US012663935B2

(12) United States Patent
Dailey et al.

(10) Patent No.: US 12,663,935 B2
(45) Date of Patent: *Jun. 23, 2026

(54) CONTINUOUS REPLICATION OF STORAGE DATA DURING PHYSICAL RELOCATION

(71) Applicant: PURE STORAGE, INC., Santa Clara, CA (US)

(72) Inventors: Aaron Dailey, San Jose, CA (US); Ronald Karr, Palo Alto, CA (US); Nicole Tselentis, Los Altos, CA (US); Logan Jennings, Menlo Park, CA (US)

(73) Assignee: EVERPURE, INC., Santa Clara, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/483,360

(22) Filed: Oct. 9, 2023

(65) Prior Publication Data

US 2024/0036759 A1 Feb. 1, 2024

Related U.S. Application Data

(63) Continuation of application No. 17/931,504, filed on Sep. 12, 2022, now Pat. No. 11,789,638, which is a continuation of application No. 17/077,467, filed on Oct. 22, 2020, now Pat. No. 11,442,652, which is a continuation-in-part of application No. 16/937,396, filed on Jul. 23, 2020, now Pat. No. 11,349,917.

(51) Int. Cl.
*G06F 15/16* (2006.01)
*G06F 3/06* (2006.01)

(52) U.S. Cl.
CPC ............ *G06F 3/065* (2013.01); *G06F 3/0604* (2013.01); *G06F 3/0635* (2013.01); *G06F 3/0647* (2013.01); *G06F 3/067* (2013.01); *G06F 3/0683* (2013.01)

(58) Field of Classification Search
CPC ...... G06F 3/065; G06F 3/0604; G06F 3/0635; G06F 3/0647; G06F 3/067; G06F 3/0683
See application file for complete search history.

(56) References Cited

U.S. PATENT DOCUMENTS

| | | | | |
|---|---|---|---|---|
| 11,442,652 B1* | 9/2022 | Dailey | ............... | H04L 67/1097 |
| 11,789,638 B2* | 10/2023 | Dailey | ................ | G06F 3/0647 |
| | | | | 711/154 |
| 2014/0269289 A1* | 9/2014 | Effros | .................... | H04L 47/18 |
| | | | | 370/231 |
| 2014/0310240 A1* | 10/2014 | Meng | ...................... | G06F 9/466 |
| | | | | 707/615 |
| 2018/0050385 A1 | 2/2018 | Wang et al. | | |
| 2018/0260125 A1 | 9/2018 | Botes et al. | | |
| 2021/0389898 A1* | 12/2021 | Hironaka | .............. | G06F 3/0685 |

* cited by examiner

*Primary Examiner* — Joseph R Maniwang

(57) ABSTRACT

Continuing replication during storage system transportation, including: replicating, between a first storage system and a second storage system, a dataset; connecting, by the first storage system during movement of the first storage system to a new physical location, to a communication network available at one or more intermediate physical locations; and continuing the replicating of the dataset between the first storage system at one or more of the intermediate physical locations and the second storage system over the communication network available at one or more of the intermediate physical locations.

20 Claims, 47 Drawing Sheets

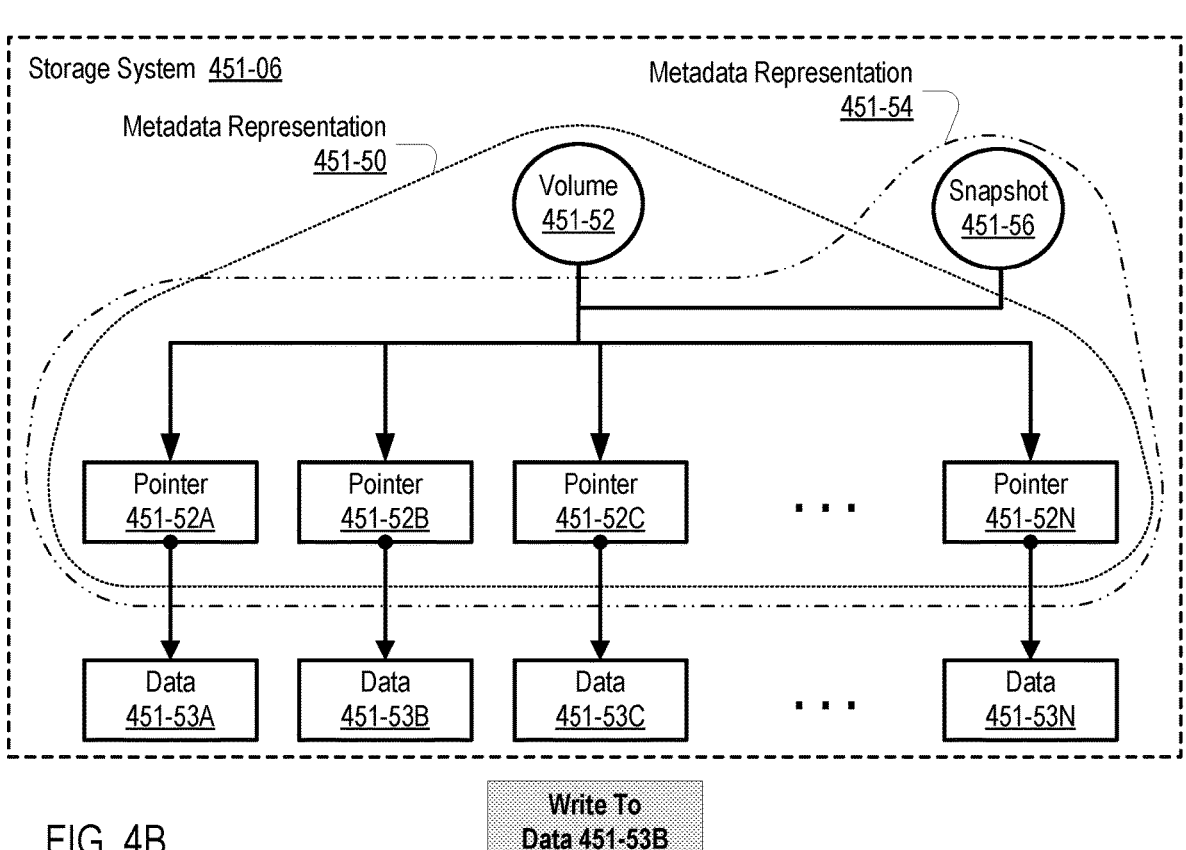
FIG. 4B
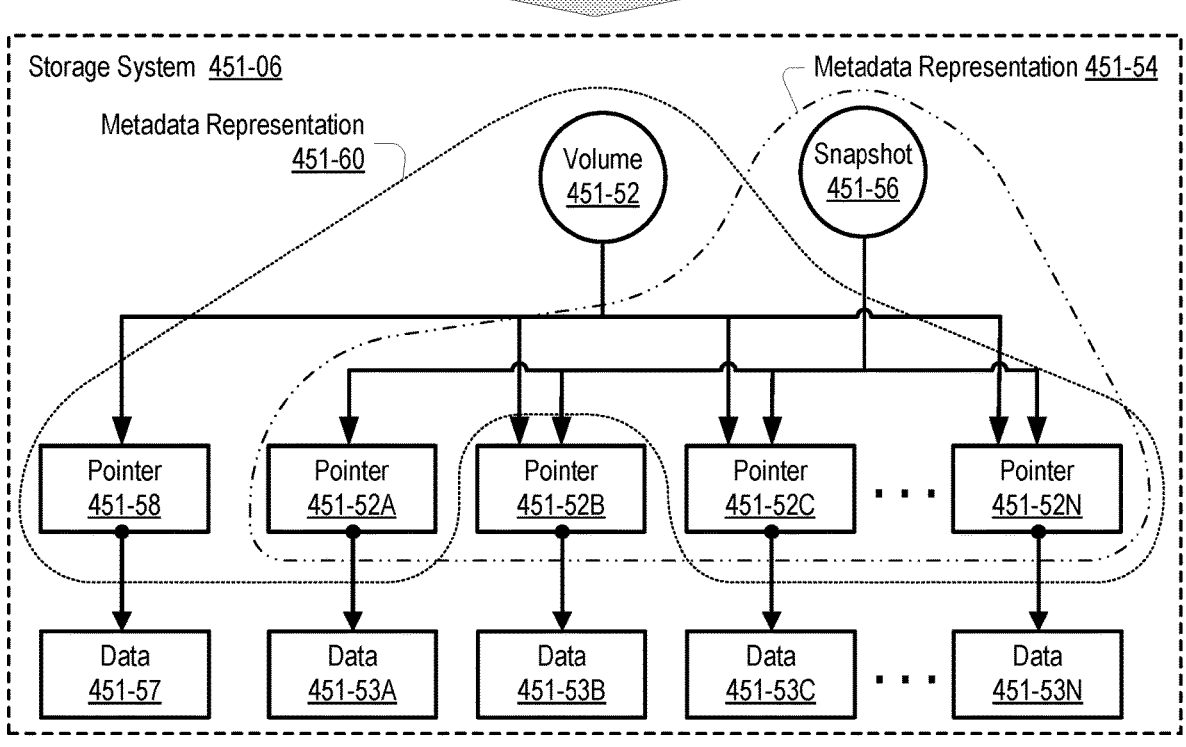

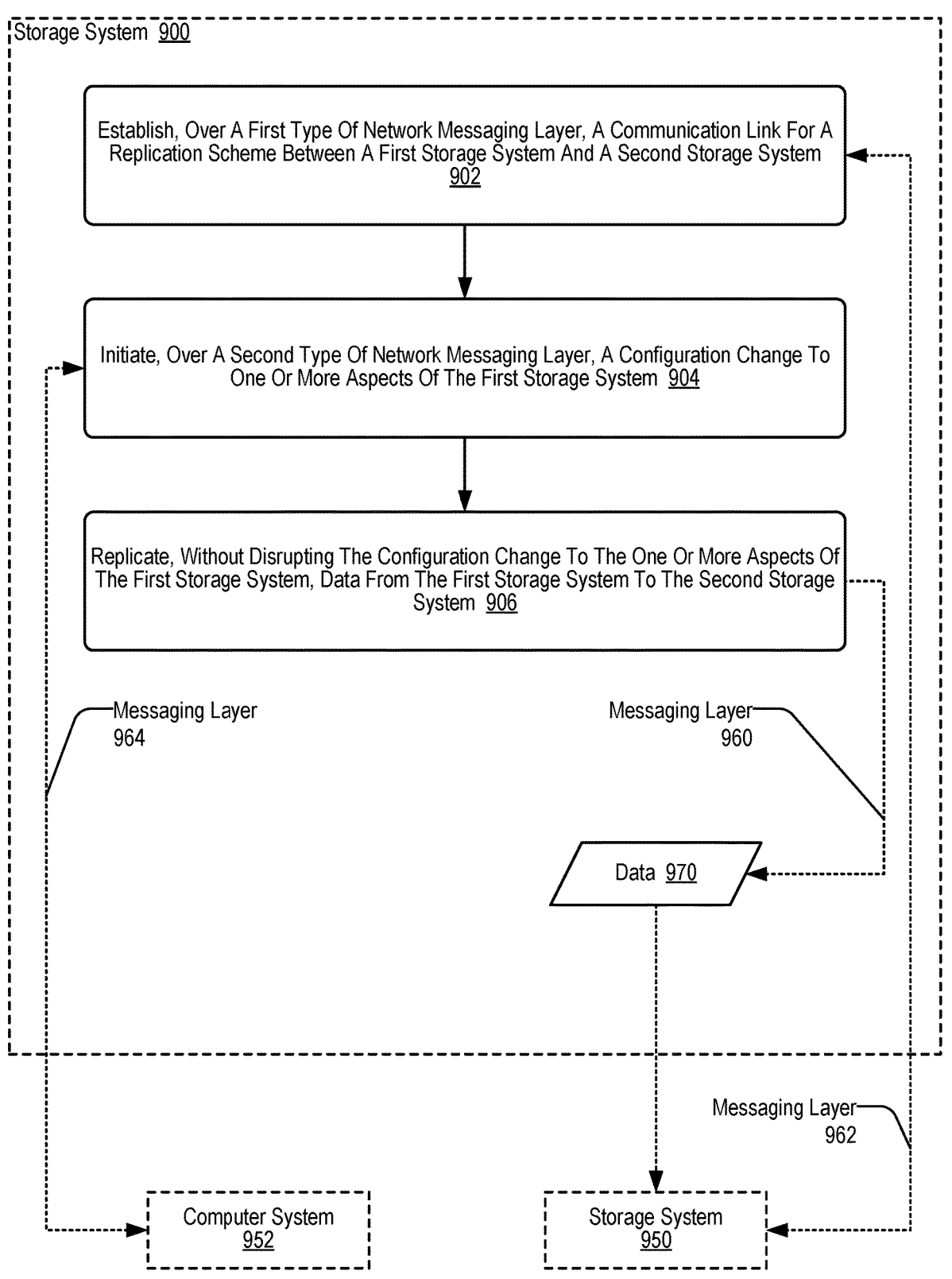

Storage System 900

Establish, Over A First Type Of Network Messaging Layer, A Communication Link For A Replication Scheme Between A First Storage System And A Second Storage System 902

Initiate, Over A Second Type Of Network Messaging Layer, A Configuration Change To One Or More Aspects Of The First Storage System 904

Replicate, Without Disrupting The Configuration Change To The One Or More Aspects Of The First Storage System, Data From The First Storage System To The Second Storage System 906

Messaging Layer 964

Messaging Layer 960

Data 970

Messaging Layer 962

Computer System 952

Storage System 950

FIG. 9

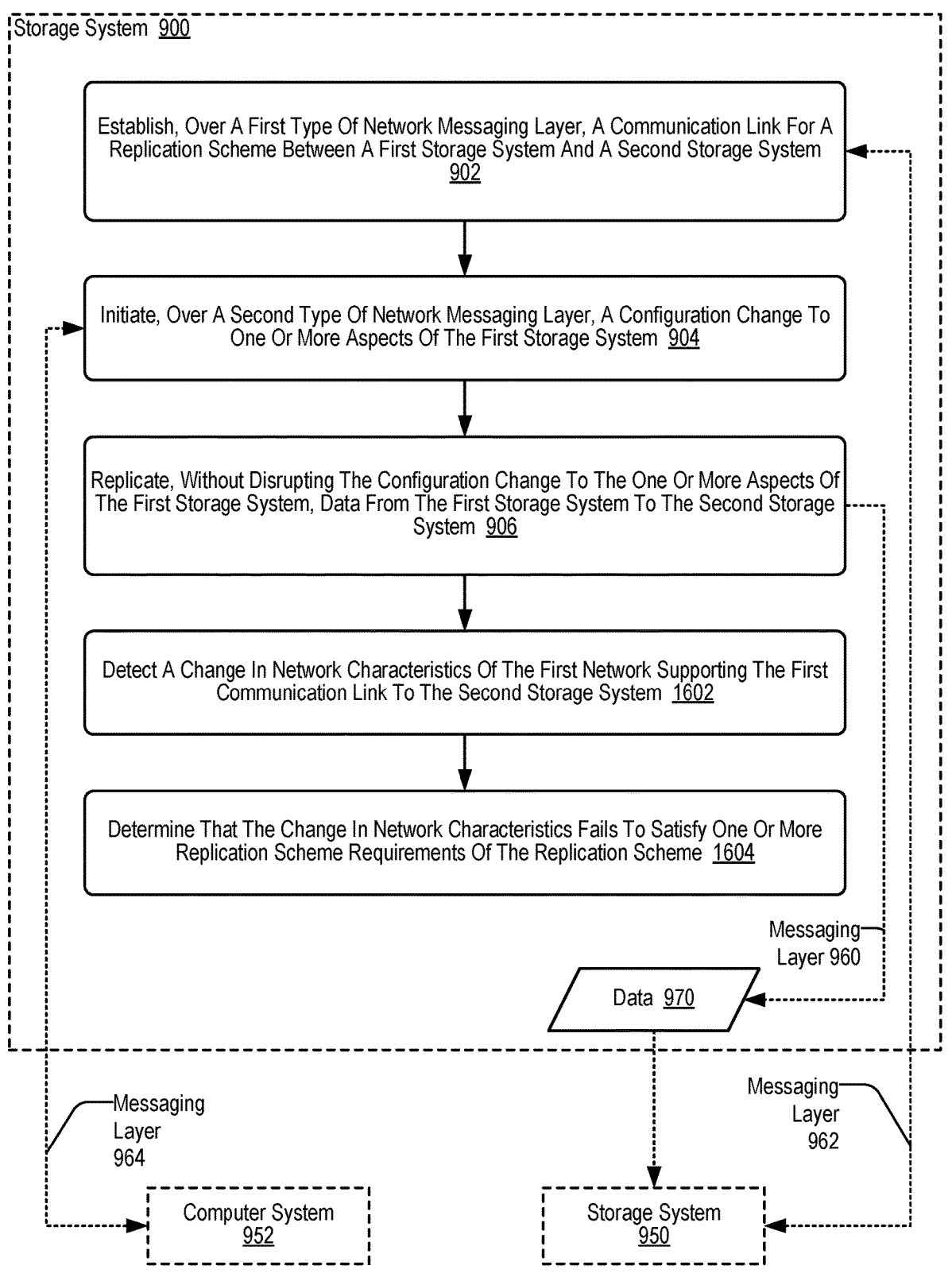

Storage System 900

Establish, Over A First Type Of Network Messaging Layer, A Communication Link For A Replication Scheme Between A First Storage System And A Second Storage System 902

Initiate, Over A Second Type Of Network Messaging Layer, A Configuration Change To One Or More Aspects Of The First Storage System 904

Replicate, Without Disrupting The Configuration Change To The One Or More Aspects Of The First Storage System, Data From The First Storage System To The Second Storage System 906

Detect A Change In Network Characteristics Of The First Network Supporting The First Communication Link To The Second Storage System 1602

Determine That The Change In Network Characteristics Fails To Satisfy One Or More Replication Scheme Requirements Of The Replication Scheme 1604

Messaging Layer 960

Data 970

Messaging Layer 964

Messaging Layer 962

Computer System 952

Storage System 950

FIG. 16

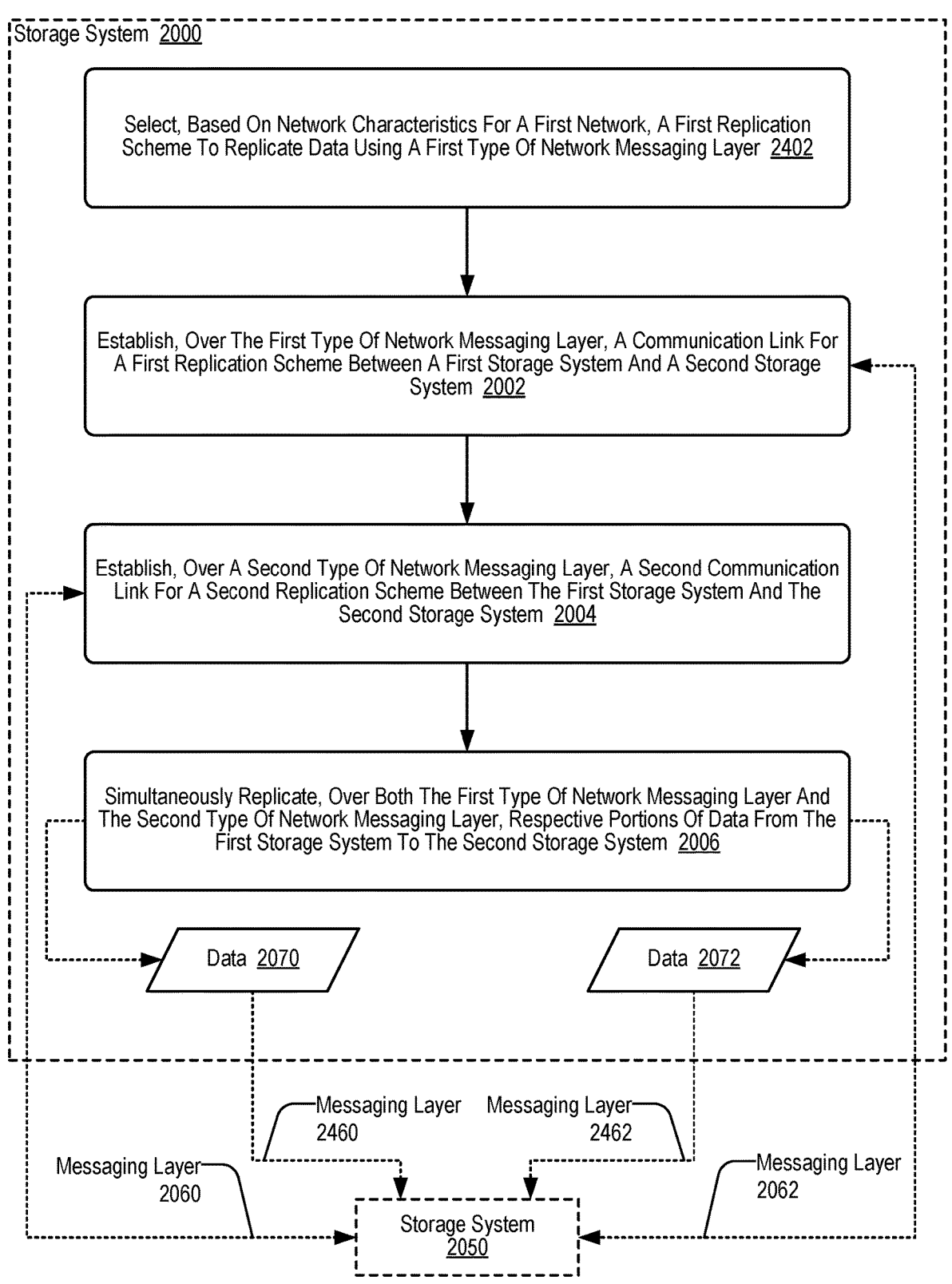

Storage System 2000

Select, Based On Network Characteristics For A First Network, A First Replication Scheme To Replicate Data Using A First Type Of Network Messaging Layer 2402

Establish, Over The First Type Of Network Messaging Layer, A Communication Link For A First Replication Scheme Between A First Storage System And A Second Storage System 2002

Establish, Over A Second Type Of Network Messaging Layer, A Second Communication Link For A Second Replication Scheme Between The First Storage System And The Second Storage System 2004

Simultaneously Replicate, Over Both The First Type Of Network Messaging Layer And The Second Type Of Network Messaging Layer, Respective Portions Of Data From The First Storage System To The Second Storage System 2006

Data 2070

Data 2072

Messaging Layer 2460     Messaging Layer 2462

Messaging Layer 2060

Messaging Layer 2062

Storage System 2050

FIG. 24

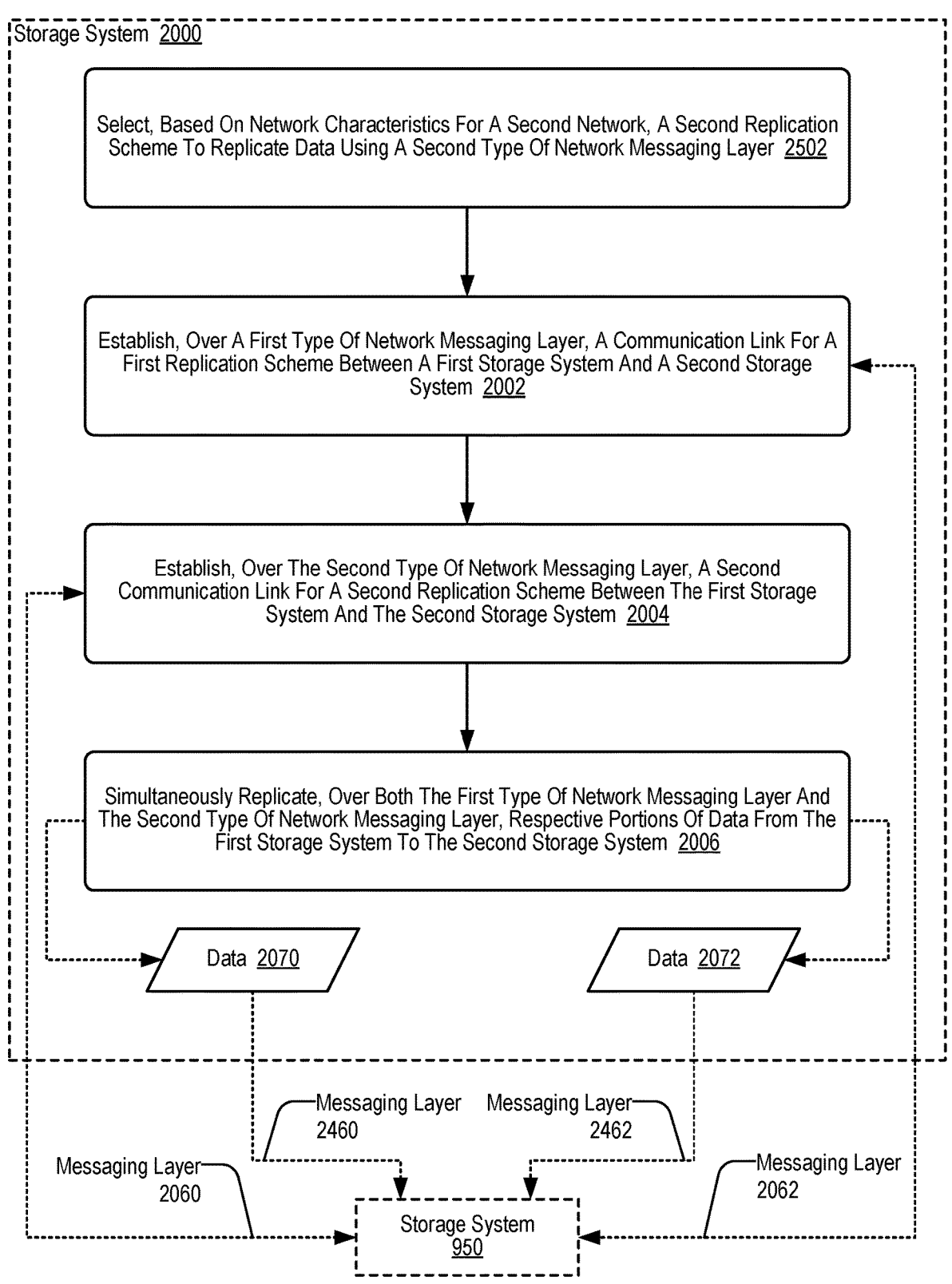

Storage System 2000

Select, Based On Network Characteristics For A Second Network, A Second Replication Scheme To Replicate Data Using A Second Type Of Network Messaging Layer 2502

Establish, Over A First Type Of Network Messaging Layer, A Communication Link For A First Replication Scheme Between A First Storage System And A Second Storage System 2002

Establish, Over The Second Type Of Network Messaging Layer, A Second Communication Link For A Second Replication Scheme Between The First Storage System And The Second Storage System 2004

Simultaneously Replicate, Over Both The First Type Of Network Messaging Layer And The Second Type Of Network Messaging Layer, Respective Portions Of Data From The First Storage System To The Second Storage System 2006

Data 2070

Data 2072

Messaging Layer 2460    Messaging Layer 2462

Messaging Layer 2060

Messaging Layer 2062

Storage System 950

FIG. 25

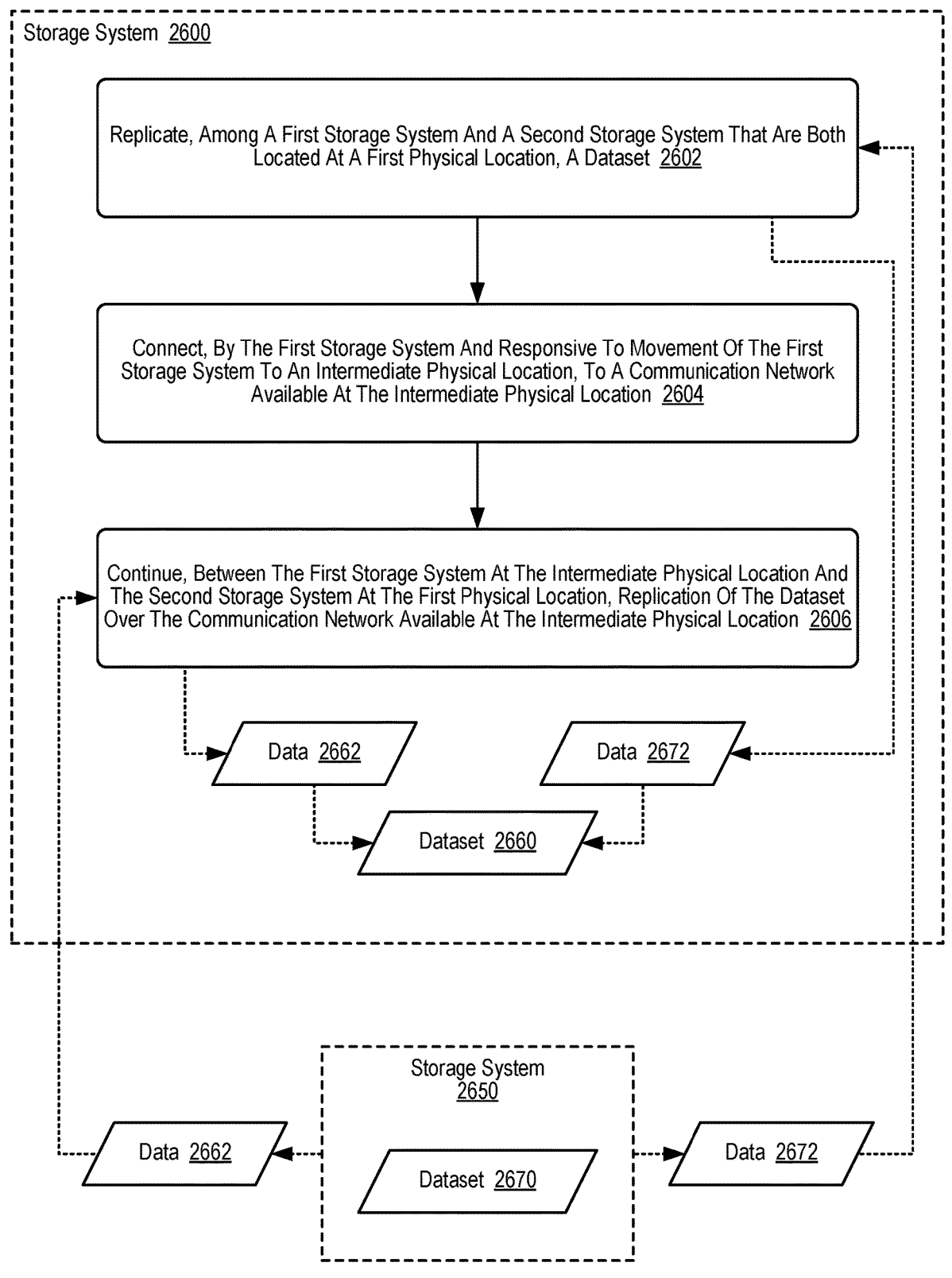

Storage System 2600

Replicate, Among A First Storage System And A Second Storage System That Are Both Located At A First Physical Location, A Dataset 2602

Connect, By The First Storage System And Responsive To Movement Of The First Storage System To An Intermediate Physical Location, To A Communication Network Available At The Intermediate Physical Location 2604

Continue, Between The First Storage System At The Intermediate Physical Location And The Second Storage System At The First Physical Location, Replication Of The Dataset Over The Communication Network Available At The Intermediate Physical Location 2606

Data 2662

Data 2672

Dataset 2660

Storage System 2650

Data 2662

Dataset 2670

Data 2672

FIG. 26A

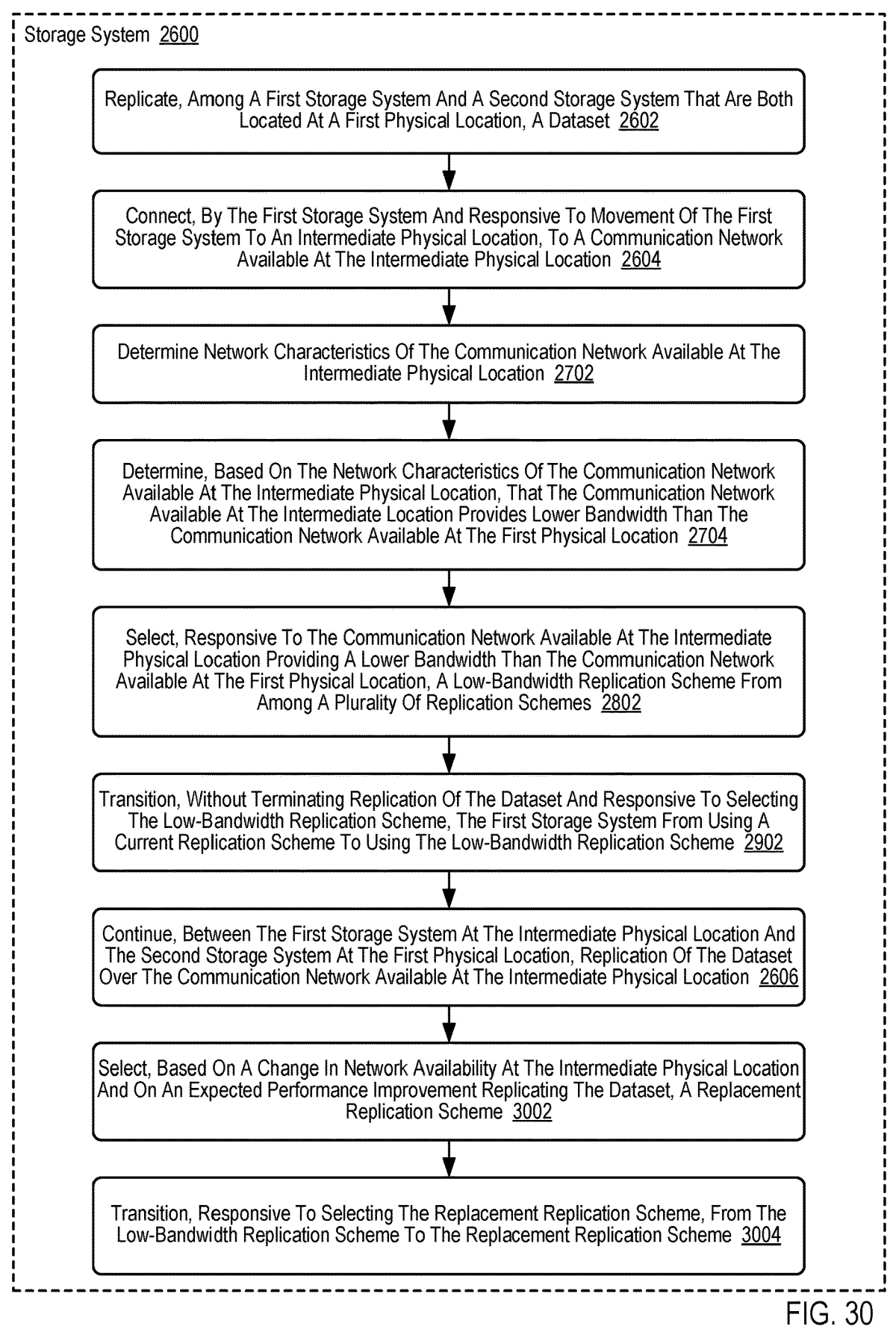

Storage System 2600

Replicate, Among A First Storage System And A Second Storage System That Are Both Located At A First Physical Location, A Dataset 2602

↓

Connect, By The First Storage System And Responsive To Movement Of The First Storage System To An Intermediate Physical Location, To A Communication Network Available At The Intermediate Physical Location 2604

↓

Determine Network Characteristics Of The Communication Network Available At The Intermediate Physical Location 2702

↓

Determine, Based On The Network Characteristics Of The Communication Network Available At The Intermediate Physical Location, That The Communication Network Available At The Intermediate Location Provides Lower Bandwidth Than The Communication Network Available At The First Physical Location 2704

↓

Select, Responsive To The Communication Network Available At The Intermediate Physical Location Providing A Lower Bandwidth Than The Communication Network Available At The First Physical Location, A Low-Bandwidth Replication Scheme From Among A Plurality Of Replication Schemes 2802

↓

Transition, Without Terminating Replication Of The Dataset And Responsive To Selecting The Low-Bandwidth Replication Scheme, The First Storage System From Using A Current Replication Scheme To Using The Low-Bandwidth Replication Scheme 2902

↓

Continue, Between The First Storage System At The Intermediate Physical Location And The Second Storage System At The First Physical Location, Replication Of The Dataset Over The Communication Network Available At The Intermediate Physical Location 2606

↓

Select, Based On A Change In Network Availability At The Intermediate Physical Location And On An Expected Performance Improvement Replicating The Dataset, A Replacement Replication Scheme 3002

↓

Transition, Responsive To Selecting The Replacement Replication Scheme, From The Low-Bandwidth Replication Scheme To The Replacement Replication Scheme 3004

FIG. 30

CONTINUOUS REPLICATION OF STORAGE DATA DURING PHYSICAL RELOCATION

CROSS-REFERENCE TO RELATED APPLICATIONS

This is a continuation application for patent entitled to a filing date and claiming the benefit of earlier-filed U.S. Pat. No. 11,789,638, issued Oct. 17, 2023, herein incorporated by reference in its entirety, which is a continuation of U.S. Pat. No. 11,442,652, issued Sep. 13, 2022, which is a continuation in-part of U.S. Pat. No. 11,349,917, issued May 31, 2022.

BRIEF DESCRIPTION OF DRAWINGS

FIG. 4B illustrates an example metadata model in accordance with some embodiments.

FIGS. 9-25 set forth flowcharts illustrating methods for replication handling among distinct networks according to some embodiments of the present disclosure.

FIGS. 26A-32 set forth flowcharts illustrating methods for replication handling during storage system transportation according to some embodiments of the present disclosure.

DESCRIPTION OF EMBODIMENTS

Figure 1A:
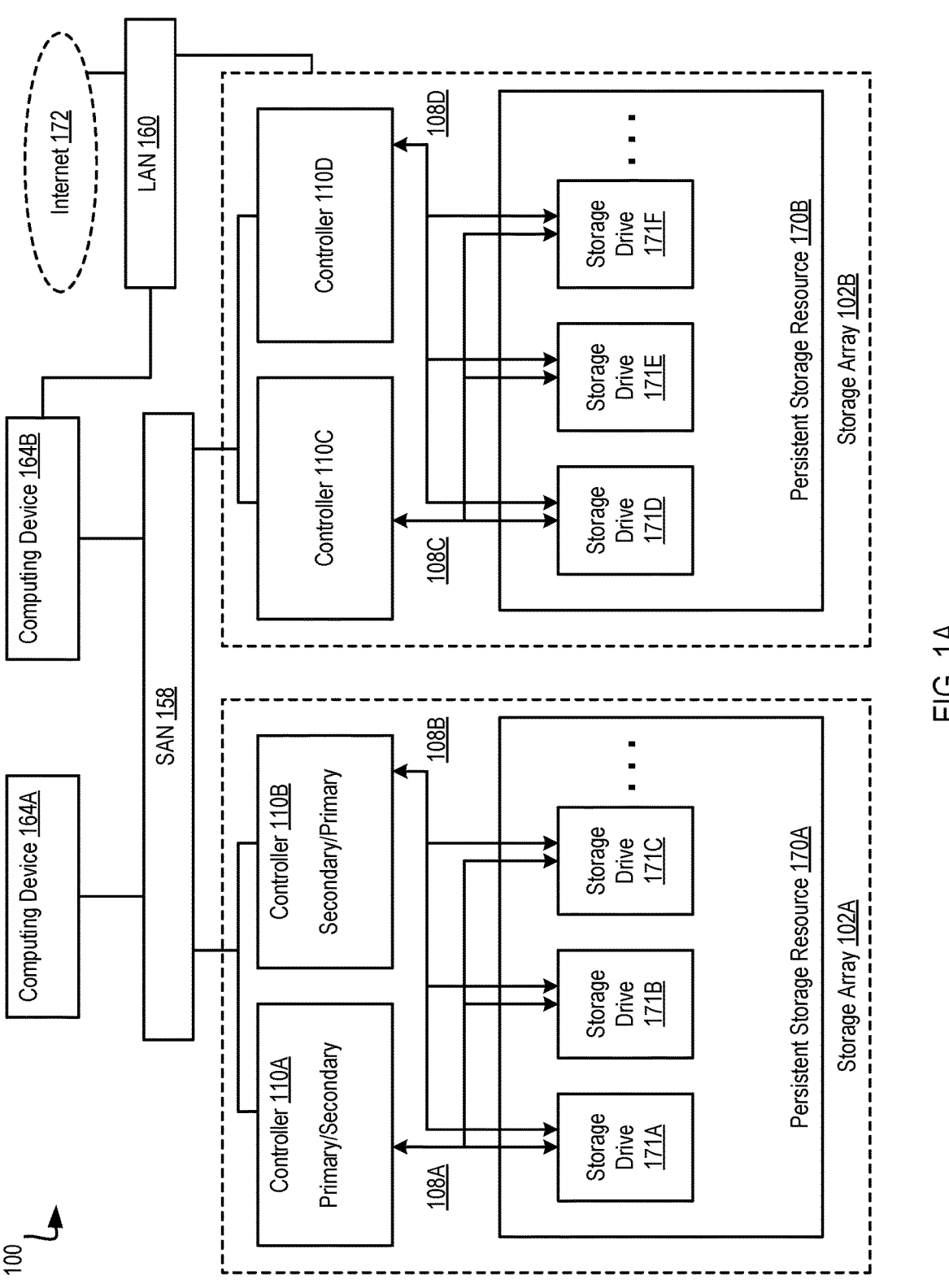
FIGS. 1A-1D illustrate example systems for data storage in accordance with some implementations.

Example methods, apparatus, and products for replication handling in during storage system transportation in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface Ci SC SF), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110B) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
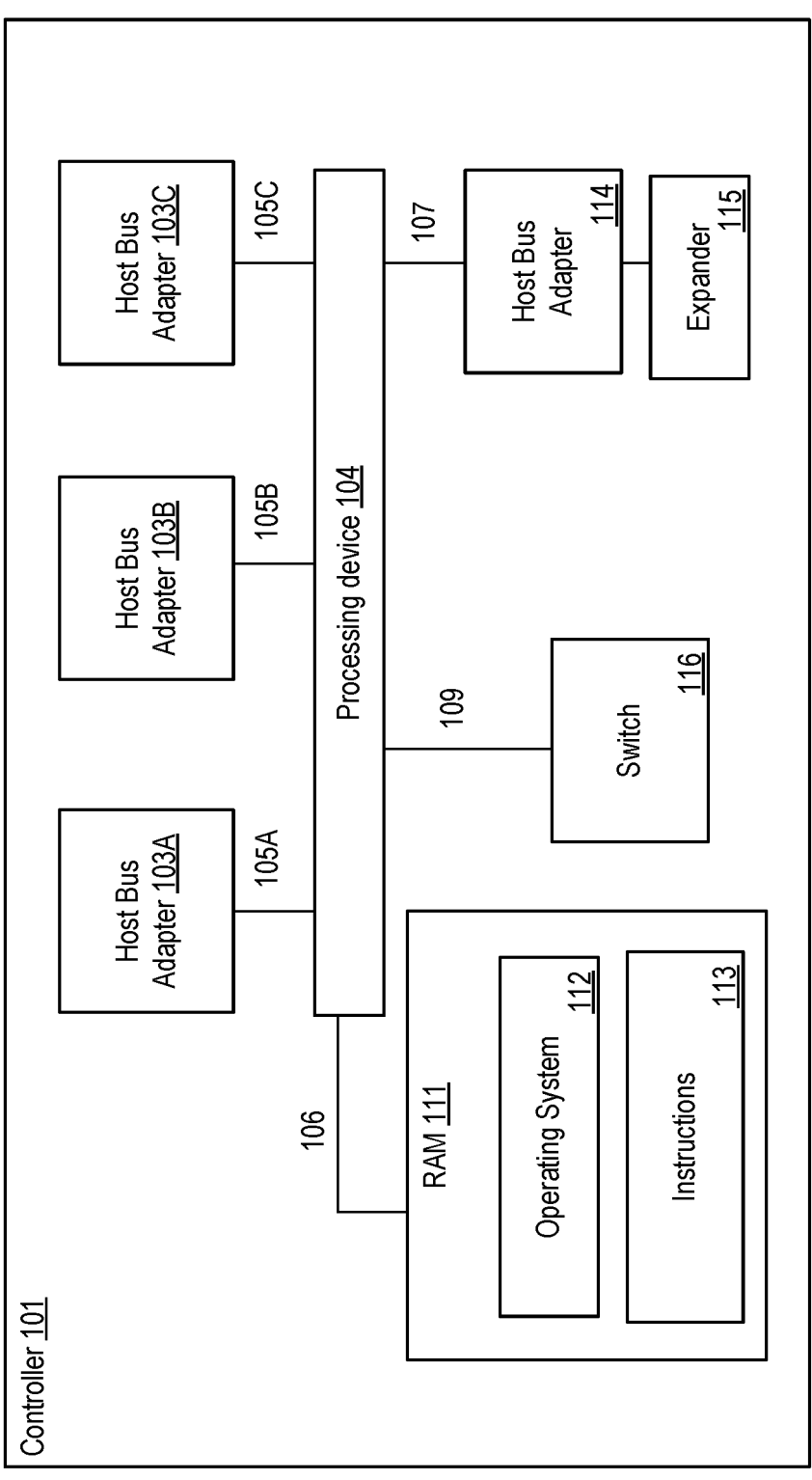

FIG. 1B illustrates an example system for data storage, in accordance with some implementations. Storage array controller 101 illustrated in FIG. 1B may be similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in a direct-mapped flash storage system. In one embodiment, a direct-mapped flash storage system is one that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is in contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
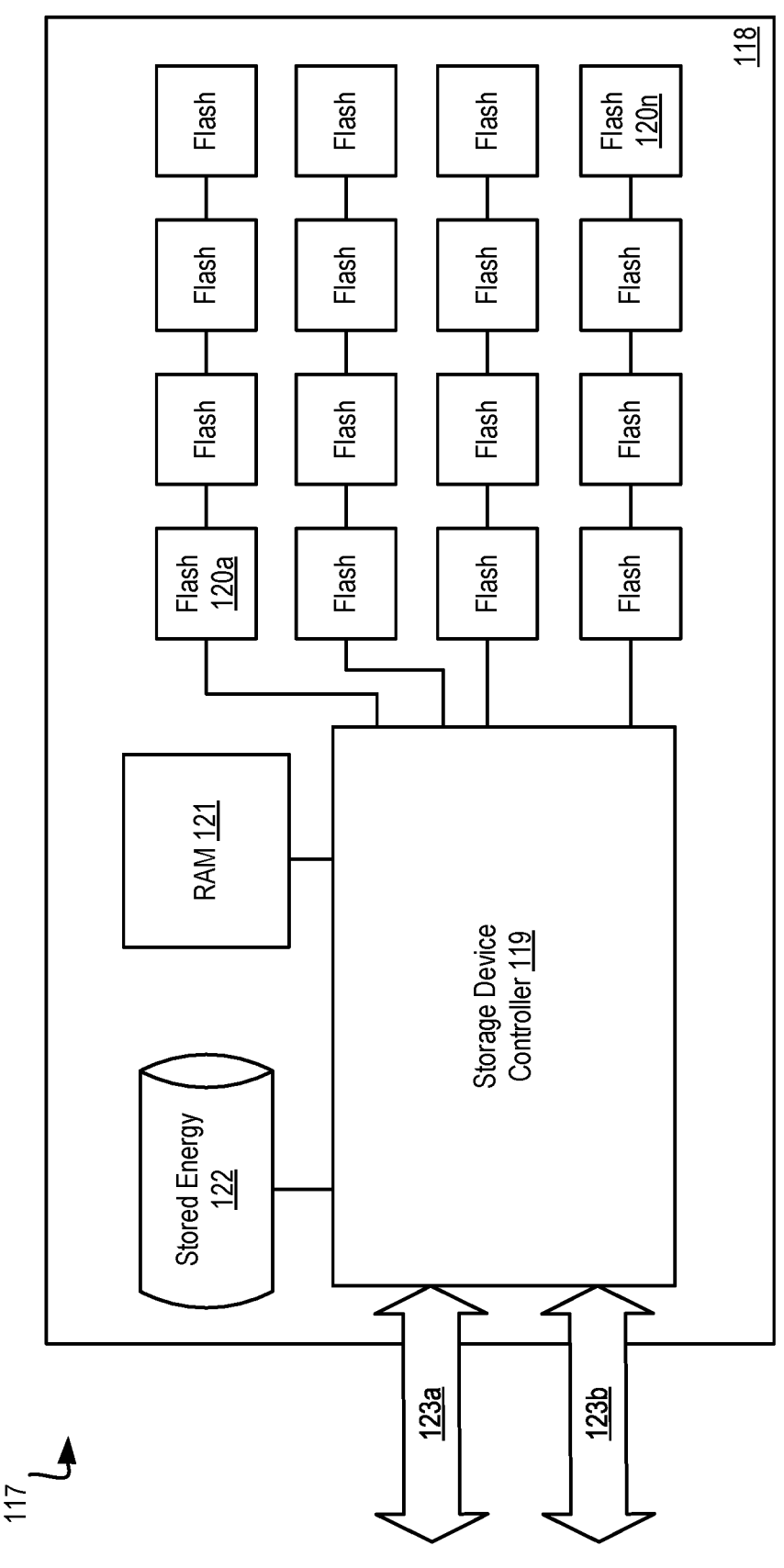

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120*a*-*n*), operatively coupled to various channels of the storage device controller 119. Flash memory devices 120*a*-*n* may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120*a*-*n* including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120*a*-120*n*) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123*a*, 123*b*. In one embodiment, data communications links 123*a*, 123*b* may be PCI interfaces. In another embodiment, data communications links 123*a*, 123*b* may be based on other communications standards (e.g., HyperTransport, InfiniBand, etc.). Data communications links 123*a*, 123*b* may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n. The stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
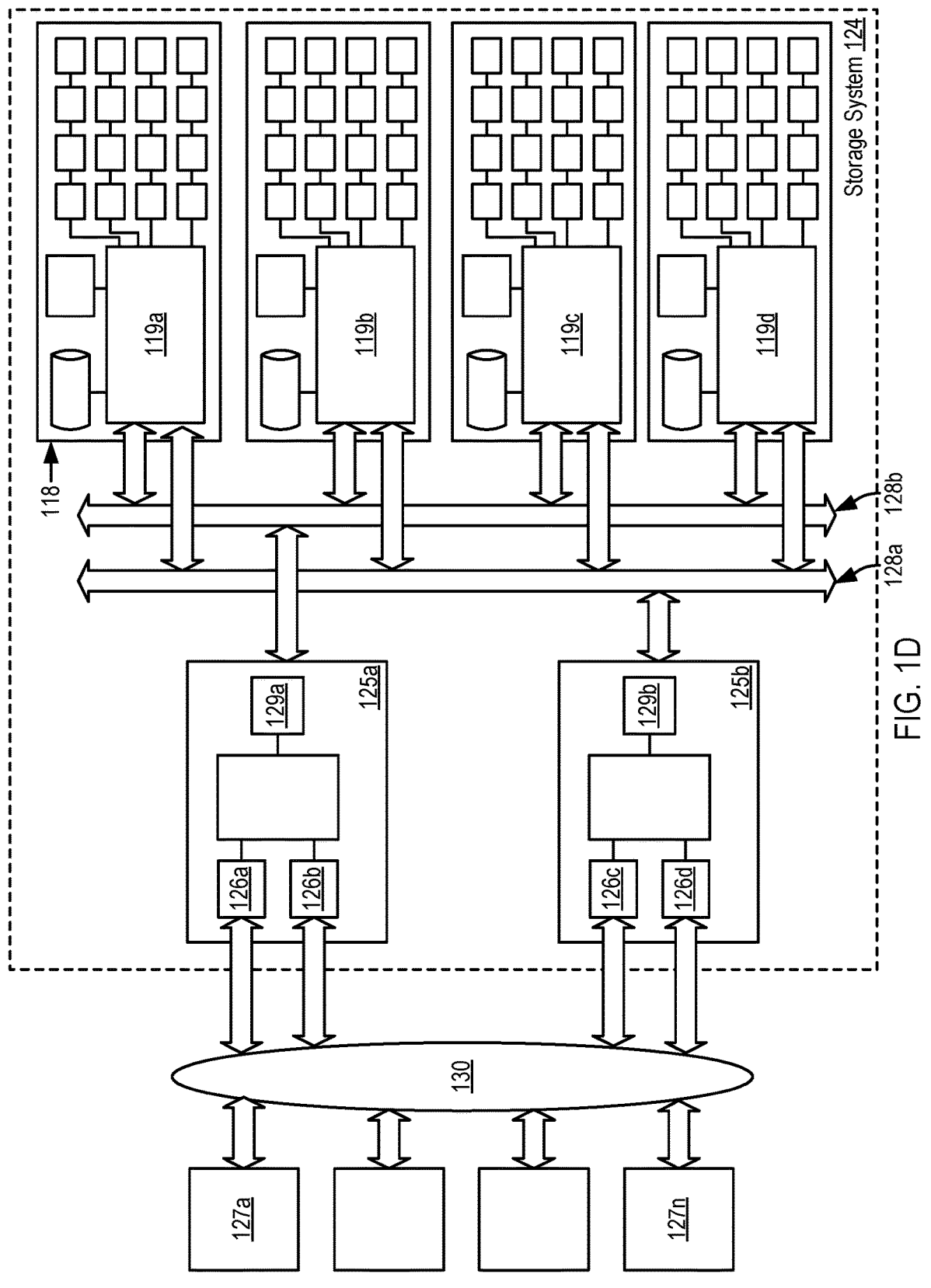

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS block storage array, a file server, an object server, a database, or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one or more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
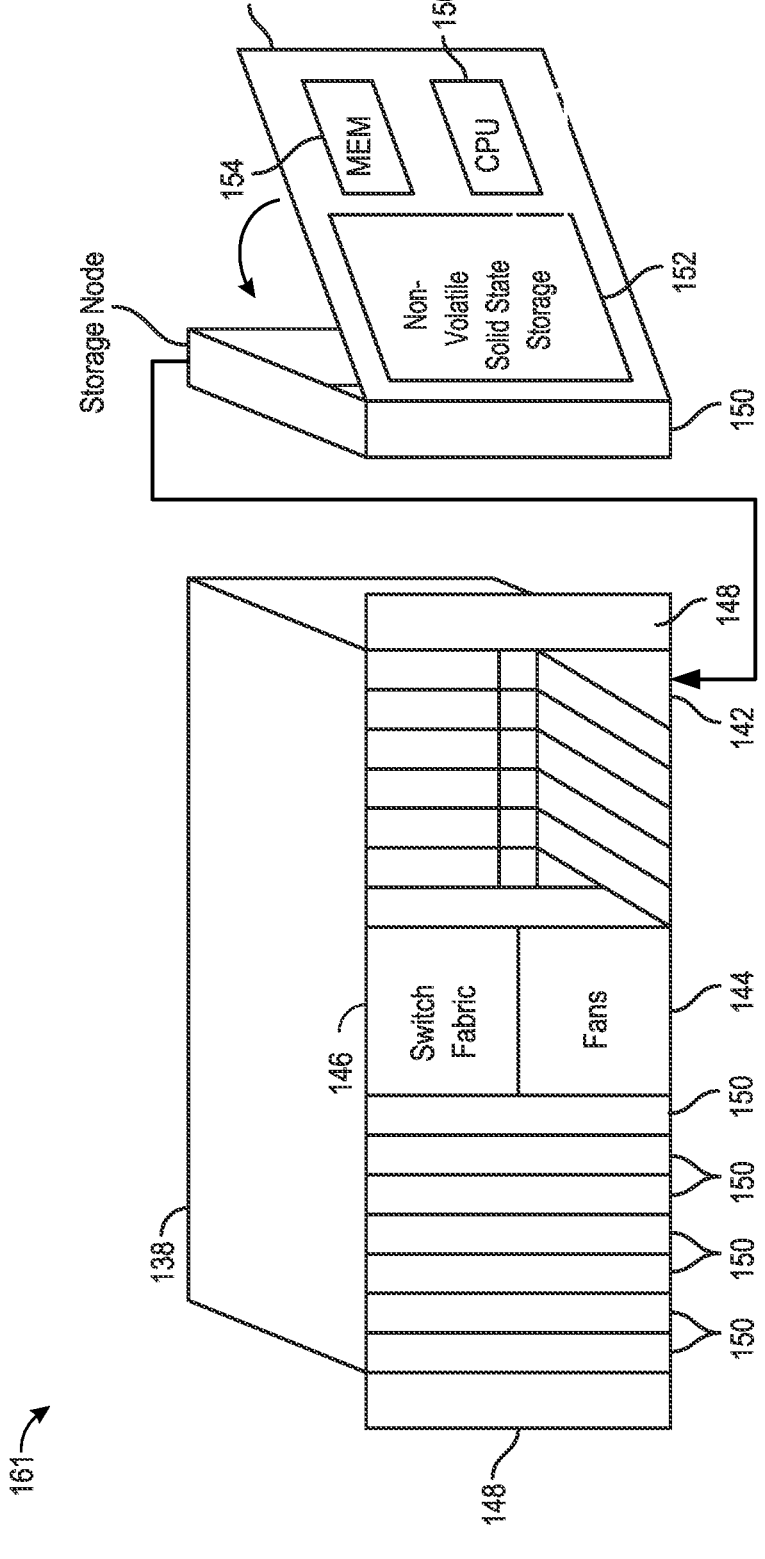
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the nonvolatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
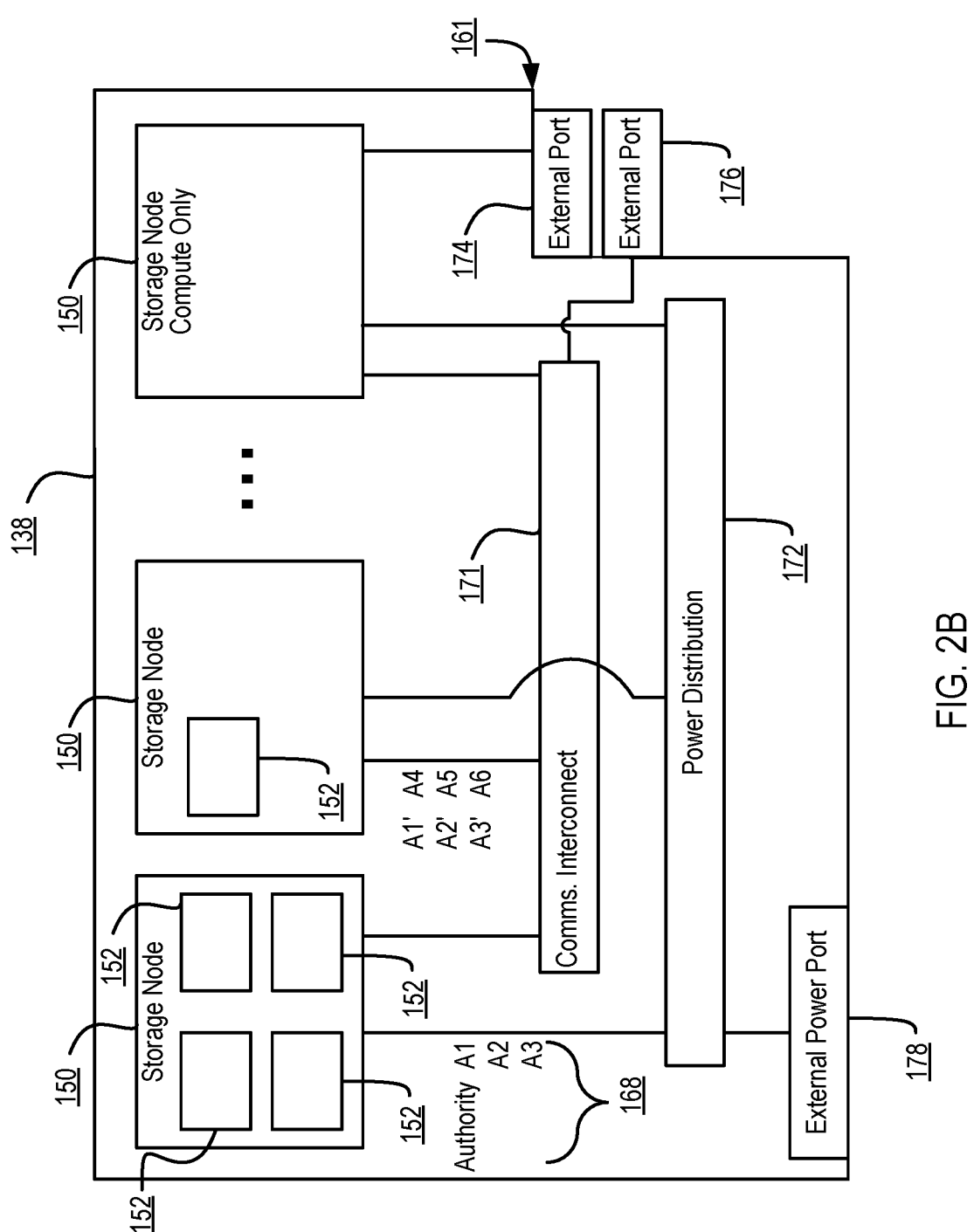
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory, or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Modes point into medium address space, where data is logically stored. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
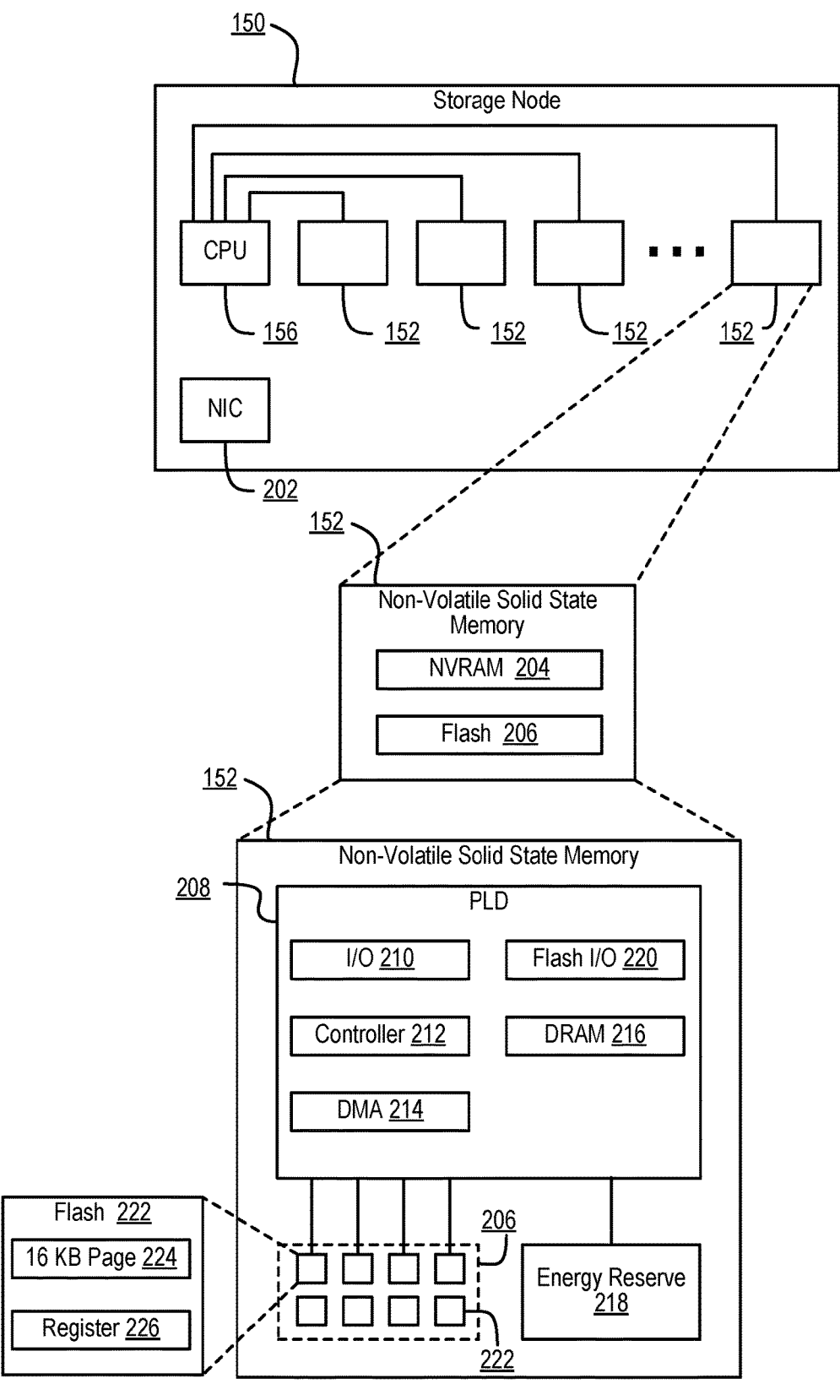
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e., multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
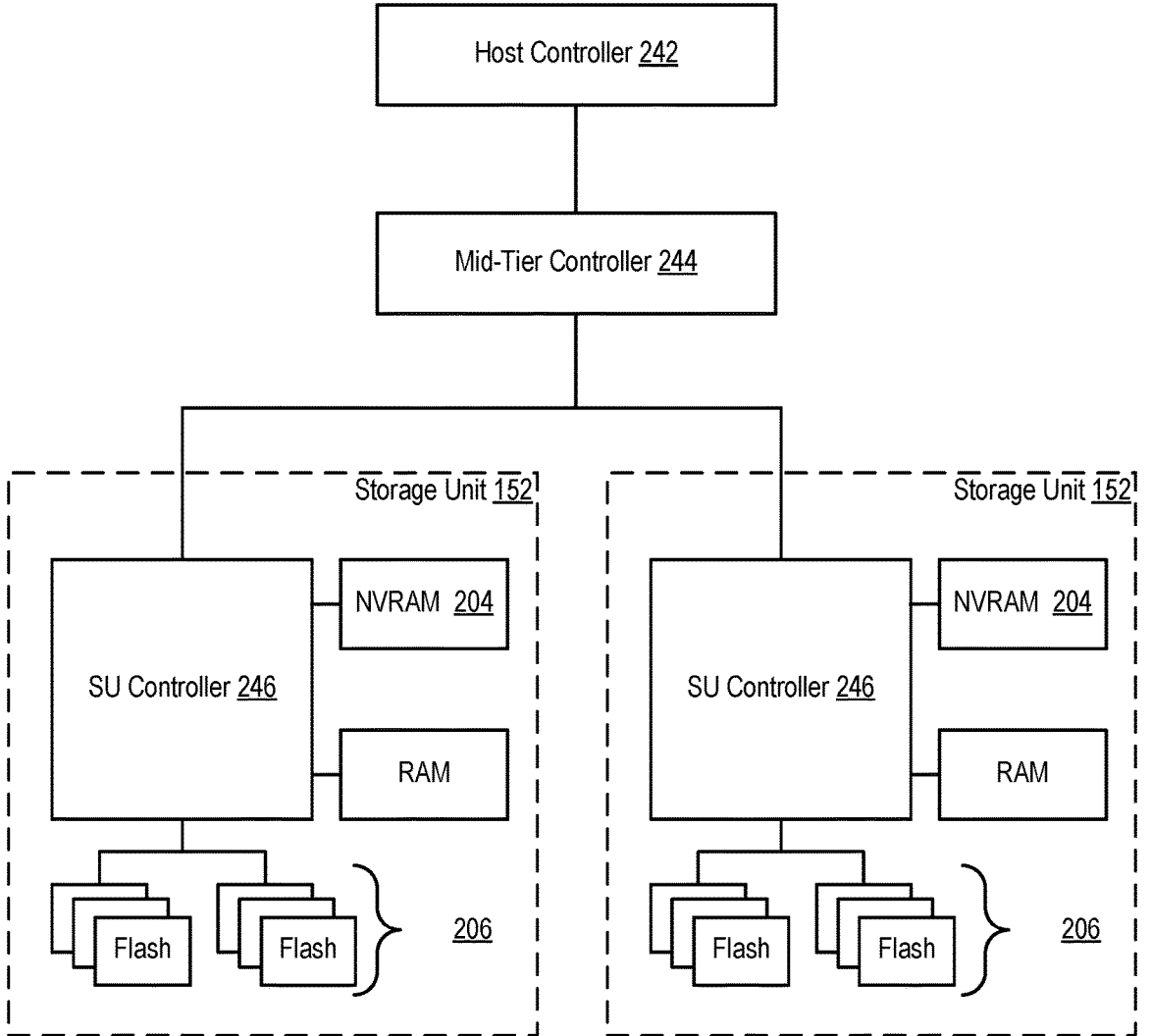
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
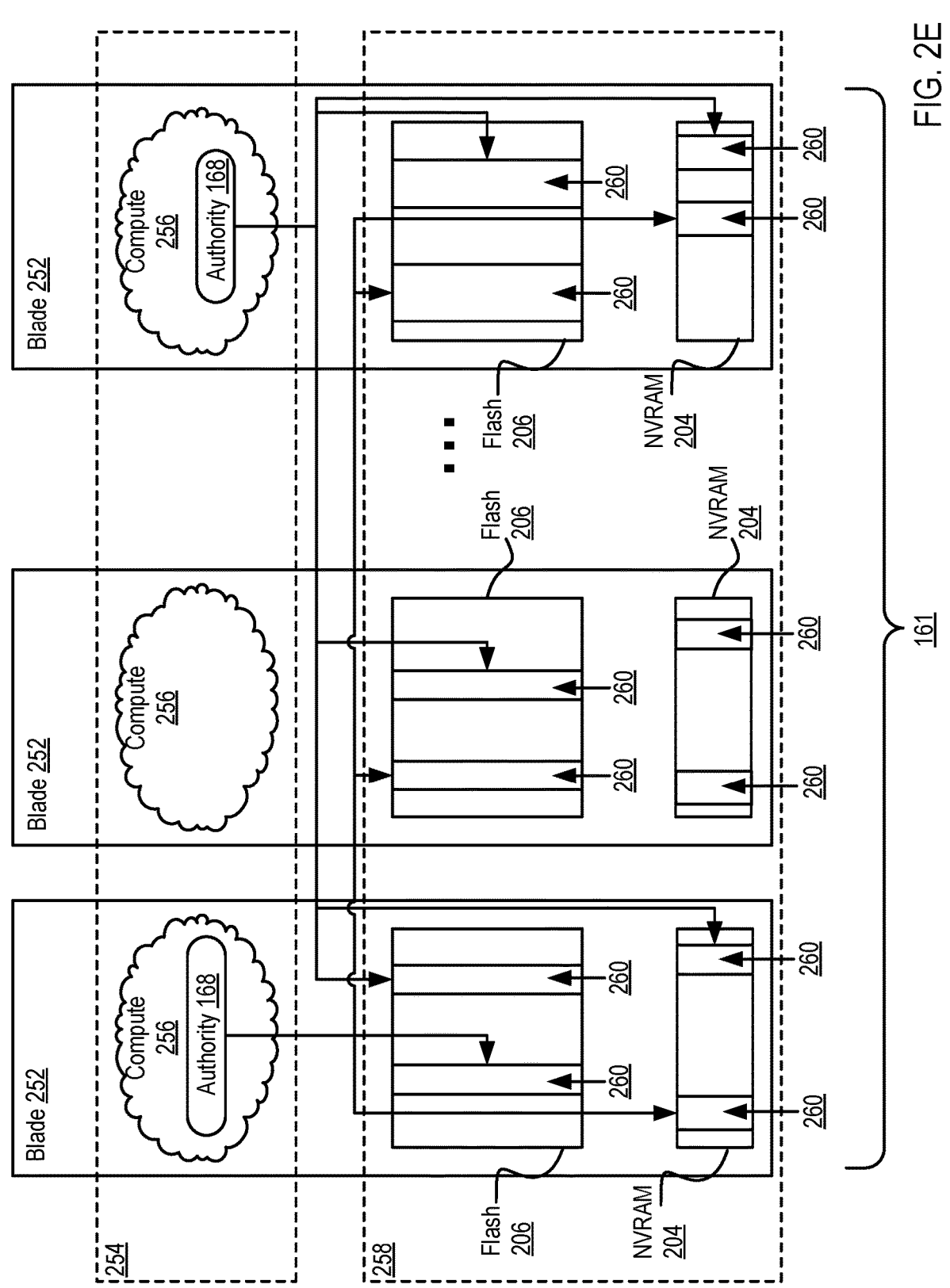
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g., partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
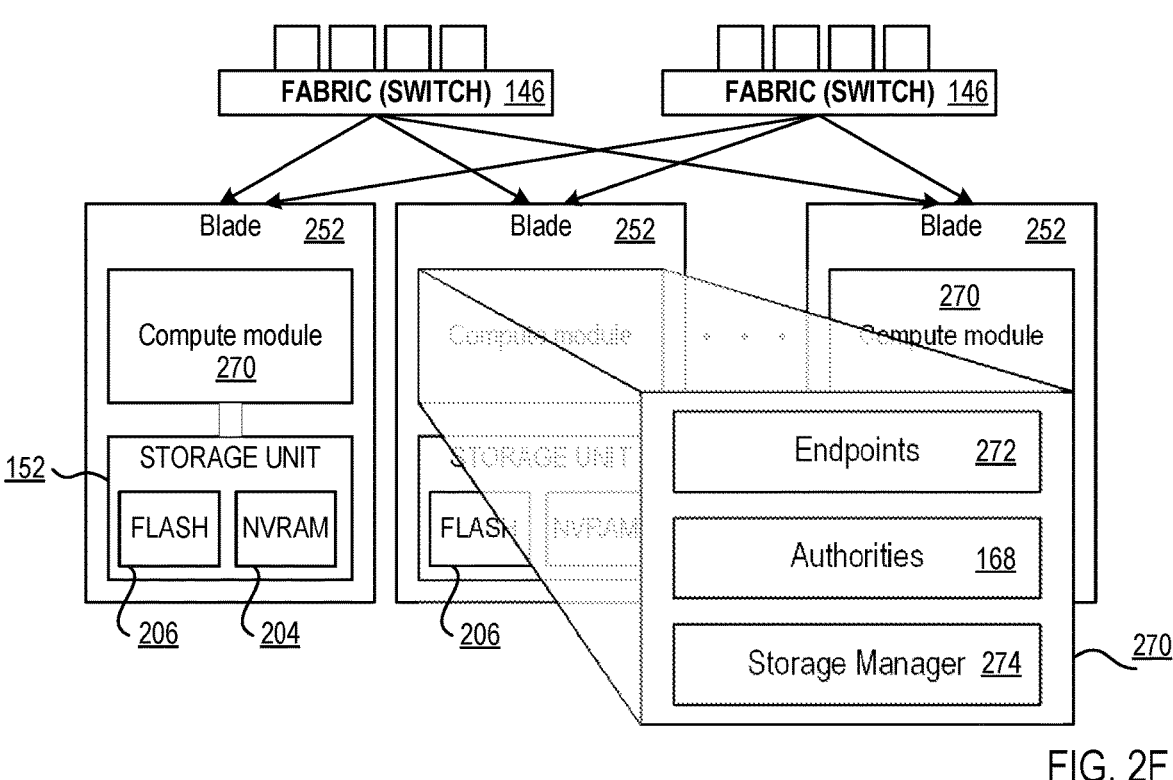
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some embodiments. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
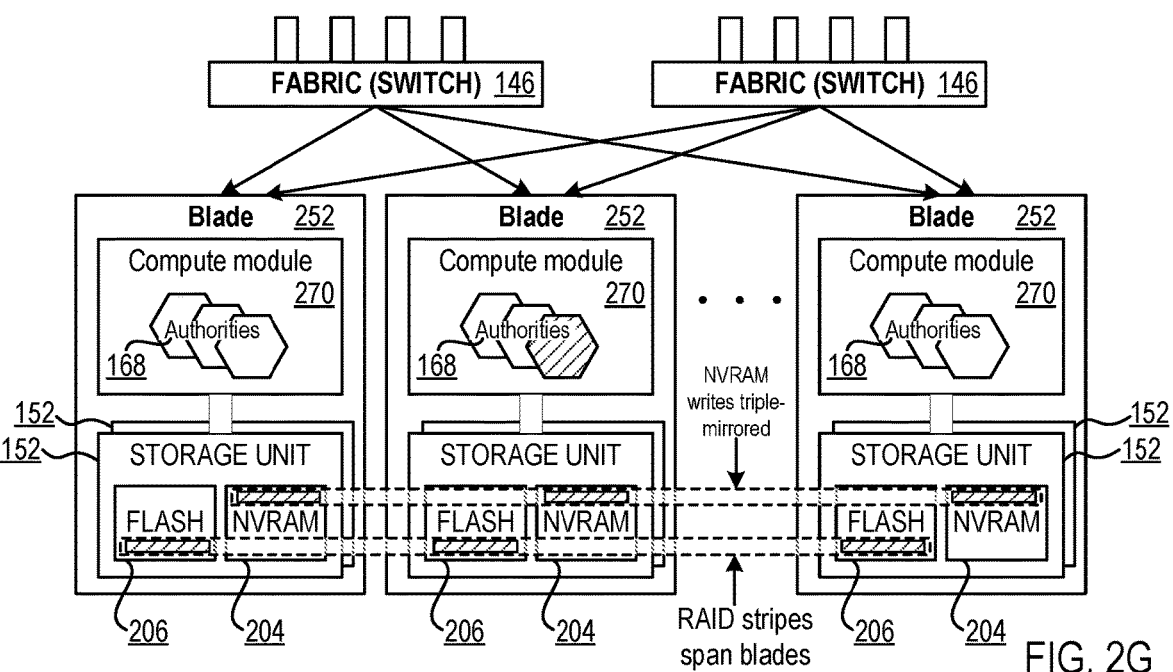
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS' environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIF S'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
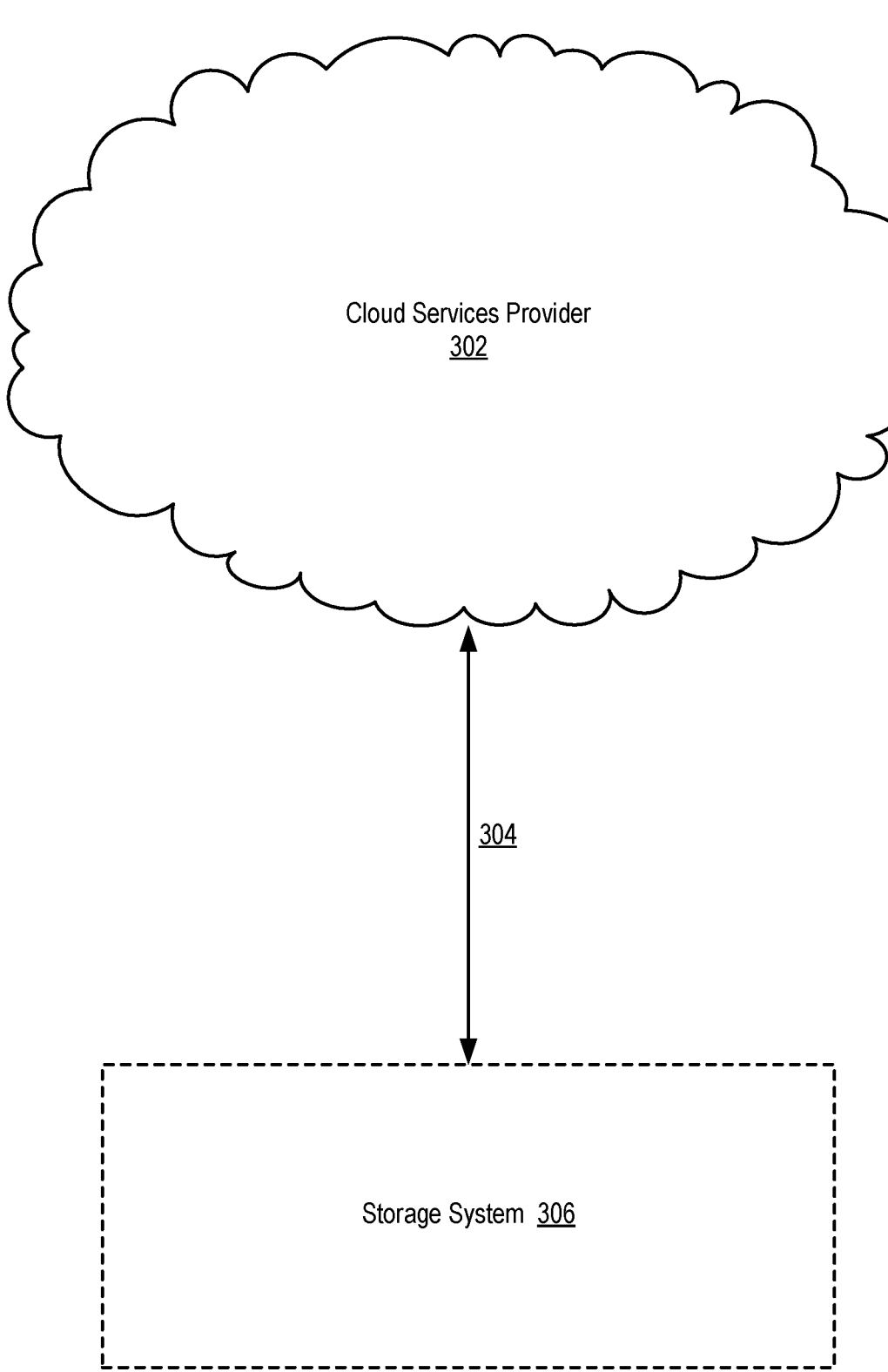
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol (IF), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications, and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on-premises with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
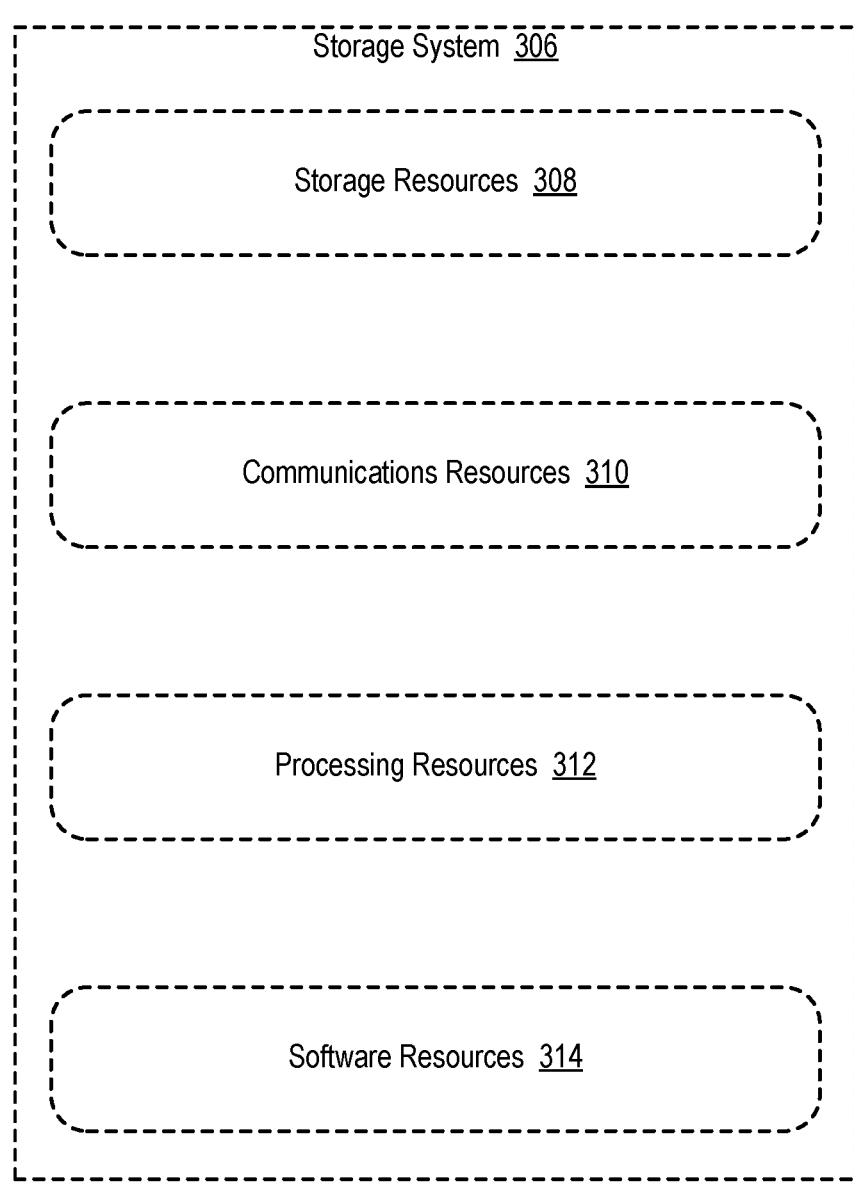
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint nonvolatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3A may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that may be useful in facilitating data communications between components within the storage system 306, as well as data communications between the storage system 306 and computing devices that are outside of the storage system 306.

The storage system 306 depicted in FIG. 3B also includes processing resources 312 that may be useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
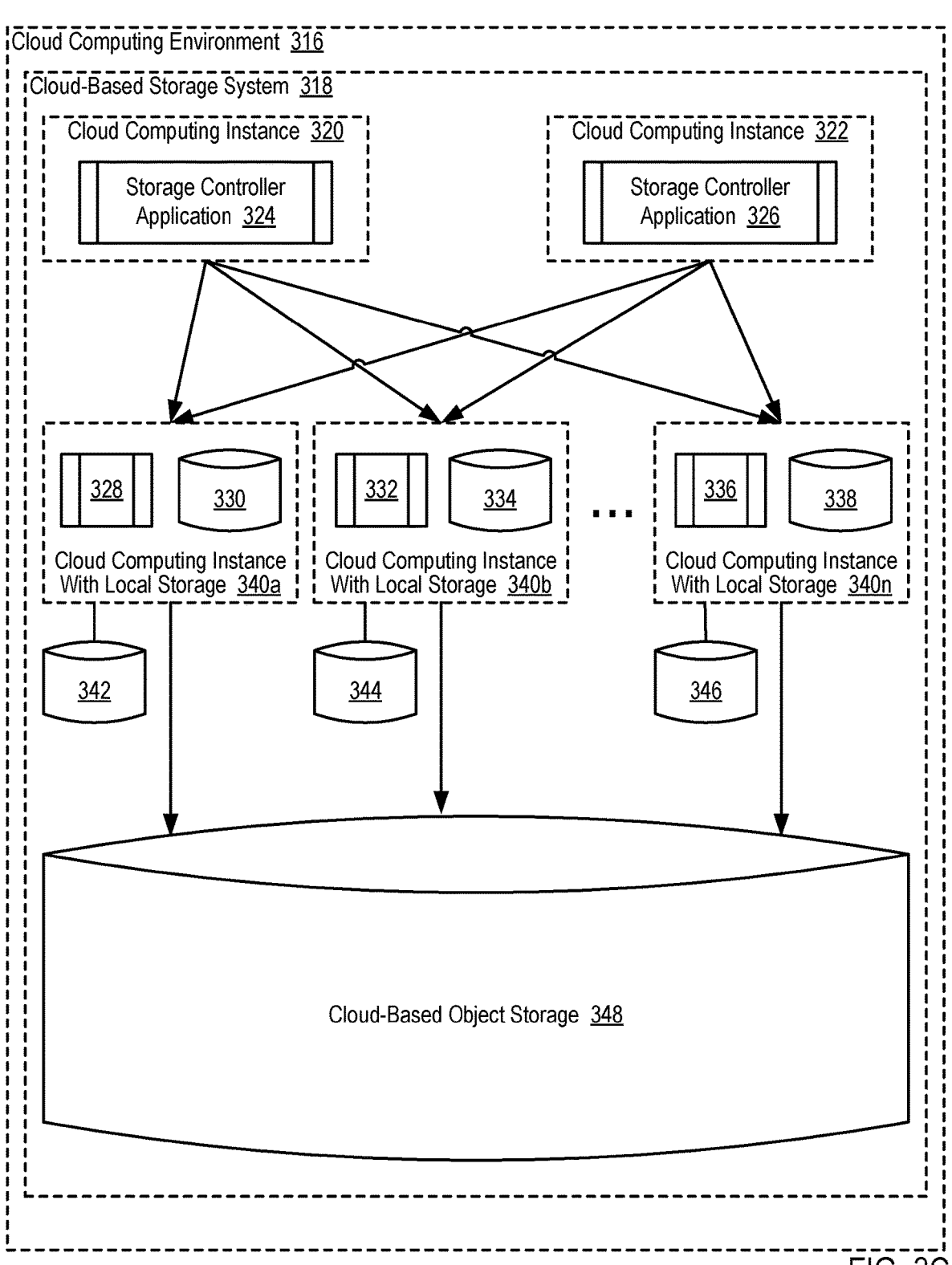
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS'), Microsoft Azure, Google Cloud Platform, IBM Cloud, Oracle Cloud, and others. The cloud-based storage system 318 may be used to provide services similar to the services that may be provided by the storage systems described above. For example, the cloud-based storage system 318 may be used to provide block storage services to users of the cloud-based storage system 318, the cloud-based storage system 318 may be used to provide storage services to users of the cloud-based storage system 318 through the use of solid-state storage, and so on.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data received from the users of the cloud-based storage system 318 to the cloud-based storage system 318, erasing data from the cloud-based storage system 318, retrieving data from the cloud-based storage system 318 and providing such data to users of the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322.

Consider an example in which the cloud computing environment 316 is embodied as AWS and the cloud computing instances are embodied as EC2 instances. In such an example, the cloud computing instance 320 that operates as the primary controller may be deployed on one of the instance types that has a relatively large amount of memory and processing power while the cloud computing instance 322 that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance 322 that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance 322 that originally operated as the secondary controller begins operating as the secondary controller again. In such an example, the cloud computing instance 320 that formerly operated as the primary controller may be terminated. Readers will appreciate that in alternative embodiments, the cloud computing instance 320 that is operating as the secondary controller after the failover event may continue to operate as the secondary controller and the cloud computing instance 322 that operated as the primary controller after the occurrence of the failover event may be terminated once the primary role has been assumed by the third cloud computing instance (not shown).

Readers will appreciate that while the embodiments described above relate to embodiments where one cloud computing instance 320 operates as the primary controller and the second cloud computing instance 322 operates as the secondary controller, other embodiments are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n depicted in FIG. 3C may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block-storage 342, 344, 346 that is offered by the cloud computing environment 316. The block-storage 342, 344, 346 that is offered by the cloud computing environment 316 may be embodied, for example, as Amazon Elastic Block Store ('EBS') volumes. For example, a first EBS volume may be coupled to a first cloud computing instance 340a, a second EBS volume may be coupled to a second cloud computing instance 340b, and a third EBS volume may be coupled to a third cloud computing instance 340n. In such an example, the block-storage 342, 344, 346 that is offered by the cloud computing environment 316 may be utilized in a manner that is similar to how the NVRAM devices described above are utilized, as the software daemon 328, 332, 336 (or some other module) that is executing within a particular cloud computing instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud computing instance 340a, 340b, 340n. In an alternative embodiment, rather than using the block-storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM.

In the example depicted in FIG. 3C, the cloud computing instances 340a, 340b, 340n with local storage 330, 334, 338 may be utilized, by cloud computing instances 320, 322 that support the execution of the storage controller application 324, 326 to service I/O operations that are directed to the cloud-based storage system 318. Consider an example in which a first cloud computing instance 320 that is executing the storage controller application 324 is operating as the primary controller. In such an example, the first cloud computing instance 320 that is executing the storage controller application 324 may receive (directly or indirectly via the secondary controller) requests to write data to the cloud-based storage system 318 from users of the cloud-based storage system 318. In such an example, the first cloud computing instance 320 that is executing the storage controller application 324 may perform various tasks such as, for example, deduplicating the data contained in the request, compressing the data contained in the request, determining where to the write the data contained in the request, and so on, before ultimately sending a request to write a dedupli-cated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

Readers will appreciate that when a request to write data is received by a particular cloud computing instance 340a, 340b, 340n with local storage 330, 334, 338, the software daemon 328, 332, 336 or some other module of computer program instructions that is executing on the particular cloud computing instance 340a, 340b, 340n may be configured to not only write the data to its own local storage 330, 334, 338 resources and any appropriate block-storage 342, 344, 346 that are offered by the cloud computing environment 316, but the software daemon 328, 332, 336 or some other module of computer program instructions that is executing on the particular cloud computing instance 340a, 340b, 340n may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3') storage that is accessible by the particular cloud computing instance 340*a*, 340*b*, 340*n*. In other embodiments, the cloud computing instances 320, 322 that each include the storage controller application 324, 326 may initiate the storage of the data in the local storage 330, 334, 338 of the cloud computing instances 340*a*, 340*b*, 340*n* and the cloud-based object storage 348.

Readers will appreciate that, as described above, the cloud-based storage system 318 may be used to provide block storage services to users of the cloud-based storage system 318. While the local storage 330, 334, 338 resources and the block-storage 342, 344, 346 resources that are utilized by the cloud computing instances 340*a*, 340*b*, 340*n* may support block-level access, the cloud-based object storage 348 that is attached to the particular cloud computing instance 340*a*, 340*b*, 340*n* supports only object-based access. In order to address this, the software daemon 328, 332, 336 or some other module of computer program instructions that is executing on the particular cloud computing instance 340*a*, 340*b*, 340*n* may be configured to take blocks of data, package those blocks into objects, and write the objects to the cloud-based object storage 348 that is attached to the particular cloud computing instance 340*a*, 340*b*, 340*n*.

Consider an example in which data is written to the local storage 330, 334, 338 resources and the block-storage 342, 344, 346 resources that are utilized by the cloud computing instances 340*a*, 340*b*, 340*n* in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block-storage 342, 344, 346 resources that are utilized by the cloud computing instances 340*a*, 340*b*, 340*n* is relatively straightforward as 5 blocks that are 1 MB in size are written to the local storage 330, 334, 338 resources and the block-storage 342, 344, 346 resources that are utilized by the cloud computing instances 340*a*, 340*b*, 340*n*. In such an example, the software daemon 328, 332, 336 or some other module of computer program instructions that is executing on the particular cloud computing instance 340*a*, 340*b*, 340*n* may be configured to: 1) create a first object that includes the first 1 MB of data and write the first object to the cloud-based object storage 348, 2) create a second object that includes the second 1 MB of data and write the second object to the cloud-based object storage 348, 3) create a third object that includes the third 1 MB of data and write the third object to the cloud-based object storage 348, and so on. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data).

Readers will appreciate that the cloud-based object storage 348 may be incorporated into the cloud-based storage system 318 to increase the durability of the cloud-based storage system 318. Continuing with the example described above where the cloud computing instances 340*a*, 340*b*, 340*n* are EC2 instances, readers will understand that EC2 instances are only guaranteed to have a monthly uptime of 99.9% and data stored in the local instance store only persists during the lifetime of the EC2 instance. As such, relying on the cloud computing instances 340*a*, 340*b*, 340*n* with local storage 330, 334, 338 as the only source of persistent data storage in the cloud-based storage system 318 may result in a relatively unreliable storage system. Likewise, EBS volumes are designed for 99.999% availability. As such, even relying on EBS as the persistent data store in the cloud-based storage system 318 may result in a storage system that is not sufficiently durable. Amazon S3, however, is designed to provide 99.999999999% durability, meaning that a cloud-based storage system 318 that can incorporate S3 into its pool of storage is substantially more durable than various other options.

Readers will appreciate that while a cloud-based storage system 318 that can incorporate S3 into its pool of storage is substantially more durable than various other options, utilizing S3 as the primary pool of storage may result in storage system that has relatively slow response times and relatively long I/O latencies. As such, the cloud-based storage system 318 depicted in FIG. 3C not only stores data in S3 but the cloud-based storage system 318 also stores data in local storage 330, 334, 338 resources and block-storage 342, 344, 346 resources that are utilized by the cloud computing instances 340*a*, 340*b*, 340*n*, such that read operations can be serviced from local storage 330, 334, 338 resources and the block-storage 342, 344, 346 resources that are utilized by the cloud computing instances 340*a*, 340*b*, 340*n*, thereby reducing read latency when users of the cloud-based storage system 318 attempt to read data from the cloud-based storage system 318.

In some embodiments, all data that is stored by the cloud-based storage system 318 may be stored in both: 1) the cloud-based object storage 348, and 2) at least one of the local storage 330, 334, 338 resources or block-storage 342, 344, 346 resources that are utilized by the cloud computing instances 340*a*, 340*b*, 340*n*. In such embodiments, the local storage 330, 334, 338 resources and block-storage 342, 344, 346 resources that are utilized by the cloud computing instances 340*a*, 340*b*, 340*n* may effectively operate as cache that generally includes all data that is also stored in S3, such that all reads of data may be serviced by the cloud computing instances 340*a*, 340*b*, 340*n* without requiring the cloud computing instances 340*a*, 340*b*, 340*n* to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block-storage 342, 344, 346 resources that are utilized by the cloud computing instances 340*a*, 340*b*, 340*n*. In such an example, various policies may be utilized to determine which subset of the data that is stored by the cloud-based storage system 318 should reside in both: 1) the cloud-based object storage 348, and 2) at least one of the local storage 330, 334, 338 resources or block-storage 342, 344, 346 resources that are utilized by the cloud computing instances 340*a*, 340*b*, 340*n*.

As described above, when the cloud computing instances 340*a*, 340*b*, 340*n* with local storage 330, 334, 338 are embodied as EC2 instances, the cloud computing instances 340*a*, 340*b*, 340*n* with local storage 330, 334, 338 are only guaranteed to have a monthly uptime of 99.9% and data stored in the local instance store only persists during the lifetime of each cloud computing instance 340*a*, 340*b*, 340*n* with local storage 330, 334, 338. As such, one or more modules of computer program instructions that are executing within the cloud-based storage system 318 (e.g., a monitoring module that is executing on its own EC2 instance) may be designed to handle the failure of one or more of the cloud computing instances 340*a*, 340*b*, 340*n* with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Consider an example in which all cloud computing instances 340a, 340b, 340n with local storage 330, 334, 338 failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage 348. Readers will appreciate that instances types are selected that allow for the maximum data transfer rates between the new cloud computing instances and the cloud-based object storage 348 such that the new high-bandwidth cloud computing instances can be rehydrated with data from the cloud-based object storage 348 as quickly as possible. Once the new high-bandwidth cloud computing instances are rehydrated with data from the cloud-based object storage 348, less expensive lower-bandwidth cloud computing instances may be created, data may be migrated to the less expensive lower-bandwidth cloud computing instances, and the high-bandwidth cloud computing instances may be terminated.

Readers will appreciate that in some embodiments, the number of new cloud computing instances that are created may substantially exceed the number of cloud computing instances that are needed to locally store all of the data stored by the cloud-based storage system 318. The number of new cloud computing instances that are created may substantially exceed the number of cloud computing instances that are needed to locally store all of the data stored by the cloud-based storage system 318 in order to more rapidly pull data from the cloud-based object storage 348 and into the new cloud computing instances, as each new cloud computing instance can (in parallel) retrieve some portion of the data stored by the cloud-based storage system 318. In such embodiments, once the data stored by the cloud-based storage system 318 has been pulled into the newly created cloud computing instances, the data may be consolidated within a subset of the newly created cloud computing instances and those newly created cloud computing instances that are excessive may be terminated.

Consider an example in which 1000 cloud computing instances are needed in order to locally store all valid data that users of the cloud-based storage system 318 have written to the cloud-based storage system 318. In such an example, assume that all 1,000 cloud computing instances fail. In such an example, the monitoring module may cause 100,000 cloud computing instances to be created, where each cloud computing instance is responsible for retrieving, from the cloud-based object storage 348, distinct $\frac{1}{100,000}$th chunks of the valid data that users of the cloud-based storage system 318 have written to the cloud-based storage system 318 and locally storing the distinct chunk of the dataset that it retrieved. In such an example, because each of the 100,000 cloud computing instances can retrieve data from the cloud-based object storage 348 in parallel, the caching layer may be restored 100 times faster as compared to an embodiment where the monitoring module only create 1000 replacement cloud computing instances. In such an example, over time the data that is stored locally in the 100,000 could be consolidated into 1,000 cloud computing instances and the remaining 99,000 cloud computing instances could be terminated.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. Consider an example in which the monitoring module monitors the performance of the could-based storage system 318 via communications with one or more of the cloud computing instances 320, 322 that each are used to support the execution of a storage controller application 324, 326, via monitoring communications between cloud computing instances 320, 322, 340a, 340b, 340n, via monitoring communications between cloud computing instances 320, 322, 340a, 340b, 340n and the cloud-based object storage 348, or in some other way. In such an example, assume that the monitoring module determines that the cloud computing instances 320, 322 that are used to support the execution of a storage controller application 324, 326 are undersized and not sufficiently servicing the I/O requests that are issued by users of the cloud-based storage system 318. In such an example, the monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Consider, as an additional example of dynamically sizing the cloud-based storage system 318, an example in which the monitoring module determines that the utilization of the local storage that is collectively provided by the local computing instances 340a, 340b, 340n has reached a predetermined utilization threshold (e.g., 95%). In such an example, the monitoring module may create additional cloud computing instances with local storage to expand the pool of local storage that is offered by the cloud computing instances. Alternatively, the monitoring module may create one or more new cloud computing instances that have larger amounts of local storage than the already existing cloud computing instances 340a, 340b, 340n, such that data stored in an already existing cloud computing instance 340a, 340b, 340n can be migrated to the one or more new cloud computing instances and the already existing cloud computing instance 340a, 340b, 340n can be terminated, thereby expanding the pool of local storage that is offered by the cloud computing instances. Likewise, if the pool of local storage that is offered by the cloud computing instances is unnecessarily large, data can be consolidated and some cloud computing instances can be terminated.

Readers will appreciate that the cloud-based storage system 318 may be sized up and down automatically by a monitoring module applying a predetermined set of rules that may be relatively simple of relatively complicated. In fact, the monitoring module may not only take into account the current state of the cloud-based storage system 318, but the monitoring module may also apply predictive policies that are based on, for example, observed behavior (e.g., every night from 10 PM until 6 AM usage of the storage system is relatively light), predetermined fingerprints (e.g., every time a virtual desktop infrastructure adds 100 virtual desktops, the number of IOPS directed to the storage system increase by X), and so on. In such an example, the dynamic scaling of the cloud-based storage system 318 may be based on current performance metrics, predicted workloads, and many other factors, including combinations thereof.

Readers will further appreciate that because the cloud-based storage system 318 may be dynamically scaled, the cloud-based storage system 318 may even operate in a way that is more dynamic. Consider the example of garbage collection. In a traditional storage system, the amount of storage is fixed. As such, at some point the storage system may be forced to perform garbage collection as the amount of available storage has become so constrained that the storage system is on the verge of running out of storage. In contrast, the cloud-based storage system 318 described here can always 'add' additional storage (e.g., by adding more cloud computing instances with local storage). Because the cloud-based storage system 318 described here can always 'add' additional storage, the cloud-based storage system 318 can make more intelligent decisions regarding when to perform garbage collection. For example, the cloud-based storage system 318 may implement a policy that garbage collection only be performed when the number of TOPS being serviced by the cloud-based storage system 318 falls below a certain level. In some embodiments, other system-level functions (e.g., deduplication, compression) may also be turned off and on in response to system load, given that the size of the cloud-based storage system 318 is not constrained in the same way that traditional storage systems are constrained.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 3C.

In some embodiments, especially in embodiments where the cloud-based object storage 348 resources are embodied as Amazon S3, the cloud-based storage system 318 may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object—and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system 318 does not need to access the data to verify its validity, the data can stay encrypted and access charges can be avoided.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described above may be useful for supporting various types of software applications. For example, the storage system 306 may be useful in supporting artificial intelligence ('AF') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks, or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. In addition to supporting the storage and use of blockchain technologies, the storage systems described above may also support the storage and use of derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available—including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data, and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user, and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution of intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics, and support. In fact, such storage systems may be capable of predicting both capacity and performance, as well as generating intelligent advice on workload deployment, interaction, and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain—computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman, or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming through the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

Figure 3D:
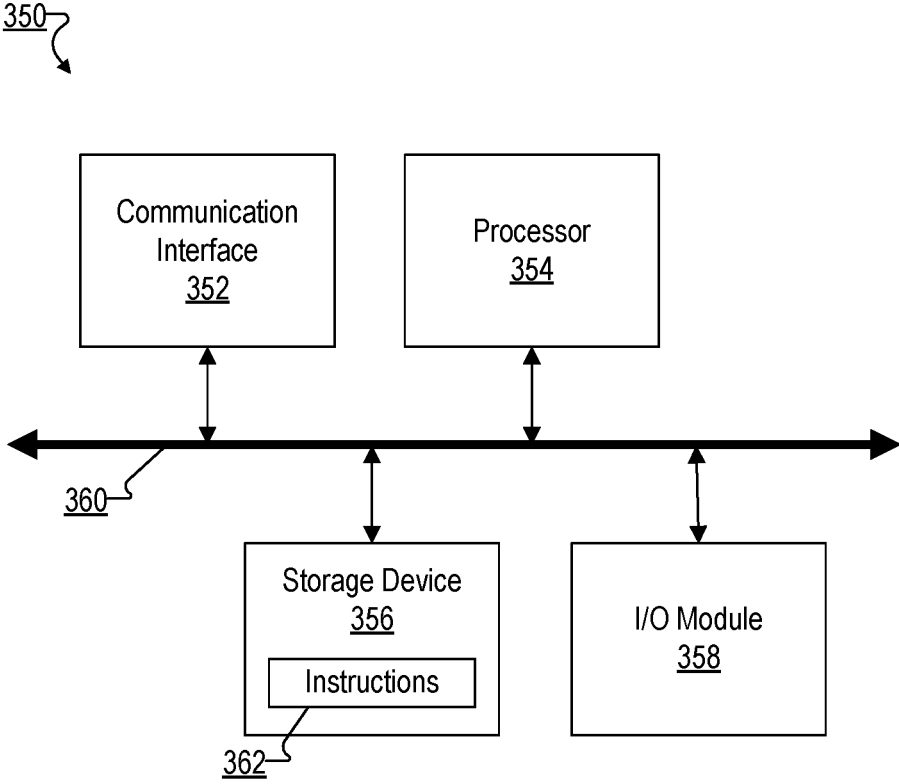
FIG. 3D illustrates an exemplary computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Figure 4A:
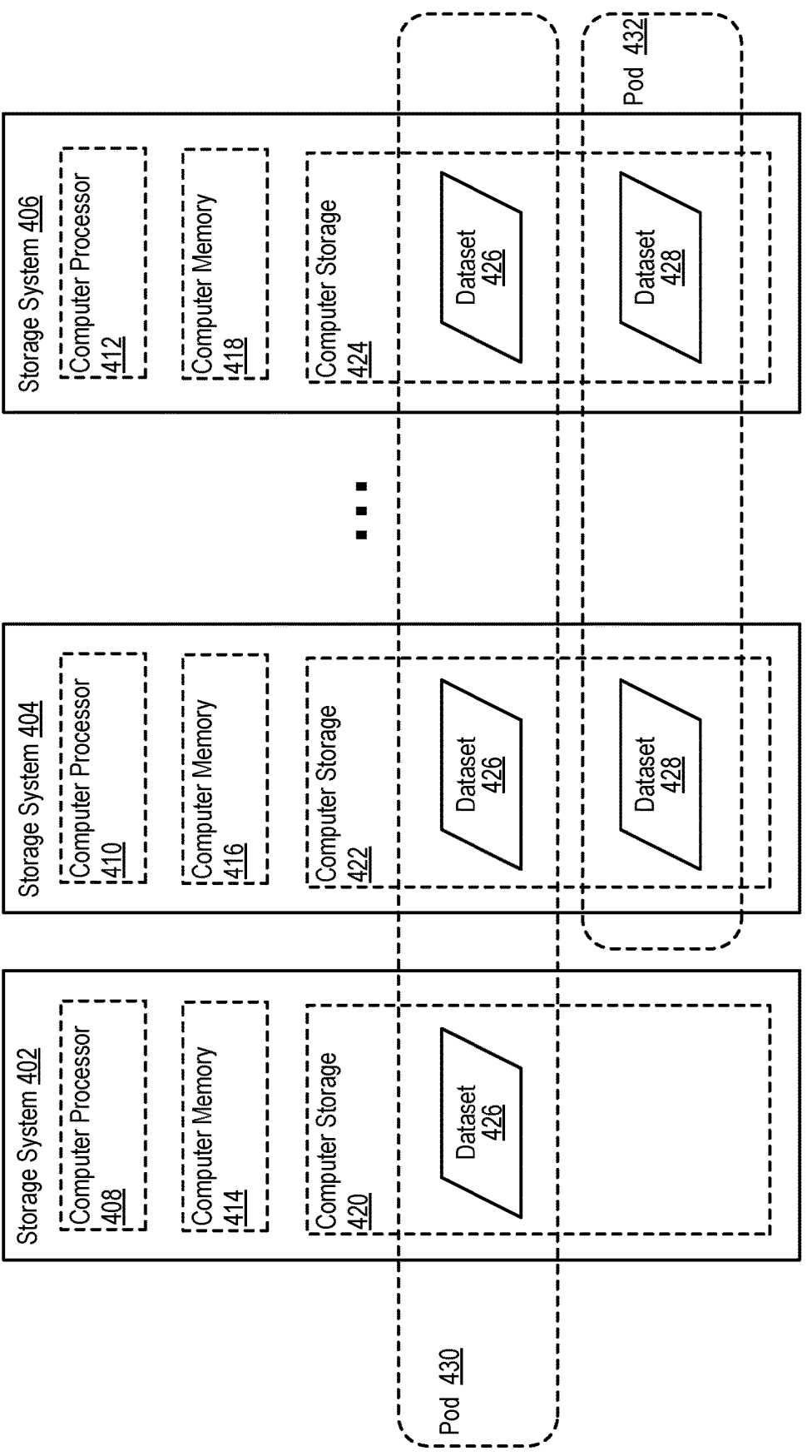
FIG. 4A illustrates an exemplary computing environment for synchronous replication in accordance with some embodiments.

For further explanation, FIG. 4A sets forth a block diagram illustrating a plurality of storage systems (402, 404, 406) that support a pod according to some embodiments of the present disclosure. Although depicted in less detail, the storage systems (402, 404, 406) depicted in FIG. 4A may be similar to the storage systems described above with reference to FIGS. 1A-1D, FIGS. 2A-2G, FIGS. 3A-3B, or any combination thereof. In fact, the storage systems (402, 404, 406) depicted in FIG. 4A may include the same, fewer, or additional components as the storage systems described above.

In the example depicted in FIG. 4A, each of the storage systems (402, 404, 406) is depicted as having at least one computer processor (408, 410, 412), computer memory (414, 416, 418), and computer storage (420, 422, 424). Although in some embodiments the computer memory (414, 416, 418) and the computer storage (420, 422, 424) may be part of the same hardware devices, in other embodiments the computer memory (414, 416, 418) and the computer storage (420, 422, 424) may be part of different hardware devices. The distinction between the computer memory (414, 416, 418) and the computer storage (420, 422, 424) in this particular example may be that the computer memory (414, 416, 418) is physically proximate to the computer processors (408, 410, 412) and may store computer program instructions that are executed by the computer processors (408, 410, 412), while the computer storage (420, 422, 424) is embodied as non-volatile storage for storing user data, metadata describing the user data, and so on. Referring to the example above in FIG. 1A, for example, the computer processors (408, 410, 412) and computer memory (414, 416, 418) for a particular storage system (402, 404, 406) may reside within one of more of the controllers (110A-110D) while the attached storage devices (171A-171F) may serve as the computer storage (420, 422, 424) within a particular storage system (402, 404, 406).

In the example depicted in FIG. 4A, the depicted storage systems (402, 404, 406) may attach to one or more pods (430, 432) according to some embodiments of the present disclosure. Each of the pods (430, 432) depicted in FIG. 4A can include a dataset (426, 428). For example, a first pod (430) that three storage systems (402, 404, 406) have attached to includes a first dataset (426) while a second pod (432) that two storage systems (404, 406) have attached to includes a second dataset (428). In such an example, when a particular storage system attaches to a pod, the pod's dataset is copied to the particular storage system and then kept up to date as the dataset is modified. Storage systems can be removed from a pod, resulting in the dataset being no longer kept up to date on the removed storage system. In the example depicted in FIG. 4A, any storage system which is active for a pod (it is an up-to-date, operating, non-faulted member of a non-faulted pod) can receive and process requests to modify or read the pod's dataset.

In the example depicted in FIG. 4A, each pod (430, 432) may also include a set of managed objects and management operations, as well as a set of access operations to modify or read the dataset (426, 428) that is associated with the particular pod (430, 432). In such an example, the management operations may modify or query managed objects equivalently through any of the storage systems. Likewise, access operations to read or modify the dataset may operate equivalently through any of the storage systems. In such an example, while each storage system stores a separate copy of the dataset as a proper subset of the datasets stored and advertised for use by the storage system, the operations to modify managed objects or the dataset performed and completed through any one storage system are reflected in subsequent management objects to query the pod or subsequent access operations to read the dataset.

Readers will appreciate that pods may implement more capabilities than just a clustered synchronously replicated dataset. For example, pods can be used to implement tenants, whereby datasets are in some way securely isolated from each other. Pods can also be used to implement virtual arrays or virtual storage systems where each pod is presented as a unique storage entity on a network (e.g., a Storage Area Network, or Internet Protocol network) with separate addresses. In the case of a multi-storage-system pod implementing a virtual storage system, all physical storage systems associated with the pod may present themselves as in some way the same storage system (e.g., as if the multiple physical storage systems were no different than multiple network ports into a single storage system).

Readers will appreciate that pods may also be units of administration, representing a collection of volumes, file systems, object/analytic stores, snapshots, and other administrative entities, where making administrative changes (e.g., name changes, property changes, managing exports or permissions for some part of the pod's dataset), on any one storage system is automatically reflected to all active storage systems associated with the pod. In addition, pods could also be units of data collection and data analysis, where performance and capacity metrics are presented in ways that aggregate across all active storage systems for the pod, or that call out data collection and analysis separately for each pod, or perhaps presenting each attached storage system's contribution to the incoming content and performance for each a pod.

One model for pod membership may be defined as a list of storage systems, and a subset of that list where storage systems are considered to be in-sync for the pod. A storage system may be considered to be in-sync for a pod if it is at least within a recovery of having identical idle content for the last written copy of the dataset associated with the pod. Idle content is the content after any in-progress modifications have completed with no processing of new modifications. Sometimes this is referred to as "crash recoverable" consistency. Recovery of a pod carries out the process of reconciling differences in applying concurrent updates to in-sync storage systems in the pod. Recovery can resolve any inconsistencies between storage systems in the completion of concurrent modifications that had been requested to various members of the pod but that were not signaled to any requestor as having completed successfully. Storage systems that are listed as pod members but that are not listed as in-sync for the pod can be described as "detached" from the pod. Storage systems that are listed as pod members, are in-sync for the pod, and are currently available for actively serving data for the pod are "online" for the pod.

Each storage system member of a pod may have its own copy of the membership, including which storage systems it last knew were in-sync, and which storage systems it last knew comprised the entire set of pod members. To be online for a pod, a storage system must consider itself to be in-sync for the pod and must be communicating with all other storage systems it considers to be in-sync for the pod. If a storage system can't be certain that it is in-sync and communicating with all other storage systems that are in-sync, then it must stop processing new incoming requests for the pod (or must complete them with an error or exception) until it can be certain that it is in-sync and communicating with all other storage systems that are in-sync. A first storage system may conclude that a second paired storage system should be detached, which will allow the first storage system to continue since it is now in-sync with all storage systems now in the list. But, the second storage system must be prevented from concluding, alternatively, that the first storage system should be detached and with the second storage system continuing operation. This would result in a "split brain" condition that can lead to irreconcilable datasets, dataset corruption, or application corruption, among other dangers.

The situation of needing to determine how to proceed when not communicating with paired storage systems can arise while a storage system is running normally and then notices lost communications, while it is currently recovering from some previous fault, while it is rebooting or resuming from a temporary power loss or recovered communication outage, while it is switching operations from one set of storage system controller to another set for whatever reason, or during or after any combination of these or other kinds of events. In fact, any time a storage system that is associated with a pod can't communicate with all known non-detached members, the storage system can either wait briefly until communications can be established, go offline and continue waiting, or it can determine through some means that it is safe to detach the non-communicating storage system without risk of incurring a split brain due to the non-communicating storage system concluding the alternative view, and then continue. If a safe detach can happen quickly enough, the storage system can remain online for the pod with little more than a short delay and with no resulting application outages for applications that can issue requests to the remaining online storage systems.

One example of this situation is when a storage system may know that it is out-of-date. That can happen, for example, when a first storage system is first added to a pod that is already associated with one or more storage systems, or when a first storage system reconnects to another storage system and finds that the other storage system had already marked the first storage system as detached. In this case, this first storage system will simply wait until it connects to some other set of storage systems that are in-sync for the pod.

This model demands some degree of consideration for how storage systems are added to or removed from pods or from the in-sync pod members list. Since each storage system will have its own copy of the list, and since two independent storage systems can't update their local copy at exactly the same time, and since the local copy is all that is available on a reboot or in various fault scenarios, care must be taken to ensure that transient inconsistencies don't cause problems. For example, if one storage systems is in-sync for a pod and a second storage system is added, then if the second storage system is updated to list both storage systems as in-sync first, then if there is a fault and a restart of both storage systems, the second might startup and wait to connect to the first storage system while the first might be unaware that it should or could wait for the second storage system. If the second storage system then responds to an inability to connect with the first storage system by going through a process to detach it, then it might succeed in completing a process that the first storage system is unaware of, resulting in a split brain. As such, it may be necessary to ensure that storage systems won't disagree inappropriately on whether they might opt to go through a detach process if they aren't communicating.

One way to ensure that storage systems won't disagree inappropriately on whether they might opt to go through a detach process if they aren't communicating is to ensure that when adding a new storage system to the in-sync member list for a pod, the new storage system first stores that it is a detached member (and perhaps that it is being added as an in-sync member). Then, the existing in-sync storage systems can locally store that the new storage system is an in-sync pod member before the new storage system locally stores that same fact. If there is a set of reboots or network outages prior to the new storage system storing its in-sync status, then the original storage systems may detach the new storage system due to non-communication, but the new storage system will wait. A reverse version of this change might be needed for removing a communicating storage system from a pod: first the storage system being removed stores that it is no longer in-sync, then the storage systems that will remain store that the storage system being removed is no longer in-sync, then all storage systems delete the storage system being removed from their pod membership lists. Depending on the implementation, an intermediate persisted detached state may not be necessary. Whether or not care is required in local copies of membership lists may depend on the model storage systems use for monitoring each other or for validating their membership. If a consensus model is used for both, or if an external system (or an external distributed or clustered system) is used to store and validate pod membership, then inconsistencies in locally stored membership lists may not matter.

When communications fail or one or several storage systems in a pod fail, or when a storage system starts up (or fails over to a secondary controller) and can't communicate with paired storage systems for a pod, and it is time for one or more storage systems to decide to detach one or more paired storage systems, some algorithm or mechanism must be employed to decide that it is safe to do so and to follow through on the detach. One means of resolving detaches is to use a majority (or quorum) model for membership. With three storage systems, as long as two are communicating, they can agree to detach a third storage system that isn't communicating, but that third storage system cannot by itself choose to detach either of the other two. Confusion can arise when storage system communication is inconsistent. For example, storage system A might be communicating with storage system B but not C, while storage system B might be communicating with both A and C. So, A and B could detach C, or B and C could detach A, but more communication between pod members may be needed to figure this out.

Care needs to be taken in a quorum membership model when adding and removing storage systems. For example, if a fourth storage system is added, then a "majority" of storage systems is at that point three. The transition from three storage systems (with two required for majority) to a pod including a fourth storage system (with three required for majority) may require something similar to the model described previously for carefully adding a storage system to the in-sync list. For example, the fourth storage system might start in an attaching state but not yet attached where it would never instigate a vote over quorum. Once in that state, the original three pod members could each be updated to be aware of the fourth member and the new requirement for a three storage system majority to detach a fourth. Removing a storage system from a pod might similarly move that storage system to a locally stored "detaching" state before updating other pod members. A variant scheme for this is to use a distributed consensus mechanism such as PAXOS or RAFT to implement any membership changes or to process detach requests.

Another means of managing membership transitions is to use an external system that is outside of the storage systems themselves to handle pod membership. In order to become online for a pod, a storage system must first contact the external pod membership system to verify that it is in-sync for the pod. Any storage system that is online for a pod should then remain in communication with the pod membership system and should wait or go offline if it loses communication. An external pod membership manager could be implemented as a highly available cluster using various cluster tools, such as Oracle RAC, Linux HA, VERITAS Cluster Server, IBM's HACMP, or others. An external pod membership manager could also use distributed configuration tools such as Etcd or Zookeeper, or a reliable distributed database such as Amazon's DynamoDB.

In the example depicted in FIG. 4A, the depicted storage systems (402, 404, 406) may receive a request to read a portion of the dataset (426, 428) and process the request to read the portion of the dataset locally according to some embodiments of the present disclosure. Readers will appreciate that although requests to modify (e.g., a write operation) the dataset (426, 428) require coordination between the storage systems (402, 404, 406) in a pod, as the dataset (426, 428) should be consistent across all storage systems (402, 404, 406) in a pod, responding to a request to read a portion of the dataset (426, 428) does not require similar coordination between the storage systems (402, 404, 406). As such, a particular storage system that receives a read request may service the read request locally by reading a portion of the dataset (426, 428) that is stored within the storage system's storage devices, with no synchronous communication with other storage systems in the pod. Read requests received by one storage system for a replicated dataset in a replicated cluster are expected to avoid any communication in the vast majority of cases, at least when received by a storage system that is running within a cluster that is also running nominally. Such reads should normally be processed simply by reading from the local copy of a clustered dataset with no further interaction required with other storage systems in the cluster.

Readers will appreciate that the storage systems may take steps to ensure read consistency such that a read request will return the same result regardless of which storage system processes the read request. For example, the resulting clustered dataset content for any set of updates received by any set of storage systems in the cluster should be consistent across the cluster, at least at any time updates are idle (all previous modifying operations have been indicated as complete and no new update requests have been received and processed in any way). More specifically, the instances of a clustered dataset across a set of storage systems can differ only as a result of updates that have not yet completed. This means, for example, that any two write requests which overlap in their volume block range, or any combination of a write request and an overlapping snapshot, compare-and-write, or virtual block range copy, must yield a consistent result on all copies of the dataset. Two operations should not yield a result as if they happened in one order on one storage system and a different order on another storage system in the replicated cluster.

Furthermore, read requests can be made time order consistent. For example, if one read request is received on a replicated cluster and completed and that read is then followed by another read request to an overlapping address range which is received by the replicated cluster and where one or both reads in any way overlap in time and volume address range with a modification request received by the replicated cluster (whether any of the reads or the modification are received by the same storage system or a different storage system in the replicated cluster), then if the first read reflects the result of the update then the second read should also reflect the results of that update, rather than possibly returning data that preceded the update. If the first read does not reflect the update, then the second read can either reflect the update or not. This ensures that between two read requests "time" for a data segment cannot roll backward.

In the example depicted in FIG. 4A, the depicted storage systems (402, 404, 406) may also detect a disruption in data communications with one or more of the other storage systems and determine whether to the particular storage system should remain in the pod. A disruption in data communications with one or more of the other storage systems may occur for a variety of reasons. For example, a disruption in data communications with one or more of the other storage systems may occur because one of the storage systems has failed, because a network interconnect has failed, or for some other reason. An important aspect of synchronous replicated clustering is ensuring that any fault handling doesn't result in unrecoverable inconsistencies, or any inconsistency in responses. For example, if a network fails between two storage systems, at most one of the storage systems can continue processing newly incoming I/O requests for a pod. And, if one storage system continues processing, the other storage system can't process any new requests to completion, including read requests.

In the example depicted in FIG. 4A, the depicted storage systems (402, 404, 406) may also determine whether the particular storage system should remain in the pod in response to detecting a disruption in data communications with one or more of the other storage systems. As mentioned above, to be 'online' as part of a pod, a storage system must consider itself to be in-sync for the pod and must be communicating with all other storage systems it considers to be in-sync for the pod. If a storage system can't be certain that it is in-sync and communicating with all other storage systems that are in-sync, then it may stop processing new incoming requests to access the dataset (426, 428). As such, the storage system may determine whether to the particular storage system should remain online as part of the pod, for example, by determining whether it can communicate with all other storage systems it considers to be in-sync for the pod (e.g., via one or more test messages), by determining whether the all other storage systems it considers to be in-sync for the pod also consider the storage system to be attached to the pod, through a combination of both steps where the particular storage system must confirm that it can communicate with all other storage systems it considers to be in-sync for the pod and that all other storage systems it considers to be in-sync for the pod also consider the storage system to be attached to the pod, or through some other mechanism.

In the example depicted in FIG. 4A, the depicted storage systems (402, 404, 406) may also keep the dataset on the particular storage system accessible for management and dataset operations in response to determining that the particular storage system should remain in the pod. The storage system may keep the dataset (426, 428) on the particular storage system accessible for management and dataset operations, for example, by accepting requests to access the version of the dataset (426, 428) that is stored on the storage system and processing such requests, by accepting and processing management operations associated with the dataset (426, 428) that are issued by a host or authorized administrator, by accepting and processing management operations associated with the dataset (426, 428) that are issued by one of the other storage systems, or in some other way.

In the example depicted in FIG. 4A, the depicted storage systems (402, 404, 406) may, however, make the dataset on the particular storage system inaccessible for management and dataset operations in response to determining that the particular storage system should not remain in the pod. The storage system may make the dataset (426, 428) on the particular storage system inaccessible for management and dataset operations, for example, by rejecting requests to access the version of the dataset (426, 428) that is stored on the storage system, by rejecting management operations associated with the dataset (426, 428) that are issued by a host or other authorized administrator, by rejecting management operations associated with the dataset (426, 428) that are issued by one of the other storage systems in the pod, or in some other way.

In the example depicted in FIG. 4A, the depicted storage systems (402, 404, 406) may also detect that the disruption in data communications with one or more of the other storage systems has been repaired and make the dataset on the particular storage system accessible for management and dataset operations. The storage system may detect that the disruption in data communications with one or more of the other storage systems has been repaired, for example, by receiving a message from the one or more of the other storage systems. In response to detecting that the disruption in data communications with one or more of the other storage systems has been repaired, the storage system may make the dataset (426, 428) on the particular storage system accessible for management and dataset operations once the previously detached storage system has been resynchronized with the storage systems that remained attached to the pod.

In the example depicted in FIG. 4A, the depicted storage systems (402, 404, 406) may also go offline from the pod such that the particular storage system no longer allows management and dataset operations. The depicted storage systems (402, 404, 406) may go offline from the pod such that the particular storage system no longer allows management and dataset operations for a variety of reasons. For example, the depicted storage systems (402, 404, 406) may also go offline from the pod due to some fault with the storage system itself, because an update or some other maintenance is occurring on the storage system, due to communications faults, or for many other reasons. In such an example, the depicted storage systems (402, 404, 406) may subsequently update the dataset on the particular storage system to include all updates to the dataset since the particular storage system went offline and go back online with the pod such that the particular storage system allows management and dataset operations, as will be described in greater detail in the resynchronization sections included below.

In the example depicted in FIG. 4A, the depicted storage systems (402, 404, 406) may also identifying a target storage system for asynchronously receiving the dataset, where the target storage system is not one of the plurality of storage systems across which the dataset is synchronously replicated. Such a target storage system may represent, for example, a backup storage system, as some storage system that makes use of the synchronously replicated dataset, and so on. In fact, synchronous replication can be leveraged to distribute copies of a dataset closer to some rack of servers, for better local read performance. One such case is smaller top-of-rack storage systems symmetrically replicated to larger storage systems that are centrally located in the data center or campus and where those larger storage systems are more carefully managed for reliability or are connected to external networks for asynchronous replication or backup services.

In the example depicted in FIG. 4A, the depicted storage systems (402, 404, 406) may also identify a portion of the dataset that is not being asynchronously replicated to the target storage system by any of the other storages systems and asynchronously replicate, to the target storage system, the portion of the dataset that is not being asynchronously replicated to the target storage system by any of the other storages systems, wherein the two or more storage systems collectively replicate the entire dataset to the target storage system. In such a way, the work associated with asynchronously replicating a particular dataset may be split amongst the members of a pod, such that each storage system in a pod is only responsible for asynchronously replicating a subset of a dataset to the target storage system.

In the example depicted in FIG. 4A, the depicted storage systems (402, 404, 406) may also detach from the pod, such that the particular storage system that detaches from the pod is no longer included in the set of storage systems across which the dataset is synchronously replicated. For example, if storage system (404) in FIG. 4A detached from the pod (430) illustrated in FIG. 4A, the pod (430) would only include storage systems (402, 406) as the storage systems across which the dataset (426) that is included in the pod (430) would be synchronously replicated across. In such an example, detaching the storage system from the pod could also include removing the dataset from the particular storage system that detached from the pod. Continuing with the example where the storage system (404) in FIG. 4A detached from the pod (430) illustrated in FIG. 4A, the dataset (426) that is included in the pod (430) could be deleted or otherwise removed from the storage system (404).

Readers will appreciate that there are a number of unique administrative capabilities enabled by the pod model that can further be supported. Also, the pod model itself introduces some issues that can be addressed by an implementation. For example, when a storage system is offline for a pod, but is otherwise running, such as because an interconnect failed and another storage system for the pod won out in mediation, there may still be a desire or need to access the offline pod's dataset on the offline storage system. One solution may be simply to enable the pod in some detached mode and allow the dataset to be accessed. However, that solution can be dangerous and that solution can cause the pod's metadata and data to be much more difficult to reconcile when the storage systems do regain communication. Furthermore, there could still be a separate path for hosts to access the offline storage system as well as the still online storage systems. In that case, a host might issue I/O to both storage systems even though they are no longer being kept in sync, because the host sees target ports reporting volumes with the same identifiers and the host I/O drivers presume it sees additional paths to the same volume. This can result in fairly damaging data corruption as reads and writes issued to both storage systems are no longer consistent even though the host presumes they are. As a variant of this case, in a clustered application, such as a shared storage clustered database, the clustered application running on one host might be reading or writing to one storage system and the same clustered application running on another host might be reading or writing to the "detached" storage system, yet the two instances of the clustered application are communicating between each other on the presumption that the dataset they each see is entirely consistent for completed writes. Since they aren't consistent, that presumption is violated and the application's dataset (e.g., the database) can quickly end up being corrupted.

One way to solve both of these problems is to allow for an offline pod, or perhaps a snapshot of an offline pod, to be copied to a new pod with new volumes that have sufficiently new identities that host I/O drivers and clustered applications won't confuse the copied volumes as being the same as the still online volumes on another storage system. Since each pod maintains a complete copy of the dataset, which is crash consistent but perhaps slightly different from the copy of the pod dataset on another storage system, and since each pod has an independent copy of all data and metadata needed to operate on the pod content, it is a straightforward problem to make a virtual copy of some or all volumes or snapshots in the pod to new volumes in a new pod. In a logical extent graph implementation, for example, all that is needed is to define new volumes in a new pod which reference logical extent graphs from the copied pod associated with the pod's volumes or snapshots, and with the logical extent graphs being marked as copy on write. The new volumes should be treated as new volumes, similarly to how volume snapshots copied to a new volume might be implemented. Volumes may have the same administrative name, though within a new pod namespace. But, they should have different underlying identifiers, and differing logical unit identifiers from the original volumes.

In some cases it may be possible to use virtual network isolation techniques (for example, by creating a virtual LAN in the case of IP networks or a virtual SAN in the case of fiber channel networks) in such a way that isolation of volumes presented to some interfaces can be assured to be inaccessible from host network interfaces or host SCSI initiator ports that might also see the original volumes. In such cases, it may be safe to provide the copies of volumes with the same SCSI or other storage identifiers as the original volumes. This could be used, for example, in cases where the applications expect to see a particular set of storage identifiers in order to function without an undue burden in reconfiguration.

Some of the techniques described herein could also be used outside of an active fault context to test readiness for handling faults. Readiness testing (sometimes referred to as "fire drills") is commonly required for disaster recovery configurations, where frequent and repeated testing is considered a necessity to ensure that most or all aspects of a disaster recovery plan are correct and account for any recent changes to applications, datasets, or changes in equipment. Readiness testing should be non-disruptive to current production operations, including replication. In many cases the real operations can't actually be invoked on the active configuration, but a good way to get close is to use storage operations to make copies of production datasets, and then perhaps couple that with the use of virtual networking, to create an isolated environment containing all data that is believed necessary for the important applications that must be brought up successfully in cases of disasters. Making such a copy of a synchronously replicated (or even an asynchronously replicated) dataset available within a site (or collection of sites) that is expected to perform a disaster recovery readiness test procedure and then starting the important applications on that dataset to ensure that it can startup and function is a great tool, since it helps ensure that no important parts of the application datasets were left out in the disaster recovery plan. If necessary, and practical, this could be coupled with virtual isolated networks coupled perhaps with isolated collection of physical or virtual machines, to get as close as possible to a real world disaster recovery takeover scenario. Virtually copying a pod (or set of pods) to another pod as a point-in-time image of the pod datasets immediately creates an isolated dataset that contains all the copied elements and that can then be operated on essentially identically to the originally pods, as well as allowing isolation to a single site (or a few sites) separately from the original pod. Further, these are fast operations and they can be torn down and repeated easily allowing testing to be repeated as often as is desired.

Some enhancements could be made to get further toward perfect disaster recovery testing. For example, in conjunction with isolated networks, SCSI logical unit identities or other types of identities could be copied into the target pod so that the test servers, virtual machines, and applications see the same identities. Further, the administrative environment of the servers could be configured to respond to requests from a particular virtual set of virtual networks to respond to requests and operations on the original pod name so scripts don't require use of test-variants with alternate "test" versions of object names. A further enhancement can be used in cases where the host-side server infrastructure that will take over in the case of a disaster takeover can be used during a test. This includes cases where a disaster recovery data center is completely stocked with alternative server infrastructure that won't generally be used until directed to do so by a disaster. It also includes cases where that infrastructure might be used for non-critical operations (for example, running analytics on production data, or simply supporting application development or other functions which may be important but can be halted if needed for more critical functions). Specifically, host definitions and configurations and the server infrastructure that will use them can be set up as they will be for an actual disaster recovery takeover event and tested as part of disaster recovery takeover testing, with the tested volumes being connected to these host definitions from the virtual pod copy used to provide a snapshot of the dataset. From the standpoint of the storage systems involved, then, these host definitions and configurations used for testing, and the volume-to-host connection configurations used during testing, can be reused when an actual disaster takeover event is triggered, greatly minimizing the configuration differences between the test configuration and the real configuration that will be used in case of a disaster recovery takeover.

In some cases it may make sense to move volumes out of a first pod and into a new second pod including just those volumes. The pod membership and high availability and recovery characteristics can then be adjusted separately, and administration of the two resulting pod datasets can then be isolated from each other. An operation that can be done in one direction should also be possible in the other direction. At some point, it may make sense to take two pods and merge them into one so that the volumes in each of the original two pods will now track each other for storage system membership and high availability and recovery characteristics and events. Both operations can be accomplished safely and with reasonably minimal or no disruption to running applications by relying on the characteristics suggested for changing mediation or quorum properties for a pod which were discussed in an earlier section. With mediation, for example, a mediator for a pod can be changed using a sequence consisting of a step where each storage system in a pod is changed to depend on both a first mediator and a second mediator and each is then changed to depend only on the second mediator. If a fault occurs in the middle of the sequence, some storage systems may depend on both the first mediator and the second mediator, but in no case will recovery and fault handling result in some storage systems depending only on the first mediator and other storage systems only depending on the second mediator. Quorum can be handled similarly by temporarily depending on winning against both a first quorum model and a second quorum model in order to proceed to recovery. This may result in a very short time period where availability of the pod in the face of faults depend on additional resources, thus reducing potential availability, but this time period is very short and the reduction in availability is often very little. With mediation, if the change in mediator parameters is nothing more than the change in the key used for mediation and the mediation service used is the same, then the potential reduction in availability is even less, since it now depends only on two calls to the same service versus one call to that service, and rather than separate calls to two separate services.

Readers will note that changing the quorum model may be quite complex. An additional step may be necessary where storage systems will participate in the second quorum model but won't depend on winning in that second quorum model, which is then followed by the step of also depending on the second quorum model. This may be necessary to account for the fact that if only one system has processed the change to depend on the quorum model, then it will never win quorum since there will never be a majority. With this model in place for changing the high availability parameters (mediation relationship, quorum model, takeover preferences), we can create a safe procedure for these operations to split a pod into two or to join two pods into one. This may require adding one other capability: linking a second pod to a first pod for high availability such that if two pods include compatible high availability parameters the second pod linked to the first pod can depend on the first pod for determining and instigating detach-related processing and operations, offline and in-sync states, and recovery and resynchronization actions.

To split a pod into two, which is an operation to move some volumes into a newly created pod, a distributed operation may be formed that can be described as: form a second pod into which we will move a set of volumes which were previously in a first pod, copy the high availability parameters from the first pod into the second pod to ensure they are compatible for linking, and link the second pod to the first pod for high availability. This operation may be encoded as messages and should be implemented by each storage system in the pod in such a way that the storage system ensures that the operation happens completely on that storage system or does not happen at all if processing is interrupted by a fault. Once all in-sync storage systems for the two pods have processed this operation, the storage systems can then process a subsequent operation which changes the second pod so that it is no longer linked to the first pod. As with other changes to high availability charac-teristics for a pod, this involves first having each in-sync storage system change to rely on both the previous model (that model being that high availability is linked to the first pod) and the new model (that model being its own now independent high availability). In the case of mediation or quorum, this means that storage systems which processed this change will first depend on mediation or quorum being achieved as appropriate for the first pod and will additionally depend on a new separate mediation (for example, a new mediation key) or quorum being achieved for the second pod before the second pod can proceed following a fault that required mediation or testing for quorum. As with the previous description of changing quorum models, an inter-mediate step may set storage systems to participate in quorum for the second pod before the step where storage systems participate in and depend on quorum for the second pod. Once all in-sync storage systems have processed the change to depend on the new parameters for mediation or quorum for both the first pod and the second pod, the split is complete.

Joining a second pod into a first pod operates essentially in reverse. First, the second pod must be adjusted to be compatible with the first pod, by having an identical list of storage systems and by having a compatible high availability model. This may involve some set of steps such as those described elsewhere in this paper to add or remove storage systems or to change mediator and quorum models. Depend-ing on implementation, it may be necessary only to reach an identical list of storage systems. Joining proceeds by pro-cessing an operation on each in-sync storage system to link the second pod to the first pod for high availability. Each storage system which processes that operation will then depend on the first pod for high availability and then the second pod for high availability. Once all in-sync storage systems for the second pod have processed that operation, the storage systems will then each process a subsequent operation to eliminate the link between the second pod and the first pod, migrate the volumes from the second pod into the first pod, and delete the second pod. Host or application dataset access can be preserved throughout these operations, as long as the implementation allows proper direction of host or application dataset modification or read operations to the volume by identity and as long as the identity is preserved as appropriate to the storage protocol or storage model (for example, as long as logical unit identifiers for volumes and use of target ports for accessing volumes are preserved in the case of SCSI).

Migrating a volume between pods may present issues. If the pods have an identical set of in-sync membership storage systems, then it may be straightforward: temporarily sus-pend operations on the volumes being migrated, switch control over operations on those volumes to controlling software and structures for the new pod, and then resume operations. This allows for a seamless migration with con-tinuous uptime for applications apart from the very brief operation suspension, provided network and ports migrate properly between pods. Depending on the implementation, suspending operations may not even be necessary, or may be so internal to the system that the suspension of operations has no impact. Copying volumes between pods with differ-ent in-sync membership sets is more of a problem. If the target pod for the copy has a subset of in-sync members from the source pod, this isn't much of a problem: a member storage system can be dropped safely enough without having to do more work. But, if the target pod adds in-sync member storage systems to the volume over the source pod, then the added storage systems must be synchronized to include the volume's content before they can be used. Until synchro-nized, this leaves the copied volumes distinctly different from the already synchronized volumes, in that fault han-dling differs and request handling from the not yet synced member storage systems either won't work or must be forwarded or won't be as fast because reads will have to traverse an interconnect. Also, the internal implementation will have to handle some volumes being in sync and ready for fault handling and others not being in sync.

There are other problems relating to reliability of the operation in the face of faults. Coordinating a migration of volumes between multi-storage-system pods is a distributed operation. If pods are the unit of fault handling and recovery, and if mediation or quorum or whatever means are used to avoid split-brain situations, then a switch in volumes from one pod with a particular set of state and configurations and relationships for fault handling, recovery, mediation and quorum to another then storage systems in a pod have to be careful about coordinating changes related to that handling for any volumes. Operations can't be atomically distributed between storage systems, but must be staged in some way. Mediation and quorum models essentially provide pods with the tools for implementing distributed transactional atomicity, but this may not extend to inter-pod operations without adding to the implementation.

Consider even a simple migration of a volume from a first pod to a second pod even for two pods that share the same first and second storage systems. At some point the storage systems will coordinate to define that the volume is now in the second pod and is no longer in the first pod. If there is no inherent mechanism for transactional atomicity across the storage systems for the two pods, then a naive implementation could leave the volume in the first pod on the first storage system and the second pod on the second storage system at the time of a network fault that results in fault handling to detach storage systems from the two pods. If pods separately determine which storage system succeeds in detaching the other, then the result could be that the same storage system detaches the other storage system for both pods, in which case the result of the volume migration recovery should be consistent, or it could result in a different storage system detaching the other for the two pods. If the first storage system detaches the second storage system for the first pod and the second storage system detaches the first storage system for the second pod, then recovery might result in the volume being recovered to the first pod on the first storage system and into the second pod on the second storage system, with the volume then running and exported to hosts and storage applications on both storage systems. If instead the second storage system detaches the first storage system for the first pod and first storage detaches the second storage system for the second pod, then recovery might result in the volume being discarded from the second pod by the first storage system and the volume being discarded from the first pod by the second storage system, resulting in the volume disappearing entirely. If the pods a volume is being migrated between are on differing sets of storage systems, then things can get even more complicated.

A solution to these problems may be to use an intermediate pod along with the techniques described previously for splitting and joining pods. This intermediate pod may never be presented as visible managed objects associated with the storage systems. In this model, volumes to be moved from a first pod to a second pod are first split from the first pod into a new intermediate pod using the split operation described previously. The storage system members for the intermediate pod can then be adjusted to match the membership of storage systems by adding or removing storage systems from the pod, as necessary. Subsequently, the intermediate pod can be joined with the second pod.

For further explanation, FIG. 4B sets forth diagrams of metadata representations that may be implemented as a structured collection of metadata objects that, together, may represent a logical volume of storage data, or a portion of a logical volume, in accordance with some embodiments of the present disclosure. Metadata representations 451-50, 451-54, and 451-60 may be stored within a storage system (451-06), and one or more metadata representations may be generated and maintained for each of multiple storage objects, such as volumes, or portions of volumes, stored within a storage system (451-06).

While other types of structured collections of the metadata objects are possible, in this example, metadata representations may be structured as a directed acyclic graph (DAG) of nodes, where, to maintain efficient access to any given node, the DAG may be structured and balanced according to various methods. For example, a DAG for a metadata representation may be defined as a type of B-tree, and balanced accordingly in response to changes to the structure of the metadata representation, where changes to the metadata representation may occur in response to changes to, or additions to, underlying data represented by the metadata representation. While in this example, there are only two levels for the sake of simplicity, in other examples, metadata representations may span across multiple levels and may include hundreds or thousands of nodes, where each node may include any number of links to other nodes.

Further, in this example, the leaves of a metadata representation may include pointers to the stored data for a volume, or portion of a volume, where a logical address, or a volume and offset, may be used to identify and navigate through the metadata representation to reach one or more leaf nodes that reference stored data corresponding to the logical address. For example, a volume (451-52) may be represented by a metadata representation (451-50), which includes multiple metadata object nodes (451-52, 451-52A-451-52N), where leaf nodes (451-52A-451-52N) include pointers to respective data objects (451-53A-451-53N, 451-57). Data objects may be any size unit of data within a storage system (451-06). For example, data objects (451-53A-451-53N, 451-57) may each be a logical extent, where logical extents may be some specified size, such as 1 MB, 4 MB, or some other size.

In this example, a snapshot (451-56) may be created as a snapshot of a storage object, in this case, a volume (451-52), where at the point in time when the snapshot (451-56) is created, the metadata representation (451-54) for the snapshot (451-56) includes all of the metadata objects for the metadata representation (451-50) for the volume (451-52). Further, in response to creation of the snapshot (451-56), the metadata representation (451-54) may be designated to be read only. However, the volume (451-52) sharing the metadata representation may continue to be modified, and while at the moment the snapshot is created, the metadata representations for the volume (451-52) and the snapshot (451-56) are identical, as modifications are made to data corresponding to the volume (451-52), and in response to the modifications, the metadata representations for the volume (451-52) and the snapshot (451-56) may diverge and become different.

For example, given a metadata representation (451-50) to represent a volume (451-52) and a metadata representation (451-54) to represent a snapshot (451-56), the storage system (451-06) may receive an I/O operation that writes to data that is ultimately stored within a particular data object (451-53B), where the data object (451-53B) is pointed to by a leaf node pointer (451-52B), and where the leaf node pointer (451-52B) is part of both metadata representations (451-451-54). In response to the write operation, the read only data objects (451-53A-451-53N) referred to by the metadata representation (451-54) remain unchanged, and the pointer (451-52B) may also remain unchanged. However, the metadata representation (451-50), which represents the current volume (451-52), is modified to include a new data object to hold the data written by the write operation, where the modified metadata representation is depicted as the metadata representation (451-60). Further, the write operation may be directed to only a portion of the data object (451-53B), and consequently, the new data object (451-57) may include a copy of previous contents of the data object (451-53B) in addition to the payload for the write operation.

In this example, as part of processing the write operation, the metadata representation (451-60) for the volume (451-52) is modified to remove an existing metadata object pointer (451-52B) and to include a new metadata object pointer (451-58), where the new metadata object pointer (451-58) is configured to point to a new data object (451-57), where the new data object (451-57) stores the data written by the write operation. Further, the metadata representation (451-60) for the volume (451-52) continues to include all metadata objects included within the previous metadata representation (451-50)—with the exclusion of the metadata object pointer (451-52B) that referenced the target data object, where the metadata object pointer (451-52B) continues to reference the read only data object (451-53B) that would have been overwritten.

In this way, using metadata representations, a volume or a portion of a volume may be considered to be snapshotted, or considered to be copied, by creating metadata objects, and without actual duplication of data objects—where the duplication of data objects may be deferred until a write operation is directed at one of the read only data objects referred to by the metadata representations.

In other words, an advantage of using a metadata representation to represent a volume is that a snapshot or a copy of a volume may be created and be accessible in constant order time, and specifically, in the time it takes to create a metadata object for the snapshot or copy, and to create a reference for the snapshot or copy metadata object to the existing metadata representation for the volume being snapshotted or copied.

As an example use, a virtualized copy-by-reference may make use of a metadata representation in a manner that is similar to the use of a metadata representation in creating a snapshot of a volume—where a metadata representation for a virtualized copy-by-reference may often correspond to a portion of a metadata representation for an entire volume. An example implementation of virtualized copy-by-reference may be within the context of a virtualized storage system, where multiple block ranges within and between volumes may reference a unified copy of stored data. In such virtualized storage system, the metadata described above may be used to handle the relationship between virtual, or logical, addresses and physical, or real, addresses—in other words, the metadata representation of stored data enables a virtualized storage system that may be considered flash-friendly in that it reduces, or minimizes, wear on flash memory.

In some examples, logical extents may be combined in various ways, including as simple collections or as logically related address ranges within some larger-scale logical extent that is formed as a set of logical extent references. These larger combinations could also be given logical extent identities of various kinds, and could be further combined into still larger logical extents or collections. A copy-on-write status could apply to various layers, and in various ways depending on the implementation. For example, a copy on write status applied to a logical collection of logical collections of extents might result in a copied collection retaining references to unchanged logical extents and the creation of copied-on-write logical extents (through copying references to any unchanged stored data blocks as needed) when only part of the copy-on-write logical collection is changed.

Deduplication, volume snapshots, or block range snapshots may be implemented in this model through combinations of referencing stored data blocks, or referencing logical extents, or marking logical extents (or identified collections of logical extents) as copy-on-write.

Further, with flash storage systems, stored data blocks may be organized and grouped together in various ways as collections are written out into pages that are part of larger erase blocks. Eventual garbage collection of deleted or replaced stored data blocks may involve moving content stored in some number of pages elsewhere so that an entire erase block can be erased and prepared for reuse. This process of selecting physical flash pages, eventually migrating and garbage collecting them, and then erasing flash erase blocks for reuse may or may not be coordinated, driven by, or performed by the aspect of a storage system that is also handling logical extents, deduplication, compression, snapshots, virtual copying, or other storage system functions. A coordinated or driven process for selecting pages, migrating pages, garbage collecting and erasing erase blocks may further take into account various characteristics of the flash memory device cells, pages, and erase blocks such as number of uses, aging predictions, adjustments to voltage levels or numbers of retries needed in the past to recover stored data. They may also take into account analysis and predictions across all flash memory devices within the storage system.

To continue with this example, where a storage system may be implemented based on directed acyclic graphs comprising logical extents, logical extents can be categorized into two types: leaf logical extents, which reference some amount of stored data in some way, and composite logical extents, which reference other leaf or composite logical extents.

A leaf extent can reference data in a variety of ways. It can point directly to a single range of stored data (e.g., 64 kilobytes of data), or it can be a collection of references to stored data (e.g., a 1 megabyte "range" of content that maps some number of virtual blocks associated with the range to physically stored blocks). In the latter case, these blocks may be referenced using some identity, and some blocks within the range of the extent may not be mapped to anything. Also, in that latter case, these block references need not be unique, allowing multiple mappings from virtual blocks within some number of logical extents within and across some number of volumes to map to the same physically stored blocks. Instead of stored block references, a logical extent could encode simple patterns: for example, a block which is a string of identical bytes could simply encode that the block is a repeated pattern of identical bytes.

A composite logical extent can be a logical range of content with some virtual size, which comprises a plurality of maps that each map from a subrange of the composite logical extent logical range of content to an underlying leaf or composite logical extent. Transforming a request related to content for a composite logical extent, then, involves taking the content range for the request within the context of the composite logical extent, determining which underlying leaf or composite logical extents that request maps to, and transforming the request to apply to an appropriate range of content within those underlying leaf or composite logical extents.

Volumes, or files or other types of storage objects, can be described as composite logical extents. Thus, these presented storage objects can be organized using this extent model.

Depending on implementation, leaf or composite logical extents could be referenced from a plurality of other composite logical extents, effectively allowing inexpensive duplication of larger collections of content within and across volumes. Thus, logical extents can be arranged essentially within an acyclic graph of references, each ending in leaf logical extents. This can be used to make copies of volumes, to make snapshots of volumes, or as part of supporting virtual range copies within and between volumes as part of EXTENDED COPY or similar types of operations.

An implementation may provide each logical extent with an identity which can be used to name it. This simplifies referencing, since the references within composite logical extents become lists comprising logical extent identities and a logical subrange corresponding to each such logical extent identity. Within logical extents, each stored data block reference may also be based on some identity used to name it.

To support these duplicated uses of extents, we can add a further capability: copy-on-write logical extents. When a modifying operation affects a copy-on-write leaf or composite logical extent the logical extent is copied, with the copy being a new reference and possibly having a new identity (depending on implementation). The copy retains all references or identities related to underlying leaf or composite logical extents, but with whatever modifications result from the modifying operation. For example, a WRITE, WRITE SAME, XDWRITEREAD, XPWRITE, or COMPARE AND WRITE request may store new blocks in the storage system (or use deduplication techniques to identify existing stored blocks), resulting in modifying the corresponding leaf logical extents to reference or store identities to a new set of blocks, possibly replacing references and stored identities for a previous set of blocks. Alternately, an UNMAP request may modify a leaf logical extent to remove one or more block references. In both types of cases, a leaf logical extent is modified. If the leaf logical extent is copy-on-write, then a new leaf logical extent will be created that is formed by copying unaffected block references from the old extent and then replacing or removing block references based on the modifying operation.

A composite logical extent that was used to locate the leaf logical extent may then be modified to store the new leaf logical extent reference or identity associated with the copied and modified leaf logical extent as a replacement for the previous leaf logical extent. If that composite logical extent is copy-on-write, then a new composite logical extent is created as a new reference or with a new identity, and any unaffected references or identities to its underlying logical extents are copied to that new composite logical extent, with the previous leaf logical extent reference or identity being replaced with the new leaf logical extent reference or identity.

This process continues further backward from referenced extent to referencing composite extent, based on the search path through the acyclic graph used to process the modifying operation, with all copy-on-write logical extents being copied, modified, and replaced.

These copied leaf and composite logical extents can then drop the characteristic of being copy on write, so that further modifications do not result in an additional copy. For example, the first time some underlying logical extent within a copy-on-write "parent" composite extent is modified, that underlying logical extent may be copied and modified, with the copy having a new identity which is then written into a copied and replaced instance of the parent composite logical extent. However, a second time some other underlying logical extent is copied and modified and with that other underlying logical extent copy's new identity being written to the parent composite logical extent, the parent can then be modified in place with no further copy and replace necessary on behalf of references to the parent composite logical extent.

Modifying operations to new regions of a volume or of a composite logical extent for which there is no current leaf logical extent may create a new leaf logical extent to store the results of those modifications. If that new logical extent is to be referenced from an existing copy-on-write composite logical extent, then that existing copy-on-write composite logical extent will be modified to reference the new logical extent, resulting in another copy, modify, and replace sequence of operations similar to the sequence for modifying an existing leaf logical extent.

If a parent composite logical extent cannot be grown large enough (based on implementation) to cover an address range associated that includes new leaf logical extents to create for a new modifying operation, then the parent composite logical extent may be copied into two or more new composite logical extents which are then referenced from a single "grandparent" composite logical extent which yet again is a new reference or a new identity. If that grandparent logical extent is itself found through another composite logical extent that is copy-on-write, then that another composite logical extent will be copied and modified and replaced in a similar way as described in previous paragraphs. This copy-on-write model can be used as part of implementing snapshots, volume copies, and virtual volume address range copies within a storage system implementation based on these directed acyclic graphs of logical extents. To make a snapshot as a read-only copy of an otherwise writable volume, a graph of logical extents associated with the volume is marked copy-on-write and a reference to the original composite logical extents are retained by the snapshot. Modifying operations to the volume will then make logical extent copies as needed, resulting in the volume storing the results of those modifying operations and the snapshots retaining the original content. Volume copies are similar, except that both the original volume and the copied volume can modify content resulting in their own copied logical extent graphs and subgraphs.

Virtual volume address range copies can operate either by copying block references within and between leaf logical extents (which does not itself involve using copy-on-write techniques unless changes to block references modifies copy-on-write leaf logical extents). Alternately, virtual volume address range copies can duplicate references to leaf or composite logical extents, which works well for volume address range copies of larger address ranges. Further, this allows graphs to become directed acyclic graphs of references rather than merely reference trees. Copy-on-write techniques associated with duplicated logical extent references can be used to ensure that modifying operations to the source or target of a virtual address range copy will result in the creation of new logical extents to store those modifications without affecting the target or the source that share the same logical extent immediately after the volume address range copy operation.

Input/output operations for pods may also be implemented based on replicating directed acyclic graphs of logical extents. For example, each storage system within a pod could implement private graphs of logical extents, such that the graphs on one storage system for a pod have no particular relationship to the graphs on any second storage system for the pod. However, there is value in synchronizing the graphs between storage systems in a pod. This can be useful for resynchronization and for coordinating features such as asynchronous or snapshot based replication to remote storage systems. Further, it may be useful for reducing some overhead for handling the distribution of snapshot and copy related processing. In such a model, keeping the content of a pod in sync across all in-sync storage systems for a pod is essentially the same as keeping graphs of leaf and composite logical extents in sync for all volumes across all in-sync storage systems for the pod, and ensuring that the content of all logical extents is in-sync. To be in sync, matching leaf and composite logical extents should either have the same identity or should have mappable identities. Mapping could involve some set of intermediate mapping tables or could involve some other type of identity translation. In some cases, identities of blocks mapped by leaf logical extents could also be kept in sync.

In a pod implementation based on a leader and followers, with a single leader for each pod, the leader can be in charge of determining any changes to the logical extent graphs. If a new leaf or composite logical extent is to be created, it can be given an identity. If an existing leaf or composite logical extent is to be copied to form a new logical extent with modifications, the new logical extent can be described as a copy of a previous logical extent with some set of modifications. If an existing logical extent is to be split, the split can be described along with the new resulting identities. If a logical extent is to be referenced as an underlying logical extent from some additional composite logical extent, that reference can be described as a change to the composite logical extent to reference that underlying logical extent.

Modifying operations in a pod thus comprises distributing descriptions of modifications to logical extent graphs (where new logical extents are created to extend content or where logical extents are copied, modified, and replaced to handle copy-on-write states related to snapshots, volume copies, and volume address range copies) and distributing descriptions and content for modifications to the content of leaf logical extents. An additional benefit that comes from using metadata in the form of directed acyclic graphs, as described above, is that I/O operations that modify stored data in physical storage may be given effect at a user level through the modification of metadata corresponding to the stored data in physical storage—without modifying the stored data in physical storage. In the disclosed embodiments of storage systems, where the physical storage may be a solid state drive, the wear that accompanies modifications to flash memory may be avoided or reduced due to I/O operations being given effect through the modifications of the metadata representing the data targeted by the I/O operations instead of through the reading, erasing, or writing of flash memory. Further, as noted above, in such a virtualized storage system, the metadata described above may be used to handle the relationship between virtual, or logical, addresses and physical, or real, addresses—in other words, the metadata representation of stored data enables a virtualized storage system that may be considered flash-friendly in that it reduces, or minimizes, wear on flash memory.

Leader storage systems may perform their own local operations to implement these descriptions in the context of their local copy of the pod dataset and the local storage system's metadata. Further, the in-sync followers perform their own separate local operations to implement these descriptions in the context of their separate local copy of the pod dataset and their separate local storage system's metadata. When both leader and follower operations are complete, the result is compatible graphs of logical extents with compatible leaf logical extent content. These graphs of logical extents then become a type of "common metadata" as described in previous examples. This common metadata can be described as dependencies between modifying operations and required common metadata. Transformations to graphs can be described as separate operations within a set of or more predicates that may describe relationships, such as dependencies, with one or more other operations. In other words, interdependencies between operations may be described as a set of precursors that one operation depends on in some way, where the set of precursors may be considered predicates that must be true for an operation to complete. A fuller description of predicates may be found within application Reference Ser. No. 15/696,418, which is included herein by reference in its entirety. Alternately, each modifying operation that relies on a particular same graph transformation that has not yet been known to complete across the pod can include the parts of any graph transformation that it relies on. Processing an operation description that identifies a "new" leaf or composite logical extent that already exists can avoid creating the new logical extent since that part was already handled in the processing of some earlier operation, and can instead implement only the parts of the operation processing that change the content of leaf or composite logical extents. It is a role of the leader to ensure that transformations are compatible with each other. For example, we can start with two writes come that come in for a pod. A first write replaces a composite logical extent A with a copy of formed as composite logical extent B, replaces a leaf logical extent C with a copy as leaf logical extent D and with modifications to store the content for the second write, and further writes leaf logical extent D into composite logical extent B. Meanwhile, a second write implies the same copy and replacement of composite logical extent A with composite logical extent B but copies and replaces a different leaf logical extent E with a logical extent F which is modified to store the content of the second write, and further writes logical extent F into logical extent B. In that case, the description for the first write can include the replacement of A with B and C with D and the writing of D into composite logical extent B and the writing of the content of the first write into leaf extend B; and, the description of the second write can include the replacement of A with B and E with F and the writing of F into composite logical extent B, along with the content of the second write which will be written to leaf extent F. A leader or any follower can then separately process the first write or the second write in any order, and the end result is B copying and replacing A, D copying and replacing C, F copying replacing E, and D and F being written into composite logical extent B. A second copy of A to form B can be avoided by recognizing that B already exists. In this way, a leader can ensure that the pod maintains compatible common metadata for a logical extent graph across in-sync storage systems for a pod.

Given an implementation of storage systems using directed acyclic graphs of logical extents, recovery of pods based on replicated directed acyclic graphs of logical extents may be implemented. Specifically, in this example, recovery in pods may be based on replicated extent graphs then involves recovering consistency of these graphs as well as recovering content of leaf logical extents. In this implementation of recovery, operations may include querying for graph transformations that are not known to have completed on all in-sync storage systems for a pod, as well as all leaf logical extent content modifications that are not known to have completed across all storage systems for the pod. Such querying could be based on operations since some coordinated checkpoint, or could simply be operations not known to have completed where each storage system keeps a list of operations during normal operation that have not yet been signaled as completed. In this example, graph transformations are straightforward: a graph transformation may create new things, copy old things to new things, and copy old things into two or more split new things, or they modify composite extents to modify their references to other extents. Any stored operation description found on any in-sync storage system that creates or replaces any logical extent can be copied and performed on any other storage system that does not yet have that logical extent. Operations that describe modifications to leaf or composite logical extents can apply those modifications to any in-sync storage system that had not yet applied them, as long as the involved leaf or composite logical extents have been recovered properly.

In another example, as an alternative to using a logical extent graph, storage may be implemented based on a replicated content-addressable store. In a content-addressable store, for each block of data (for example, every 512 bytes, 4096 bytes, 8192 bytes or even 16384 bytes) a unique hash value (sometimes also called a fingerprint) is calculated, based on the block content, so that a volume or an extent range of a volume can be described as a list of references to blocks that have a particular hash value. In a synchronously replicated storage system implementation based on references to blocks with the same hash value, replication could involve a first storage system receiving blocks, calculating fingerprints for those blocks, identifying block references for those fingerprints, and delivering changes to one or a plurality of additional storage systems as updates to the mapping of volume blocks to referenced blocks. If a block is found to have already been stored by the first storage system, that storage system can use its reference to name the reference in each of the additional storage systems (either because the reference uses the same hash value or because an identifier for the reference is either identical or can be mapped readily). Alternately, if a block is not found by the first storage system, then content of the first storage system may be delivered to other storage systems as part of the operation description along with the hash value or identity associated with that block content. Further, each in-sync storage system's volume descriptions are then updated with the new block references. Recovery in such a store may then include comparing recently updated block references for a volume. If block references differ between different in-sync storage systems for a pod, then one version of each reference can be copied to other storage systems to make them consistent. If the block reference on one system does not exist, then it be copied from some storage system that does store a block for that reference. Virtual copy operations can be supported in such a block or hash reference store by copying the references as part of implementing the virtual copy operation.

Figure 5A:
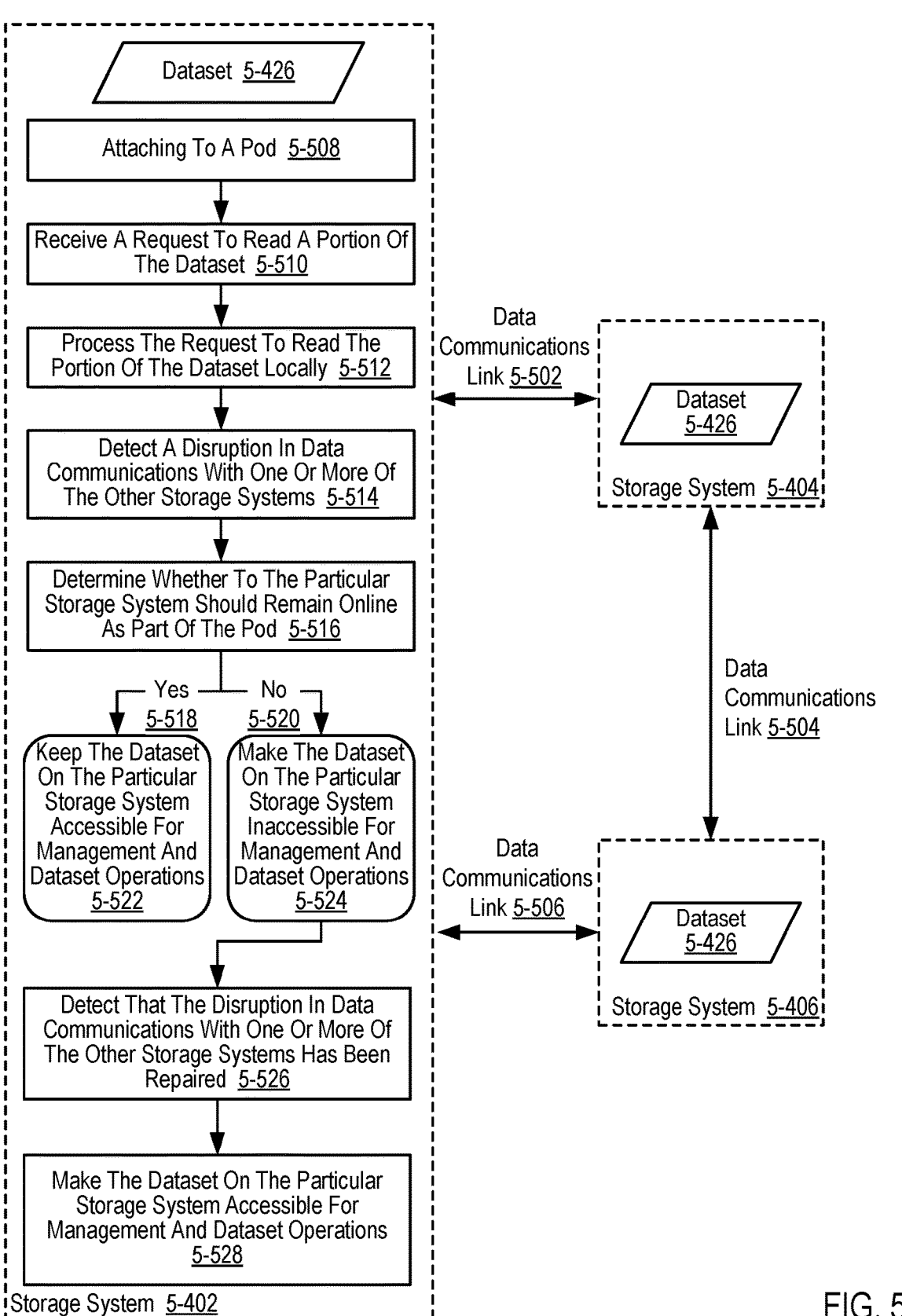
FIGS. 5A and 5B set forth flowcharts for synchronous replication in accordance with some embodiments.

For further explanation, FIG. 5A sets forth a flow chart illustrating steps that may be performed by storage systems (5-402, 5-404, 5-406) that support a pod according to some embodiments of the present disclosure. Although depicted in less detail, the storage systems (5-402, 5-404, 5-406) depicted in FIG. 5A may be similar to the storage systems described above, or any combination thereof. In fact, the storage systems (5-402, 5-404, 5-406) depicted in Figure may include the same, fewer, additional components as the storage systems described above.

In the example method depicted in FIG. 5A, a storage system (5-402) may attach (5-508) to a pod. The model for pod membership may include a list of storage systems and a subset of that list where storage systems are presumed to be in-sync for the pod. A storage system is in-sync for a pod if it is at least within a recovery of having identical idle content for the last written copy of the dataset associated with the pod. Idle content is the content after any in-progress modifications have completed with no processing of new modifications. Sometimes this is referred to as "crash recoverable" consistency. Storage systems that are listed as pod members but that are not listed as in-sync for the pod can be described as "detached" from the pod. Storage systems that are listed as pod members, are in-sync for the pod, and are currently available for actively serving data for the pod are "online" for the pod.

In the example method depicted in FIG. 5A, the storage system (5-402) may attach (5-508) to a pod, for example, by synchronizing its locally stored version of the dataset (5-426) along with an up-to-date version of the dataset (5-426) that is stored on other storage systems (5-404, 5-406) in the pod that are online, as the term is described above. In such an example, in order for the storage system (5-402) to attach (5-508) to the pod, a pod definition stored locally within each of the storage systems (5-402, 5-404, 5-406) in the pod may need to be updated in order for the storage system (5-402) to attach (5-508) to the pod. In such an example, each storage system member of a pod may have its own copy of the membership, including which storage systems it last knew were in-sync, and which storage systems it last knew comprised the entire set of pod members.

In the example method depicted in FIG. 5A, the storage system (5-402) may also receive (5-510) a request to read a portion of the dataset (5-426) and the storage system (5-402) may process (5-512) the request to read the portion of the dataset (5-426) locally. Readers will appreciate that although requests to modify (e.g., a write operation) the dataset (5-426) require coordination between the storage systems (5-402, 5-404, 5-406) in a pod, as the dataset (5-426) should be consistent across all storage systems (5-402, 5-404, 5-406) in a pod, responding to a request to read a portion of the dataset (5-426) does not require similar coordination between the storage systems (5-402, 5-404, 5-406). As such, a particular storage system (5-402) that receives a read request may service the read request locally by reading a portion of the dataset (5-426) that is stored within the storage system's (5-402) storage devices, with no synchronous communication with other storage systems (5-404, 5-406) in the pod. Read requests received by one storage system for a replicated dataset in a replicated cluster are expected to avoid any communication in the vast majority of cases, at least when received by a storage system that is running within a cluster that is also running nominally. Such reads should normally be processed simply by reading from the local copy of a clustered dataset with no further interaction required with other storage systems in the cluster.

Readers will appreciate that the storage systems may take steps to ensure read consistency such that a read request will return the same result regardless of which storage system processes the read request. For example, the resulting clustered dataset content for any set of updates received by any set of storage systems in the cluster should be consistent across the cluster, at least at any time updates are idle (all previous modifying operations have been indicated as complete and no new update requests have been received and processed in any way). More specifically, the instances of a clustered dataset across a set of storage systems can differ only as a result of updates that have not yet completed. This means, for example, that any two write requests which overlap in their volume block range, or any combination of a write request and an overlapping snapshot, compare-and-write, or virtual block range copy, must yield a consistent result on all copies of the dataset. Two operations cannot yield a result as if they happened in one order on one storage system and a different order on another storage system in the replicated cluster.

Furthermore, read requests may be time order consistent. For example, if one read request is received on a replicated cluster and completed and that read is then followed by another read request to an overlapping address range which is received by the replicated cluster and where one or both reads in any way overlap in time and volume address range with a modification request received by the replicated cluster (whether any of the reads or the modification are received by the same storage system or a different storage system in the replicated cluster), then if the first read reflects the result of the update then the second read should also reflect the results of that update, rather than possibly returning data that preceded the update. If the first read does not reflect the update, then the second read can either reflect the update or not. This ensures that between two read requests "time" for a data segment cannot roll backward.

In the example method depicted in FIG. 5A, the storage system (5-402) may also detect (5-514) a disruption in data communications with one or more of the other storage systems (5-404, 5-406). A disruption in data communications with one or more of the other storage systems (5-404, 5-406) may occur for a variety of reasons. For example, a disruption in data communications with one or more of the other storage systems (5-404, 5-406) may occur because one of the storage systems (5-402, 5-404, 5-406) has failed, because a network interconnect has failed, or for some other reason. An important aspect of synchronous replicated clustering is ensuring that any fault handling doesn't result in unrecoverable inconsistencies, or any inconsistency in responses. For example, if a network fails between two storage systems, at most one of the storage systems can continue processing newly incoming I/O requests for a pod. And, if one storage system continues processing, the other storage system can't process any new requests to completion, including read requests.

In the example method depicted in FIG. 5A, the storage system (5-402) may also determine (5-516) whether to the particular storage system (5-402) should remain online as part of the pod. As mentioned above, to be 'online' as part of a pod, a storage system must consider itself to be in-sync for the pod and must be communicating with all other storage systems it considers to be in-sync for the pod. If a storage system can't be certain that it is in-sync and communicating with all other storage systems that are in-sync, then it may stop processing new incoming requests to access the dataset (5-426). As such, the storage system (5-402) may determine (5-516) whether to the particular storage system (5-402) should remain online as part of the pod, for example, by determining whether it can communicate with all other storage systems (5-404, 5-406) it considers to be in-sync for the pod (e.g., via one or more test messages), by determining whether the all other storage systems (5-404, 5-406) it considers to be in-sync for the pod also consider the storage system (5-402) to be attached to the pod, through a combination of both steps where the particular storage system (5-402) must confirm that it can communicate with all other storage systems (5-404, 5-406) it considers to be in-sync for the pod and that all other storage systems (5-404, 5-406) it considers to be in-sync for the pod also consider the storage system (5-402) to be attached to the pod, or through some other mechanism.

In the example method depicted in FIG. 5A, the storage system (5-402) may also, responsive to affirmatively (5-518) determining that the particular storage system (5-402) should remain online as part of the pod, keep (5-522) the dataset (5-426) on the particular storage system (5-402) accessible for management and dataset operations. The storage system (5-402) may keep (5-522) the dataset (5-426) on the particular storage system (5-402) accessible for management and dataset operations, for example, by accepting requests to access the version of the dataset (5-426) that is stored on the storage system (5-402) and processing such requests, by accepting and processing management operations associated with the dataset (5-426) that are issued by a host or authorized administrator, by accepting and processing management operations associated with the dataset (5-426) that are issued by one of the other storage systems (5-404, 5-406) in the pod, or in some other way.

In the example method depicted in FIG. 5A, the storage system (5-402) may also, responsive to determining that the particular storage system should not (5-520) remain online as part of the pod, make (5-524) the dataset (5-426) on the particular storage system (5-402) inaccessible for management and dataset operations. The storage system (5-402) may make (5-524) the dataset (5-426) on the particular storage system (5-402) inaccessible for management and dataset operations, for example, by rejecting requests to access the version of the dataset (5-426) that is stored on the storage system (5-402), by rejecting management operations associated with the dataset (5-426) that are issued by a host or other authorized administrator, by rejecting management operations associated with the dataset (5-426) that are issued by one of the other storage systems (5-404, 5-406) in the pod, or in some other way.

In the example method depicted in FIG. 5A, the storage system (5-402) may also detect (5-526) that the disruption in data communications with one or more of the other storage systems (5-404, 5-406) has been repaired. The storage system (5-402) may detect (5-526) that the disruption in data communications with one or more of the other storage systems (5-404, 5-406) has been repaired, for example, by receiving a message from the one or more of the other storage systems (5-404, 5-406). In response to detecting (5-526) that the disruption in data communications with one or more of the other storage systems (5-404, 5-406) has been repaired, the storage system (5-402) may make (5-528) the dataset (5-426) on the particular storage system (5-402) accessible for management and dataset operations.

Readers will appreciate that the example depicted in FIG. 5A describes an embodiment in which various actions are depicted as occurring within some order, although no ordering is required. Furthermore, other embodiments may exist where the storage system (5-402) only carries out a subset of the described actions. For example, the storage system (5-402) may perform the steps of detecting (5-514) a disruption in data communications with one or more of the other storage systems (5-404, 5-406), determining (5-516) whether to the particular storage system (5-402) should remain in the pod, keeping (5-522) the dataset (5-426) on the particular storage system (5-402) accessible for management and dataset operations or making (5-524) the dataset (5-426) on the particular storage system (5-402) inaccessible for management and dataset operations without first receiving (5-510) a request to read a portion of the dataset (5-426) and processing (5-512) the request to read the portion of the dataset (5-426) locally. Furthermore, the storage system (5-402) may detect (5-526) that the disruption in data communications with one or more of the other storage systems (5-404, 5-406) has been repaired and make (5-528) the dataset (5-426) on the particular storage system (5-402) accessible for management and dataset operations without first receiving (5-510) a request to read a portion of the dataset (5-426) and processing (5-512) the request to read the portion of the dataset (5-426) locally. In fact, none of the steps described herein are explicitly required in all embodiments as prerequisites for performing other steps described herein.

Figure 5B:
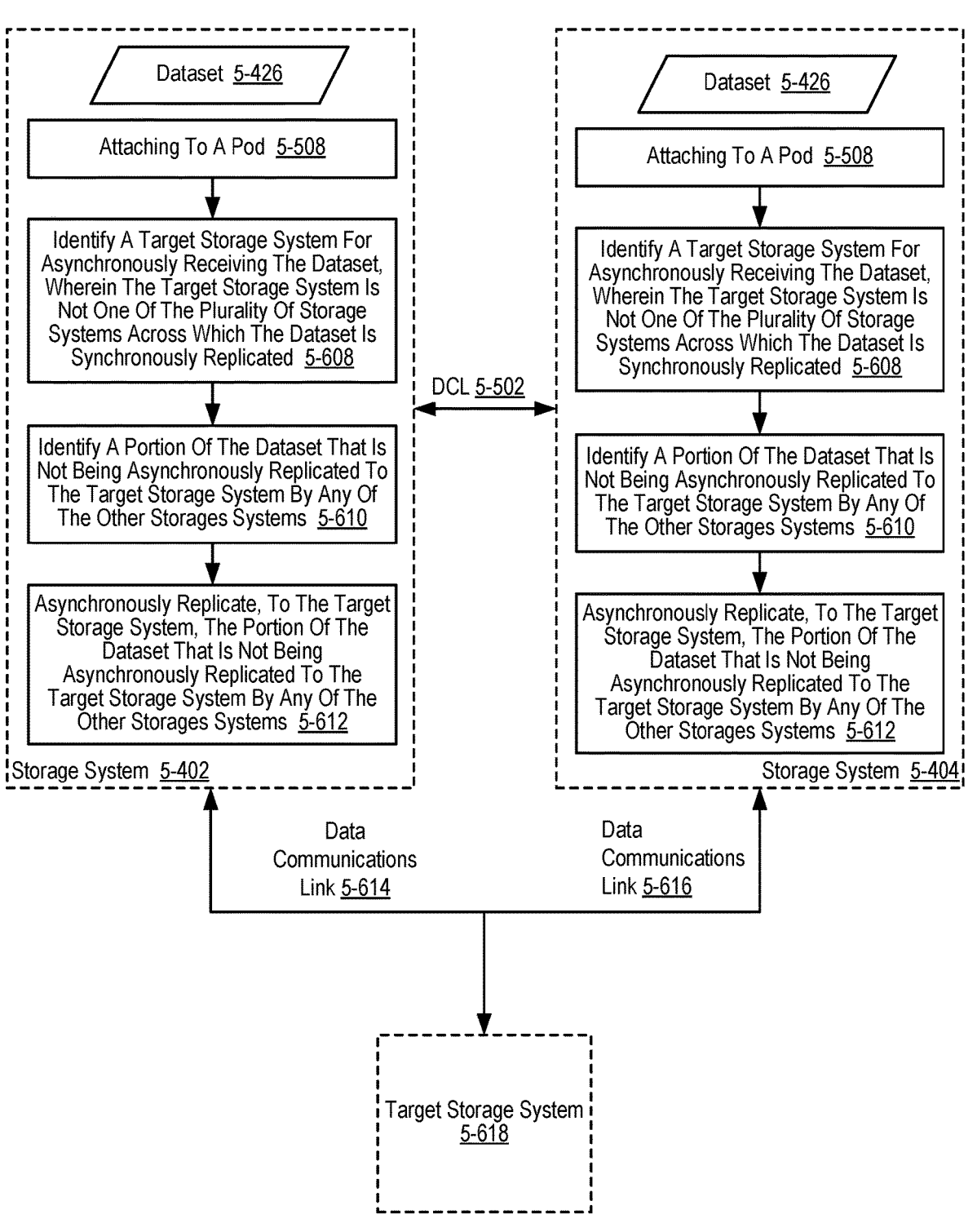
Figure 6A:
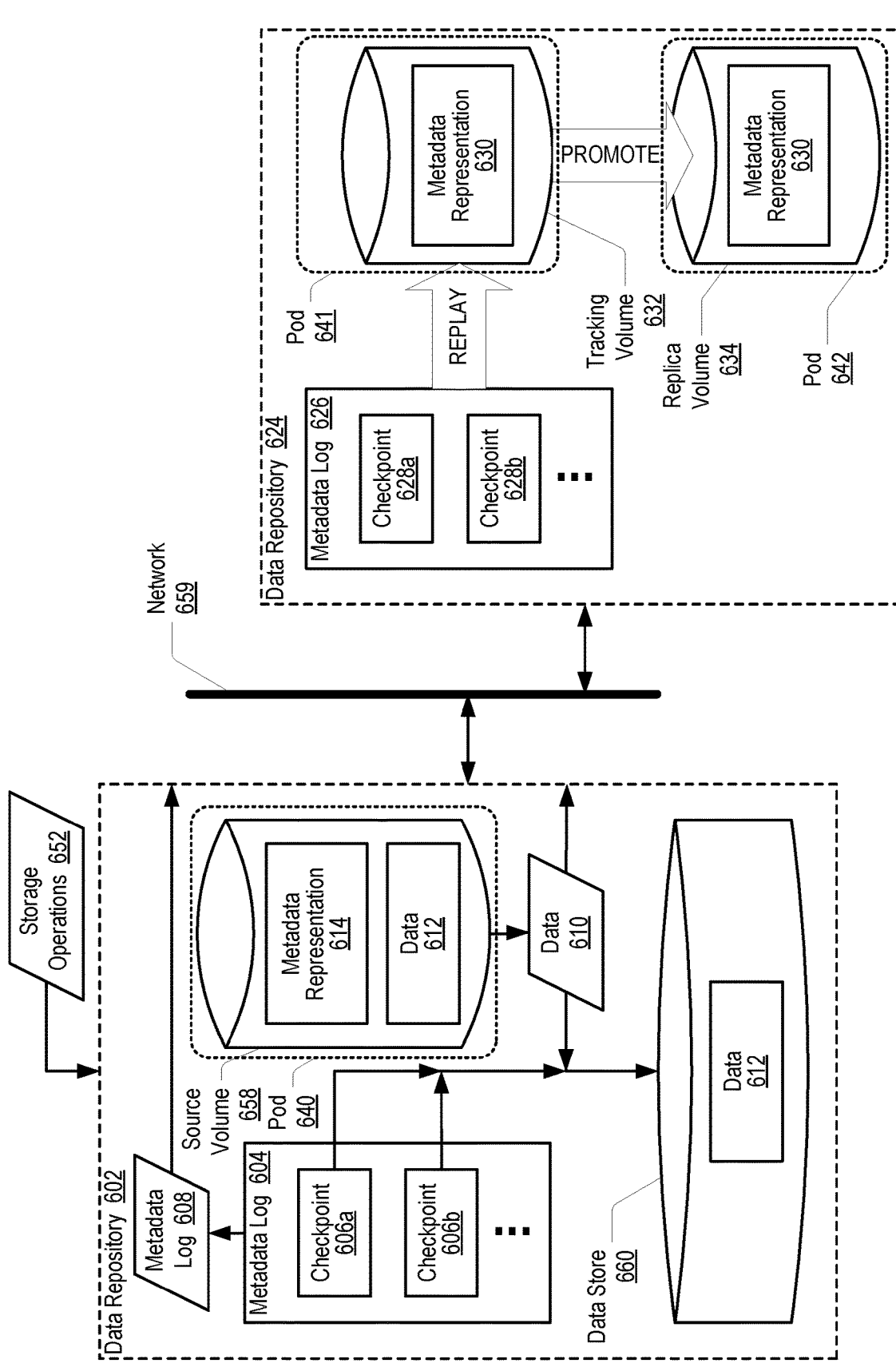
FIGS. 6A and 6B illustrate an exemplary computing environment for a uniform model for distinct types of data replication in accordance with some embodiments.
Figure 6B:
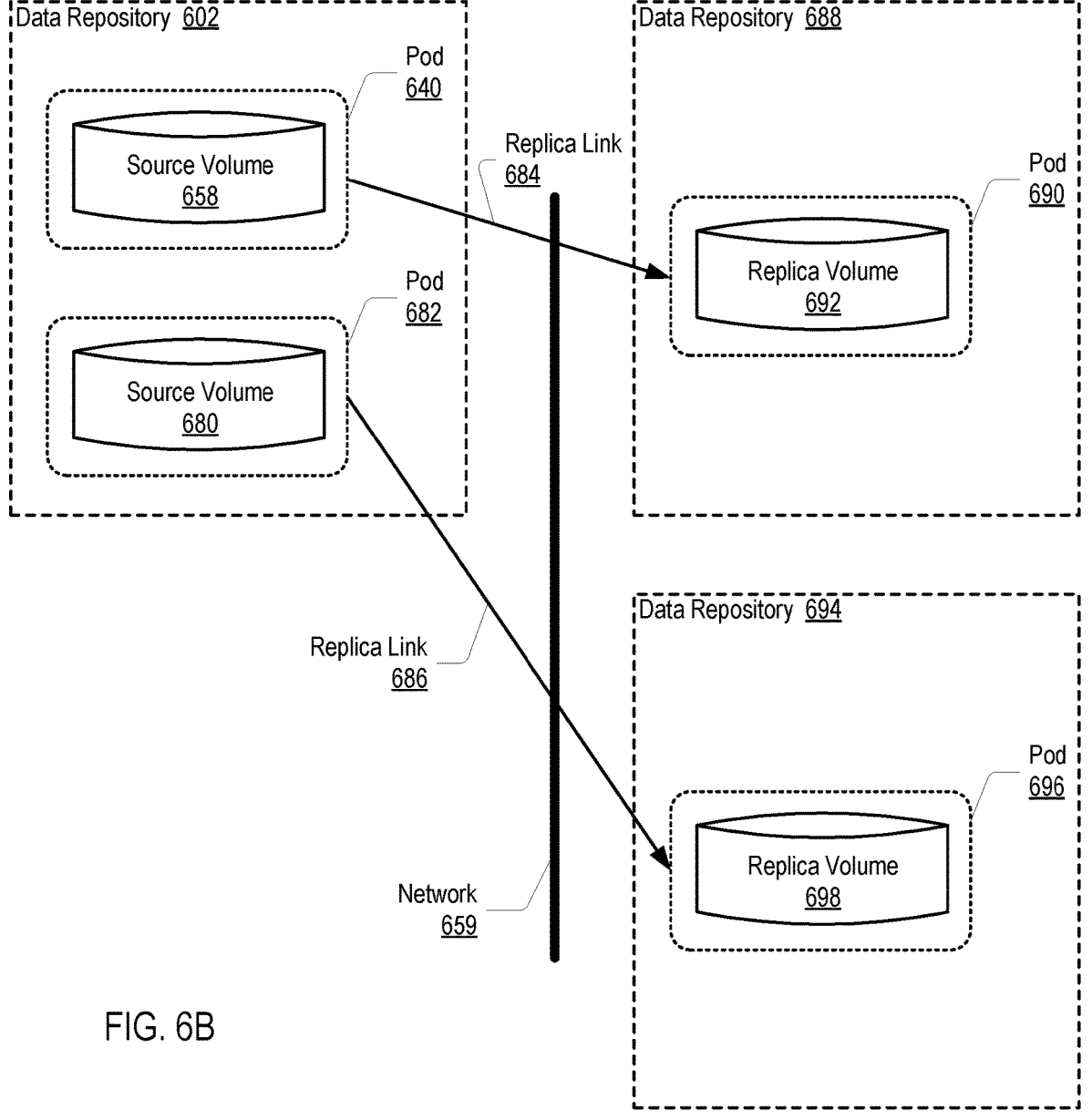

For further explanation, FIG. 5B sets forth a flow chart illustrating steps that may be performed by storage systems (5-402, 5-404, 5-406) that support a pod according to some embodiments of the present disclosure. Although depicted in less detail, the storage systems (5-402. 5-404, 5-406) depicted in FIG. 5B may be similar to the storage systems described above with reference to FIGS. 1A-1D, FIGS. 2A-2G, FIGS. 3A-3B, FIG. 6A or 6B, or any combination thereof. In fact, the storage systems (5-402, 5-404, 5-406) depicted in FIG. 5B may include the same, fewer, additional components as the storage systems described above.

In the example method depicted in FIG. 5B, two or more of the storage systems (5-402, 5-404) may each identify (5-608) a target storage system (5-618) for asynchronously receiving the dataset (5-426). The target storage system (5-618) for asynchronously receiving the dataset (5-426) may be embodied, for example, as a backup storage system that is located in a different data center than either of the storage systems (5-402, 5-404) that are members of a particular pod, as cloud storage that is provided by a cloud services provider, or in many other ways. Readers will appreciate that the target storage system (5-618) is not one of the plurality of storage systems (5-402, 5-404) across which the dataset (5-426) is synchronously replicated, and as such, the target storage system (5-618) initially does not include an up-to-date local copy of the dataset (5-426).

In the example method depicted in FIG. 5B, two or more of the storage systems (5-402, 5-404) may each also identify (5-610) a portion of the dataset (5-426) that is not being asynchronously replicated to the target storage (5-618) system by any of the other storages systems that are members of a pod that includes the dataset (5-426). In such an example, the storage systems (5-402, 5-404) may each asynchronously replicate (5-612), to the target storage system (5-618), the portion of the dataset (5-426) that is not being asynchronously replicated to the target storage system by any of the other storages systems. Consider an example in which a first storage system (5-402) is responsible for asynchronously replicating a first portion (e.g., a first half of an address space) of the dataset (5-426) to the target storage system (5-618). In such an example, the second storage system (5-404) would be responsible for asynchronously replicating a second portion (e.g., a second half of an address space) of the dataset (5-426) to the target storage system (5-618), such that the two or more storage systems (5-402, 5-404) collectively replicate the entire dataset (5-426) to the target storage system (5-618).

Readers will appreciate that through the use of pods, as described above, the replication relationship between two storage systems may be switched from a relationship where data is asynchronously replicated to a relationship where data is synchronously replicated. For example, if storage system A is configured to asynchronously replicate a dataset to storage system B, creating a pod that includes the dataset, storage system A as a member, and storage system B as a member can switch the relationship where data is asynchronously replicated to a relationship where data is synchronously replicated. Likewise, through the use of pods, the replication relationship between two storage systems may be switched from a relationship where data is synchronously replicated to a relationship where data is asynchronously replicated. For example, if a pod is created that includes the dataset, storage system A as a member, and storage system B as a member, by merely unstretching the pod (to remove storage system A as a member or to remove storage system B as a member), a relationship where data is synchronously replicated between the storage systems can immediately be switched to a relationship where data is asynchronously replicated. In such a way, storage systems may switch back-and-forth as needed between asynchronous replication and synchronous replication.

This switching can be facilitated by the implementation relying on similar techniques for both synchronous and asynchronous replication. For example, if resynchronization for a synchronously replicated dataset relies on the same or a compatible mechanism as is used for asynchronous replication, then switching to asynchronous replication is conceptually identical to dropping the in-sync state and leaving a relationship in a state similar to a "perpetual recovery" mode. Likewise, switching from asynchronous replication to synchronous replication can operate conceptually by "catching up" and becoming in-sync just as is done when completing a resynchronization with the switching system becoming an in-sync pod member.

Alternatively, or additionally, if both synchronous and asynchronous replication rely on similar or identical common metadata, or a common model for representing and identifying logical extents or stored block identities, or a common model for representing content-addressable stored blocks, then these aspects of commonality can be leveraged to dramatically reduce the content that may need to be transferred when switching to and from synchronous and asynchronous replication. Further, if a dataset is asynchronously replicated from a storage system A to a storage system B, and system B further asynchronously replicates that data set to a storage system C, then a common metadata model, common logical extent or block identities, or common representation of content-addressable stored blocks, can dramatically reduce the data transfers needed to enable synchronous replication between storage system A and storage system C.

Readers will further appreciate that through the use of pods, as described above, replication techniques may be used to perform tasks other than replicating data. In fact, because a pod may include a set of managed objects, tasks like migrating a virtual machine may be carried out using pods and the replication techniques described herein. For example, if virtual machine A is executing on storage system A, by creating a pod that includes virtual machine A as a managed object, storage system A as a member, and storage system B as a member, virtual machine A and any associated images and definitions may be migrated to storage system B, at which time the pod could simply be destroyed, membership could be updated, or other actions may be taken as necessary.

For further explanation FIG. 6 illustrates a configurable replication system that provides continuous replication with minimal batching and an adjustable recovery point objective. In contrast to the example storage systems described above, which describes use of pods in implementing synchronous replication, in this example, pods are used for asynchronous, or near-synchronous replication.

However, as described further below, while replication may be asynchronous, efficient use of lightweight journals, also referred to as metadata logs, allows for a short, typical recovery point (the time difference between last update on a source data repository and the clock value of the source data repository associated with the latest consistent dataset available at a target data repository) that can be on the order of a few to 50 or 100 milliseconds, or a short intrinsic or configured recovery point objective (RPO), where in some cases, the RPO may be on the order of a few tens of milliseconds up to some specified number of minutes. In some examples, the RPO limit may be more of a function of a typical maximum transfer time. As an illustrative scenario, the earth's moon is a little over one light-second away from the earth, so with sufficient bandwidth to avoid queue delay, an RPO to the moon of 1.2 seconds is possible with a lightweight journal implementation (receiving an acknowledgement from the moon for the primary to confirm the recovery point will take at least another 1.2 seconds).

In some implementations, the configurable replication system provides for disaster recovery from a failure at a source data repository based on a target data repository being able to provide read and write access with a consistent version of the source data repository in response to the failure of the source data repository. As an example, consider a set of clock values associated with an original dataset that is being updated, where a source time represents a clock value for the source dataset, and includes all updates which were signaled as completed on the original dataset prior to that time and excludes all updates which were received to be processed against the dataset after that time. In this example, any updates which were received to be processed against the dataset at the source time but had not yet been signaled as completed can in general be arbitrarily included or excluded barring any transactional interdependencies.

Further, a snapshot may represent one such source time for a dataset, and where rolling lightweight checkpoints may represent a sequence of dataset source times. In near-sync replication, checkpoints may be applied as they come in or when they are completely ready to be applied. As a result, in some examples, a tracking dataset always represents some replicated source time clock value which is generally some amount behind the live dataset's source time clock value. In this example, the difference between the replicated dataset source time clock value and the live dataset source time clock value may be reported as the current available "recovery point"—the distance between the replicated dataset source time clock value and the live dataset source time clock (though propagation delays likely mean that neither source nor target know exactly what this time distance is).

In some implementations, the lightweight journals may be a basis for implementing continuous data protection—with or without any implementation of data replication. In some examples, continuous data protection provides relatively fine-grained versioning of a dataset for extended periods of time, to allow roll-back or other access to any of those fine-grained versions. For example, these versions can be examined to determine when some update or corruption occurred, allowing a roll-back or other access (such as the formation of a usable snapshot or clone) to the version immediately prior to that update. In some cases, it makes sense to provide access to both the pre-change/pre-corruption dataset as well as the more recent data (or even a set of points-in-time of the dataset before or since the time of the update/corruption) so that other changes can be copied or otherwise reconciled, or for diagnostic purposes.

Further, continuing with this example, in continuous data protection, checkpoints of a dataset may be replayed up to some limit in order to construct a consistent image. In some cases, such checkpoints may be transformed into a read-only snapshot, or the dataset may also be cloned (or the read-only snapshot may be cloned) to form a read-write volume that may be used for various purposes. In this example, an implementation of continuous data protection may clone a volume to match some point in time, test it to determine whether the volume includes or excludes some data or some corruption, and then if needed re-clone the volume to match some other point in time and test the volume again. In this example, when a point-in-time is determined, that point-in-time may be used as a basis to generate a primary volume or simply copy data out of the volume at that point-in-time.

Further still, in some implementations, continuous data protection may provide more granular access to these named source time clock values from the source dataset, with granularity limited to the granularity of checkpoints. In some cases, continuous data protection could be either local (the checkpoints are retained on a local storage system and are available for local access), or they can be on a replication target (the checkpoints are retained on a replication target), or both, with each possibly having different retention periods and models for merging checkpoints or converting them to long-duration snapshots.

In some implementations, a 'pod', as the term is used here and throughout the present application, may be embodied as a management entity that represents a dataset, a set of managed objects and management operations, a set of access operations to modify or read the dataset, and a plurality of storage systems. Such management operations may modify or query managed objects through a storage system with proper access. Each storage system may store a separate copy of the dataset as a proper subset of the datasets stored and advertised for use by the storage system, where operations to modify managed objects or the dataset performed and completed through any one storage system are reflected in subsequent management objects to query the pod or subsequent access operations to read the dataset.

In some implementations, a replication relationship is formed as a set of storage systems 602, 624 that replicate some dataset 612 between independent stores, where each storage system 602, 624 may have its own copy and its own separate internal management of relevant data structures for defining storage objects, for mapping objects to physical storage, for deduplication, for defining the mapping of content to snapshots, and so on. In this way, a replication system may use a common management model that is a same, or similar, management model, and use a same, or similar, implementation model and persistent data structures for both synchronous replication and asynchronous replication.

As illustrated, a source data repository 602 receives storage system operations 652 and may communicate with a target data repository 624 to generate replica data. In this example, the source data repository 602 may be similar to computing device 350 or similar to a storage system 100, 306, 318, as described above with reference to FIGS. 1A-3D. While exemplary systems are depicted in FIG. 6, the components illustrated in FIG. 6 are not intended to be exhaustive or limiting.

As noted above, incoming data storage operations 652 may be received and handled by the source data repository 602, and the data storage operations that update or modify a volume 658, or more generally, modify one or more datasets, may be streamed or transmitted to the target data repository 624 as the data storage operations arrive. In other words, the source data repository 602 may be considered 'active' in that the source data repository 602 accepts write operations and other operations that may modify the stored data, where the target data repository 624 may be considered 'passive' in that the target data repository 624 may accept read operations, but not storage operations that may modify the stored data.

In this example, the source data repository 602 maintains a metadata log 604, which may be referred to as a journal of modifying data storage operations ordered by checkpoint. In some cases, a journal may equivalently be referred to as a lightweight journal due to the journal including only meta- data information, but little or no storage data provided by a user to be stored. In some examples, the metadata log 604 may be generated or updated during a flush of storage data from NVRAM to a backend bulk storage—where a storage system architecture with NVRAM, and example backend bulk storage, are described above with reference to FIG. 2D. In some examples, the metadata, such as checkpoints 604, may be stored in the source data repository 602 as metadata, without being included within a journal, or metadata log structure, where the journal, or metadata log 604 may be constructed on demand, such as in response to one or more checkpoints being ready for transmission to a target data repository 624.

In some implementations, a checkpoint may also be referred to as an ordered "lightweight checkpoint" of a dataset. In some examples, as described elsewhere, a check- point may include metadata describing a set of updates, but where the checkpoints only reference the actual data asso- ciated with a corresponding set of updates by holding references to where the data for a given checkpoint is stored in the normal course of operations for the storage system. A given set of updates may begin to be staged in NVRAM, or a first tier of a storage system's storage, before the set of updates, or at least a portion of these of updates is flushed to backing storage, or a second tier of the storage system.

However, in this example, the data referenced by a set of updates within a given checkpoint may survive logical (or address range) overwrites and garbage collection and is not duplicated into a separate metadata journal. Further, light- weight checkpoints may be ordered in that to arrive at a complete and consistent point-in-time image of some point in time of the original dataset, each set of updates described in each lightweight checkpoint between some prior consis- tent image and the point in time corresponding to a particular lightweight checkpoint should either be applied to form that point-in-time image or the update could be determined to be unnecessary, for example, being due to an overwrite or deletion. In some examples, lightweight checkpoints may be merged, which can be beneficial because merging may release some backing store data that has been overwritten or deleted, for example by having been written in an earlier checkpoint and overwritten in a later one that is merged with the earlier one (in which case the data for the earlier write may no longer be needed), thereby allowing some otherwise held data to be garbage collected.

Continuing with this example, such lightweight check- points are intended to represent very fine-grained consis- tency point moments in time as consistency points, with each lightweight checkpoint including a set of updates that have been signaled as completed, excluding a set of updates whose processing has not yet started, and potentially includ- ing or excluding updates that are concurrent with the moment in time the checkpoint represents. In some example, formation of a new lightweight checkpoint or a duration, or period, between two checkpoints may be based on time slices, such as every few milliseconds, or operation count slices, such as every 50 to 500 update operations, or based on transfer size or some more complex relationship to update operations, such as counting a few megabytes of modifications or some number of logical extent updates, or they can relate to some explicit operation, such as an operation to explicitly tag or name a particular point-in-time so it can be referenced later such as by a program noticing or being notified when it is received and applied by to replication target, any combination of these and other trig- gers. Such tags or names could also be searched for within a continuous data protection implementation.

In some implementations, lightweight checkpoints may differ from snapshots in that they do not affect the durable structure of the storage system beyond whatever side struc- ture is used to store them, apart from the garbage collection or overwrite holds, and lightweight checkpoints may be discarded with minimal effect, other than the release of those garbage collection or overwrite holds. Further, in some cases, lightweight checkpoints may also lack individual administrative handles, perhaps apart from lightweight checkpoints that are explicitly tagged or named. In some example, lightweight checkpoints exist almost exclusively as an ordered list of metadata bundles describing updates, where the ordered list of metadata may be stored in a log-style structure. Further, lightweight checkpoints may be persistent or not persistent, in dependence at least upon an intended use of the lightweight checkpoint. In particular, near-sync replication may have crash or resynchronization recovery mechanisms that may operate independently of lightweight checkpoints and that may then not require persisting of lightweight checkpoint logs, while the target of replication might separately benefit from persisting check- points on the target storage system for fault recovery pur- poses, such as part of making application of lightweight checkpoints atomic.

In some implementations, if the metadata for a light- weight checkpoint represents logical composite and leaf extents, as described in prior patents, then a lightweight checkpoint may be a set of descriptions for updating these logical composite and leaf extents which are themselves metadata descriptions that reference stored data by content identifier references In some cases, use of content identifiers irrespective of the use of an extent model may also be beneficial in that such use preserves information about duplicates and may be used as part of a strategy to avoid transfer of content that a target storage system may already be known to store. For further clarification, these prior patents include, U.S. patent Ser. No. 16/050,385, 62/598, 989, and which are incorporated herein for all purposes.

Continuing with this example, the structure of a metadata representation of a dataset may be particularly effective in a Flash storage system because Flash does not allow overwrite in place at the chip level and may generally be driven, at some level, by garbage collection algorithms that can readily account for a wide variety of references that have holds on written data. In some cases, some details may account for the NVRAM aspects which do not have to follow the same write-elsewhere-with-garbage-collection model, but at least the bulk data writes for lightweight checkpoints are not separate writes that require separate storage.

In some implementations, and as described in other sec- tions of this reference, some applications of lightweight checkpoints may include normal operation of near-sync replication (in contrast to initialization or resynchronization), which may also be referred to as asynchronous replication. In this example, lightweight checkpoints may be transferred over a network link to some target repository that may then apply the lightweight checkpoints to a tracking copy of the original dataset, with lightweight checkpoints (and their referenced data) being held at least until the tracking copy has been updated.

In some cases, if checkpoints may be received or applied out-of-order, then all intermediate checkpoints may need to be received and applied before the lightweight checkpoint on the source system can be released. Generally, lightweight checkpoints should be applied atomically, such as by using some transaction mechanism. One transaction mechanism is to receive the metadata for a lightweight checkpoint, receive all the data content for a lightweight checkpoint and storing it locally on the target, and then roll forward the tracking copy to incorporate the metadata updates in the lightweight checkpoint with its data references updated to reference the data content stored locally on the target.

Further, other applications of lightweight checkpoints may include:

In some examples, a tracking copy may be converted into a snapshot or a clone to provide a stable image at some point in time, thereby allowing use of a point-in-time image for testing purposes or failover purposes;

In some examples, if a source-to-target interconnect and the target storage repository are not roughly keeping up with the rate that the source storage system itself is receiving data, storing it, and forming and transferring lightweight checkpoints, then these lightweight checkpoints can start building up. In this scenario, there are several reactions to this that can be used: lightweight checkpoints could be merged to reduce their cost (the source dataset points-in-time associated with named or tagged checkpoints might be preferentially retained); back pressure could be put on the source storage system to reduce the rate at which it receives, processes, or completes updates; a subset of checkpoints could be converted to more durable snapshots; or lightweight checkpoint-based replication could be discarded in favor of replication based on periodic snapshots. In some cases, some number of periodic snapshots might already be kept for resync or connection loss/reconnect purposes so switching to snapshot replication may already be fully ready to go—meaning that lightweight checkpoints since the last snapshot may simply be discarded if replication is not keeping up sufficiently for the lightweight snapshots to be useful (further clarification may be found within U.S. patent Ser. No. 15/842,850, which is incorporated herein for all purposes);

In some examples, connection loss or other kinds of interruptions to replication may generally be handled by switching to some other scheme, such as snapshot based replication, or by using a resync model similar to what is described for synchronous replication recovery, though without the need to catch all the way up at the very end;

In some examples, the transfer of data can be initiated by the sender side by simply sending the referenced data to the target storage system along with sending the lightweight checkpoint metadata updates. Further, the transfer of data may instead be initiated by the target storage system: if the lightweight checkpoint metadata lists content identifiers, then the target storage system can reuse references to content it already stores but can then request retrieval of content it does not current store. This can reduce total bandwidth required, though if the network link has to be sized for the update rate, the benefit may be low; and In some examples, if the source storage system itself stores content compressed as some kind of compressed blocks, then the compressed blocks may in many cases be transferred directly rather than being uncompressed and then possibly recompressed before being transmitted over the network.

In some implementations, lightweight checkpoints may be used to implement continuous data protection either on the original storage system—with or without replication being involved—or on a replication target system by storing the lightweight checkpoints on the target storage system rather than simply applying and then discarding them. In continuous data protection, various point-in-time images of a dataset can be accessed by rolling forward a copy of a dataset to include all lightweight checkpoints up to the lightweight checkpoint corresponding to some source dataset point-in-time of interest.

For example, if the storage system also implements durable snapshots, then only lightweight checkpoints since the point-in-time of the most immediately prior snapshot may need to be applied. Generally, higher granularity is more interesting for more recent history of a dataset and less granularity is needed farther back, allowing for the possibility of ever more aggressive lightweight checkpoint merging as points-in-time recede, or eventually discarding them in favor of less frequent snapshots.

Further, if continuous data protection is used to locate a point in time just before where an unwanted change or corruption was introduced, then relatively fine grained lightweight checkpoints (milliseconds to a few seconds to every few minutes) might only need to be kept until plenty of time has elapsed to ensure that corruption will have been noticed and recovery procedures started. After that, 30 minute or hourly or even daily snapshots might be preferable (or such rollbacks may be considered unnecessary). Any specific lightweight checkpoint can be converted into durable snapshots if snapshots hadn't been created explicitly. If lightweight checkpoints can be named or tagged, continuous data protection could support locating and accessing those named lightweight checkpoints.

In some implementations, as noted below, under some storage system conditions, or in response to a user-specified configuration, near-synchronous replication may be transitioned to different type of replication, including periodic replication or synchronous replication. Further, in some implementations, a source data storage system may implement synchronous replication that is pod-based among a cluster of storage systems, but where one or more of the source data storage systems also implement lightweight checkpoints for near-synchronous replication with a target storage system that may be initiated in the event of a communication fault with the other storage system in the cluster of storage systems—thereby allowing the source storage system to maintain both synchronous data replication over near distances and to maintain data resiliency over longer distances. Further, in some examples, RPO may be configurable, where the time or operation size of lightweight checkpoints may be configured or adjusted based on, at least, available network bandwidth or supporting flow-control (as discussed above). In some cases, if a set of synchronously replicating storage systems exchange checkpoint information between them as part of their operation, then near-synchronous replication can operate and continue from any of the storage systems that synchronously replicate the checkpoint information, including continuing after the failure of one such storage system, including parallel transfer of data and metadata from multiple of the synchronously replicating storage systems. Such parallel data transfer could, for example, involve the target of near-synchronous replication requesting data for referenced composite or logical extents or content identifiers from any set or subset of the synchronously replicating storage systems.

Further, in some implementations, an addition to near-synchronous replication is short-distance synchronous replication of metadata and data updates, combined with longer-distance non-synchronous replication of lightweight checkpoints. In such an example, this may provide what is sometimes called "bunker" replication where a storage system within synchronous replication distance is sized to store enough for in-transit data and metadata but is not sized to store a complete dataset. In this example, if the primary (complete) copy fails but the intermediate "bunker" storage survives, then the further distant non-synchronous target can be caught up by applying the updates that were stored synchronously on the bunker storage. Further, in this example, if both primary and bunker storage fail, then at least the longer-distance storage is consistent and within the longer distance RPO. Continuing with this example, the lightweight checkpoints may be formed and transferred by either the bunker storage system or by the primary storage system, or can be formed and transferred by a combination of the primary storage system and the bunker storage system.

In some implementations, a metadata log 604 schema may be sorted by (pod, checkpoint), which allows for traversal in a correct order, where a same schema may be used on both a source data repository 602 and a target data repository 624. In this example, a write operation may be encoded in a metadata log 604 by indicating both a physical extent identification along with address information of all writes for a given checkpoint. Further, in some cases, a metadata log 604 may contain operations to modify a metadata representation 614 of the dataset that correspond to system operations, such as copy-on-write (CoW). For example, modifications to a metadata representation 614 may include modifications due to an XCOPY, WSAME, snapshots, CoW, among others. An example of such operation-style metadata may include a sequence of updates to logical and composite extents, with any written content tied to a checkpoint being retained at least until the checkpoint is no longer needed for replication or other purposes. In this case, the metadata log may contain the logical and composite logical extent updates including references to any stored data, with the stored data being a held reference to the content stored in the storage system for its regular use but with any garbage collection or overwrite held off as long as the checkpoint is retained. Further, in some cases, content overwrites within a checkpoint (including within merged checkpoints if checkpoint merging is supported) may discard the hold on the earlier content replaced by later content described by the checkpoint. In some examples, a metadata log 604 may include metadata representation 614 identifier allocations on a source data repository 602, which allows the target data repository 624 to avoid trying to look up content identifiers that do not exist on the target data repository 624.

In different embodiments, the lifetime of checkpoint entries 606a, 606b may be configurable to allow for different options for data recovery, including a lifetime extending for an ongoing length of storage services that allows for continuous data protection. In this example, the configurable replication system may provide continuous replication, whereas data storage operations that modify a volume or dataset arrive, the storage operations are grouped into checkpoints, and where a given checkpoint may include varying numbers of storage operations. In some examples, a given checkpoint may include metadata for up to 100 storage operations. As noted herein, because a garbage collection process may keep stored data based on references to the stored data location being referenced by either general storage system references within the storage system's general metadata or by a metadata log that includes checkpoints, then the length of the lifetime of the checkpoints corresponds to a length of time for a recovery window for continuous data protection.

In this example, a checkpoint may be considered a smallest unit of data consistency, where if the metadata log 626 received at the target data repository 624 includes a particular checkpoint, then a replica dataset 634 that is generated by replaying the storage operations in the particular checkpoint will include all storage operations from all checkpoints that were generated prior to the particular checkpoint—and such a policy provides for a crash consistent recovery point for the replica dataset 634. Further, if there is a snapshot that is from a point-in-time earlier than the desired replay point, then only replay checkpoints since that snapshot may be needed during a recovery. In this example, checkpoints may be merged to allow garbage collection of overwritten data, and checkpoints may also be periodically converted to snapshots if that results in a cleaner format or a better or simpler relationship with garbage collection.

In some implementations, snapshots may be used to coordinate a point in time in the update stream. For example, an application can make some update then issue a snapshot request, and if snapshots are a type of update that is replicated, then when the snapshot appears on the target storage system, that point in time for the application is present. In this example, this could be generalized to some kind of tag, such that a snapshot is not necessarily needed. Further in this example, if some metadata tag is set on a dataset, or on some component within a dataset, and that tag is handled as a type of update within the log/checkpoint model, then a monitoring program on the target storage system could detect when that point in time of the source dataset has been reached on the target by noticing the appearance of the tag. The storage system could further support a means of notifying programs waiting for such snapshots or named or tagged checkpoints being received and processed on a target storage system. Yet further, when the target storage system has received and processed such snapshots or named or tagged checkpoints, it could send a notification back to the source storage system, which could then, in turn, notify interested programs that the snapshot or named or tagged checkpoint is known to have been received and processed on the target system. Continuing with this example, such a process could be used, for example, by a program running against the source storage system that updates some data, tags a checkpoint, and then takes some action when notified by the source storage system that the tagged checkpoint (and thus the update) is known to have been replicated. For example, a high level task could perform a set of updates which are replicated, and where the action taken is that aspects of the continue only after receiving that notification. In some cases, this in turn allows higher level tasks to be replicated effectively synchronously across long distances even when performing many smaller operations that are not themselves replicated synchronously. For example, a web application might use this to ensure that some requested update to, for example, a user profile is durable across distances before a web page shows the durable change to the user profile.

While in this example, replication is described in the context of replicating a "volume", in general, the described replication techniques may be applied to any generalized dataset. In other words, in the general case, replication applies to a dataset, which may include one or more volumes, and/or one or more other types of data or collections of data, at a given point in time. In some cases, a dataset may be a dataset specified by a pod, where in a pod the actual set of volumes may change as volumes are added to and removed from the pod, and tracking will reflect that by adding and removing volumes. Further, in some examples, continuous data protection of a pod may result in volumes existing or not existing based on which checkpoint we roll backward to or forward to, and on the volume membership at the pod's source time for that checkpoint.

Continuing with this example, each incoming write operation may be persisted as described above with reference to FIGS. 1A-3D, where in addition to the source volume 658 being updated, a reference to the storage location of the data corresponding to the write operation is added to the metadata log 604. In this way, the metadata log 604 may serve as a buffer that allows recovery after a network outage and support bursts of write operations without impeding the reception or handling of storage operations by the source data repository 602. In this example, as checkpoints 606a, 606b are completed and created within the metadata log 604, the checkpoints 606a, 606b may be replicated to the target data repository 624 by, for example, transmission of one or more messages that include metadata log 608 using a standard communication protocol over one or more networks 659. In this example, independent of the transmission of the metadata log 604, the source data repository 602 may also transmit data 610 corresponding to the checkpoints 606 within the metadata log 604.

In some implementations, as checkpoints are created within the source data repository 602, a monitoring service may monitor which checkpoints are complete, and determine where the checkpoints may be read. In some examples, a checkpoint may be created as a checkpoint is written into NVRAM, or a first tier of fast data storage. In some cases, the monitoring service may provide an interface for accessing checkpoint data from NVRAM or from a given storage location.

Continuing with this example, a target data repository 624 may open one or more forwarding streams from the source data repository 602, where on the source data repository 602, each forwarding stream may claim a number of checkpoints from the monitoring service. In this example, a given forwarding stream may fetch metadata log 614 information for one or more checkpoints 606. Similarly, in this example, a given forwarding stream may fetch corresponding storage data for the one or more checkpoints 606. In this way, one or more communication channels may be opened, in some cases in parallel, between the source data repository 602 and the target data repository 624, where the one or more communication channels operate to transfer the metadata log 614 and corresponding data 612 between the source data repository 602 and the target data repository 624.

In this example, in response to receiving the metadata log 608, the target data repository 624 may persist the checkpoints 628a, 628b into a local metadata log 626. Based on a successful write of the checkpoints 628 into the local metadata log 626, the target data repository 624 may respond to the source data repository 602 with an acknowledgment, where in response to the acknowledgment, the source data repository 602 may—in dependence upon a configuration setting—delete or maintain the checkpoints 606a, 606b.

In some examples, the target data repository 624 may periodically, or in response to receiving metadata log 626 information from the source data repository 602, replay the storage operations within the checkpoints 628 to generate and update a tracking volume 632. In some examples, replaying the storage operations may include converting metadata log 626 information into regular formatted metadata for the storage system and converting global content identifiers into local content identifiers; for example, such converting may include mapping content identifiers between the source data repository 602 and the target data repository 624. In this example, a metadata representation 630 may be implemented similarly to metadata representation 614 on the source data repository 602, where the physical location information may be different based on use of physical storage on the target data repository. In some examples, a tracking volume may also be referred to as a "shadow" volume.

In some implementations, content identifiers may be used to mark written content, including content that the source has already determined was a duplicate of other content that the source knows of (for example, through tracking the source write history, source snapshot history, source virtual copy history, and/or any local duplicate detection). In some examples, the content identifiers may be leveraged when doing recovery, such as after an extended outage, or when converting from near-sync replication to periodic or asynchronous replication.

In some implementations, delivery of a checkpoint as a set of metadata updates and content identifiers may result in the target storage system noticing which content identifiers the target storage system is already aware of and already stores—the target storage system may then request from the source storage system any content whose content identifiers the target storage system does not already store or is not already aware of. In some cases, except at moon-level distances, checkpoint delivery may still result in sub-second RPOs, and may also reduce data transfer bandwidth if duplicates are common. Further, in this example, until all missing content has been requested and received by the target storage system, the checkpoint may not be considered completed so the checkpoint may not be deleted to allow garbage collection.

In some examples, the tracking volume 632 is generated in response to a promotion event, where a promotion event may be based on a detected failure, detected impending failure, or detected degradation of responsiveness beyond a compliance policy threshold of the source data repository. In some cases, the promotion event may be automatically generated based on such a detection of a promotion event, and in other cases, the promotion event may be responsive to a user specifying that the replica data on the target data repository 624 be promoted.

In some implementations, a user may promote a tracking volume 632 in order to use a replica of the source data for different uses, such as for testing—where testing may include modification of the replica data in the tracking volume 632. However, based on a promotion event generating a replica volume 634, any modifications or corruption to the tracking volume that may occur during testing may be undone or reversed by referencing the replica volume 634. In this example, promotion of the tracking volume 632 also includes configuration filtering and/or reconciliation as part of making the tracking volume 632 a new volume available for use by a computational process, a computing device, or a compute node. Further, demotion or deletion of a volume may cause a host to reconfigure a connection to continue to access replica data on the target data repository 624.

While in some implementations, received metadata log 608 information may be played to generate the tracking volume 632 without storing the metadata log 608, or keeping a stored metadata log 626, the stored metadata log 626 may serve as a basis for providing data consistency guarantees described above with regard to the storage operations in a checkpoint.

Further, separating the generation of the tracking volume from dependence upon checkpoints as they are received, and instead generating the tracking volume from stored check-points supports receiving checkpoints out of order and the option to order the checkpoints prior to building the tracking volume 632. In other words, checkpoints may be transmitted and received out of order, but in general, checkpoint may not be applied out of order, so in some cases applying the checkpoints to a tracking dataset or volume may be delayed until intervening checkpoints are received. This example may be generalized as requiring that all intermediate check-points be received before the tracking dataset or volume may be advanced to the time associated with a received dataset (irrespective of how checkpoint updates are actually applied).

Further, in this example, if for some reason, such as a recovery event on the source data repository 602 based on data loss or based on a user or application requesting access to the replica volume or based on a failover request to begin using the replica volume 634 as a primary or user-accessible volume, then the target data repository 624 may promote, or activate, the replica volume 634. In response, the existing checkpoints in the metadata log 626 may be replayed to generate a version of the tracking volume 632 consistent with a most recent checkpoint received, and the tracking volume 632 may be used to create a version of the source volume 658.

In some examples, in response to a recovery event—such as a source data repository 602 losing a connection with a host computer (not depicted) or applications sending storage operations, performance degradation beyond a threshold value, storage capacity exceeding a threshold value, or a degradation in response times—the target data repository 624 may be promoted to handle all further storage operations from the host computer, and another data repository may be selected. In this example, the replica link from the original source data repository 602 to the target data repository 624 may be reconfigured to flip directions, where the target data repository 624 becomes a new source data repository and another data repository becomes a new target data repository, and where other replica link characteristics stay the same.

The continuous replication from the source data repository 602 to the target data repository 624 may also be described in terms of pods, where pods and pod character-istics are described above with reference to FIGS. 4 and 5. As noted above, where FIG. 5 describes use of pods in implementing synchronous replication, in this example, pods are used for asynchronous, or near-synchronous repli-cation. In other words, in this example, source volume 658 may be included within a pod 640, and the replica volume 634 may be included within pod 642. In this way, in response to an indication that a user or application intends to use the replica data, and the tracking volume 632 being promoted, the replica pod 642 is updated with the most current contents from the tracking volume 632. While in this example a pod is depicted as include a single volume, in other examples, a pod may generally hold any type and quantity of data, including multiple volumes and/or multiple structured or unstructured datasets.

Further, in some implementations, as discussed above, there may be a dynamic relationship of volumes to pods, where the dynamic collection of volumes within a pod may be related to a clock value within the update stream on a source storage system. For example, a checkpoint may introduce volumes to a pod, change volume characteristics (name, size, etc.) and may remove volumes. In this example, if there are protection groups or some similar organizational concept within a pod, then these protection groups may also change with those changes being propagated through check-points. In this way, a near-sync target storage system may actually take over relatively seamlessly as a periodic repli-cation source with all relationships intact, minus whatever time difference the last processed checkpoint is from the previous active source. In short, in some cases, it is the unified nature of the metadata model between synchronous replication, near synchronous replication (near-sync), and periodic replication (or asynchronous) replication, coupled with the local-to-global-to-local content identifier and logi-cal and composite extent identifier transformations that provides improvements to various aspects of a storage system and of a storage system replication process.

As depicted in FIG. 6, a data repository 602 stores both data 612 from incoming storage operations 652, and a metadata representation 614 of the data 612. In this example, a metadata representation 614 may be implemented as a structured collection of metadata objects that, together, may represent a logical volume of storage data, or a portion of a logical volume, in accordance with some embodiments of the present disclosure. Metadata representation 614 may be stored within the source data repository 602, and one or more metadata representations may be generated and main-tained for each of multiple storage objects, such as volumes, or portions of volumes, stored within the data repository 602.

In other examples, other types of structured collections of the metadata objects are possible; however, in this example, metadata representations may be structured as a directed acyclic graph (DAG) of nodes, where, to maintain efficient access to any given node, the DAG may be structured and balanced according to various methods. For example, a DAG for a metadata representation may be defined as a type of B-tree, and balanced accordingly in response to changes to the structure of the metadata representation, where changes to the metadata representation may occur in response to changes to, or additions to, underlying data represented by the metadata representation. Generally, meta-data representations may span across multiple levels and may include hundreds or thousands of nodes, where each node may include any number of links to other nodes.

Further, in this example, the leaves of a metadata repre-sentation may include pointers to the stored data for a volume, or portion of a volume, where a logical address, or a volume and offset, may be used to identify and navigate through the metadata representation to reach one or more leaf nodes that reference stored data corresponding to the logical address. Data objects may be any size unit of data within the data repository 602. For example, data objects may each be a logical extent, where logical extents may be some specified size, such as 1 MB, 4 MB, or some other size, such as a system-specified block size.

In some implementations, as described above with reference to FIGS. 1A-3D, the data repository 602 may include multiple types of data storage, including NVRAM and Flash storage, where NVRAM may be used as a staging area for incoming storage operations, and where Flash storage may provide long-term, durable storage. In this example, the source volume 658, or portions of the source volume 658, may be stored in NVRAM, and the entire source volume may be stored within Flash memory, or as depicted in FIG. 6, data store 660.

In some implementations, the metadata log 604 is ordered according to checkpoints, and is a journal, or log, describing all changes to stored data, and where checkpoints within the metadata log 604 that have not already been transmitted to the target data repository 624 are transmitted in response to generation or completion of a single checkpoint, or a set of checkpoints, in dependence upon a target RPO. For example, depending on a size of a checkpoint, or a quantity of data-modifying operations described by the checkpoint, more frequent transmission may be may in dependence upon a lower target RPO.

Further, as described above, checkpoints 606 within the metadata log 604 may include references to stored content such as blocks within data store 660 where that stored content consists of what the storage system would have stored were it not for the replicated checkpoint. In this way, the storage required for the metadata log and checkpoints is reduced considerably versus what would be required for a complete log of all updates that includes both metadata and a duplicate copy of data that was being written to the source storage system. In some examples, a service, or process, or controller, operating on the source data repository 602 may monitor creation of checkpoints, and forward or transmit the checkpoint, or set of checkpoints, to the target data repository 624.

In some implementations, references within checkpoints, and as a consequence, references within a metadata log, may refer to objects or data stored on the source data repository 602 that have been modified by subsequent storage operations, but where the data stored on the source data repository 602 has not yet been transferred to the target data repository 624. In such a scenario, if a garbage collection process on the source data repository 602 relies only on a reference table maintained by a storage controller managing data within the source data repository 602, then the garbage collection process may delete data or reallocate or otherwise overwrite a storage location that results in data referenced by a metadata log becoming unavailable or no longer valid as a source of content for a replicated checkpoint, thereby compromising the replication. To overcome such a scenario, in some examples, a garbage collection process on the source data repository 602 may reference both a reference table maintained by a storage controller or source data repository 602 process and also a list of references held by lightweight checkpoints, and specifically, a list of references within one or more checkpoints within a metadata log. Over time, checkpoints can be merged together to allow some overwritten content to be released for garbage collection.

In this way, based at least on both sources of data references—system references and metadata log references—a garbage collection process may preserve data that has not yet been replicated, but would otherwise be modified or deleted by subsequent storage operations. Such data preservation during garbage collection also holds true for continuous data protection, when checkpoints are retained on a source storage system for some period of time in order to allow for flexible rollback, where the period of time may be configurable to an arbitrary quantity of time. In other words, a garbage collection process may determine that content at a storage location is not needed, and may be reclaimed or garbage collected, based on the content at the storage location not being referenced by any checkpoints in a metadata log or referenced by a storage system reference table.

In some implementations, as noted above, each checkpoint is exclusive of every other checkpoint, and based on the checkpoints being ordered, the checkpoints may be transmitted in any order to the target data repository 624. In this example, on the target data repository 624, the checkpoints are applied, or replayed, in order to create a consistent version of the data stored on the source data repository 602. In some cases, the data transmitted from the source data repository 602 to the target data repository 624 may be read from data storage within data store 660, for example if the data has been flushed from the NVRAM to Flash, or from the NVRAM, for example if the data continues to be stored in the NVRAM.

In some implementations, depending on configuration settings with respect to RPO, data may remain on the source data repository 602 for more or less time. In some cases, the longer that data remains on the source data repository 602, the greater the opportunity to perform transformations that may reduce the quantity of data transferred to the target data repository 624. For example, incoming data may be deduplicated, or overwrite previously written data, or may be deleted, among other operations or transformations, which may reduce the quantity of data that is transferred from the source data repository 602 to the target data repository 624.

In some implementations, the messaging mechanisms may be implemented similarly to the messaging mechanisms described above for synchronous data replication, with reference to FIGS. 4 and 5.

Figure 7:
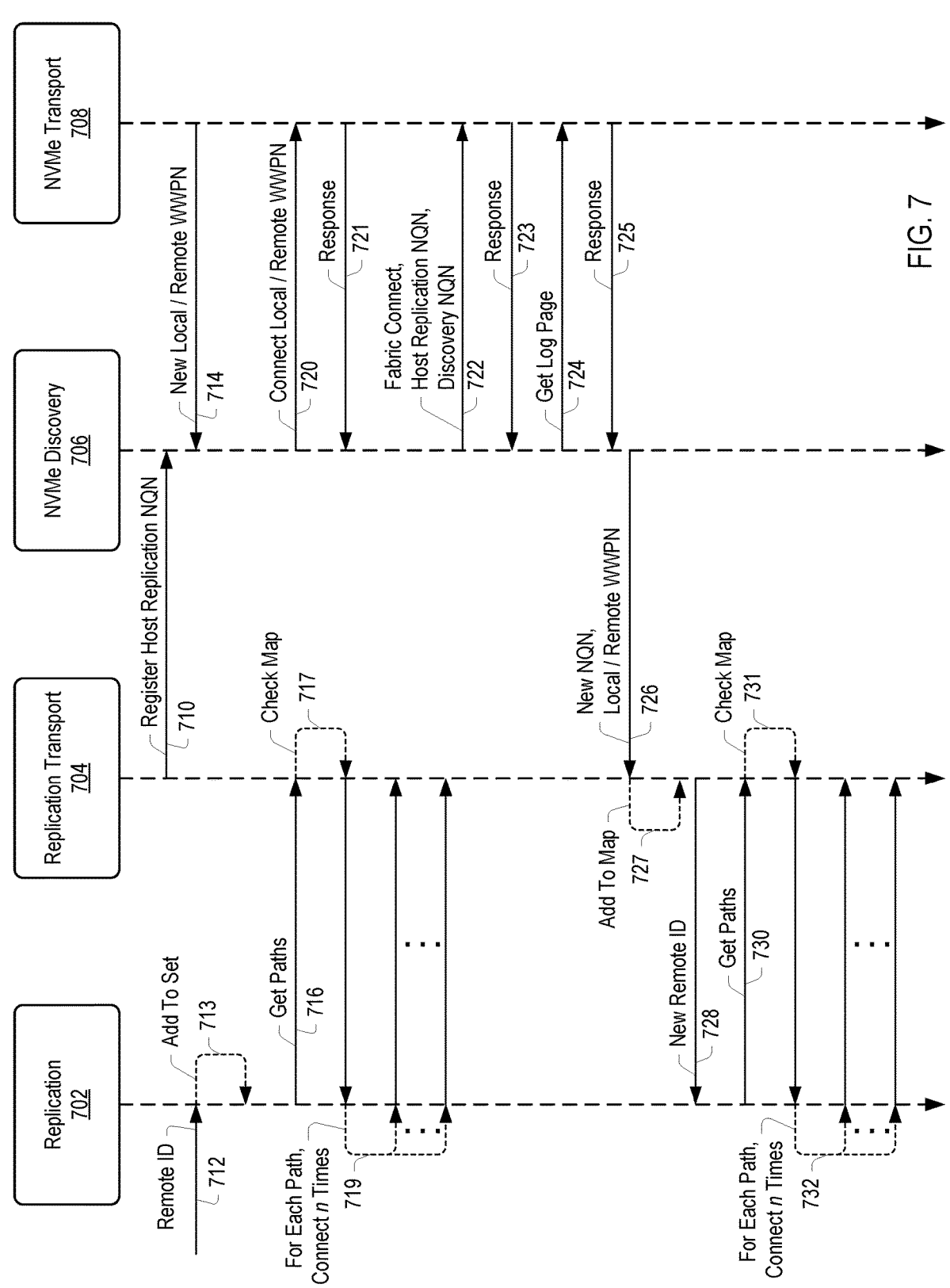
FIGS. 7 and 8 illustrate example control flows for selective communication protocol layering for synchronous replication in accordance with some embodiments.

For further explanation FIG. 7 illustrates a configurable replication system that provides continuous replication with minimal batching and an adjustable recovery point objective. In this example, a management object that specifies a replication policy between a source pod and a replica pod may be referred to as a "replica link".

A replica link specification may include a specification for a source of data for replication and a target for replica data, including storage data, checkpoints, metadata representations, or metadata logs (or journals). In some cases, the source of data may be a volume, a structured or unstructured dataset, a bucket, a file within a file system, an entire file system directory, or a combination of sources—where the data sources are stored within a source data repository 602.

In some cases, there may be one or more replication data targets, where, for example, a source data repository 602 includes multiple pods 640, 682 and multiple, respective replication data targets, illustrated as target data repositories 688, 694. In this example, source pod 640 includes a volume 658, source pod 682 includes a volume 680, replica pod 690 includes replica volume 692, and replica pod 696 includes replica volume 698. Further, as illustrated in FIG. 7, there may be one or more replica links 684, 686 that manage replication from the source data repository to one or more target data repositories 688, 694.

In some implementations, in an example where replication includes the use of snapshots of the source data, a replica link may specify a snapshot policy, which may specify conditions under which a snapshot may be taken. For example, if asynchronous replication, as described above with reference to FIG. 6, becomes backed up—such as where the quantity of backed up data and/or metadata pending transfer would result in an RPO that is beyond a threshold RPO value—then a snapshot may be taken. In other examples, the snapshot policy may specify that snapshots are to be taken at a specified schedule, and may specify a length of time for keeping snapshots available.

Further, in some examples, instead of or in addition to generating snapshots for a source data repository to reduce a backlog of metadata and/or data transmissions to a target data repository, a source data repository may perform one or more transformations or optimizations on the data and/or metadata to be transmitted. For example, if a source data repository determines that data pending transfer is identical to data already transferred, then the source data repository may avoid sending the duplicate data that is pending transfer. As another example, checkpoints within a metadata log may be folded together, where if there is an overwrite between two checkpoints, then the source data repository may avoid sending data that has been overwritten, as reflected by the folded checkpoints.

Further, a replica link may also specify a replica policy, where the replica policy may include or be exclusively snapshots, specify continuous, but not synchronous replication, or specify synchronous replication. In all cases, a user may be provided with a single user interface, with a single workflow, for a replica link specification allowing for specification of one or more characteristics for data replication.

In some implementations, a replica link may also specify a compliance policy. For example, a compliance policy may specify that for a particular type of replication policy—for example, continuous, synchronous, asynchronous, snapshot—the replication should adhere to specified parameters. As one example, for a snapshot replication policy, the compliance policy may specify that if a frequency, or schedule, according to which snapshots are taken fails to meet a threshold level of compliance, then a system warning may be generated. Similarly, if data and/or metadata is not being transferred quickly enough to satisfy a specified RPO, or other performance metric, then a system warning or alert may also be generated. Alternately, updates on the source storage system can be slowed down in order to avoid exceeding the RPO.

However, in other cases, in response to failing to satisfy a threshold level of compliance, other corrective actions may be taken, for example, of a target data repository is a cause of a backup, or has had a drop in performance, or is nearing capacity, then a diagnostic may be initiated to identify correctable issues or an alternate target data repository may be identified for transferring the target replica data to the new target data repository. In some implementations, the replica link may also store attributes of the replication history, such as identifying a point at which a source data repository became frozen or unavailable.

Generally, a replica link may be used to specify a replication relationship, and depending on whether a pod is active or passive, determines a direction of the replication, where replication occurs in the direction of an active (or activated or promoted) pod to a passive (or deactivated or demoted) pod. In this example, a replication direction may also be changed if all pods connected to the replica link are in communication and reach consensus on a change in replication direction. In this way, a source pod may be protected by creating a replica link to another, deactivated, pod on another data repository, where hosts or host groups may be connected to the deactivated pod on the target data repository to read—nearly synchronous—data from the source pod.

Figure 8:
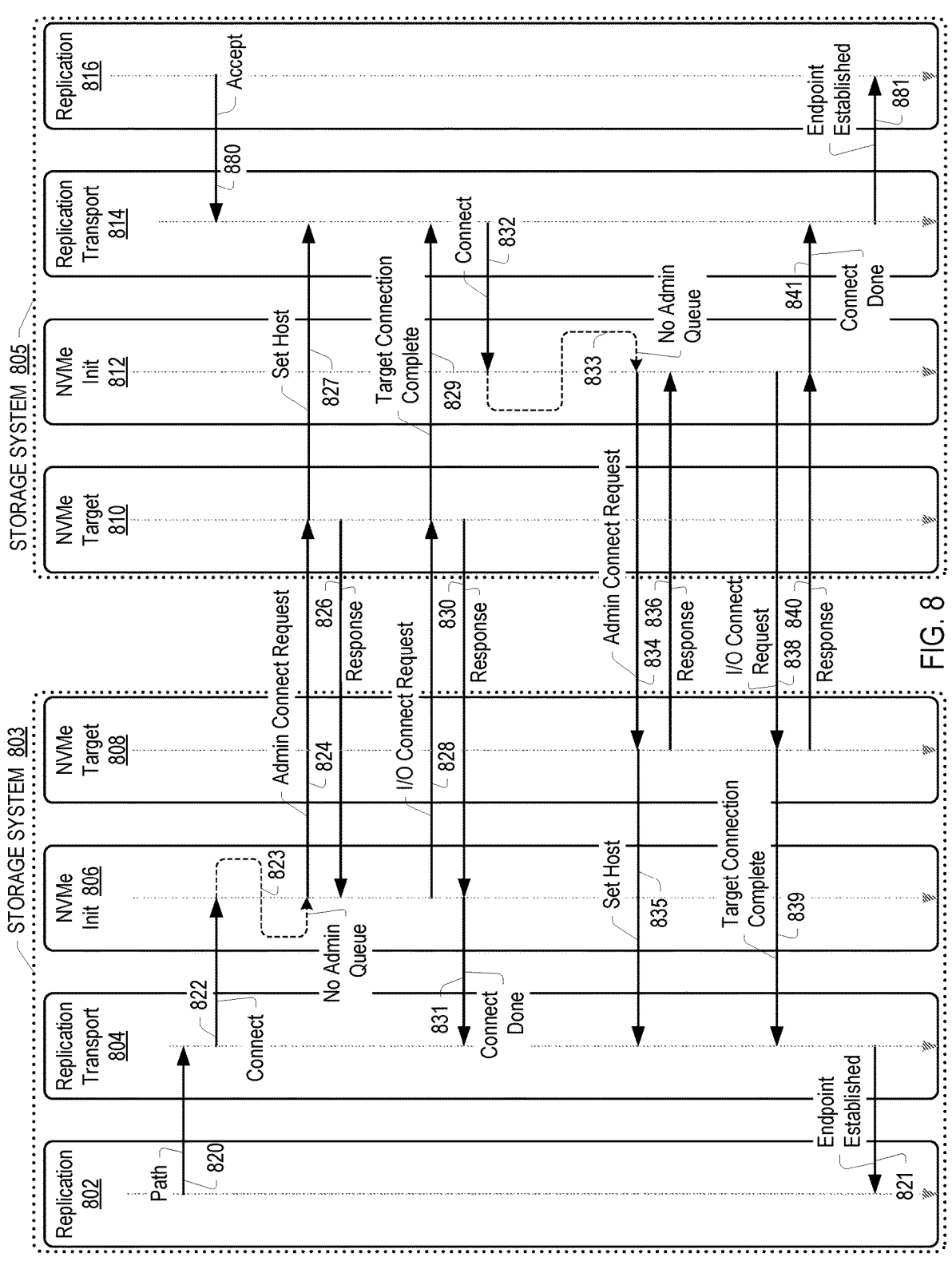

For further explanation, FIGS. 7 and 8 illustrate aspects of selective communication protocol layering for synchronous replication between one or more storage systems according to some embodiments of the present disclosure. More specifically, as part of an example embodiment of selective communication protocol layering, FIG. 7 illustrates an example method of a listen control flow, FIG. 8 illustrates an example method of a connect/accept control flow, and FIG. 9 illustrates an example method of a send/read control flow.

FIG. 7 illustrates aspects of selective communication protocol layering for synchronous replication between one or more storage systems according to some embodiments of the present disclosure. More specifically, as part of an example embodiment of selective communication protocol layering, FIG. 7 illustrates example method of a connect/accept control flow that may be implemented on storage systems similar to the storage systems described above with reference to FIGS. 1A-1D, FIGS. 2A-2G, FIGS. 3A-3C, FIGS. 4A and 4B, FIGS. 5-6C, or any combination thereof.

In some implementations, a replication protocol or replication scheme may be specified to provide bidirectional communication paths established between storage systems using selective features of one or multiple standard communication protocols—where the underlying standard communication protocols are traditionally designed for data transmission in a single direction, from a computer system providing storage content to a storage system providing storage services.

Further, in some implementations, storage systems may then implement synchronous replication based on the replication protocol or replication scheme providing bidirectional communication between storage systems. In this way, the synchronous replication protocols or schemes described above with reference to FIGS. 6A-6B may be carried out by using the replication protocol or scheme providing bidirectional communication.

In the following examples, a group of multiple storage systems that are configured to synchronously replicate one or more datasets among each and every storage system within the group may be referred to as a cluster of storage systems, or may be equivalently referred to as an active cluster or active cluster of storage systems. As noted above, example implementations of an active cluster of storage systems synchronously replicating datasets and managing pods are described above with reference to FIGS. 6A-6B, and further described within the parent applications of the present disclosure.

In some implementation, as explained in greater detail below, some portions, but not all portions of multiple communication protocols are used to implement bidirectional data replication in a manner that is outside of the design scope of the underlying multiple communication protocols.

Further, in some implementations, by using selected aspects of the underlying communication protocols, in addition to reconfiguring aspects of the underlying communication protocols, various embodiments of a replication protocol or scheme provide for bidirectional replication of data that more efficiently—by, for example, using fewer messages as compared to a standard deployment of the underlying communication protocols—provides support for the synchronous replication protocols or schemes described above with reference to FIGS. 6A-6B, in addition to providing support for other types of replication services.

In some implementations, in addition to the replication protocols or schemes described above with reference to FIG. 6 implementing synchronous replication, the bidirectional features of the replication protocol or scheme may also be used to implement other types of data replication protocols or schemes, including asynchronous replication, or more generally, any protocol or scheme based on bidirectional transfer of data between computer systems and/or storage systems.

In some implementations, the communication protocols used may be: Fibre Channel, NVMe, NVMe over Fabrics (NVME-oF), TCP/IP, RoCE, or combinations of these communication protocols.

As one example of modifications to underlying protocols, during a discovery process for a Fibre Channel protocol layer, a given storage system may receive a log of other target storage systems. Further, in this example, at the NVMe protocol layer, the given storage system may receive a list of identifiers for the other target storage systems, where the list of identifiers may be a list of NVMe qualified names (NQNs).

However, in this example, in accordance with the replication protocol or scheme, a format of an NQN may be modified to include an identifier usable by the replication protocol or scheme, where the replication protocol identifier is usable by the storage system to identify a list of storage systems that may be included within a data replication configuration. More specifically, in this example, the list of storage systems may be a list of storage systems that may be included within an active cluster of storage systems that are synchronously replicating a dataset.

Further, in some implementations, as noted above, Fibre Channel and NVMe are designed for a host computer or server to store data on a storage system, but are not designed for a connected storage system to reciprocally store storage content on the host computer, much less where the host computer and storage system are configured to synchronously replicate data.

By contrast, in some implementations, the replication protocol or scheme specifies logic that establishes bidirectional communication that is carried out by an initiator storage system establishing a communication channel in one direction with a given target storage system, and the target storage system—in response to establishing a communication channel from the initiator storage system to the target storage system and determining that there is no communication channel from the target storage system back to the initiator storage system establishes a communication channel back to the initiator storage system.

In this way, in some examples, bidirectional communication channels may be established to support the bidirectional data links described above with reference to the synchronous replication protocols or schemes described above with reference to FIGS. 6A-6B, where multiple storage systems within an active cluster provide synchronously replicated data services. In other words, the disclosed replication protocol or scheme specifies a distinct networking stack and communication protocol that is different from a deployment of standard implementations, either alone or combined, of the underlying Fibre Channel, NVMe, and IP protocols.

In some implementations, the replication protocol or scheme may provide multiple types of functionality to implement aspects of establishing connections between storage systems, listening for new storage systems coming online, and reading and sending as part of bidirectional communication between computer systems and/or storage systems.

More specifically, in some implementations that include one or more aspects of Fibre Channel, NVMe, and TCP/IP communication protocols, the replication protocol or scheme may include: (I) a replication protocol layer for active cluster (in this example, the highest layer); (II) a replication transport layer; (III) an NVMe-oF layer; and (IV) an NVMe transport layer, where, in some examples, the NVMe transport layer may be Fibre Channel.

For example, with regard to (I) above, the synchronous replication protocol layer, the replication protocol or scheme may include: (a) discovery functionality; (b) remote client connector functionality; (c) send functionality; (d) receive functionality; and (e) disconnect functionality, among others.

Discovery functionality, listed as (I)(a) above, may include:

(i) listening for remote storage system identifiers that may be interested in being included within a configuration for establishing synchronous replication—where the storage system identifier is used by the replication protocol or scheme, but not used or necessary for the underlying communication protocols;

(ii) listening to a replication transport service for new storage system identifiers or for new paths for existing storage system identifiers—where a given storage system may query other storage systems for path information, where the query may be based on respective storage system identifiers for the other storage systems in the active cluster; and (iii) determining whether to connect using a particular one or more new paths to a given storage system in the active cluster or whether to keep using existing paths to the given storage system.

Remote client connector functionality, listed as (I)(b) above, may include:

(i) using a list or vector of paths to connect to remote storage systems;

(ii) controlling a quantity of connections to establish, and tracking if the connections are successful; and (iii) maintaining a list of paths accessible to the replication protocol layer.

Send, receive, and disconnect functionality, listed as (I) (c)-(e) above, may include: sending data to other storage systems by using Fibre Channel; receiving data from other storage systems by using Fibre Channel; and disconnecting from other storage systems by initiating disposal of a transport layer endpoint or by detecting and responding to errors on a send. Further, disconnect functionality may be driven by the Fibre Channel detecting a disconnection of a target from a transport fabric.

Continuing with this example, with regard to (II) above, the replication transport layer, this layer may include: (a) messaging transport functionality; and (b) transport endpoint functionality.

Messaging transport functionality at a replication transport layer, listed as (II)(a) above, may include:

(i) listening, as an initiator and in accordance with the NVMe discovery protocol to get new NVMe qualified names (NQN) identifiers based on Fibre Channel world wide port names (WWPNs), and/or remote Fibre Channel WWPN identifiers, where in response to discovering a new storage system, the replication protocol layer listener, described above at (I)(a)(i), may be notified;

(ii) receiving connect/transport endpoint creation requests, which may include configuring or setting up a transport endpoint object that may: allocate buffers or trackers on the initiator side of a connection, allocate buffers or trackers on a target side of a connection, issue connect commands in accordance with an NVMe transport layer, wait for target connection in accordance with an NVMe transport layer;

(iii) tracking pending initiator-side connections waiting for target-side connects; and (iv) listening to NVMe transport for target connects in order to complete an initiator connection, which may include setting up a transport endpoint object, as above, where the transport endpoint object may allocate data buffers and/or trackers for the initiator side of a connection, allocate data buffers and/or trackers for a target-side of a connection, send success messages over NVMe over Fibre Channel (FC-NVMe), and issue connect commands via an NVMe transport layer.

Transport endpoint functionality at a replication transport layer, listed as (II)(b) above, may include functionality for:

(i) receiving data as a Fibre Channel endpoint, where receiving data may also include allocating a buffer list, and further include sending a read for every allocated data buffer, where reading data is described in greater detail above with reference to FIG. 5;

(ii) sending data, where sending data may include receiving a buffer list from the replication protocol layer that interfaces with storage systems in an active cluster, and command messages to allocate target and connection specific data buffers, and may include initiating copying contents into respective NVMe read buffers;

(iii) receiving data at the replication transport layer corresponding to NVMe initiator and read completion protocols, where receiving data at the replication transport layer may also include providing a read task that may handle parsing header information, verification, allocating buffers, and copying in data;

(iv) error handling; and (v) disconnecting from one or more storage systems in the active cluster, which may include disposing of connections at the replication transport layer and the NVMe layer.

Continuing with this example, with regard to (III) above, the NVMe-oF protocol layer, this layer may include: (a) polling; (b) initiator discovery; (c) initiator control; (d) initiator connections; (e) target control; and (f) target connections.

Polling functionality at the NVMe-oF protocol layer, listed as (III)(a) above, may determine whether an NVMe initiator connection has been successfully established, whether a target connection received a read request, whether a target control received a connection request, whether an initiator connection received a read completion, among other functions.

Initiator discovery functionality at the NVMe-oF protocol layer, listed as (III)(b) above, may get notification for new local WWPN/remote WWPN pairs, initiate NVMe discovery to obtain NVMe qualified names (NQNs), and also provide remote and local WWPNs and NQNs to the messaging transport functionality at the replication transport layer, listed as (II)(a) above.

Initiator control functionality at the NVMe-oF protocol layer, listed as (III)(c) above, may provide keep-alive services to an initiator, which may include sending keep-alive messages, terminating connections on timeouts, track keep-alive latencies, and, if no admin connections are established when a connection is requested, admin connections may be established.

Initiator connection functionality at the NVMe-oF protocol layer, listed as (III)(d) above, may maintain queue identifiers, send NVMe read commands, or answer read requests.

Target control functionality at the NVMe-oF protocol layer, listed as (III)(e) above, may determine whether a connection is accepted based on specified NQNs, and may provide callbacks to a target storage system in response to new connections.

Target connection functionality at the NVMe-oF protocol layer, listed as (III)(f) above, may provide external disconnect services or answer read requests.

Continuing with this example, with regard to (IV) above, the NVMe transport layer, this layer may include: (a) initiator functionality that may listen for local WWPNs and/or remote WWPNs, may connect to local WWPNs and/or remote WWPNs, and may send commands or data, receive data, requests for data, and responses, and disconnect; and (b) target functionality.

Turning toward FIG. 7, as noted above, FIG. 7 illustrates aspects of selective communication protocol layering for synchronous replication between one or more storage systems according to some embodiments of the present disclosure. More specifically, as part of an example embodiment of selective communication protocol layering, or a replication protocol or scheme, FIG. 7 illustrates an example method of a listen/get path control flow as part of a discovery process.

In some implementations, a storage system may listen for any path changes to a remote storage system, where if replication services are added, a notification may be received for each impacted storage system within the active cluster of storage systems.

Further, in some implementations, if any Fibre Channel switch configuration change impacts connectivity from a given storage system in an active cluster to any other storage system in the active cluster, a corresponding notification may be received for each impacted other storage system.

As illustrated in FIG. 7, establishing paths between storage systems to support bidirectional communication, where the bidirectional communication may support replication, including synchronous replication among an active cluster of storage systems, may include: replication 702, replication transport 704, NVMe discovery 706, and NVMe transport 708.

In some implementations, given one or more new replication protocol identifiers at the replication layer 702, where the replication protocol identifier is depicted as remote identifier 712, the remote identifier 712 is added 713 to a set of remote identifiers corresponding to a set of storage systems that may be included within an active cluster of storage systems replicating data among each other.

Continuing with this example, and as noted above with regard to (I)(a)(i) and (I)(a)(ii), the replication transport layer may listen for new replication protocol identifiers, and given one or more replication protocol identifiers, the replication transport 704 may be queried 716 to get paths for each of the one or more replication protocol identifiers. Further, in this example, for each of the one or more paths 717, a host, initiator, or storage system may connect 719 to each respective one or more storage system corresponding to each of the respective one or more replication protocol identifiers.

In some implementations, a host, storage system, or more generally, an initiator computing device, may register 710 a host replication NQN with a discovery service. Further, a host, or storage system, may, as part of a discovery process, receive new local/remote WWPNs for Fibre Channel addressing 714. Similarly, as depicted, a listening or discovery process for both NVMe and Fibre Channel may include connect requests 720 and corresponding responses 721, fabric connect 722, host replication NQN, discovery NQN and corresponding responses 727, and get log page requests 724 for NVMe discovery and corresponding responses 725 with the requested log pages with NVMe addressing information. However, in some examples, a discovery process may proceed without receiving log page requests.

Further, continuing with this example, in response to receiving new NQN and WWPN information 726, an update to mapping information 727 may be made, and given a new remote protocol identifier 728 obtained from parsing the new NQN, a new round of connecting may be performed—including, getting path information 730, checking mapping information 731, and, connecting for each of the new paths 732. However, in some examples, a discovery process may proceed without receiving new NQN and WWPN information. Further, in some examples, even if a protocol identifier 728 is not new, a corresponding notification is processed because a path may have changed.

In short, a listening process on a host or initiator storage system may obtain NVMe and Fibre Channel addressing information for storage systems that may become part of an active cluster of storage systems replicating a dataset among themselves, and where the host or initiator storage system may continually listen for and update path and connection information.

For further explanation, FIG. 8 illustrates aspects of selective communication protocol layering for synchronous replication between one or more storage systems according to some embodiments of the present disclosure. More specifically, as part of an example embodiment of selective communication protocol layering, or a replication protocol or scheme, FIG. 8 illustrates an example method of a connect/accept control flow.

As explained above with reference to FIG. 7, as storage systems come online or otherwise become available for storage use, a listen/get path process may establish paths between the storage systems, where available storage systems may be presented for configuration or use. For example, a user at a storage system management console may be presented with one or more storage options among the multiple storage systems, where a user may specify objects, datasets, volumes, or other storage data for replication among selected storage systems. In this example, given a set of storage systems, replication, or synchronous replication may be implemented as described above with reference to FIGS. 6A-6B, and also within the applications to which the present application draws priority.

In this example, given a path, where a path is obtained as described above with reference to FIG. 7, a storage system 803 may initiate a connection 820 with another storage system 805. Further, in this example, the responding storage system 805 may respond 880 by preparing the replication transport layer 814 to accept an incoming connect request—where selected steps of the replication protocol or scheme establishing a connection are depicted in FIG. 8 and described below.

Continuing with this example, as described above with reference to the replication protocol layer and remote client connector functionality, listed as (I)(b)(i)-(iii), given a list of paths, a storage system may initiate connections to one or more remote storage systems.

As described above, each storage system within an active cluster, or each storage system that may join an active cluster, may implement a replication protocol or scheme that includes a replication layer, a replication transport layer, an NVMe initiator layer, and an NVMe target layer. In this example, storage systems (803, 805) include these layers, respectively depicted as replication (802, 816), replication transport (804, 814), NVMe init (806, 812), and NVMe target (808, 810).

Overall, depicted in FIG. 8 are replication protocol exchanges for establishing—for each of one or more paths to one or more storage systems—bidirectional communication channels between storage systems based on selected aspects of underlying protocols. In this example, a result of establishing bidirectional communication between the storage systems 803, 805 is that each respective storage system 803, 805 will have a respective endpoint object 821, 881 usable for replication of data between the storage systems 803, 805, including synchronous replication of data.

More specifically, in this example, a storage system may initiate a discovery process and receive a list of NVMe qualified names (NQNs), where each NQN may be formatted to include both standard NVMe addressing information and a replication protocol identifier. As noted above, a replication protocol identifier may be independent of the underlying protocols, including NVMe and Fibre Channel, where the replication protocol identifier may be used to identify storage systems that may be included within an active cluster.

While storage systems, in some examples, may initiate a Fibre Channel discovery process upon storage system startup, or a reboot, where the Fibre Channel discovery process may make the storage system aware of other storage systems in a network, replication protocol identifiers may be used to identify other storage systems and storage pools for replication between the storage systems.

In some examples, a user may specify a set of storage systems that may be included within a set of storage systems in an active cluster, or more generally a user may specify storage systems that may be configured to bidirectionally replication data. For example, a user may specify a first storage system to be in a replication relationship with a second storage system, and in response, the first storage system may make a request over an IP network to the second storage system requesting the replication protocol identifier for the second storage system.

In this way, in this example, a given storage system may use replication protocol identifiers to determine which one or more other storage systems may be configured as part of a replication relationship, or which other one or more storage system may be configured to synchronously replicate data. Further, as described above, based on the replication protocol identifier, a corresponding storage system may be addressed without use of world wide port names (WWPNs) at the Fibre Channel layer.

In this example, a storage system 803 that initiates a connection may be referred to as an active side storage system, and a storage system 805 that responds to the connection request may be referred to as a passive side storage system. In this example, storage system 803, the active side storage system may issue an initial connect request to establish communication from storage system 803 to storage system 805.

Further, in this example, in response to the connect request from storage system 803, storage system 805 may connect to storage system 803—where bidirectional communication may be established based on successfully establishing communication channels from storage system 803 to storage system 805 and from storage system 805 to storage system 803. Given establishment of bidirectional communication between storage system 803 and storage system 805, the storage systems 803, 805 are configured to replicate data, including synchronously replicate data.

In general, active storage systems may listen for paths to storage systems with replication protocol identifiers that may be included in a replication relationship or active cluster, and initiate establishing bidirectional communication channels to support data replication. Further, in some examples, an active storage system may also specify data to be replicated in the replication relationship, including specifying one or more datasets, volumes, objects, or other specified forms of storage content.

Continuing with this example, in response to, at the replication layer, discovering a new path 820, or an updated path, storage system 803 may initiate establishing a connection to connect 822 to the storage system corresponding to the new or updated path 820, which in this example is storage system 805. In this example, in response to the connect 822 request, a determination 823 is made as to whether an administrative queue is currently established for storage system 805, where if there is no current administrative queue for storage system 805, then an administrative connect request 824 is sent to storage system 805. Further, in this example, in response to the administrative connect request 824, storage system 805 may set 827 storage system 803 as a host system for providing data for storage.

Continuing with this example, in response to storage system 805 receiving the administrative connect request 824, storage system 805 may respond 826 to storage system 803 to establish the administrative queue.

Further, in addition to establishing an administrative queue, storage system 803 also sends an I/O connect request 828 to storage system 805 to establish I/O queues to hold data to be transferred from storage system 805 to storage system 803. Continuing with this example, in response to storage system 805 receiving the I/O connect request 828, storage system 805 may respond 830 to storage system 803 to establish one or more I/O queues on storage system 803. Further, in this example, in response to storage system 805 receiving the I/O connect request 828, storage system 805 may determine that the connection 829 on the target side, storage system 805, in this case, is complete. As discussed above with reference to FIGS. 4A-5, read operations may be made more efficient by pre-allocating buffer space to reduce a number of messages needed to transfer data between storage system 803 and storage system 805.

In this example, based on establishing the administrative queue and the one or more I/O queues on storage system 803, data may be transferred from storage system 805 to storage system 803, and a connection 831 from the direction of storage system 805 to storage system 803 may be considered established.

Continuing with this example, in accordance with the replication protocol or scheme, in response to the connection 822 request from storage system 803, and as part of the operations performed in response to storage system 805 preparing to send data to storage system 803, and in response to a connection being formed based on the connection complete 829 notification, storage system 805 may initiate a connection 832 from the direction of storage system 805 to storage system 803.

In this example, in response to the connect 832 request, a determination 833 is made as to whether an administrative queue is currently established for storage system 805, where if there is no current administrative queue for storage system 803, then an administrative connect request 834 is sent to storage system 803.

Continuing with this example, in response to storage system 803 receiving the administrative connect request 834, storage system 803 may respond 836 to storage system 805 to establish the administrative queue. Further, in this example, in response to the administrative connect request 834, storage system 803 may set 835 storage system 805 as a host system for providing data for storage.

Further, in addition to establishing an administrative queue, storage system 805 also sends an I/O connect request 838 to storage system 803 to establish I/O queues to hold data to be transferred from storage system 805 to storage system 803. Continuing with this example, in response to storage system 803 receiving the I/O connect request 838, storage system 803 may respond 840 to storage system 805 to establish one or more I/O queues on storage system 805. Further, in this example, in response to storage system 803 receiving the I/O connect request 838, storage system 803 may determine that the connection 839 on the target side, storage system 803, in this case, is complete.

In this example, based on establishing the administrative queue and the one or more I/O queues on storage system 805, data may be transferred from storage system 803 to storage system 805, and a connection 841 from the direction of storage system 803 to storage system 805 may be considered established.

In this way, given establishment of communication in both directions between storage system 803 and storage system 805, respective endpoints 821, 881 may be considered established, as described above with reference to the replication transport layer, described above with reference to (II)(b)(i)-(v).

For further explanation, FIG. 9 sets forth a flowchart that illustrates a method for implementing replication handling among distinct networks in accordance with some embodiments of the present disclosure. Also depicted in this example are an additional storage system (950) and a computer system (952). The storage systems (900, 950) may implement data storage features described above with reference to FIGS. 1A-1D, 2A-2G, 3A, 3B, and 4A-8, as the storage systems (900, 950) may include some or all of the components described in the above Figures.

In some implementations, storage systems may implement multiple different replication schemes between themselves, where the different replication schemes are based on a common management model for implementing the replication scheme and the replication transport. In some implementations, the common management model is also a basis that allows the storage systems to switch from one type of replication scheme or replication transport to a different type of replication scheme or replication transport because a same common management model is used to support the different allowed combinations of replication schemes and replication transports.

Further, in some implementations, communication links between storage systems over which replication data and administrative data is communicated between storage systems may be established over different types of underlying physical media layers. For example, a given storage system may include multiple different types of network ports that support different types of networking protocols, such as Fibre Channel, TCP/IP, NVMe over Fabrics, InfiniBand, among any other standard networking protocols.

In this way, in some implementations, a cluster of storage systems may establish one or more different replication schemes among themselves, and responsive to various conditions, the storage systems may switch between different replication schemes without any interruption in a replication relationship among the storage systems—where the continuous operation may be based on the different replication schemes using a common management model for data replication. In some implementations, a replication relationship between two storage systems may include simultaneous operation of several replication transports over multiple communication links operating on multiple, different underlying physical media layers.

Further, in some implementations, a common management model may specify communication operations that are encapsulated from the transport mechanisms of a particular network messaging layer. For example, the common management model may provide communication operations that are used by a given replication scheme, where the communication operations do not require specification of details regarding operations of a messaging layer such as a network transport layer. However, in other examples, a common management model may specify communication operations, or network operations, that have more or less visibility into the transport mechanisms of a given network transport layer.

Continuing with this example implementation, based on the common management model not specifying communications between storage systems at a protocol stack layer that is lower than a network transport layer, storage systems may—in addition to switching between different replication schemes or instead of switching between different replication schemes switch between different network ports implementing different types of network transport protocols for different types of underlying physical networks.

In other words, in some implementations, because multiple network protocol stacks for a replication scheme are concurrently supported by the common management model, the common management model may continue with an existing replication scheme or switch to a different replication scheme without any awareness of the physical transport mechanisms used to communicate the replication data or administrative data.

In short, in some implementations, the common management model may provide a consistent, and uniform interface to disparate, or different, underlying network messaging mechanisms. For example, among multiple network ports of a given storage system, one network port may be connected to a TCP/IP network, and another network port may be connected to a Fibre Channel network. Similarly, additional network ports may provide support for additional communication links in accordance with one or more underlying network messaging mechanisms.

In some implementations, based on having a storage system configured to establish multiple communication links over different underlying physical networks, a storage system may continue to operate a given replication scheme over a first network while simultaneously performing other storage system functions without disrupting the data replication.

For example, a first storage system may be implementing a first replication scheme to establish a replication relationship with a second storage system over a first network port and first network, and simultaneously implement a second replication scheme to establish a replication relationship with a third storage system (or in some cases with the same second storage system) over a second port and second network.

Continuing with this example, a storage system management service may issue a storage system management command that is received by the first storage system, where the storage system management command indicates initiation of a storage system upgrade. In this example, the first storage system, in response to the upgrade command, may suspend data replication for a network port to be used for the storage system upgrade.

In this way, in this example, a storage system may continue data replication using one or more replication schemes with another storage system while simultaneously performing a storage system upgrade—where the data replication between the storage systems continues without disruption from the storage system upgrade.

In some implementations, a storage system may upgrade from components designed for one mechanism for replication communications to components designed for a different mechanism for replication communications. As one example, a storage system may transition or upgrade from being configured for multiple ethernet ports for replication communications to also including ports for using Fibre Channel for replication, where in some cases, the Fibre Channel port may replace an existing network port, such as an ethernet port. Continuing with this example, responsive to an upgrade or addition of the Fibre Channel port, a replication scheme may switch from using replication transport mechanisms reliant on ethernet to replication transport mechanisms reliant on Fibre Channel—where the replication scheme may transition from using one replication transport mechanism to using a different replication transport mechanism without disrupting replication of a dataset that is being replicated using a same replication scheme. In this way, in this example, an upgrade or addition may be tested prior to use, and where switching the replication scheme over to using the upgraded or added network mechanism does not disrupt the operation of the replication scheme.

As part of such a transition from one network port or network transport mechanism to another network port or network transport mechanism, a second, new, network link (such as a new port or a new network transport mechanism) can be configured to run in parallel with a first, prior, network link (such as a prior port or a new network transport mechanism) that preceded the transition. Use of the second network link can then be tested by sending messages over the second link as well as over the first link. Messages sent over the second link could be some fraction of the total messages associated with replication, or they could be test messages, or they could be duplicates of messages sent over the first link. Measurements of these messages can then determine that the new network link is adequate to ensure that replication can complete the transition, such as by determining that a combination of network bandwidth, latency, packet loss, CPU overhead, or other factors is adequate for replication to continue without the presence of the first, prior, network link. Once that second network link is proved out, use of the first network link can be discontinued.

It should be noted that these transitions may have to happen in parallel on a first and a second storage system that have a replication relationship. As a result, two storage systems with such a replication relationship may need to coordinate upgrade of components, configuring of new network links, testing of new network links, and finalizing the transition from a first, prior, network link to a second, new, network link.

In some implementations, the depicted computer system (952) may be implemented by a storage system, as described in the above FIGS. 1A-8. However, in other examples, the computer system (952) may be implemented by any computing device, including mobile devices, desktop computers, or servers.

Further still, in other implementations, the depicted computer system (952) may be a virtual computing instance, such as a compute node, or compute instance within a cloud computing environment. For example, the computer system (952) may be a virtual computer system implemented within a cloud computing environment, such as the cloud computing environment described with reference to FIGS. 3A-3D.

Continuing with this example, the virtual computer system (952) may be implemented as part of a storage system management service within a cloud storage system management service. In this example, the cloud storage system management service may manage one or more of the storage systems (900, 950), including monitoring the status and health of the storage systems (900, 950) and providing updates or configuration changes to the storage systems (900, 950).

In some implementations, each storage system (900, 950) may support respective implementations of multiple, distinct types of replication. In some examples, distinct replication schemes may include, among others not listed, synchronous replication, nearly synchronous replication, asynchronous replication, configurable asynchronous replication, snapshot-based replication, continuous data replication, periodic replication, or a combination of configurable asynchronous data replication and dynamically determined snapshot updates. Examples of various ones of these replication schemes are described above with reference to FIGS. 4A-8.

In some implementations, the above-listed replication schemes may be implemented based on a common or uniform management model, where the common management model includes a same or similar metadata model for representing stored data, such as the metadata representation described above with reference to FIG. 4B. For example, in some implementations, a given storage system may use each of the above-listed replication schemes to establish a replication relationship among one or more other storage systems, where implementation of a replication schemes is based on a management model that is common to all storage systems participating in a replication relationship, where the common management model may be used to implement each of the above-listed replication schemes.

In some implementations, while each storage system may implement a common management model, in some examples, each storage system participating in the replication relationship may have its own copy of a dataset being replicated, and a respective management model specification of internal management of a metadata model and relevant data structures for defining storage objects, for mapping objects to physical storage, for deduplication, for defining the mapping of content to snapshots, and so on.

In some implementations, each of the different replication schemes, with each respective different manner in which replication is achieved, at some point communicate data or administrative information across a network or communication fabric from one storage system to another one or more storage systems.

In other words, in some implementations, a given replication scheme among the above-listed replication schemes may specify networking or communication operations that specify communications between different storage systems. However, continuing with this example implementation, the given replication scheme may not specify any implementation details regarding physical media layers of a network stack, such as a network layer, a data link layer, or a physical layer. In some examples, such encapsulation disentangles any given replication scheme from being aware of network transport mechanisms, which serves as a basis for switching between replication transport mechanisms without any disruption to replication schemes. However, some replication transport mechanisms may only support some replication schemes; for example, synchronous replication may be supported by a low-latency, low-overhead communication mechanism, such as NVMe over fabric, NVMe over FC, or SCSI over FC.

In this way, continuing with this example implementation, for any of the above-listed replication schemes, sending or receiving data between a first storage system (900) and a second storage system (950) is implemented similarly whether the media layer beneath the network messaging layer is a Fibre Channel network, a TCP/IP network, or any other type of physical network, including wireless networks.

Consequently, in some implementations of replication handling among distinct networks, whether a storage system is implementing asynchronous replication, synchronous replication, or some other replication scheme, the replication scheme specifications are the same for communication with another storage system.

In some implementations, one or more storage controllers may manage each of multiple replication relationships, from a given storage system to one or more other storage systems, where each replication relationship may be implemented over a respective network and corresponding network protocol layer. Example storage system controllers are described in greater detail above with reference to FIGS. 1A-3D.

In some implementations, behavior of a replication relationship between storage system may be specified by a replication policy. For example, a replication policy may be considered a management object that specifies behaviors, rules, and/or characteristics between storage systems. Further, in some examples, a replication policy may specify a source storage system as a source for data and one or more target storage systems as a target for replication data.

Further still, in some examples, a replication policy may specify storage data to be replicated, checkpoint information, a metadata representation for the storage data to be replicated, and/or metadata logs or metadata journals. In some examples, a source of data may be specified as a volume, a structured or unstructured dataset, a bucket, a file within a file system, an entire file system directory, or as a combination of sources of data.

Further, in some implementations, a replication policy may specify conditions or rules that determine each condition or rule for modifying the behavior of a replication scheme, switching between replication schemes, both modifying behavior or a replication scheme and switching between different networks, or both switching between replication schemes and switching between different networks.

In some implementations, for example, a replication policy may specify that if a Fibre Channel network is available between storage systems, then an initial replication scheme to use between the storage systems may be a synchronous replication scheme. Further, in this example, the replication policy may specify that the synchronous replication scheme continues unless there are changes to the health of the network or changes to available bandwidth.

However, in other examples, the replication policy may specify that in response to synchronizing a dataset with a synchronous replication scheme, that the replication scheme switch to a different replication scheme, such as asynchronous replication, snapshot-based replication, or any of the other above-listed replication schemes.

In some implementations, as another example, a replication policy may specify that if a TCP/IP network is available, then an initial replication scheme to use between storage systems may be an asynchronous replication scheme or a near synchronous replication scheme. Further, in this example, the replication policy may specify that if a Fibre Channel network becomes available, then the replication policy switch to a synchronous replication policy and also switch to using the Fibre Channel network.

In some implementations, a replication policy may specify replication balancing among different networks to different storage systems. For example, if a first storage system is connected to a second storage system over both Fibre Channel and IP, and if the first storage system is connected to a third storage system only over IP, then the replication policy may specify that a network balancing that includes distributing, if possible, replication relationships among multiple different storage systems among multiple different networks.

In this example, the replication policy, to avoid replicating data to both the second storage system and the third storage system over a same IP network, the replication policy may specify that the replication scheme between the first storage system and the third storage system use IP, and specify that the replication scheme between the first storage system and the second storage system use a different network, if available, which in this case, a Fibre Channel network is available, so the replication scheme between the first storage system and the second storage system is specified to use the Fibre Channel network.

Continuing with this example, in addition to determining how to distribute which replication scheme among the available networks to different storage systems, the replication policy may further specify, given a selection of networks to use between storage systems, which of the replication schemes to use among the selection of networks to the other storage systems. In this example, the selection of replication scheme may be carried out similarly to the above-listed examples.

In some implementations, a replication policy may specify conditions or rules based on underlying network health or underlying bandwidth characteristics. For examples, if network behavior changes, or if there are indications of a degradation of network health, or indications of a possible network outage, then the replication policy may switch from a current replication scheme to a lower bandwidth intensive replication scheme.

In other examples, a replication policy may specify that in response to indications of a degradation of network health, or indications of a possible network outage, then the replication policy may switch from using a current network for a current replication scheme to using a different network for a same replication scheme or to using a different network and switching to a different replication scheme.

In some implementations, in addition to or instead of responding to network health by switching networks, a replication policy may specify responses to changes in network loads or network bandwidth availability. For example, a replication policy may specify that in response to network bandwidth availability that drops below a specified threshold, a replication scheme without switching networks or switching between messaging layers—switch from a current replication scheme to a replication scheme that uses less network bandwidth. For example, the replication policy may specify a switch from using synchronous replication to snapshot-based replication, or some other type of lower bandwidth consumption replication scheme.

In some implementations, in addition to or instead of responding to network health by switching networks, a replication policy may specify responses to changes in network loads or network bandwidth availability. For example, a replication policy may specify that in response to network bandwidth availability that drops below a specified threshold, to switch from a current network for a current replication scheme to a different network, where the switch to the different network may continue with a same replication scheme or also include switching to a different replication scheme. In this example, if the switch includes switching replication schemes, the selection of a different replication scheme may be carried out as described above.

Further, in some implementations, each storage system participating in a replication relationship according to any of the above replication schemes may implement a shared, or common management model that specifies metadata representations, implementation model, or persistent data structures for implementing each of the above replication schemes.

As one example implementation of switching between replication schemes that use pods, a replication relationship between two storage systems (900, 950) may be switched from a relationship where data is asynchronously replicated to a relationship where data is synchronously replicated. For example, if a first storage system (900) is configured to asynchronously replicate a dataset to a second storage system (950), then creating a pod that includes the dataset, the first storage system (900) as a member, and the second storage system (950) as a member can switch the relationship where data is asynchronously replicated to a relationship where data is synchronously replicated.

Similarly, continuing with this example, through the use of pods, the replication relationship between two storage systems may be switched from a relationship where data is synchronously replicated to a relationship where data is asynchronously replicated. For example, if a pod is created that includes the dataset, where the pod includes the first storage system (900) as a member and includes the second storage system (950) as a member, then by unstretching the pod (to remove the first storage system (900) as a member or to remove the second storage system (950) as a member), a relationship where data is synchronously replicated between the storage systems can immediately be switched to a relationship where data is asynchronously replicated. In this way, in some implementations, storage systems (900, 950) may switch back and forth as needed between asynchronous replication and synchronous replication.

Further, in this example, switching may be facilitated by the implementation relying on similar techniques for both synchronous and asynchronous replication. For example, if resynchronization for a synchronously replicated dataset relies on the same or a compatible mechanism as is used for asynchronous replication, then switching to asynchronous replication is conceptually identical to dropping the in-sync state and leaving a relationship in a state similar to a "perpetual recovery" mode. Likewise, switching from asynchronous replication to synchronous replication can operate conceptually by "catching up" and becoming in-sync just as is done when completing a resynchronization with the switching system becoming an in-sync pod member.

In some implementations, alternatively, or additionally, given that both synchronous and asynchronous replication rely on similar or identical common metadata (or a common model for representing and identifying logical extents or stored block identities, or a common model for representing content-addressable stored blocks) these aspects of commonality can be leveraged to dramatically reduce the content that may need to be transferred when switching to and from synchronous and asynchronous replication.

Further, in some implementations, if a dataset is asynchronously replicated from a first storage system (900) to a second storage system (950), and the second storage system (950) further asynchronously replicates that data set to a third storage system (not depicted), then a common metadata model, common logical extent or block identities, or common representation of content-addressable stored blocks, may dramatically reduce the data transfers needed to enable synchronous replication between the first storage system (900) and the third storage system.

Turning toward FIG. 9, the flowchart illustrates a method for replication handling among distinct networks in accordance with some embodiments of the present disclosure.

The example method depicted in FIG. 9 includes: establishing (902), over a first type of network messaging layer (960), a communication link for a replication scheme between a first storage system (900) and a second storage system (950); initiating (904), over a second type of network messaging layer, a configuration change to one or more aspects of the first storage system (900); and replicating (906), without disrupting the configuration change to the one or more aspects of the first storage system (900), data (970) from the first storage system to the second storage system.

Establishing (902), over the first type of network messaging layer (960), a communication link for a replication scheme between a first storage system (900) and a second storage system (950) may be carried out using multiple techniques. For example, as described above with reference to FIGS. 4A-8, a communication link may be established using a network messaging layer from a standard network protocol, such as Fibre Channel, TCP/IP, NVMe over Fabrics, among others. In other examples, a communication link may be established based on selective protocol layering, such as described above with reference to FIGS. 7 and 8. As discussed above, the network messaging layer may be a network transport layer.

Further, in this example, and as described above, a replication policy may specify conditions, rules, and/or criteria on which to base a selection of an available network type and corresponding network port to use. Further still, in this example, a replication policy may specify conditions or criteria on which to base a selection of the replication scheme to use. In some examples, a replication policy may be associated with a respective dataset to be replicated, where the dataset may be any type of organization of data, as described above.

Initiating (904), over a second type of network messaging layer (964), a configuration change to one or more aspects of the first storage system (900) may be carried out using multiple techniques. For example, a remote computer system (952) may have automated configuration management software, or provide an administrator with a storage system management console, where the administrator or the configuration management software may issue an update that carries out a configuration change to one or more aspects of the storage system (900) software, or firmware, or both. In other examples, configuration management software may be implemented within a cloud computing environment, or where an administrator accesses a storage system management console via a cloud services provider.

Further, in this example, the second type of network messaging layer (964) may be implemented as part of a network protocol that operates over a network accessible by a network port that is distinct from a network port that provides access to a different network over which the first type of networking messaging layer (960) operates.

Replicating (906), without disrupting the configuration change to the one or more aspects of the first storage system (900), data (970) from the first storage system to the second storage system may be carried out as described above. For example, the first storage system (900) may, given an established communication link over which a replication scheme may operate, replicate data (970) to the other storage system (950) in accordance with the replication scheme using a messaging layer (960) that is independent and distinct from the messaging layer (964) over which the configuration change is transmitted from the computer system (952) to the storage system (900).

Figure 10:
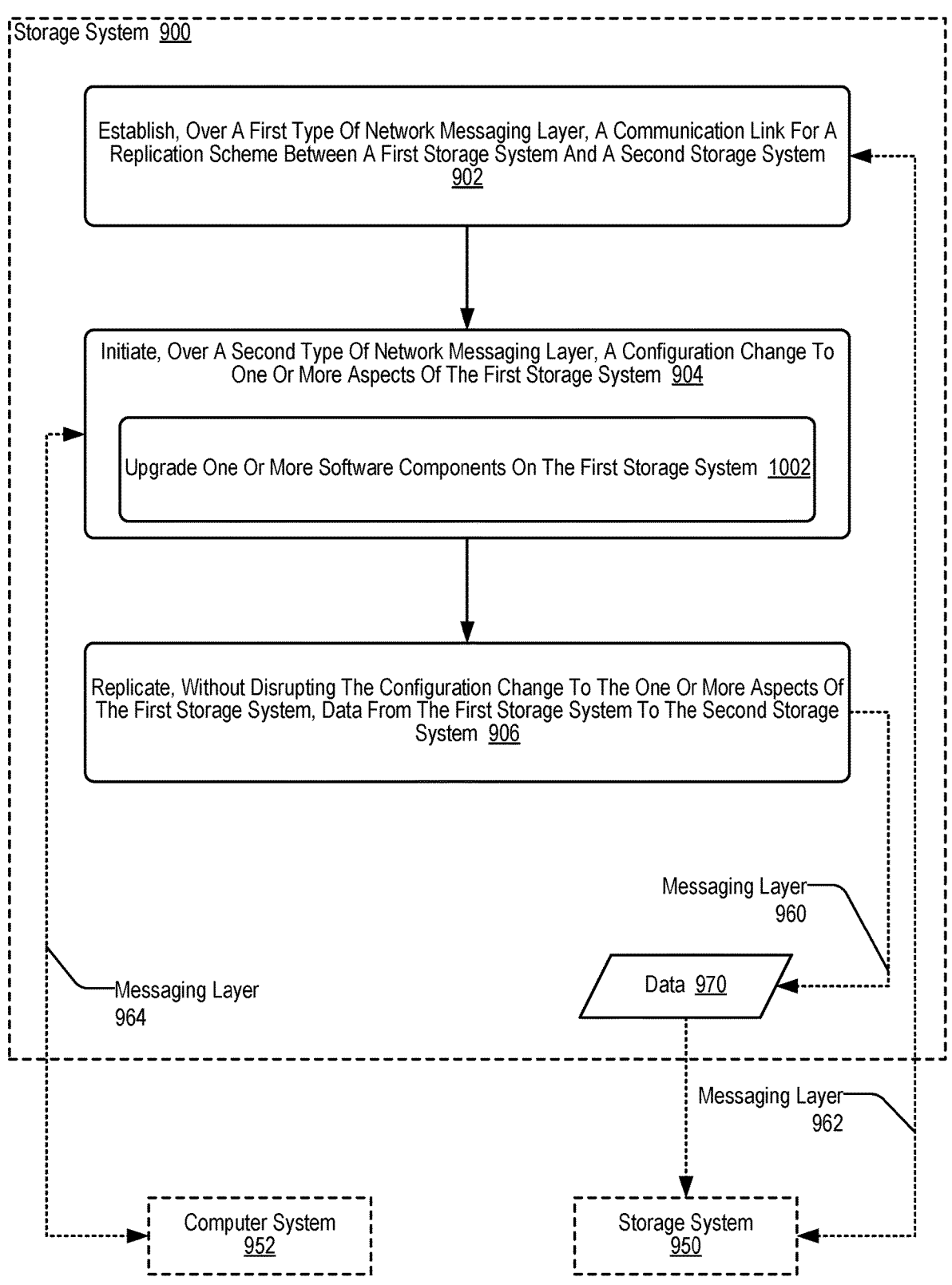

For further explanation, FIG. 10 sets forth a flowchart that illustrates a method for implementing replication handling among distinct networks in accordance with some embodiments of the present disclosure.

The example method depicted in FIG. 10 is similar to the example method depicted in FIG. 9 in that the example method depicted in FIG. 10 includes: establishing (902), over a first type of network messaging layer (960), a communication link for a replication scheme between a first storage system (900) and a second storage system (950); initiating (904), over a second type of network messaging layer, a configuration change to one or more aspects of the first storage system (900); and replicating (906), without disrupting the configuration change to the one or more aspects of the first storage system (900), data (970) from the first storage system to the second storage system.

However, the example method depicted in FIG. 10 further specifies that initiating (904), over a second type of network messaging layer, a configuration change to one or more aspects of the first storage system (900) includes upgrading (1006) one or more software components on the first storage system (900). Further, the example method in FIG. 10 also includes: replicating (1002), over a second communication link between the first storage system (900) and the second storage system (950), a portion (1052) of a dataset, where the communication link over the first type of network messaging layer is a first communication link; interrupting (1004) replication over the second communication link to initiate the configuration change; establishing (1008), based on the updated one or more software or hardware components, a third communication link between the first storage system (900) and the second storage system (950); and replicating (1010), over the third communication link, additional portions (1054) of the dataset, where replication over the third communication link uses a type of network messaging layer (1060) that is different from the first type of network messaging layer.

In this example, a dataset (1050) being replicated among the storage system (900, 950), may include multiple portions of data (970, 1052, 1054), where the multiple portions of data may be transmitted along multiple communication links and corresponding messaging layers. Further, in this example, as described in greater detail below, replication along one of the communication links may be interrupted to upgrade the storage system (900) to be able to use a different type of network messaging layer, where replication of the dataset (1050) may continue after the upgrade via a communication link that uses the new type of messaging layer.

Replicating (1002), over a second communication link between the first storage system (900) and the second storage system (950), a portion (1052) of the dataset, where the communication link over the first type of network messaging layer is a first communication link may be carried out similarly as described above with reference to replicating (906), data (970) from the first storage system (950) to the second storage system. In some examples, the second communication link—prior to upgrading (1006)—may be over a same type of network messaging layer (960) as the first communication link. As one example, the network messaging layer (960) used by both the first and second communication links may be Ethernet, where the upgraded network messaging layer may be Fibre Channel; however, any messaging layer protocols described above may correspond to the initial and/or upgraded components for establishing a network communication protocol and network messaging layer. In this example, replicating (1002) may be performed prior to initiating (904) the configuration change.

Interrupting (1004) replication (1002) over the second communication link to initiate (904) the configuration change may be carried out by the replication scheme responding to a command from a storage controller to suspend replication.

Upgrading (1006) one or more software components on the first storage system (900) may be performed by the storage system (900) receiving, over a communication link that uses a particular network protocol and a corresponding network messaging service (964), a command or instruction that specifies an update or upgrade to storage system (900) software, firmware, or both software and firmware. As noted above, the communication link between the storage system (900) and the computer system (952) operates over a network, and corresponding protocol stack including the messaging layer (964), that is distinct and independent of the communication link over a different network, and corresponding protocol stack that includes the messaging layer (960).

Continuing with this example, and given the independence of the networks and communication links between the first storage system (900) and the second storage system (950) and between the first storage system (900) and the computer system (952), the upgrade (1002) issued by the computer system (952) to the first storage system (900) may occur simultaneously with replication of data (970) between the first storage system (900) and the second storage system. Further, based on this independence, the upgrade (1002) may occur without disrupting the replication relationship and the replication of data between the first storage system (900) and the second storage system (950).

Establishing (1008), based on the updated one or more software or hardware components, a third communication link between the first storage system (900) and the second storage system (950) may be carried out similarly to establishing (902) the first communication link between the first storage system (900) and the second storage system (950), where the difference is in the type of network communication protocol and network messaging layer established, and where details of the network communication protocols and network messaging layers are described above. In this example, establishing (1008) the third communication link may be performed subsequent to initiating (904) the configuration change.

Replicating (1010), over the third communication link, additional portions (1054) of the dataset, where replication (1010) over the third communication link uses a type of network messaging layer that is different from the first type of network messaging layer may be carried out similarly to replicating (906) data from the first storage system (900) to the second storage system (950), where the difference is in the type of network communication protocol and network messaging layer used for the third communication link. In this example, replicating (1010) the additional portions (1054) of the dataset may be performed subsequent to initiating (904) the configuration change.

In this way, in this example, replication between the first and second storage systems (900, 950) may continue without disruption over multiple, distinct communication links, and corresponding network communication layers, even as some of the communication links among the multiple communication links may be interrupted for upgrades—and where replication may continue among all communication links subsequent to the upgrades.

Figure 11:
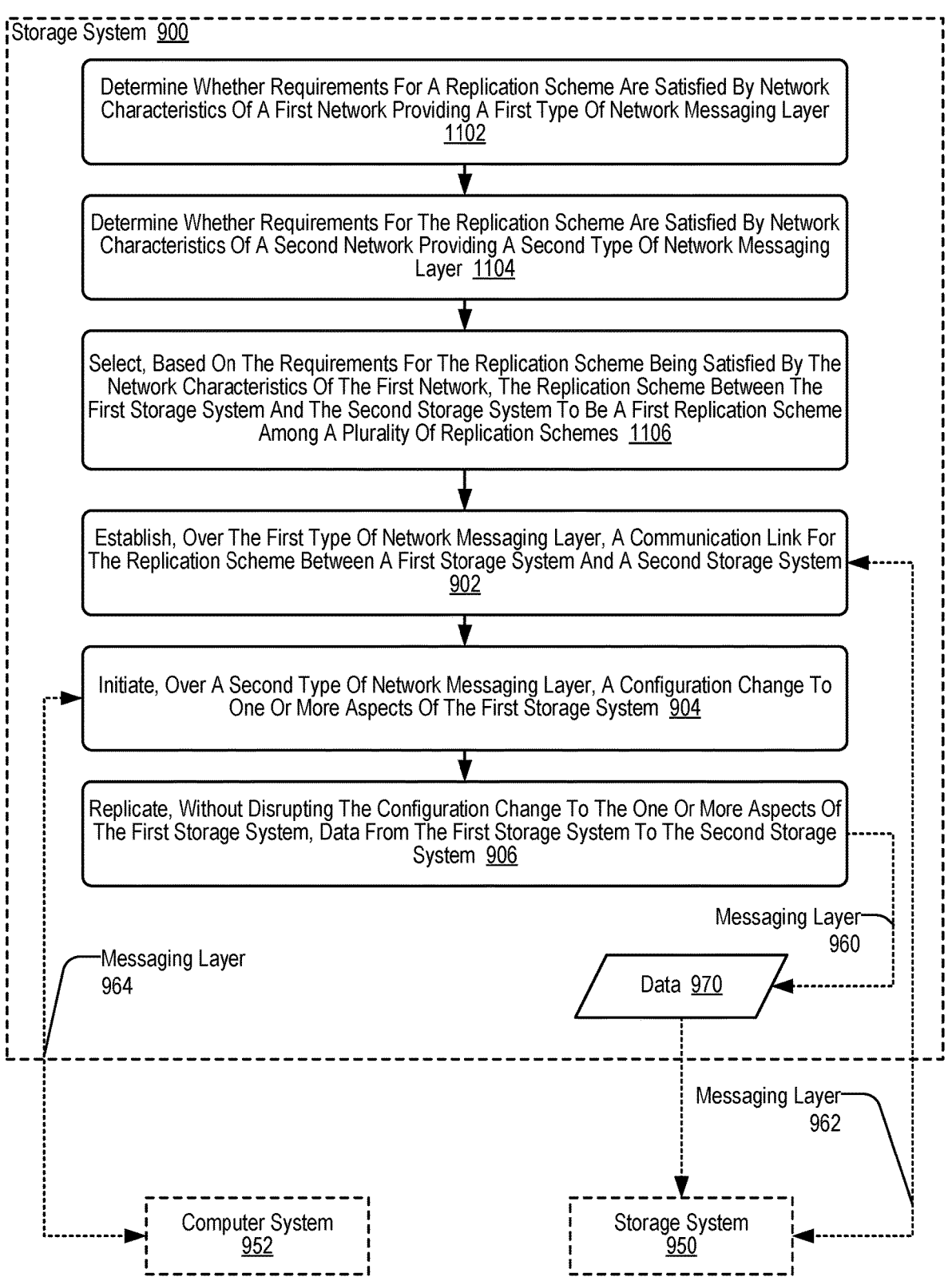

For further explanation, FIG. 11 sets forth a flowchart that illustrates a method for implementing replication handling among distinct networks in accordance with some embodiments of the present disclosure.

The example method depicted in FIG. 11 is similar to the example method depicted in FIG. 9 in that the example method depicted in FIG. 11 includes: establishing (902), over a first type of network messaging layer (960), a communication link for a replication scheme the one or more aspects of the first storage system (900), data (970) from the first storage system to the second storage system.

However, the example method depicted in FIG. 11 further includes: determining (1102) whether requirements for a replication scheme are satisfied by network characteristics of a first network providing the first type of network messaging layer (960); determining (1104) whether requirements for the replication scheme are satisfied by network characteristics of a second network providing the second type of network messaging layer (964); and selecting (1106), based on the requirements for the replication scheme begin satisfied by the network characteristics of the first network, the replication scheme between the first storage system (900) and the second storage system (950) to be a first replication scheme among a plurality of replication schemes.

Determining (1102) whether requirements for a replication scheme are satisfied by network characteristics of a first network providing the first type of network messaging layer (960) may be carried out by referencing a replication policy for the data (970) or dataset being replicated and identifying one or more requirements for supporting the replication scheme and comparing to the network characteristics. For example, the replication policy may specify that for the replication scheme, say synchronous replication, that round trip travel time for communication to the second storage system (950) be under a specified number of microseconds, or that a specified quantity of bandwidth needs to be available, or that a specified level of network reliability must be provided, or other characteristics of metrics of an underlying network. For example, different networks, such as Fibre Channel or others listed above, may specify metrics for network messaging and supported network bandwidths.

Continuing with this example, given the replication scheme requirements, and given the network characteristics, a determination may be made as to whether each of the replication scheme requirements are satisfied by the network characteristics of the first network.

Determining (1104) whether requirements for the replication scheme are satisfied by network characteristics of a second network providing the second type of network messaging layer (964) may be carried out by referencing the replication policy for the data (970) or dataset being replicated and identifying one or more requirements for supporting the replication scheme and comparing to the network characteristics. For example, as noted above, the replication policy may specify that for the replication scheme, say synchronous replication, that round trip travel time for communication to the second storage system (950) be under a specified number of microseconds, or that a specified quantity of bandwidth needs to be available, or that a specified level of network reliability must be provided, or other characteristics of metrics of an underlying network. Given the replication scheme requirements and given the network characteristics, a determination may be made as to whether each of the replication scheme requirements are satisfied by the network characteristics of the second network.

Selecting (1106), based on the requirements for the replication scheme begin satisfied by the network characteristics of the first network, the replication scheme between the first storage system (900) and the second storage system (950) to be a first replication scheme among a plurality of replication schemes may be carried out by using the determinations (1102, 1104) of whether the replication scheme is satisfied by the first network or the second network—where the network that satisfies, or best satisfies, the replication scheme requirements may be selected as the network for the replication scheme.

Figure 12:
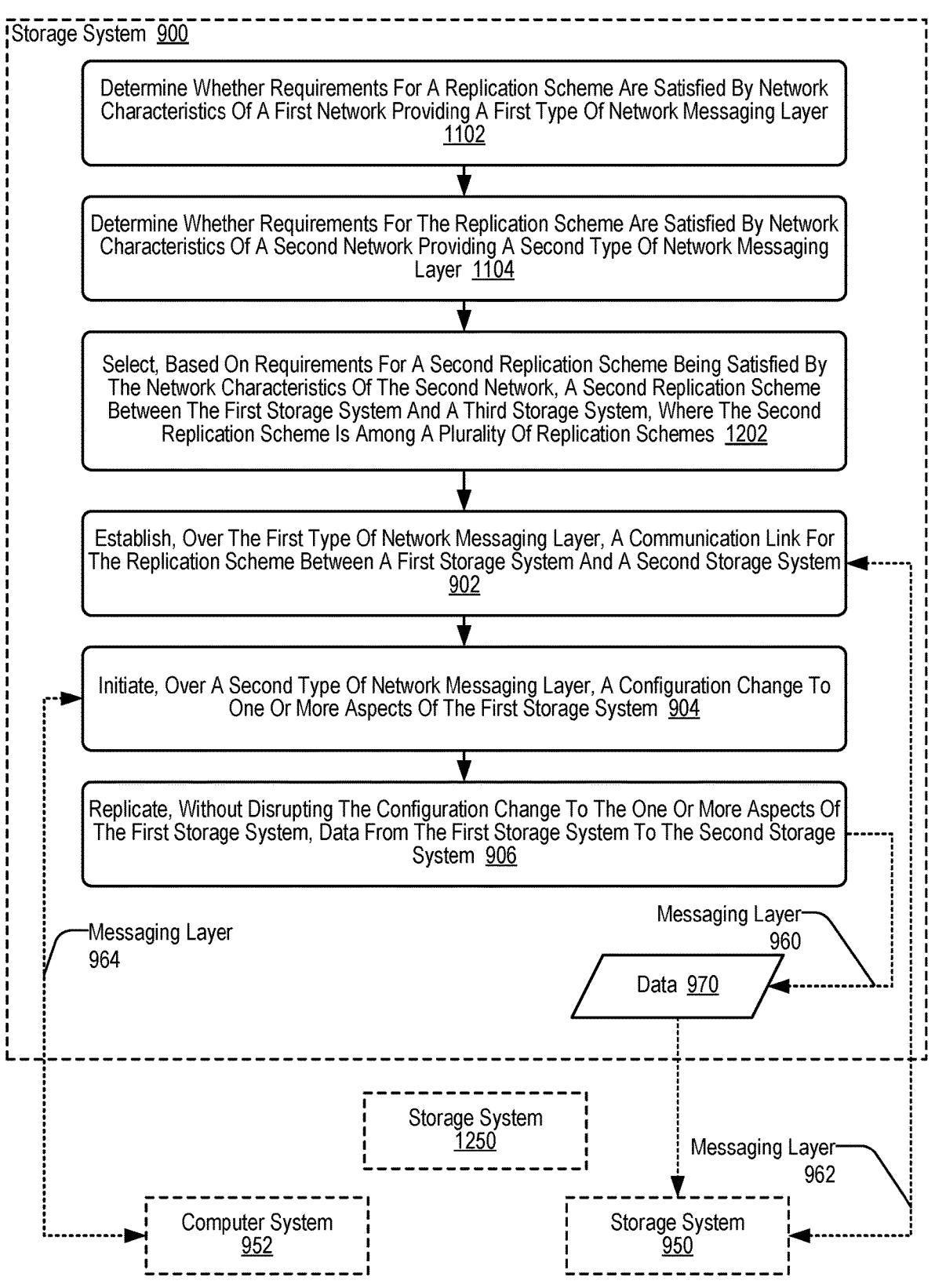

For further explanation, FIG. 12 sets forth a flowchart that illustrates a method for implementing replication handling among distinct networks in accordance with some embodiments of the present disclosure.

The example method depicted in FIG. 12 is similar to the example method depicted in FIG. 11 in that the example method depicted in FIG. 12 includes: determining (1102) whether requirements for a replication scheme are satisfied by network characteristics of a first network providing the first type of network messaging layer (960); determining (1104) whether requirements for the replication scheme are satisfied by network characteristics of a second network providing the second type of network messaging layer (964); establishing (902), over a first type of network messaging layer (960), a communication link for a replication scheme between a first storage system (900) and a second storage system (950); initiating (904), over a second type of network messaging layer, a configuration change to one or more aspects of the first storage system (900); and replicating (906), without disrupting the configuration change to the one or more aspects of the first storage system (900), data (970) from the first storage system to the second storage system.

However, the example method depicted in FIG. 12, in contrast to the example method depicted in FIG. 11, which includes selecting (1106) the replication scheme among a plurality of replication schemes, the example method in FIG. 12 includes: selecting (1202), based on requirements for a second replication scheme being satisfied by the network characteristics of the second network, a second replication scheme between the first storage system (900) and a third storage system (1250), where the second replication scheme is among a plurality of replication schemes.

Selecting (1202), based on requirements for a second replication scheme being satisfied by the network characteristics of the second network, a second replication scheme between the first storage system (900) and a third storage system (1250) may be carried out similarly to selecting (1106) the replication scheme between the first storage system (900) and the second storage system (950).

Figure 13:
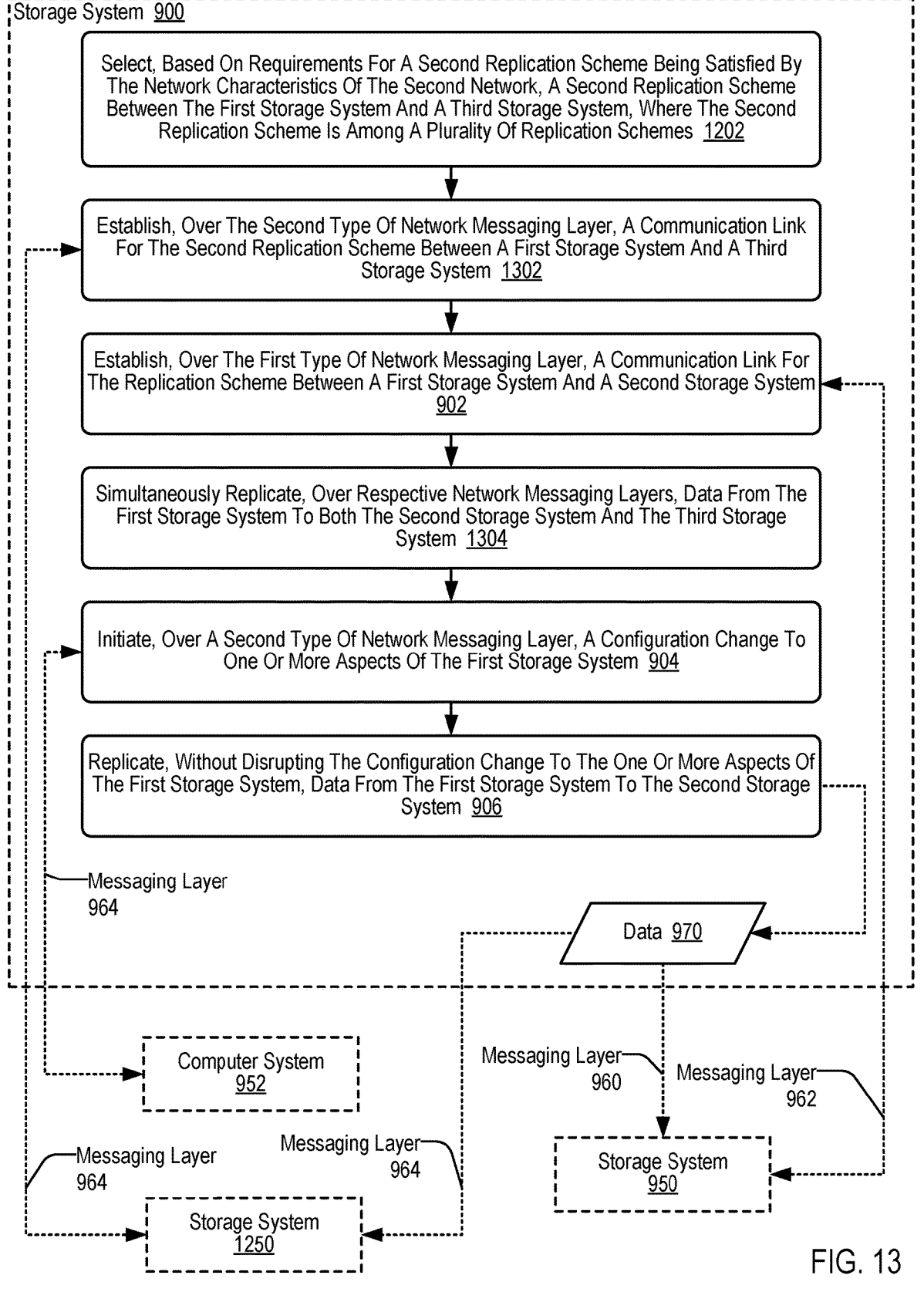

For further explanation, FIG. 13 sets forth a flowchart that illustrates a method for implementing replication handling among distinct networks in accordance with some embodiments of the present disclosure.

The example method depicted in FIG. 13 is similar to the example method depicted in FIG. 12 in that the example method depicted in FIG. 13 includes: selecting (1202), based on requirements for a second replication scheme being satisfied by the network characteristics of the second network, a second replication scheme between the first storage system (900) and a third storage system (1250); establishing (902), over a first type of network messaging layer (960), a communication link for a replication scheme between a first storage system (900) and a second storage system (950); initiating (904), over a second type of network messaging layer, a configuration change to one or more aspects of the first storage system (900); and replicating (906), without disrupting the configuration change to the one or more aspects of the first storage system (900), data (970) from the first storage system to the second storage system.

However, the example method depicted in FIG. 13 further includes: establishing (1302), over the second type of messaging layer (964), a communication link for the second replication scheme between the first storage system (900) and a third storage system (1250); and simultaneously replicating (1304), over respective network messaging layers (960, 964), data (970) from the first storage system (900) to both the second storage system (950) and the third storage system (1250).

Establishing (1302), over the second type of messaging layer (964), a communication link for the second replication scheme between the first storage system (900) and a third storage system (1250) may be carried out similarly to establishing (902), over a first type of network messaging layer (960), a communication link for a replication scheme between a first storage system (900) and a second storage system (950), described above with reference to FIG. 9.

Simultaneously replicating (1304), over respective network messaging layers (960, 964), data (970) from the first storage system (900) to both the second storage system (950) and the third storage system (1250) may be carried out as described above.

For example, based on having the first storage system (900) configured to establish multiple communication links over different underlying physical networks, such as different networks to the second storage system (950) and the third storage system (1250), the first storage system (900) may continue to replication data (970) to the second storage system (950) over a first network and a first type of messaging layer (960) while simultaneously replicating data (970) from first storage system (900) to the third storage system (1250) over a second network and a second type of messaging layer (964).

Figure 14:
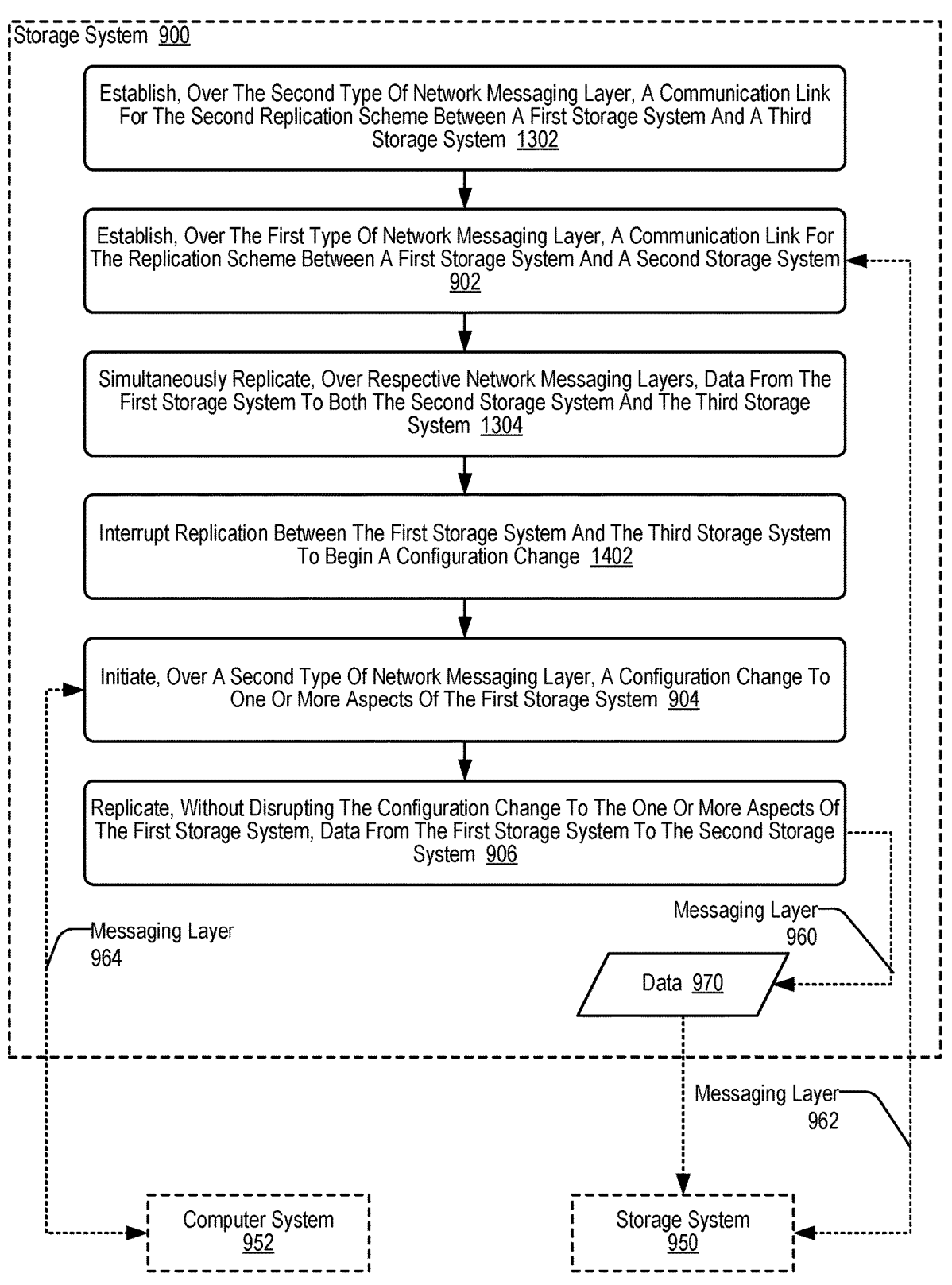

For further explanation, FIG. 14 sets forth a flowchart that illustrates a method for implementing replication handling among distinct networks in accordance with some embodiments of the present disclosure.

The example method depicted in FIG. 14 is similar to the example method depicted in FIG. 13 in that the example method depicted in FIG. 14 includes: establishing (1302), over the second type of messaging layer (964), a communication link for the second replication scheme between the first storage system (900) and a third storage system (1250); establishing (902), over a first type of network messaging layer (960), a communication link for a replication scheme between a first storage system (900) and a second storage system (950); simultaneously replicating (1304), over respective network messaging layers (960, 964), data (970) from the first storage system (900) to both the second storage system (950) and the third storage system (1250); initiating (904), over a second type of network messaging layer, a configuration change to one or more aspects of the first storage system (900); and replicating (906), without disrupting the configuration change to the one or more aspects of the first storage system (900), data (970) from the first storage system to the second storage system.

However, the example method depicted in FIG. 14 includes interrupting (1402) replication between the first storage system (900) and the third storage system (1250) to begin a configuration change.

Interrupting (1402) replication between the first storage system (900) and the third storage system (1250) to begin a configuration change may be carried out by a storage controller, in response to receiving a message indicating an update, suspending or interrupting replication that is occurring over the communication link between the first storage system (900) and the third storage system (1250). Further, in this example, after suspending the replication between the first storage system (900) and the third storage system (1250), the storage controller may apply the configuration change specified in the update message.

Figure 15:
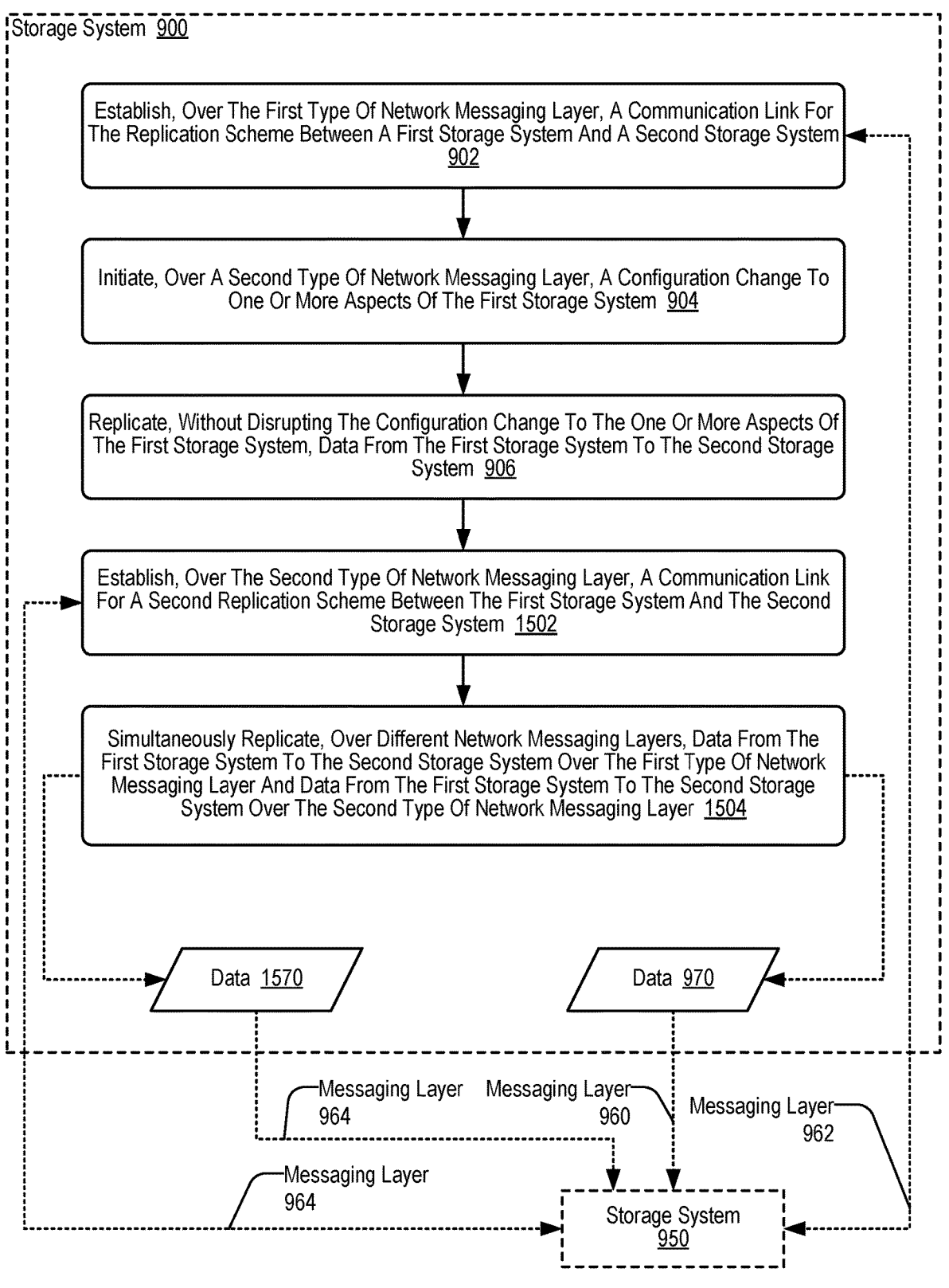

For further explanation, FIG. 15 sets forth a flowchart that illustrates a method for implementing replication handling among distinct networks in accordance with some embodiments of the present disclosure.

The example method depicted in FIG. 15 is similar to the example method depicted in FIG. 9 in that the example method depicted in FIG. 15 includes: establishing (902), over a first type of network messaging layer (960), a communication link for a replication scheme the one or more aspects of the first storage system (900), data (970) from the first storage system to the second storage system.

However, the example method depicted in FIG. 15 further includes: establishing (1502), over the second type of network messaging layer (964), a communication link for a second replication scheme between the first storage system (900) and the second storage system (950); and simultaneously replicating (1504), over different network messaging layers (960, 964), data (970) from the first storage system (900) to the second storage system (950) over the first type of network messaging layer (960) and data (1570) from the first storage system (900) to the second storage system (950) over the second type of network messaging layer (964).

Establishing (1502), over the second type of network messaging layer (964), a communication link for a second replication scheme between the first storage system (900) and the second storage system (950) may be carried out similarly to establishing (902) a communication link for the replication scheme between the first storage system (900) and the second storage system (950)—where a difference is that the communication link is established over a different messaging layer.

Simultaneously replicating (1504), over different network messaging layers (960, 964), data (970) from the first storage system (900) to the second storage system (950) over the first type of network messaging layer (960) and data (1570) from the first storage system (900) to the second storage system (950) over the second type of network messaging layer (964) may be carried out based on having the first storage system (900) configured to establish multiple communication links over different underlying physical networks, such as different networks to the same second storage system (950)—where the first storage system (900) may continue to replication data (970) to the second storage system (950) over a first network and a first type of messaging layer (960) while simultaneously replicating data (1570) from first storage system (900) to the second storage system (950) over a second network and a second type of messaging layer (964).

For further explanation, FIG. 16 sets forth a flowchart that illustrates a method for implementing replication handling among distinct networks in accordance with some embodiments of the present disclosure.

The example method depicted in FIG. 16 is similar to the example method depicted in FIG. 9 in that the example method depicted in FIG. 16 includes: establishing (902), over a first type of network messaging layer (960), a communication link for a replication scheme the one or more aspects of the first storage system (900), data (970) from the first storage system to the second storage system.

However, the example method depicted in FIG. 16, in contrast to the example method of FIG. 9, further includes: detecting (1602) a change in network characteristics of the first network supporting the first communication link to the second storage system (950); and determining (1604) that the change in network characteristics fails to satisfy one or more replication scheme requirements of the replication scheme.

Detecting (1602) a change in network characteristics of the first network supporting the first communication link to the second storage system (950) may be carried out by a diagnostic or monitoring process that periodically, or in response to network events, gathers metrics and status information for a given network, such as the first network in this example.

Determining (1604) that the change in network characteristics fails to satisfy one or more replication scheme requirements of the replication scheme may be carried out by comparing current network characteristics—based on the changes detected (1602) above—and referencing a replication policy for the data (970) or dataset being replicated and identifying one or more requirements for supporting the replication scheme and comparing to the current network characteristics. For example, the replication policy may specify that for the replication scheme, say synchronous replication, that a specified network speed, or that a specified quantity of bandwidth needs to be available, or that a specified level of network reliability must be provided, or other characteristics of metrics of an underlying network.

Figure 17:
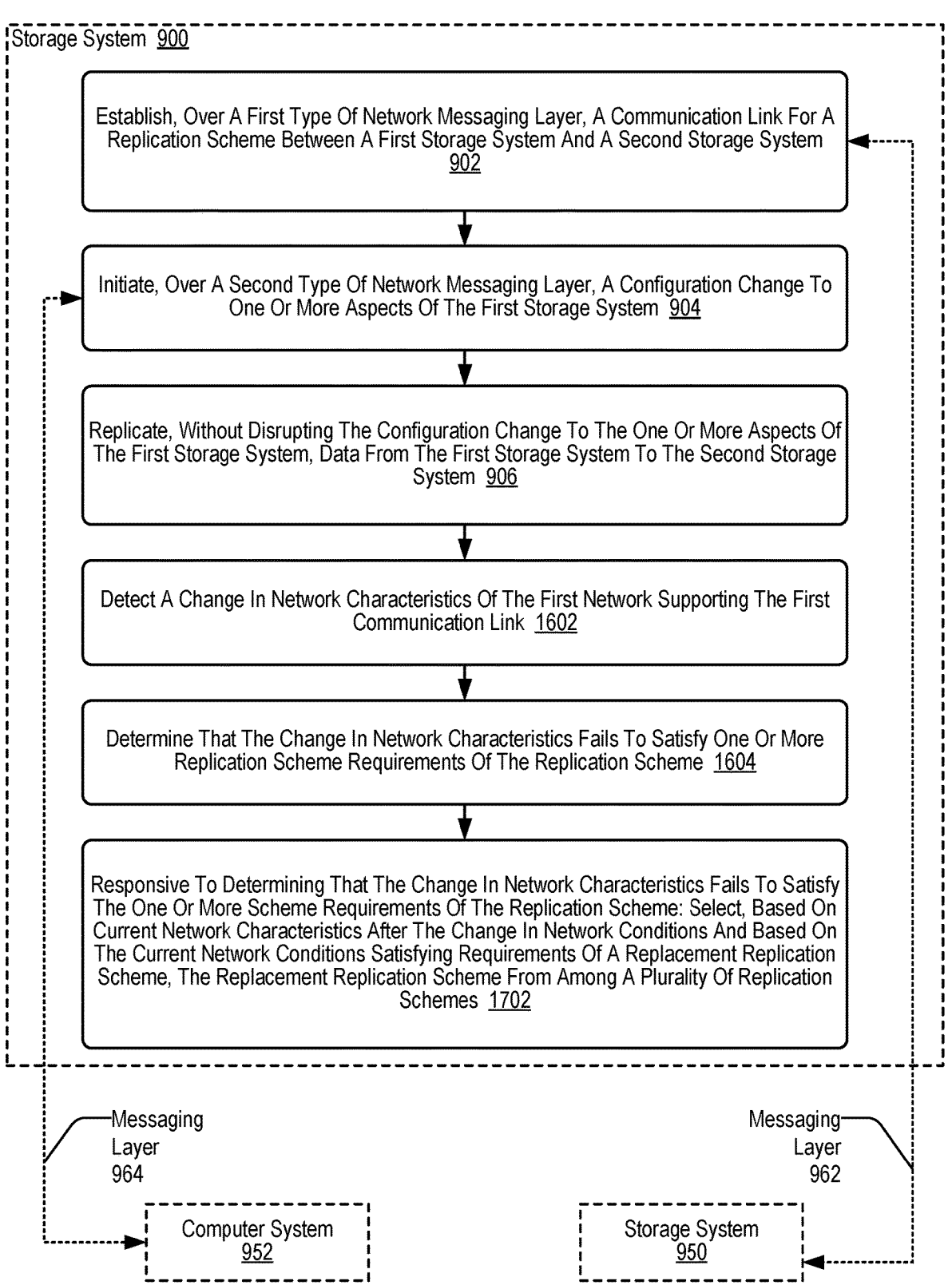

For further explanation, FIG. 17 sets forth a flowchart that illustrates a method for implementing replication handling among distinct networks in accordance with some embodiments of the present disclosure.

The example method depicted in FIG. 17 is similar to the example method depicted in FIG. 16 in that the example method depicted in FIG. 17 includes: establishing (902), over a first type of network messaging layer (960), a communication link for a replication scheme between a first storage system (900) and a second storage system (950); initiating (904), over a second type of network messaging layer, a configuration change to one or more aspects of the first storage system (900); replicating (906), without disrupting the configuration change to the one or more aspects of the first storage system (900), data (970) from the first storage system to the second storage system; detecting (1602) a change in network characteristics of the first network supporting the first communication link to the second storage system (950); and determining (1604) that the change in network characteristics fails to satisfy one or more replication scheme requirements of the replication scheme.

However, the example method depicted in FIG. 17 further specifies that responsive to determining (1604) the change in network characteristics fails to satisfy the one or more replication scheme requirements of the replication scheme: selecting (1702), based on current network characteristics after the change in network conditions and based on the current network conditions satisfying requirements of a replacement replication scheme, the replacement replication scheme from among a plurality of replication schemes.

Selecting (1702), based on current network characteristics after the change in network conditions and based on the current network conditions satisfying requirements of a replacement replication scheme, the replacement replication scheme from among a plurality of replication schemes may be carried out similarly to selecting (1202), based on requirements for a second replication scheme being satisfied by the network characteristics of the second network, a second replication scheme between the first storage system (900) and a third storage system (1250), where the second replication scheme is among a plurality of replication schemes, described in FIG. 12.

Figure 18:
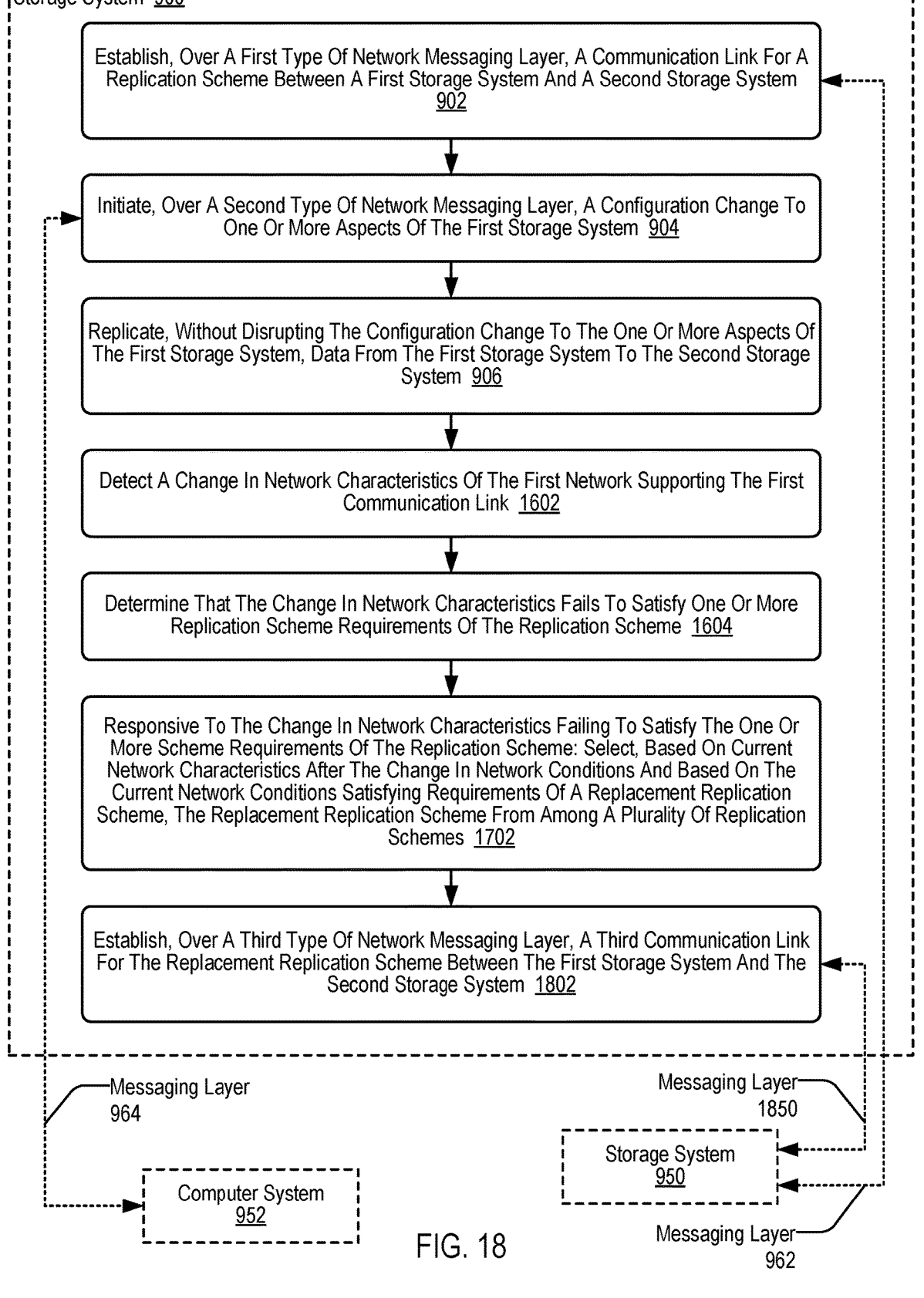

For further explanation, FIG. 18 sets forth a flowchart that illustrates a method for implementing replication handling among distinct networks in accordance with some embodiments of the present disclosure.

The example method depicted in FIG. 18 is similar to the example method depicted in FIG. 17 in that the example method depicted in FIG. 18 includes: establishing (902), over a first type of network messaging layer (960), a communication link for a replication scheme between a first storage system (900) and a second storage system (950); initiating (904), over a second type of network messaging layer, a configuration change to one or more aspects of the first storage system (900); replicating (906), without disrupting the configuration change to the one or more aspects of the first storage system (900), data (970) from the first storage system to the second storage system; detecting (1602) a change in network characteristics of the first network supporting the first communication link to the second storage system (950); determining (1604) that the change in network characteristics fails to satisfy one or more replication scheme requirements of the replication scheme; and responsive to determining (1604) the change in network characteristics fails to satisfy the one or more replication scheme requirements of the replication scheme: selecting (1702), based on current network characteristics after the change in network conditions and based on the current network conditions satisfying requirements of a replacement replication scheme, the replacement replication scheme from among a plurality of replication schemes.

However, the example method depicted in FIG. 18 further includes: establishing (1802), over a third type of network messaging layer (1850), a third communication link for the replacement replication scheme between the first storage system (900) and the second storage system (950).

Establishing (1802), over a third type of network messaging layer (1850), a third communication link for the replacement replication scheme between the first storage system (900) and the second storage system (950) may be carried out similarly to establishing (902), over a first type of network messaging layer (960), a communication link for a replication scheme between a first storage system (900) and a second storage system (950), described above with reference to FIG. 9. As noted above, the first storage system (900) may include multiple network ports, where each network port may support one or more networking protocols over one or more communication networks or fabrics, and where each networking protocol may correspond to a network protocol stack that includes a messaging layer.

Figure 19:
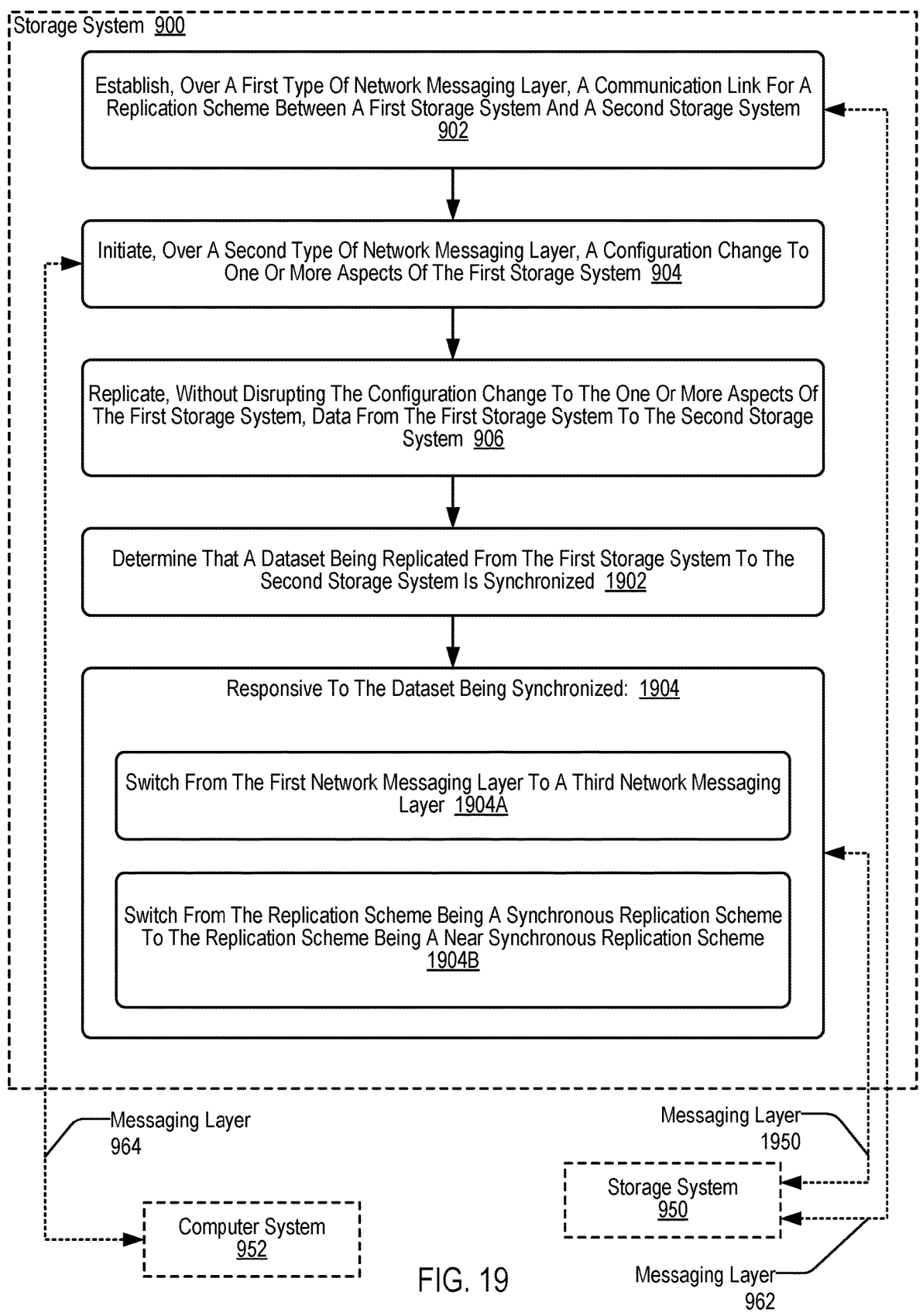

For further explanation, FIG. 19 sets forth a flowchart that illustrates a method for implementing replication handling among distinct networks in accordance with some embodiments of the present disclosure.

The example method depicted in FIG. 19 is similar to the example method depicted in FIG. 9 in that the example method depicted in FIG. 19 includes: establishing (902), over a first type of network messaging layer (960), a communication link for a replication scheme between a first storage system (900) and a second storage system (950); initiating (904), over a second type of network messaging layer, a configuration change to one or more aspects of the first storage system (900); and replicating (906), without disrupting the configuration change to the one or more aspects of the first storage system (900), data (970) from the first storage system to the second storage system.

However, the example method depicted in FIG. 19, in contrast to the example method of FIG. 9, further includes: determining (1902) that a dataset being replicated from the first storage system (900) to the second storage system (950) is synchronized; and responsive to the dataset being synchronized (1904): switching (1904A) from the first network messaging layer to a third network messaging layer (1950), and switching (1904B) from the replication scheme being a synchronous replication scheme to the replication scheme being a near synchronous replication scheme.

In this example, a replication policy associated with a dataset may specify conditions under which replication schemes may be switched to a different replication scheme. For example, initial synchronization of a dataset may be network bandwidth intensive, and so a replication policy may select a Fibre Channel network for initially synchronizing the dataset. Further, in this example, the replication policy for the dataset may specify that in response to initially synchronizing the dataset, to switch to a different replication scheme and/or a different type of network transport mechanism.

Continuing with this example, in response to synchronizing the dataset—for example, in order to provide the Fibre Channel network to other bandwidth intensive replication scheme use—may switch the replication scheme to a different network based on a replication policy specifying balancing of network usage that includes specifying use of lower bandwidth networks or lower traffic replication schemes subsequent to the initial dataset being synchronized. Further, in some examples, in addition to switching to a different network, and corresponding different messaging layer, the replication scheme may also be switched to a different replication scheme.

Determining (1902) that a dataset being replicated from the first storage system (900) to the second storage system (950) is synchronized may be carried out using various techniques in accordance with a particular replication scheme being used. For example, as described above with reference to a synchronous replication scheme synchronizing a dataset (426) between multiple storage systems (402, 404, 406) may use acknowledgement messages between storage system to indicate a synchronized dataset. In other examples, different replication schemes may have respective mechanisms for determining when a dataset is synchronized, as described above with reference to FIGS. 4A-8.

Switching (1904A), in response to the dataset being synchronized (1904), from the first network messaging layer to a third network messaging layer (1950) may be carried out by a storage controller suspending replication operations from the first storage system to the second storage system on a current network using a current first network messaging layer (960), and then establishing a communication link with the second storage system (950) using a different network and a third network messaging layer (1950). In this example, establishing the communication link may be carried out to establishing (902) a communication link as described above with reference to FIG. 9.

Switching (1904B) from the replication scheme being a synchronous replication scheme to the replication scheme being a near synchronous replication scheme may be carried out by the storage controller suspending the current synchronous replication scheme by completing any outstanding operations for the current synchronous replication scheme without initiating new replication operations. In response to completing any current outstanding replication operations, the storage controller may then initiate the asynchronous replication scheme over the established communication link described above with reference to switching (1904A) between network messaging layers.

Figure 20:
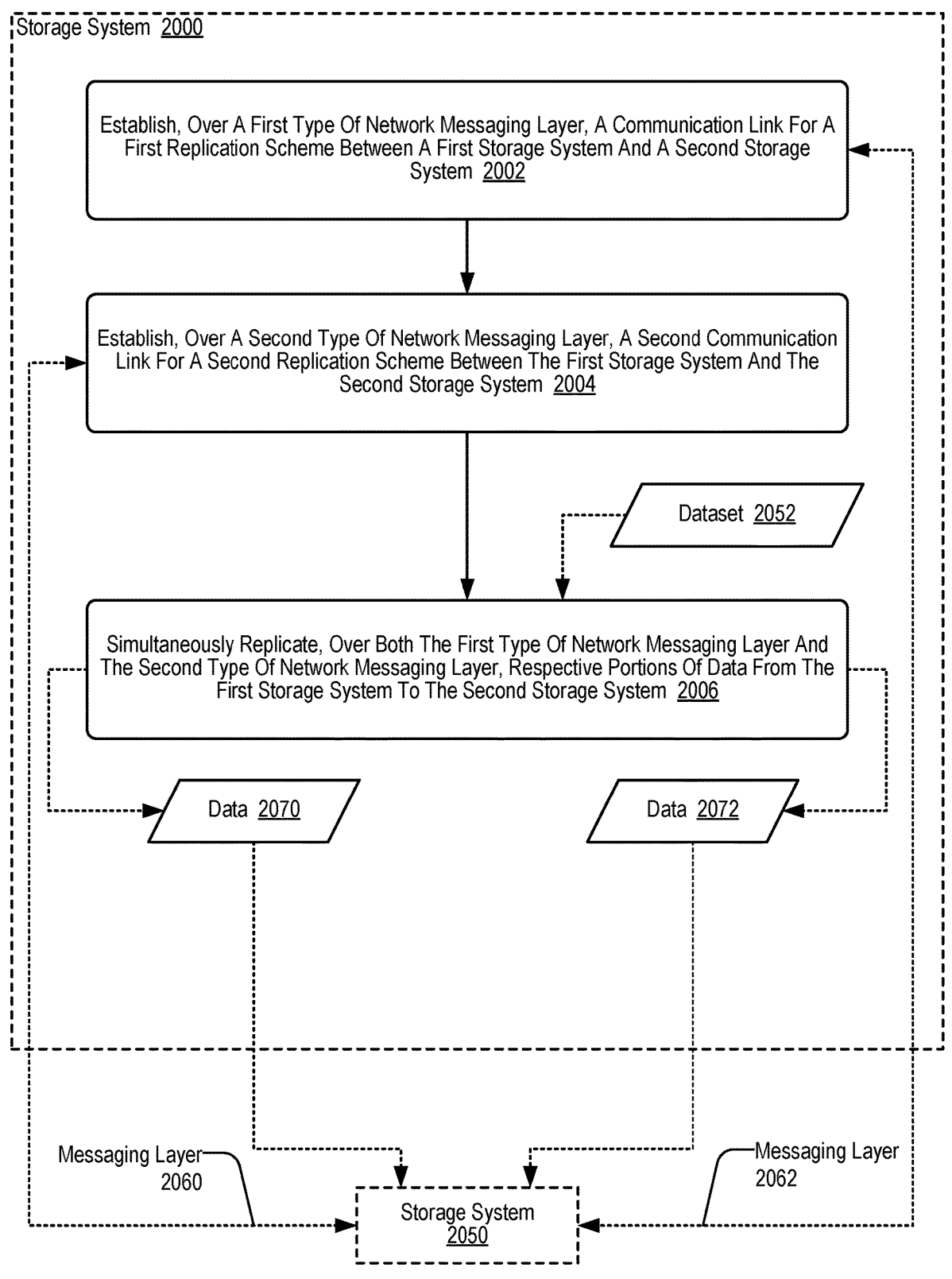

For further explanation, FIG. 20 sets forth a flowchart that illustrates a method for implementing replication handling among distinct networks in accordance with some embodiments of the present disclosure.

In this example, two storage systems (2000, 2050) may establish a replication relationship in accordance with a given replication scheme, where the storage systems may use multiple different networks and correspondingly different network messaging mechanisms to simultaneously replicate data.

Specifically, in the example method depicted in FIG. 20 includes a storage system (2000): establishing (2002), over a first type of network messaging layer (2062), a communication link for a first replication scheme between a first storage system (2000) and a second storage system (2050); establishing (2004), over a second type of messaging layer (2060), a second communication link for a second replication scheme between the first storage system and the second storage system (2050); and simultaneously replicating, over both the first type of network messaging layer (2062) and the second type of network messaging layer (2060), respective portions of a dataset (2052) from the first storage system (2000) to the second storage system (2050).

Establishing (2002), over a first type of network messaging layer (2062), a communication link for a first replication scheme between a first storage system (2000) and a second storage system (2050) may be carried out similarly to establishing (902) a communication link between storage systems described above with reference to FIG. 9.

Establishing (2004), over a second type of messaging layer (2060), a second communication link for a second replication scheme between the first storage system and the second storage system (2050) may be carried out similarly to establishing (902) a communication link between storage systems described above with reference to FIG. 9.

Simultaneously replicating (2006), over both the first type of network messaging layer (2062) and the second type of network messaging layer (2060), respective portions of a dataset (2052) from the first storage system (2000) to the second storage system (2050) may be carried out similarly to simultaneously replicating (1304) data between a first storage system and a second and third storage system. However, in this example, by contrast to simultaneous replication (1304) in FIG. 13 to different storage systems, the first storage system simultaneously replicates data (2070, 2072) portions of the dataset (2052) to the same second storage system (2050) over different networks using different network messaging layers (2060, 2062).

Figure 21:
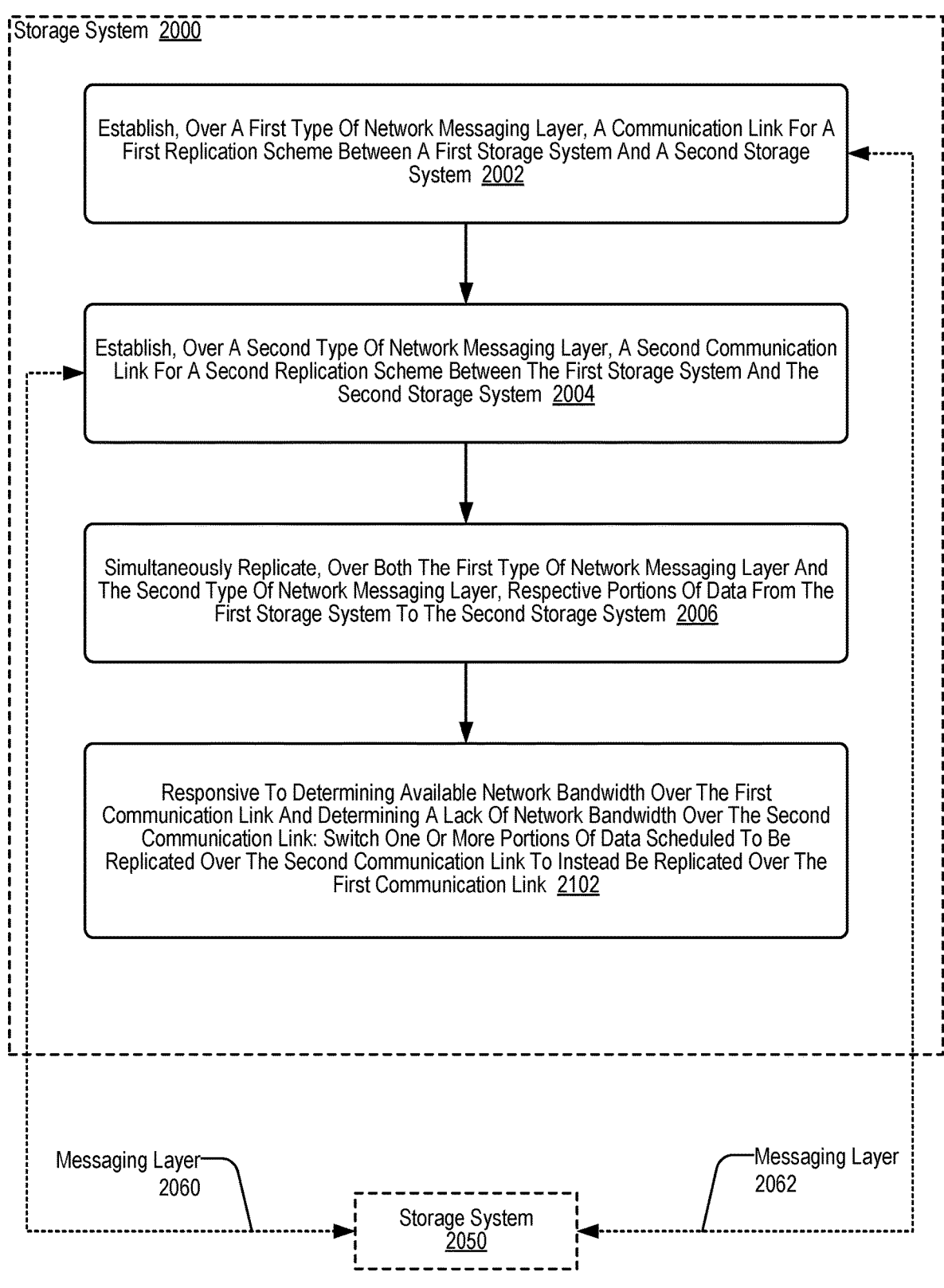

For further explanation, FIG. 21 sets forth a flowchart that illustrates a method for implementing replication handling among distinct networks in accordance with some embodiments of the present disclosure.

In this example, as described in FIG. 20, the two storage systems (2000, 2050) have an established replication relationship in accordance with a given replication scheme, where the storage systems may use multiple different networks and correspondingly different network messaging mechanisms to simultaneously replicate data.

However, in the example method of FIG. 20, a replication policy may specify responses to changes in network availability, where the responses may include switching replication schemes and/or switching to a different network and corresponding network messaging mechanism.

Specifically, in the example method depicted in FIG. 21, similar to the example method of FIG. 20, includes a storage system (2000): establishing (2002), over a first type of network messaging layer (2062), a communication link for a first replication scheme between a first storage system (2000) and a second storage system (2050); establishing (2004), over a second type of messaging layer (2060), a second communication link for a second replication scheme between the first storage system and the second storage system (2050); and simultaneously replicating, over both the first type of network messaging layer (2062) and the second type of network messaging layer (2060), respective portions of a dataset (2052) from the first storage system (2000) to the second storage system (2050).

However, the example method in FIG. 21 further includes: responsive to determining available network bandwidth over the first communication link and determining a lack of network bandwidth over the second communication link, switching (2102) one or more portions of data scheduled to be replicated over the second communication link to instead be replicated over the first communication link.

Switching (2102), responsive to determining available network bandwidth over the first communication link and determining a lack of network bandwidth over the second communication link, one or more portions of data scheduled to be replicated over the second communication link to instead be replicated over the first communication link may be carried out similarly to switching (1904A) from one type of network messaging layer (1950) to another type of network messaging layer (964), as described above with reference to FIG. 19. Further, in this example, determining available network bandwidth and lack of network bandwidth may be carried out by a storage controller communicating with a network monitoring process to determine status information for various networks available to the storage system (2000).

Figure 22:
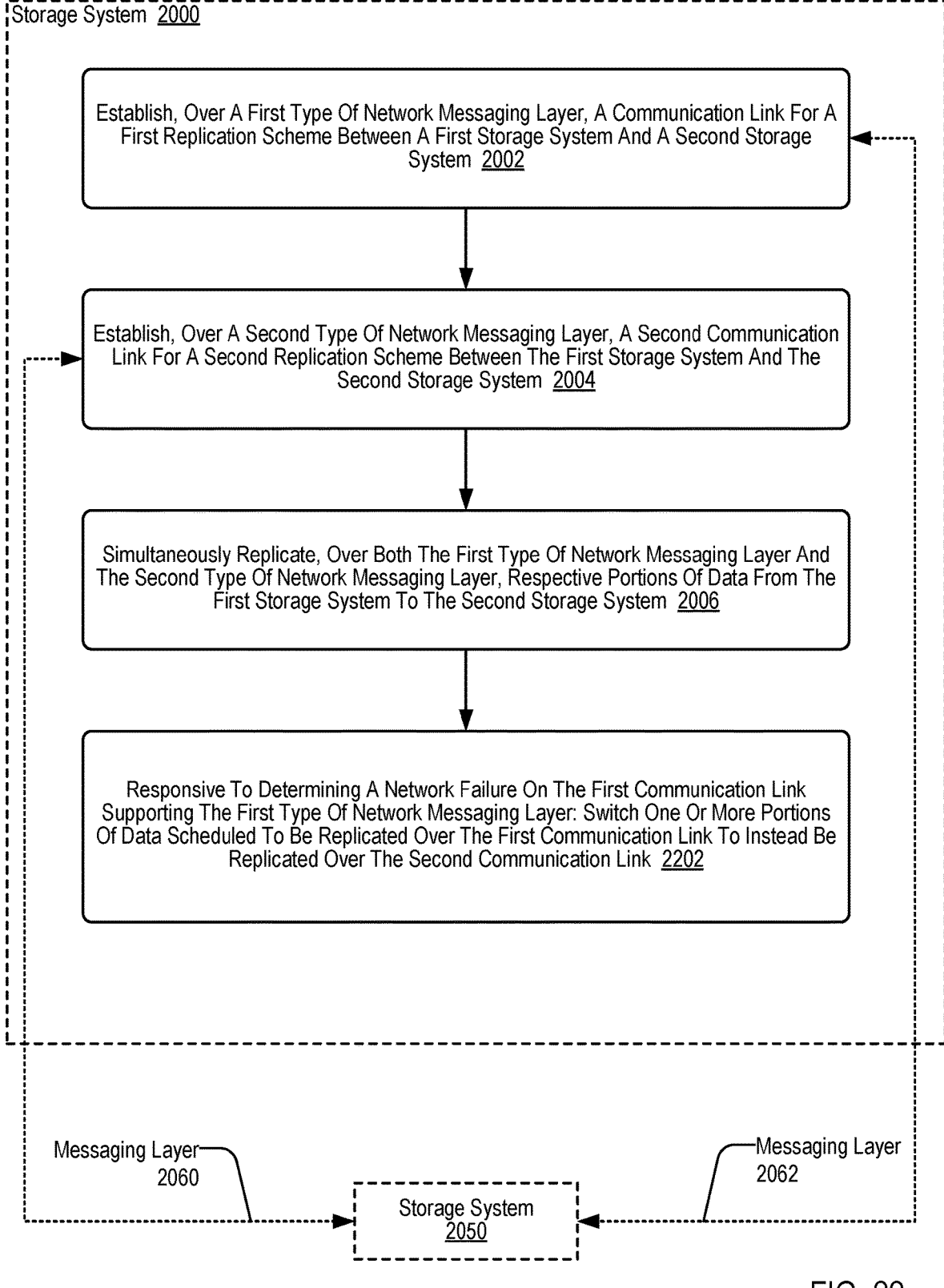

For further explanation, FIG. 22 sets forth a flowchart that illustrates a method for implementing replication handling among distinct networks in accordance with some embodiments of the present disclosure.

In this example, as described in FIG. 20, the two storage systems (2000, 2050) have an established replication relationship in accordance with a given replication scheme, where the storage systems may use multiple different networks and correspondingly different network messaging mechanisms to simultaneously replicate data.

However, in the example method of FIG. 22, a replication policy may specify responses to changes or disruptions in network health, where the responses may include switching replication schemes and/or switching to a different network and corresponding network messaging mechanism.

Specifically, in the example method depicted in FIG. 22, similar to the example method of FIG. 20, includes a storage system (2000): establishing (2002), over a first type of network messaging layer (2062), a communication link for a first replication scheme between a first storage system (2000) and a second storage system (2050); establishing (2004), over a second type of messaging layer (2060), a second communication link for a second replication scheme between the first storage system and the second storage system (2050); and simultaneously replicating, over both the first type of network messaging layer (2062) and the second type of network messaging layer (2060), respective portions of a dataset (2052) from the first storage system (2000) to the second storage system (2050).

However, the example method in FIG. 22 further includes: responsive to determining a network failure on the first communication link supporting the first type of network messaging layer (2062), switching (2202) one or more portions of data scheduled to be replicated over the first communication link to instead be replicated over the second communication link.

Switching (2202), responsive to determining a network failure on the first communication link supporting the first type of network messaging layer (2062), one or more portions of data scheduled to be replicated over the first communication link to instead be replicated over the second communication link may be carried out similarly to switching (1904A) from one type of network messaging layer (1950) to another type of network messaging layer (964), as described above with reference to FIG. 19. Further, in this example, determining network health status or network failures may be carried out by a storage controller communicating with a network monitoring process to determine status information for various networks available to the storage system (2000).

Figure 23:
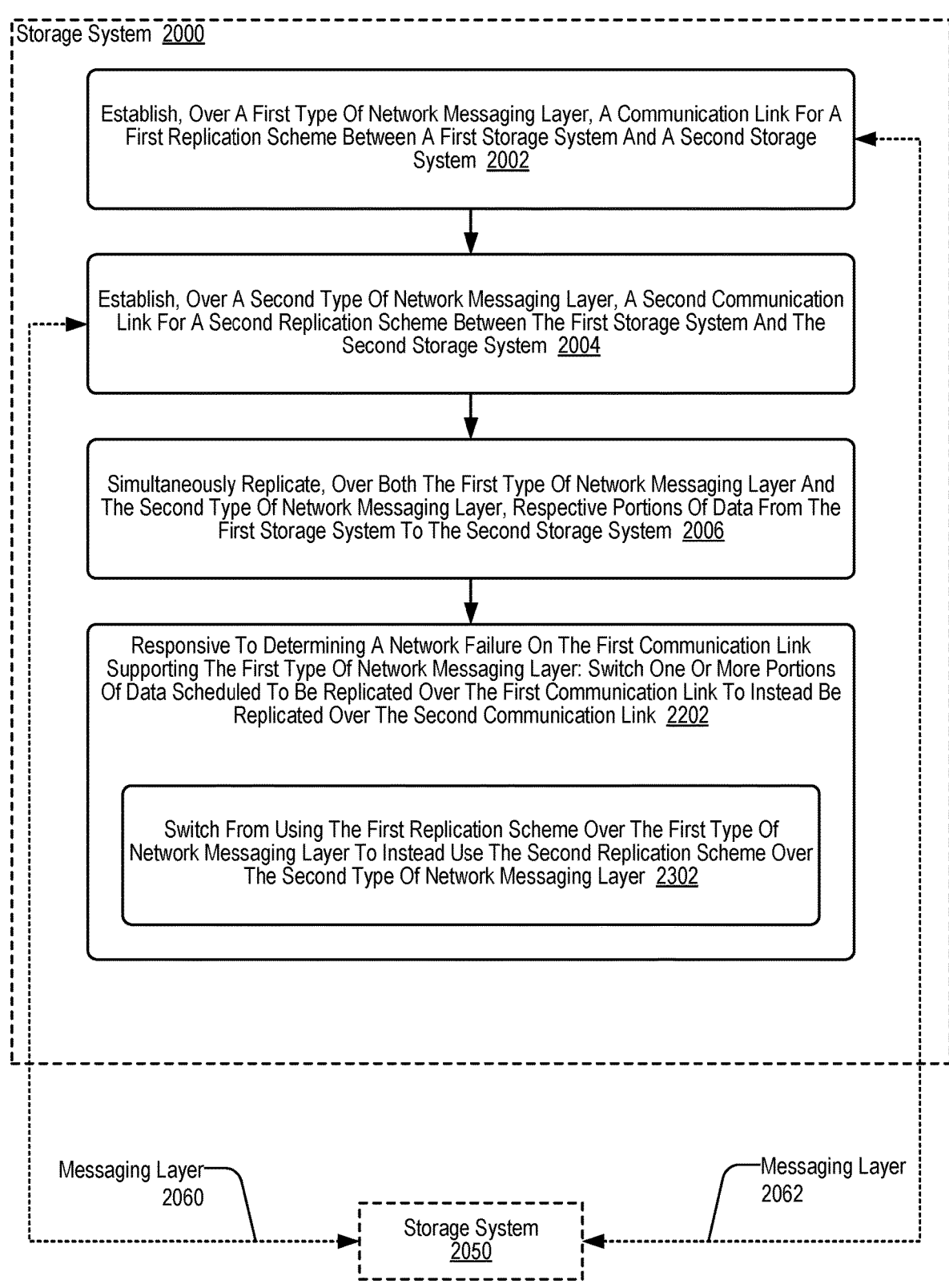

For further explanation, FIG. 23 sets forth a flowchart that illustrates a method for implementing replication handling among distinct networks in accordance with some embodiments of the present disclosure.

In this example, as described in FIG. 20, the two storage systems (2000, 2050) have an established replication relationship in accordance with a given replication scheme, where the storage systems may use multiple different networks and correspondingly different network messaging mechanisms to simultaneously replicate data.

However, in the example method of FIG. 23, a replication policy may specify responses to changes or disruptions in network health, where the responses may include switching replication schemes and switching network messaging mechanism.

Specifically, in the example method depicted in FIG. 23, similar to the example method of FIG. 22, includes a storage system (2000): establishing (2002), over a first type of network messaging layer (2062), a communication link for a first replication scheme between a first storage system (2000) and a second storage system (2050); establishing (2004), over a second type of messaging layer (2060), a second communication link for a second replication scheme between the first storage system and the second storage system (2050); simultaneously replicating, over both the first type of network messaging layer (2062) and the second type of network messaging layer (2060), respective portions of a dataset (2052) from the first storage system (2000) to the second storage system (2050); and responsive to determining a network failure on the first communication link supporting the first type of network messaging layer (2062), switching (2202) one or more portions of data scheduled to be replicated over the first communication link to instead be replicated over the second communication link.

However, the example method in FIG. 23 further specifies that switching (2202) data scheduled to be replicated over the first communication link to instead be replicated over the second communication link further includes switching (2302) from using the first replication scheme over the first type of network messaging layer (2062) to instead use the second replication scheme over the second type of network messaging layer.

Switching (2302) from using the first replication scheme over the first type of network messaging layer (2062) to instead use the second replication scheme over the second type of network messaging layer may be carried out similarly to switching (1904B) between different replication schemes described above with reference to FIG. 19.

For further explanation, FIG. 24 sets forth a flowchart that illustrates a method for implementing replication handling among distinct networks in accordance with some embodiments of the present disclosure.

In this example, a replication policy may specify, for a corresponding dataset, one or more bases on which to select a first replication scheme to replicate the dataset, including using network characteristics as a basis.

Specifically, in the example method depicted in FIG. 24, similar to the example method of FIG. 20, includes a storage system (2000): establishing (2002), over a first type of network messaging layer (2062), a communication link for a first replication scheme between a first storage system (2000) and a second storage system (2050); establishing (2004), over a second type of messaging layer (2060), a second communication link for a second replication scheme between the first storage system and the second storage system (2050); and simultaneously replicating, over both the first type of network messaging layer (2062) and the second type of network messaging layer (2060), respective portions of a dataset (2052) from the first storage system (2000) to the second storage system (2050).

However, the example method in FIG. 24 further includes: selecting (2402), based on network characteristics for a first network, a first replication scheme to replicate data (2072) using a first type of network messaging layer (2062).

Selecting (2402), based on network characteristics for a first network, a first replication scheme to replicate data (2072) using a first type of network messaging layer (2462) may be carried out similarly to selecting (1202) a replication scheme based on network characteristics of a network, as described above with reference to FIG. 12. In this example, as described above, a replication policy may specify network requirements for different replication schemes, where a replication scheme may be selected based on given network characteristics satisfying the replication scheme.

For further explanation, FIG. 25 sets forth a flowchart that illustrates a method for implementing replication handling among distinct networks in accordance with some embodiments of the present disclosure.

In this example, similar to the example of FIG. 24, where a replication policy is selected for a first network, in this example, a replication policy may specify, for a corresponding dataset, one or more bases on which to select a second replication scheme to replicate the dataset, including using network characteristics as a basis.

Specifically, in the example method depicted in FIG. 25, similar to the example method of FIG. 20, includes a storage system (2000): establishing (2002), over a first type of network messaging layer (2062), a communication link for a first replication scheme between a first storage system (2000) and a second storage system (2050); establishing (2004), over a second type of messaging layer (2060), a second communication link for a second replication scheme between the first storage system and the second storage system (2050); and simultaneously replicating, over both the first type of network messaging layer (2062) and the second type of network messaging layer (2060), respective portions of a dataset (2052) from the first storage system (2000) to the second storage system (2050).

However, the example method in FIG. 25 further includes: selecting (2502), based on network characteristics for a second network, a second replication scheme to replicate data (2070) using a second type of network messaging layer (2460).

Selecting (2502), based on network characteristics for a second network, a second replication scheme to replicate data (2070) using a second type of network messaging layer (2460) may be carried out similarly to selecting (2502) a replication scheme based on network characteristics of a network, as described above with reference to FIG. 24.

For further explanation, FIG. 26A sets forth a flowchart that illustrates an example method for implementing replication handling during storage system transportation in accordance with some embodiments of the present disclosure.

In some situations, a dataset may be replicated from a first location to a second location, and an effective way to replicate the dataset from the first location to the second location is to physically move or transport a copy of the dataset. In other words, physical transport of a dataset may be more practical than a network transfer of the dataset because after a dataset grows past a certain point, for example larger than several terabytes, replicating the dataset over a computer network to a remote location may be cost prohibitive, time prohibitive, or otherwise disadvantageous relative to physically transporting the dataset or a copy of a dataset as part of replicating the dataset.

In some examples, a storage system may be transported via shipping containers, package delivery services, by a vehicle, or in other ways. In some cases, the storage system may have its own power supply, or the storage system may, during transport, have access, and sometimes limited or intermittent access, to an external power supply. Further, the storage system may have radios, or be connected to radios, such as for connecting to cellphone or other types of wireless data networks, or may, continuously or intermittently, be connected through some other means to external networks, during transport. Additional features for a storage system carrying out continued replication of a dataset during transport are described below.

In cases where a storage system is being transported from one physical location to another physical location, and where the storage system stores a dataset that is being replicated among multiple storage systems, if the dataset is updated during the transport of the storage system without replication efforts by the storage system, then upon arrival, the dataset on the storage system may be significantly out-of-sync with the dataset on the other storage systems, due to losing updates for the duration of travel. Therefore, as described below, various implementations of replication handling during storage system transportation are described that provide for continued replication of a dataset stored on a storage system as the storage system is physically transported between different physical locations. Such continued replication of the dataset on the storage system during transport may, upon arrival at a destination physical location, reduce the time and resources required to bring the dataset on the storage system up-to-date with other storage systems that are replicating the dataset and that had been processing updates to the dataset at their locations while the one copy of the dataset was being transported.

As one example, a storage system may be physically located at a first location along with one or more storage systems, such as a first location that is a data center or an on-premises site, where for the purpose of distinction, but not necessarily an ordinal distinction, the storage system to be transported is referred to as a "first" storage system. In this example, the one or more storage systems may be part of a pod, where a dataset is being replicated among the members of the pod. A full description of pods and different types of replication schemes is provided above, with reference to FIGS. 4A-6B. In this example, the pod may be stretched to include the storage system to be transported, or the first storage system, and as a result of stretching the pod to include the first storage system, the dataset may begin to be replicated onto the first storage system—where this replication of the dataset onto the first storage system begins and ends prior to the first storage system being physically moved to the second location. As noted above, in some cases, a dataset on the first storage system may be physically transported from a first physical location to a second physical location more quickly than if the dataset were transferred over a computer network between the first physical location and the second physical location, due to limitations of wide area network bandwidth versus the time to physically transport a large data set on physical media. In other examples, the pod expansion may only begin, but not complete, prior to movement of the first storage system. In these examples, during transport of the first storage system, the dataset on the first storage system may become out-of-sync with respect to the dataset on the other storage systems replicating the dataset within the pod.

As discussed in greater detail below, methods are provided for replication handling in the first storage system during transport that include overcoming such an out-of-sync state of the dataset on the first storage system, or continuing replication of the dataset on the first storage system. In this way, the first storage system, and a dataset, may be transported from a first location to a second location, resulting in the dataset being available at a second location faster due to physical transport of the first storage system than if the dataset were transferred over a computer network. Further, because synchronization efforts are made during transport of the first storage system, upon arrival of the first storage system at the second location, the dataset on the first storage system may be synchronized faster than if no synchronization of the dataset were performed during transport.

As noted above, in some examples, if a dataset is being replicated among a set of storage systems and a first storage system, and if the dataset is not static, then during transport of the first storage system from a first physical location to a second physical location, and correspondingly, during transport of a copy of the dataset stored on the first storage system, the dataset may become out-of-sync during transport. Consequently, in implementations described below, synchronization of the dataset is continued during transport of the first storage system, where synchronization efforts are continued over different types of available communication networks that may be encountered during transport of the first storage system.

Further, the communication networks available during transport of the first storage system may be different from the communication networks available at the first physical location of the first storage system, and there may be different types of communication networks available over the course of the transport of the first storage system. Further still, the communication networks available during transport may not be able to match the performance of communication networks at either a first physical location or a second physical location. In some examples, characteristics of available communication networks during transport of the first storage system may serve as a basis for switching from an initial replication scheme at the first physical location to a replication scheme that is more suited to the communication networks available during transport of the first storage system.

In some implementations, movement of a dataset may be carried out by transporting a first storage system (2600) from the first physical location to the second physical location, where the first storage system (2600) stores a copy of the dataset within memory devices internal to the first storage system (2600), and further where the dataset is attempted to be kept synchronized, or as nearly synchronized as communication networks available during transport of the first storage system (2600) allow.

Turning toward FIG. 26A, the flowchart illustrates an example method for replication handling during storage system transportation in accordance with some embodiments of the present disclosure. In some implementations, a storage system to be transported can include one or more storage devices, one or more network ports, and one or more storage controllers. Such a storage system may be embodied as one or more of the storage systems described above, including combinations and variants of such storage systems. Such a storage system may be coupled to power supplies, networking resources, and other devices in various embodiments.

The computing environment illustrated in FIG. 26A includes a first storage system (2600) and a second storage system (2650). In this example, the first storage system (2600) and the second storage system (2650) establish a replication relationship that is based on the first storage system (2600) and the second storage system (2650) initiating a replication scheme among themselves, and among any other storage systems that may be included in the replication relationship. A replication scheme may be a synchronous replication scheme, an asynchronous replication scheme, a snapshot-based replication scheme, among any of the other replication schemes described above with reference to FIGS. 4A-25. In some examples, a replication scheme may replicate a dataset among stationary storage systems and storage systems configured to continue replicating during transportation, where the dataset may be any addressable quantity or type of storage content, such as one or more volumes, files, data objects, databases, among other examples described above with reference to FIGS. 4A-25.

Further, in this example, upon initiation of a replication scheme, the first storage system (2600) and the second storage system (2650) may begin to coordinate—consistent with properties and characteristics of the particular replication scheme being used—such that updates to a version of a dataset on the first storage system (2600) and the second storage system (2650) are replicated to the other storage systems that are part of the replication scheme. In some examples, any of the storage systems that are part of a replication scheme may receive updates to a dataset being replicated.

In this way, in some implementations, updates to a dataset—from either users, applications, workloads, or other storage systems—may be received at any of the storage systems and replicated to each other storage system—where the process of replication includes replicating, at or by each respective storage system, a given update to a respective version of a locally stored dataset to be consistent with every other version of the dataset stored on every other storage system that is coordinating to implement the replication scheme.

In other words, in some examples, replicating a dataset includes a given storage system updating a local version of a dataset to be consistent with other storage systems that are also updating respective local versions of the dataset to be consistent with one another—whether an update to a dataset is being received from a user, application, workload, or a computing system outside of the storage systems replicating the dataset, or whether an update to the dataset is being received from another storage system. Additional details for carrying out replication of a dataset in accordance with various replication schemes may be found above with reference to FIGS. 4A-25.

The example method depicted in FIG. 26A includes: replicating (2602), between a first storage system (2600) and a second storage system (2650) that are both located at a first physical location, a dataset (2670); connecting (2604), by the first storage system (2600) and responsive to movement of the first storage system (2600) to an intermediate physical location, to a communication network available at the intermediate physical location; and continuing (2606), between the first storage system at the intermediate physical location and the second storage system (2650) at the first physical location, replication of the dataset (2670) over the communication network available at the intermediate physical location.

Replicating (2602), between a first storage system (2600) and a second storage system (2650) that are both located at a first physical location, a dataset (2670) may be carried out using various techniques. For example, a dataset (2670) may be stored on a second storage system (2650), and the first storage system (2600) may be identified as a backup storage system where replication (2602) includes the first storage system (2600) being identified as a target storage system for synchronously or asynchronously receiving the dataset (2670) and updates to the dataset (2670), and where replication (2602) initially includes copying an entire dataset (2670) from the second storage system (2650) to the first storage system (2600).

In some examples, the first storage system (2600) may be identified as a target storage system via user interface selections of a dashboard, or control console that provides management options for one or more storage systems, including management options for identifying target storage systems for backups, specifying datasets, volumes, or application data to backup or replicate, among other storage management options. Replication of a dataset among storage systems is described in greater detail above with reference to FIGS. 4A-8, where the first storage system (2650) may be considered to have all the functionality and features of the storage systems described above with reference to FIGS. 1A-3D.

In other examples of replicating (2602) a dataset between the first storage system (2600) and a second storage system (2650), the second storage system (2650) and first storage system (2600) may be selected to be members of a pod, as described in the example above, where a dataset may be replicated among the members of the pod. Pods and replication among members of a pod, or a replicated cluster, are described above with reference to FIGS. 4A-8. Further, in this example, member storage systems in a pod may be selected via a user interface allowing for specification of a dataset to be replicated among pod members.

In this example, replicating (2602) a dataset (2670, 2660) may include a second storage system (2650) and a first storage system (2600) using any of the replication schemes described above with reference to FIGS. 4A-25 to replicate a dataset, receive updates to a dataset, and ensure consistency of the dataset among the storage systems replicating the dataset. As illustrated in FIG. 26A, a second storage system (2650) and a first storage system (2600) may each store a local version (2660, 2670) of a dataset being replicated. While in this example, FIG. 26A depicts updates (2672, 2662) to the replicated dataset going from the second storage system (2650) to the first storage system (2600), in other examples, updates may also be sent from the first storage system (2600) to the second storage system (2650), in dependence upon which system receives an update to a dataset.

Continuing with this example, and to provide context for a computational environment for the first storage system (2600) and the second storage system (2650), a first physical location for the first storage system (2600) may be within a traditional, geographically fixed data center. In this example, the first storage system (2600) may be physically connected, via one or more network ports, to one or more networks implemented within the fixed data center. For example, the first communication network may be a Fibre Chanel network. Further, in this example, the first storage system (2600) may be connected to an external power supply provided by the fixed data center. In this way, in this example, while the first storage system (2600) is located within the first physical location, the first storage system (2600) may have a synchronized copy of the dataset (2670) due to the first storage system (2600) and the second storage system (2650) establishing a replication relationship, and being members of a replication scheme prior to physical transport of the first storage system (2600).

Connecting (2604), by the first storage system (2600) and responsive to movement of the first storage system (2600) to an intermediate physical location, to a communication network available at the intermediate physical location may be carried out in accordance with different techniques. For example, a network controller or storage controller on the first storage system (2600) may, responsive to the first storage system (2650) being disconnected from a current communication network and moved to an intermediate physical location, detect a loss of the communication network connection that is available at the first physical location, where the first storage system (2600) is physically located at the first physical location prior to movement. An intermediate physical location may be any physical location between the first physical location and a destination physical location for the first storage system (2600), including the intermediate physical location being on or within a land vehicle, aircraft, watercraft, shipping container, or some other vessel capable of physically transporting the first storage system (2600). Readers will appreciate that the intermediate physical locations, and all locations described herein, may include the location of a vehicle at a particular point in time as the storage system may be loaded on a vehicle and may be undergoing transport through a set of intermediate physical locations.

Further, responsive to detecting the loss of the communication network connection available at the first physical location, a network controller or storage controller on the first storage system (2600) may begin to search for any communication networks available at the intermediate physical location, including wireless 802.11 networks, cellular networks, satellite links, and/or physical network connections, such as Ethernet, Fibre Channel, SCSI, among other physical or wireless networks. Continuing with this example, in response to finding an available communication network at the intermediate physical location, the first storage system (2600) may connect (2604) to the available communication network using a communication protocol that corresponds to the communication network, including communication protocols corresponding to wireless 802.11 networks, cellular networks, satellite links, and/or physical network connections, such as Ethernet, Fibre Channel, SCSI, among other physical or wireless networks.

Continuing (2606), between the first storage system (2600) at the intermediate physical location and the second storage system (2650) at the first physical location, replication (2602) of the dataset (2670) over the communication network available at the intermediate physical location may be carried out using different techniques. For example, the first storage system (2600) may, given the connection to the communication network available at the intermediate physical location, communicate with the second storage system (2650) to determine a recovery point and begin a recovery and resynchronization process to bring the version of the dataset (2660) on the first storage system (2600) in-sync with the version of the dataset (2670) on the second storage system (2650). More specifically, as discussed above with reference to FIGS. 4A-8 in the context of this example, the respective datasets (2660, 2670) on the mobile date center (2600) and the second storage system (2650) may be in-sync and consistent prior to the movement of the first storage system (2600), where during a period after the first storage system (2600) is disconnected from a communication network available at the first physical location and prior to connection (2604) to a communication network available at the intermediate physical location, the datasets (2660, 2670) may become out-of-sync because of updates received at the second storage system (2650) that were unable to be replicated to the first storage system (2600). Furthermore, even if the transported storage is not brought fully in-sync, transfer of some amount of data will reduce the total data to transfer when the transported storage system arrives at its destination and is connected for use.

In this example, the out-of-sync dataset (2660) on the first storage system (2600) may be brought into an in-sync and consistent state relative to the dataset (2670) on the second storage system (2650) in accordance with the data recovery process described above, where recovery includes reconciling differences in applying updates. Further, in the context of a recovery process described above, the first storage system (2600) may be considered to have gone from a "detached" state when disconnected from the communication network available at the first physical location to a "connected" state when connected to the communication network available at the intermediate physical location.

In this way, in this example, after establishing a communication link over the communication network available at the intermediate physical location, the first storage system (2600) may then continue (2606) to replicate data by continuing to use a replication scheme used at the first physical location. However, in other examples, the first storage system (2600) may select a different replication scheme to use while connected to the communication network available at the intermediate physical location, relative to the first physical location, where the different replication scheme selected may be based on characteristics of the communication network available at the intermediate physical location.

More specifically, in some examples, based on new network capabilities at the intermediate physical location, the first storage system (2600) may select a replacement replication scheme to continue replication of the dataset (2670).

Figure 26B:
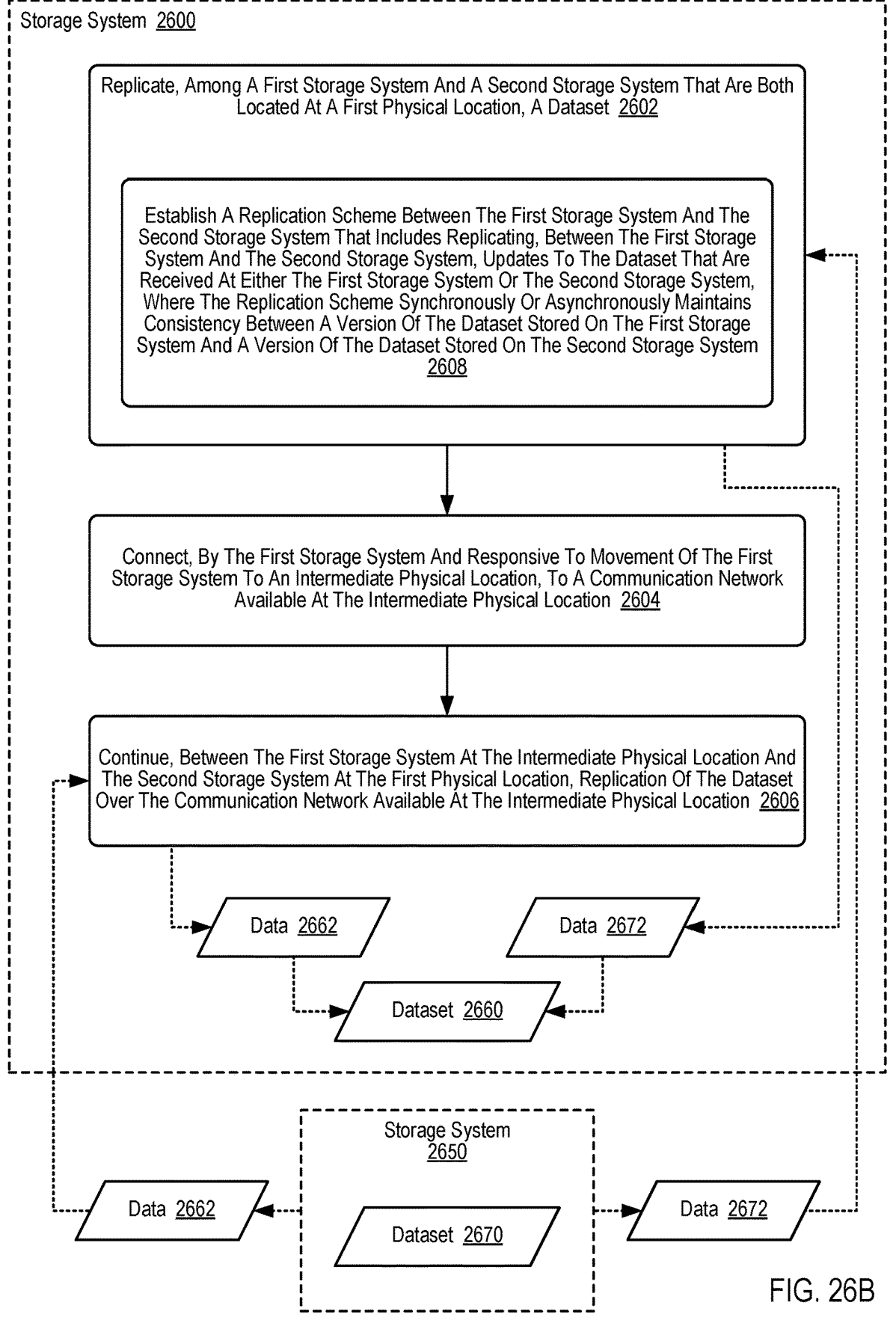

For further explanation, FIG. 26B sets forth a flowchart that illustrates a method for implementing replication handling in a first storage system in accordance with some embodiments of the present disclosure.

In this example, the replication relationship between the first storage system (2600) and the second storage system (2650) is established, where the replication relationship may be based on any of the replication schemes to carry out replicating the dataset as described above with reference to FIG. 26A. While this replication relationship is described above with reference to FIG. 26A, the focus of the flowchart and method described relative to FIG. 26A is on movement of the first storage system (2600) from a first physical location to an intermediate physical location, connection by the first storage system (2600) to a communication network available during transport, and continuing to replicate the dataset between the first storage system (2600) at an intermediate location and the second storage system (2650) at a first physical location.

The example method depicted in FIG. 26A is similar to the example method depicted in FIG. 26B in that the example method depicted in FIG. 26B also includes: replicating (2602), between a first storage system (2600) and a second storage system (2650) that are both located at a first physical location, a dataset (2670); connecting (2604), by the first storage system (2600) and responsive to movement of the first storage system (2600) to an intermediate physical location, to a communication network available at the intermediate physical location; and continuing (2606), between the first storage system (2600) at the intermediate physical location and the second storage system (2650) at the first physical location, replication of the dataset (2670) over the communication network available at the intermediate physical location.

However, the example method depicted in FIG. 26B further specifies that replicating (2602), between a first storage system (2600) and a second storage system (2650) that are both located at a first physical location, a dataset (2670) includes: establishing (2608) a replication scheme between a first storage system (2600) and a second storage system (2650) that includes replicating (2602), between the first storage system (2600) and the second storage system (2650), updates to the dataset (2660, 2670) that are received at either the first storage system (2600) or the second storage system (2650), where the replication scheme synchronously or asynchronously maintains consistency between a version of the dataset (2660) stored on the first storage system (2600) and a version of the dataset (2670) stored on the second storage system (2650).

Establishing (2608) a replication scheme between a first storage system (2600) and a second storage system (2650) that includes replicating (2602), between the first storage system (2600) and the second storage system (2650), updates to the dataset (2660, 2670) that are received at either the first storage system (2600) or the second storage system (2650) may be carried out using various techniques. For example, a user may select, via a user interface providing storage system management options for storage systems, the first storage system (2600) and the second storage system (2650) to begin replicating a specified dataset, where the user may specify any of the types of datasets described above, and where the user may also specify the type of replication scheme to use to replicate the dataset. As described above, in some examples, the user may specify a type of replication scheme and members of a pod and one or more datasets to be replicated among the members of the pod, where the members of the pod may be one or more storage systems.

Example replication schemes are described above with reference to FIGS. 26A, and include replication schemes that synchronously or asynchronously maintain consistency between respective versions of a replicated dataset stored on respective storage systems, including, with reference to FIG. 26B, maintaining consistency between a version of a dataset (2660) stored on the first storage system (2600) and a version of the dataset (2670) stored on the second storage system (2650).

Figure 27:
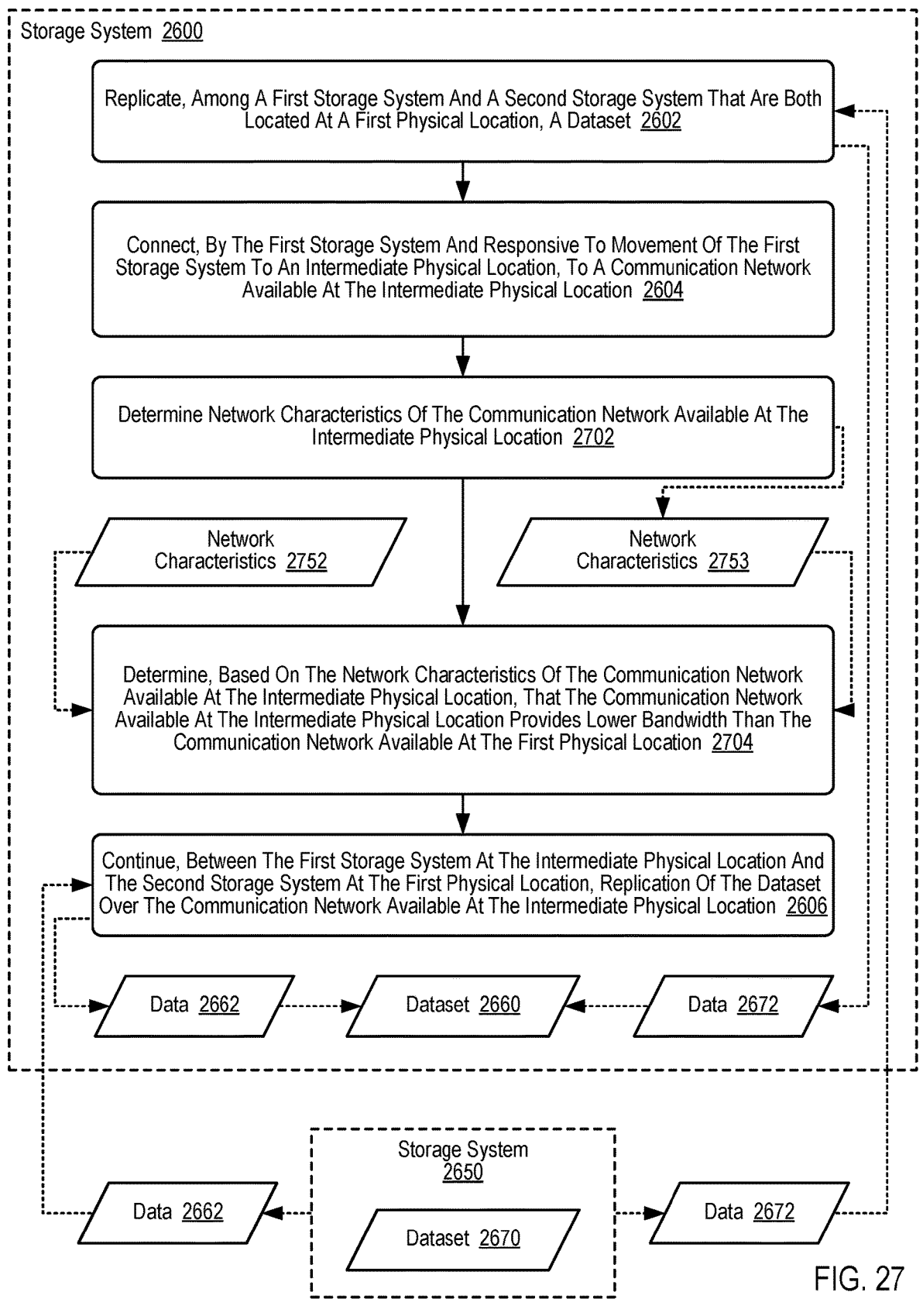

For further explanation, FIG. 27 sets forth a flowchart that illustrates a method for implementing replication handling during storage system transportation in accordance with some embodiments of the present disclosure. Also depicted in this example is an additional storage system (2650).

The first storage system (2600) and the second storage system (2650) may implement data storage features described above with reference to FIGS. 1A-26, as the first storage system (2600) and the second storage system (2650) may include some or all of the components described above. However, as described above, the first storage system (2600) may also implement additional features that support mobility of the first storage system (2600) and continued data replication during transport.

In this example, the first storage system (2600), following the example of FIG. 26A describing the first storage system (2600) moving to an intermediate physical location, determines that network capabilities, such as bandwidth capacity, are lower at a communication network available at the intermediate physical location—where in a later example, described below with respect to FIG. 28, a selection is made for an appropriate replication scheme to use based on network characteristics of the communication network available at the intermediate physical location.

The example method depicted in FIG. 27 is similar to the example method depicted in FIG. 26A in that the example method depicted in FIG. 27 also includes: replicating (2602), between a first storage system (2600) and a second storage system (2650) that are both located at a first physical location, a dataset (2670); connecting (2604), by the first storage system (2600) and responsive to movement of the first storage system (2600) to an intermediate physical location, to a communication network available at the intermediate physical location; and continuing (2606), between the first storage system (2600) at the intermediate physical location and the second storage system (2650) at the first physical location, replication of the dataset (2670) over the communication network available at the intermediate physical location.

However, the example method depicted in FIG. 27 further includes: determining (2702) network characteristics of the communication network available at the intermediate physical location; and determining (2704), based on the network characteristics of the communication network available at the intermediate physical location, that the communication network available at the intermediate physical location provides lower bandwidth than the communication network available at the first physical location.

Determining (2702) network characteristics of the communication network available at the intermediate physical location may be carried out using traditional hardware and software techniques for a network controller scanning for and identifying physical or wireless networks that may be available at one or more network ports. Further, a network controller, may, given a determination that a communication network is available, determine network characteristics based on a type of the available communication network, where network characteristics include transmission rates and/or bandwidth capacity. For example, if the communication network available at the intermediate physical location is an Ethernet connection, then such a network connection has commonly associated features and network characteristics, such as transmission rates and/or bandwidth capacity. Similarly, network characteristics for the communication network available at the intermediate physical location may be based on whether a type of network connection is Fibre Channel, wireless 802.11, a satellite link, among other example communication networks described above.

Determining (2704), based on the network characteristics (2752) of the communication network available at the intermediate physical location, that the communication network available at the intermediate physical location provides lower bandwidth than the communication network available at the first physical location may be carried out using different techniques. For example, the communication network available at the first physical location is a Fibre Channel network, and the storage controller may track metrics, including network characteristics, corresponding to communication networks used during the replication of the dataset, where the network characteristics corresponding to communication networks used during the replication of the dataset may be determined similarly to determining (2702) the network characteristics described above. Further, given network characteristics of the communication network available at the first physical location and network characteristics of the communication network available at the intermediate physical location, the storage controller may determine that network bandwidth available at the intermediate physical location is lower than the bandwidth that was available at the first physical location.

For example, if the communication network available at the intermediate physical location is a wireless 802.11 network, and as noted above, the communication network available at the first physical location was Ethernet, then the bandwidth capabilities indicated by respective network characteristics of these networks may be compared to determine that the bandwidth available on the communication network at the intermediate physical location is lower than the bandwidth available on the communication network at the first physical location.

As noted above, this determination (2704) of a lower bandwidth availability may be used to select a replacement replication scheme to used that is more appropriate to the lower bandwidth capacity of the communication network available at the intermediate physical location, where such a selection is described below with reference to FIG. 28.

Figure 28:
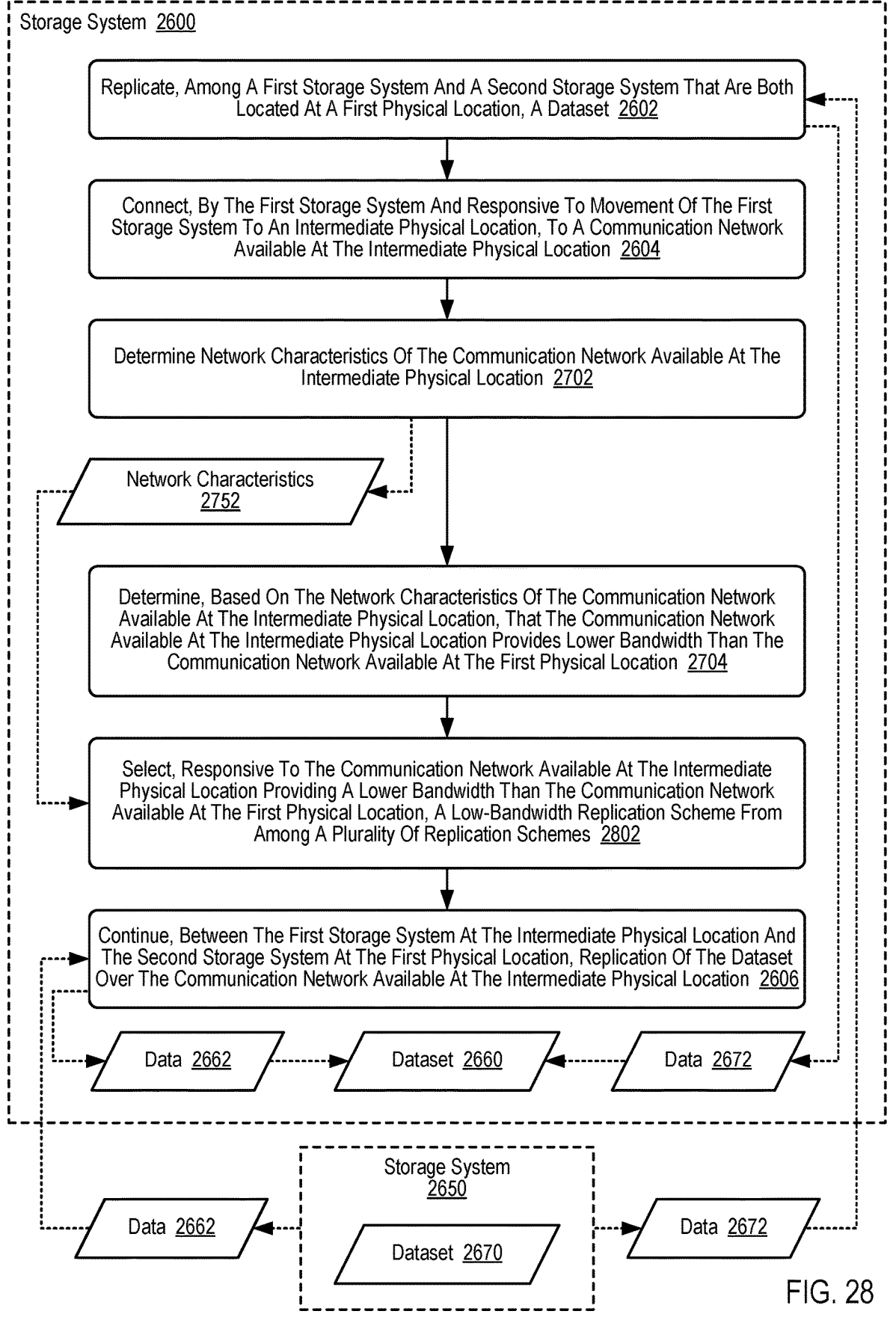

For further explanation, FIG. 28 sets forth a flowchart that illustrates a method for implementing replication handling during storage system transportation in accordance with some embodiments of the present disclosure. Also depicted in this example is an additional storage system (2650).

In this example—which continues the example above with reference to FIG. 27, which describes determining that network characteristics, such as network bandwidth capacity, are lower at a communication network available at the intermediate physical location—a selection is made for a lower bandwidth replication scheme to use based on the network characteristics of the communication network available at the intermediate physical location.

The example method depicted in FIG. 28 is similar to the example method depicted in FIG. 27 in that the example method depicted in FIG. 28 also includes: replicating (2602), between a first storage system (2600) and a second storage system (2650) that are both located at a first physical location, a dataset (2670); connecting (2604), by the first storage system (2600) and responsive to movement of the first storage system (2600) to an intermediate physical location, to a communication network available at the intermediate physical location; continuing (2606), between the first storage system (2600) at the intermediate physical location and the second storage system (2650) at the first physical location, replication of the dataset (2670) over the communication network available at the intermediate physical location; determining (2702) network characteristics of the communication network available at the intermediate physical location; and determining (2704), based on the network characteristics of the communication network available at the intermediate physical location, that the communication network available at the intermediate physical location provides lower bandwidth than the communication network available at the first physical location.

However, the example method depicted in FIG. 28 further includes: selecting (2802), responsive to the communication network available at the intermediate physical location providing lower bandwidth than the communication network available at the first physical location, a low-bandwidth replication scheme from among a plurality of replication schemes.

Selecting (2802), responsive to the communication network available at the intermediate physical location providing lower bandwidth than the communication network available at the first physical location, a low-bandwidth replication scheme from among a plurality of replication schemes may be carried out using different techniques. For example, in response to determining (2704) that the communication network available at the intermediate physical location provides lower bandwidth than the communication network available at the first physical location, the storage controller may access a table that maps each of the plurality of supported replication schemes with preferred types of communication networks, and where each of the mapped preferred types of communication networks correspond to respective bandwidth capacity ranges. The plurality of replication schemes supported may include the replication schemes described above with reference to FIG. 26A.

Continuing with this example, the lower bandwidth provided by the communication network available at the intermediate physical location may be matched to a bandwidth capacity range for one or more replication schemes, where the selected low-bandwidth replication scheme may be based on an estimate of which of the matching one or more replication schemes will likely result in a greatest amount of synchronization of the dataset during transport of the first storage system (2600). In some examples, the low-bandwidth replication scheme may be an asynchronous replication scheme, such as a snapshot-based replication scheme, where the initial, higher bandwidth replication scheme may be a synchronous replication scheme.

Figure 29:
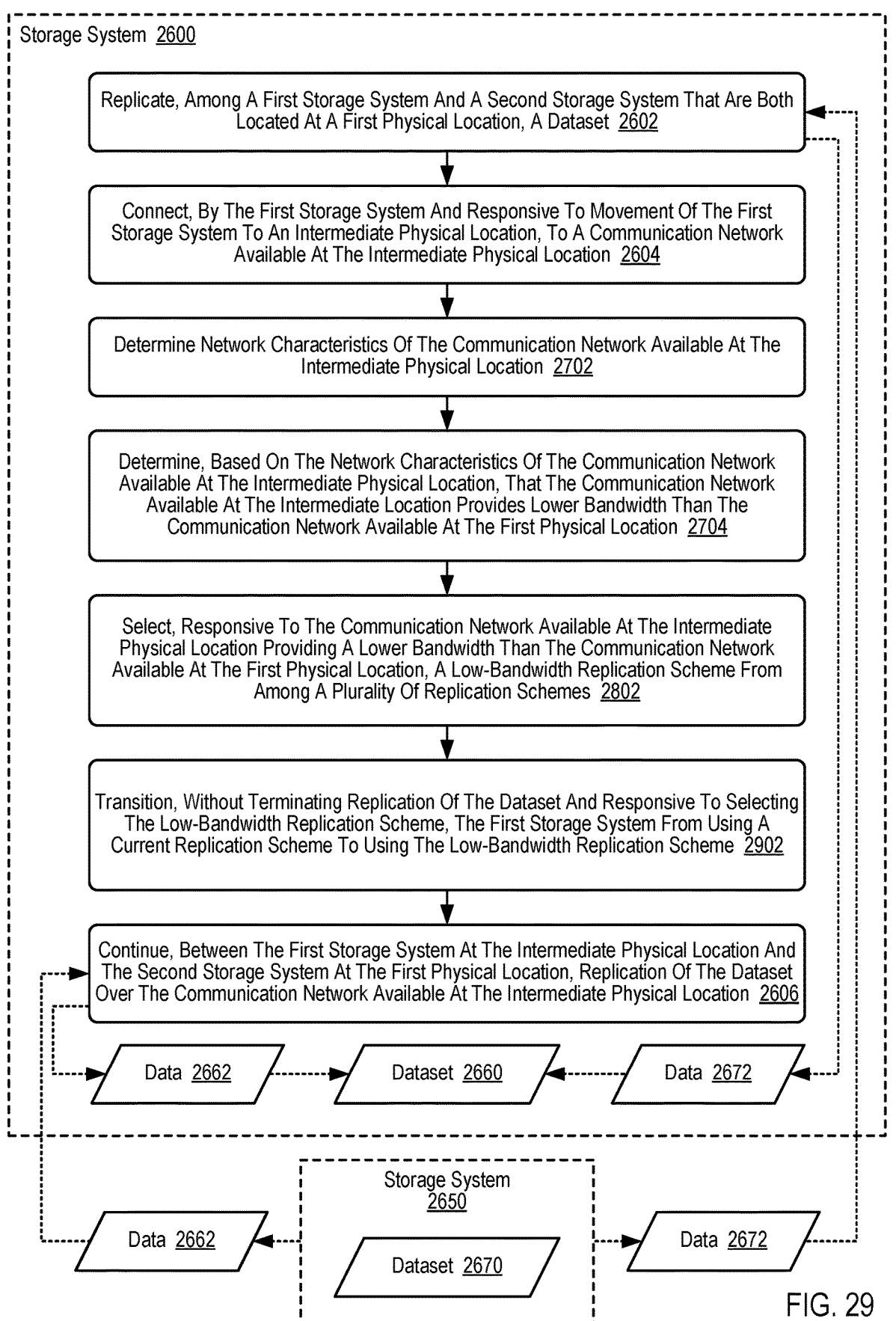

For further explanation, FIG. 29 sets forth a flowchart that illustrates a method for implementing replication handling during storage system transportation in accordance with some embodiments of the present disclosure. Also depicted in this example is an additional storage system (2650).

In this example, which continues after the first storage system (2600) has selected (2802) a low-bandwidth replication scheme, now performs a transition from the previous replication scheme—used when the first storage system (2600) was connected to a communication network at the first physical location—to the selected (2802), low-bandwidth replication scheme.

The example method depicted in FIG. 29 is similar to the example method depicted in FIG. 28 in that the example method depicted in FIG. 29 also includes: replicating (2602), between a first storage system (2600) and a second storage system (2650) that are both located at a first physical location, a dataset (2670); connecting (2604), by the first storage system (2600) and responsive to movement of the first storage system (2600) to an intermediate physical location, to a communication network available at the intermediate physical location; continuing (2606), between the first storage system (2600) at the intermediate physical location and the second storage system (2650) at the first physical location, replication of the dataset (2670) over the communication network available at the intermediate physical location; determining (2702) network characteristics of the communication network available at the intermediate physical location; determining (2704), based on the network characteristics of the communication network available at the intermediate physical location, that the communication network available at the intermediate physical location provides lower bandwidth than the communication network available at the first physical location; and selecting (2802), responsive to the communication network available at the intermediate physical location providing lower bandwidth than the communication network available at the first physical location, a low-bandwidth replication scheme from among a plurality of replication schemes.

However, the example method depicted in FIG. 29 further includes: transitioning (2902), without terminating replication of the dataset and responsive to selecting (2802) the low-bandwidth replication scheme, the first storage system (2600) from using a current replication scheme to using the low-bandwidth replication scheme.

Transitioning (2902), without terminating replication of the dataset and responsive to selecting (2802) the low-bandwidth replication scheme, the first storage system (2600) from using a current replication scheme to using the low-bandwidth replication scheme may be carried out using various techniques. For example, as discussed above, responsive to movement of the first storage system (2600) to an intermediate physical location, the first storage system (2600) may lose connection to a current communication network that had been available at the first physical location, where continuation (2606) of the replication may include the first storage system (2600) undergoing a data recovery process responsive to connecting (2604) to the communication network available at the intermediate physical location.

Given this context described above with reference to FIG. 26A, the selection (2802) of the low-bandwidth replication scheme may be performed by a storage controller after connecting (2604) to the communication network available at the intermediate physical location and prior to continuing (2606) replication of the dataset. Additionally, prior to continuing (2606) replication of the dataset, the storage controller may transition (2902) to using the low-bandwidth replication scheme prior to the data recovery process. Further, as discussed above, the plurality of replication schemes, including the initial replication scheme and the low-bandwidth replication scheme, may be based on a common management model and use similar techniques for data recovery, communicating updates to the dataset included in the various type of replication, including synchronous replication and asynchronous replication.

In some examples, the initial replication scheme may be a synchronous replication scheme and the low-bandwidth replication scheme may be an asynchronous replication scheme, where both replication schemes transfer identified blocks and identified segments. Further, in this example, given identifiers for the blocks and segments, the first storage system (2600) may transition from synchronous replication to asynchronous replication and continue replication because the first storage system (2600) is aware of the blocks and segments it has already received and how to incorporate additionally received blocks and segments as they continue arriving in accordance with the asynchronous replication scheme.

Further, in this example, because synchronization and data replication are based on a common management model, the transitioning (2902) from the current replication scheme (synchronous replication) to the low-bandwidth replication scheme (asynchronous replication) may be carried out by dropping the in-sync state of the dataset (2660), and leaving the replication state in a state of recovery, which may be considered an indefinite state as long as asynchronous replication is enabled. Similarly, responsive to the first storage system (2600) arriving at a destination physical location, such as an on-prem site, or another geographically fixed data center, the first storage system (2600) may switch from asynchronous replication to synchronous replication by setting the in-sync state to synchronized in response to the first storage system (2600) catching up, or synchronizing the dataset (2660) with the other storage systems that are replicating the dataset (2670).

For further explanation, FIG. 30 sets forth a flowchart that illustrates a method for implementing replication handling during storage system transportation in accordance with some embodiments of the present disclosure. Also depicted in this example is an additional storage system (2650).

In this example, during transport, a first storage system (2600) may, over the course of traveling over a large distance, discover new wireless networks and lose connections with other wireless networks, or in some cases, connect and disconnect from wired communication networks. As described below, in this example, a first storage system (2600) that has already transitioned (2902) to a low-bandwidth replication scheme, determines that available networks have changed, and in response, the first storage system (2600) undergoes another transition to a different type of replication scheme.

The example method depicted in FIG. 30 is similar to the example method depicted in FIG. 29 in that the example method depicted in FIG. 30 also includes: replicating (2602), between a first storage system (2600) and a second storage system (2650) that are both located at a first physical location, a dataset (2670); connecting (2604), by the first storage system (2600) and responsive to movement of the first storage system (2600) to an intermediate physical location, to a communication network available at the intermediate physical location; continuing (2606), between the first storage system (2600) at the intermediate physical location and the second storage system (2650) at the first physical location, replication of the dataset (2670) over the communication network available at the intermediate physical location; determining (2702) network characteristics of the communication network available at the intermediate physical location; determining (2704), based on the network characteristics of the communication network available at the intermediate physical location, that the communication network available at the intermediate physical location provides lower bandwidth than the communication network available at the first physical location; selecting (2802), responsive to the communication network available at the intermediate physical location providing lower bandwidth than the communication network available at the first physical location, a low-bandwidth replication scheme from among a plurality of replication schemes; transitioning (2902), without terminating replication of the dataset and responsive to selecting (2802) the low-bandwidth replication scheme, the first storage system (2600) from using a current replication scheme to using the low-bandwidth replication scheme.

However, the example method depicted in FIG. 30 further includes: selecting (3002), based on a change in network availability at the intermediate physical location and on expected performance improvement replicating the dataset, a replacement replication scheme; and transitioning (3004), responsive to selecting (3002) the replacement replication scheme, from the low-bandwidth replication scheme to the replacement replication scheme.

Selecting (3002), based on a change in network availability at the intermediate physical location and on expected performance improvement replicating the dataset, the replacement replication scheme may be carried out using various techniques. For example, during transport, the first storage system (2600) may be moved from a physical location where only a cellular network is available into a physical location where a wireless 802.11 network is available. In this example, the intermediate physical location may change, however, in other examples, the intermediate physical location may remain the same while different communication networks become available. As noted above, based on periodic polling, or based on detecting a network event, a storage controller or network controller on the first storage system (2600) may determine changes in available networks. In this example, given the determined change in available networks, the storage controller may, similarly to selecting (2802) the low-bandwidth replication scheme, select (3002) a replacement replication scheme based on a type of available network and/or based on available bandwidth capacity for the newly available network.

For example, based on an increase in network bandwidth, the first storage system (2600) may select a replacement replication scheme to improve the performance of replicating the dataset based on the replacement replication scheme being more capable than the current low-bandwidth replication scheme of making use of the increased network bandwidth. For example, the first storage system (2600) may transition from the asynchronous replication specified by the low-bandwidth replication scheme back to a synchronous replication scheme.

Transitioning (3004), responsive to selecting the replacement replication scheme, from the low-bandwidth replication scheme to the replacement replication scheme may be carried out using different techniques. For example, transitioning (3004) from the low-bandwidth replication scheme to the replacement replication scheme may be performed similarly to the previous transition (2902) from the initial replication scheme to the low-bandwidth replication scheme described above with reference to FIG. 29.

Figure 31:
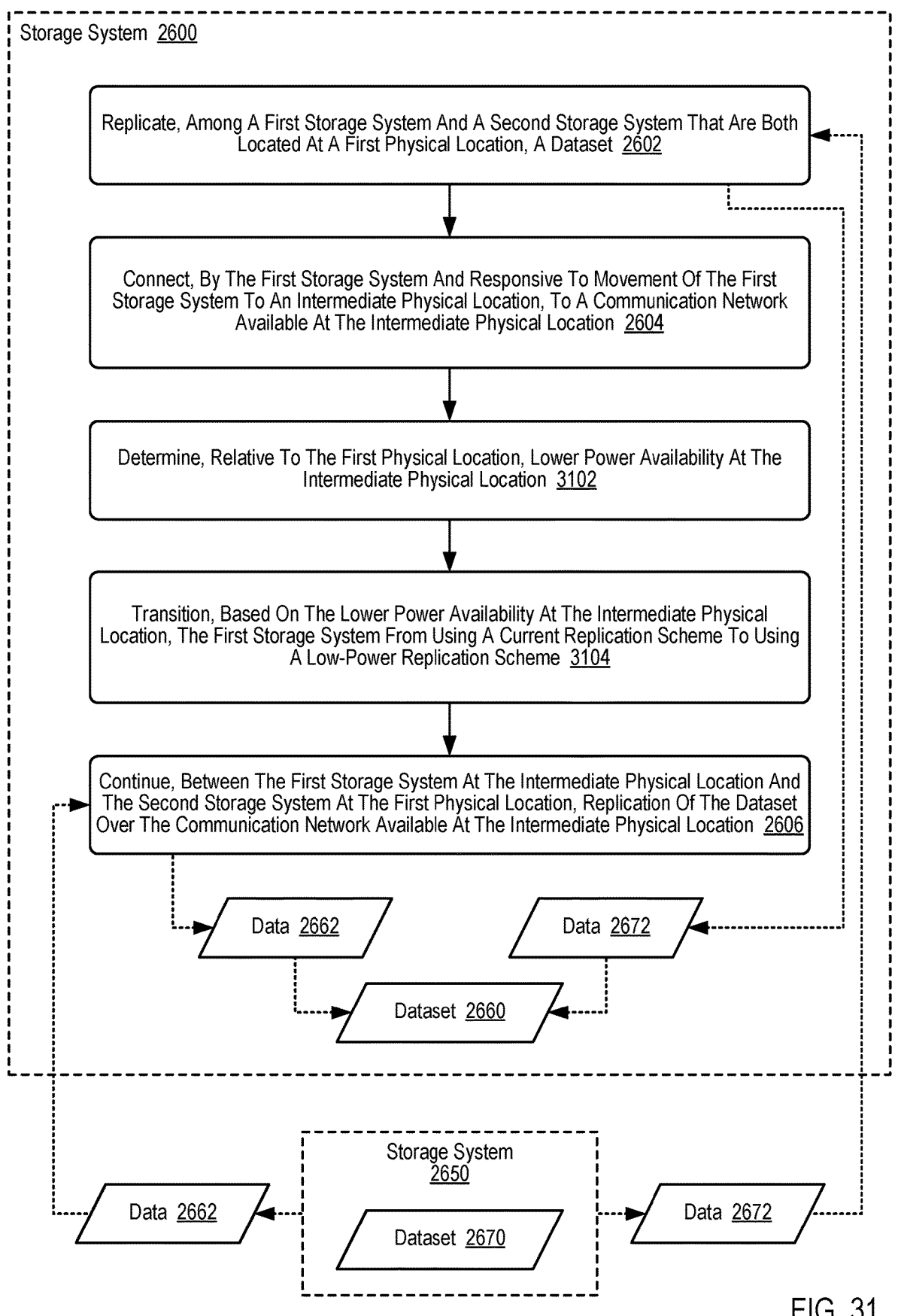

For further explanation, FIG. 31 sets forth a flowchart that illustrates a method for implementing replication handling during storage system transportation in accordance with some embodiments of the present disclosure. Also depicted in this example is an additional storage system (2650).

In this example, a trigger for a first storage system (2600) switching between replication schemes—in addition to switching based on available networks or instead of switching based on available networks—may be a change in power sources. Specifically, in this example, in response to being unplugged from an external power source, the first storage system (2600) may switch to internal power, and correspondingly switch to a replication scheme that only operates intermittently, thereby conserving power, or that can operate with fewer powered-on components, or in lower power modes for the components that are powered on.

The example method depicted in FIG. 31 is similar to the example method depicted in FIG. 26A in that the example method depicted in FIG. 31 also includes: replicating (2602), between a first storage system (2600) and a second storage system (2650) that are both located at a first physical location, a dataset (2670); connecting (2604), by the first storage system (2600) and responsive to movement of the first storage system (2600) to an intermediate physical location (e.g., during physical transport on a vehicle), to a communication network available at the intermediate physical location; and continuing (2606), between the first storage system (2600) at the intermediate physical location and the second storage system (2650) at the first physical location, replication of the dataset (2670) over the communication network available at the intermediate physical location.

However, the example method depicted in FIG. 31, in contrast to the example method described with reference to FIG. 26A, further includes: determining (3102), relative to the first physical location, lower power availability at the intermediate physical location; and transitioning (3104), based on the lower power availability at the intermediate physical location, the first storage system (2600) from using a current replication scheme to using a low-power replication scheme.

Determining (3102) lower power availability at the second physical location may be carried out by, for example, detecting a transition from using an external power source, such as a power outlet, to using an internal power source such as a battery, where detection may include detecting loss of power from the external power source and handling a transition to battery power. For example, at the first physical location, which may be a geographically fixed data center, the first storage system (2600) may be plugged in to an external power supply, where prior to transport, the first storage system (2600) may be unplugged from the external power supply, which may trigger an automatic switch to using an internal power source. In some embodiments, the storage system may be able to run in a lower power mode when running from batteries or other limited power sources associated with the transport. In fact, the storage system may be configured to detect that the available power is lower by measuring lowered voltage levels or less available current, thereby causing the storage system to enter the lower power mode.

Transitioning (3104), based on the lower power availability at the intermediate physical location, the first storage system (2600) from using a current replication scheme to using a low-power replication scheme may be carried out using different techniques. For example, transitioning (3104) from using a current replication scheme to using a low-power replication scheme may be carried out similarly to transitioning (2902) the first storage system (2600) from using a current replication scheme to using a low-bandwidth replication scheme, as described above with reference to FIG. 29. For example, in response to determining (3102) the lower power availability, the storage controller may access a table that corresponds each of the plurality of replication schemes with an indication of whether or not the respective replication scheme is a low-power replication scheme or not. For example, each asynchronous replication scheme may be mapped to indicate a low-power replication scheme, and each synchronous replication scheme may be mapped to indicate a high-power replication scheme. In this way, the storage controller may identify and select a low-power replication scheme to serve as the replacement replication scheme to transition (3104) into.

Figure 32:
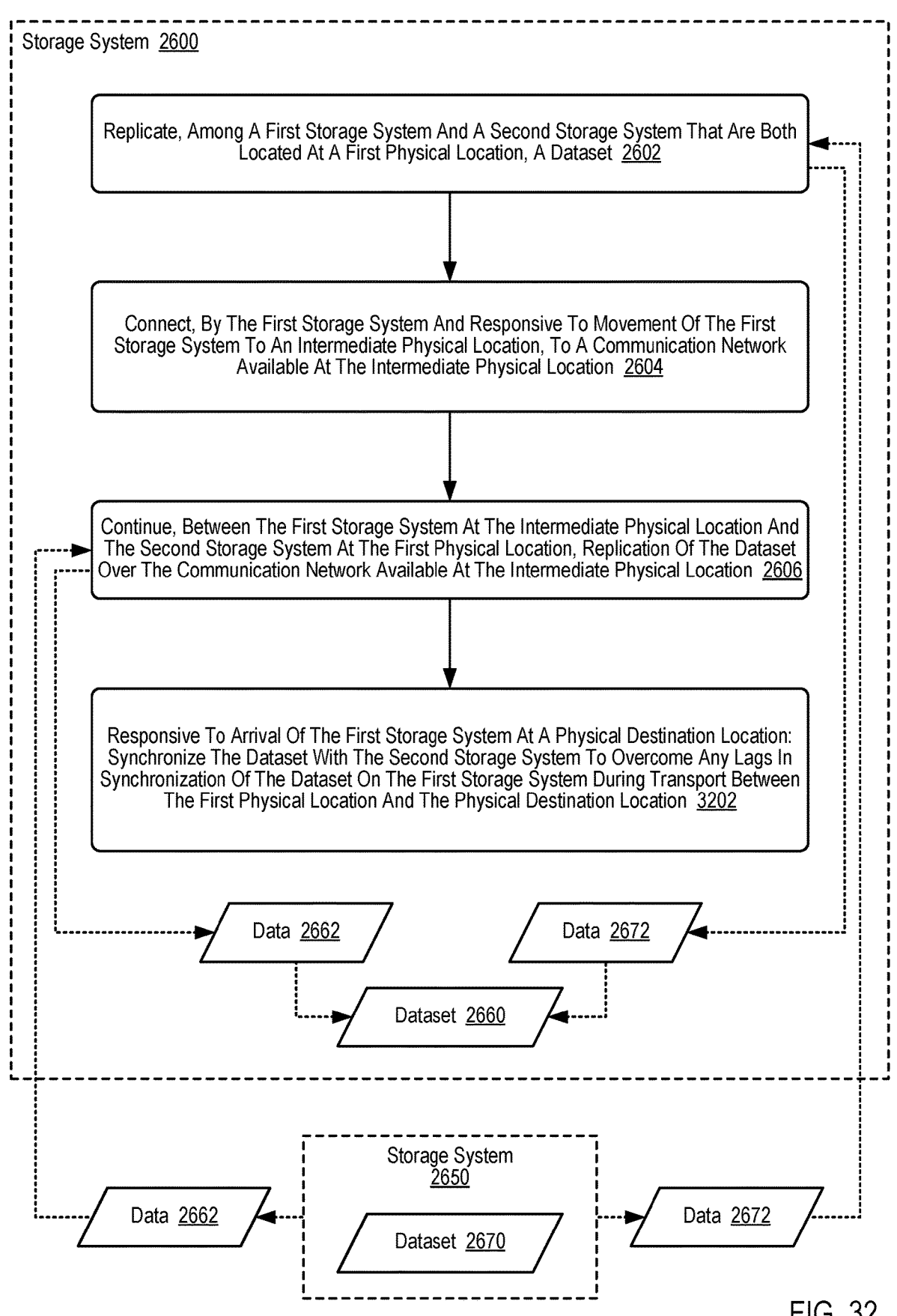

For further explanation, FIG. 32 sets forth a flowchart that illustrates a method for implementing replication handling during storage system transportation in accordance with some embodiments of the present disclosure. Also depicted in this example is an additional storage system (2650).

In this example, a trigger for a first storage system (2600) transitioning between replication schemes may be arrival at a physical destination location. Specifically, in this example, in response to arriving at a physical destination location, the first storage system (2600) identifies available networks and switches to one of the available networks.

The example method depicted in FIG. 32 is similar to the example method depicted in FIG. 26A in that the example method depicted in FIG. 32 also includes: replicating (2602), between a first storage system (2600) and a second storage system (2650) that are both located at a first physical location, a dataset (2670); connecting (2604), by the first storage system (2600) and responsive to movement of the first storage system (2600) to an intermediate physical location, to a communication network available at the inter-mediate physical location; and continuing (2606), between the first storage system (2600) at the intermediate physical location and the second storage system (2650) at the first physical location, replication of the dataset (2670) over the communication network available at the intermediate physi-cal location.

However, the example method depicted in FIG. 32 further includes: responsive to arrival of the first storage system (2600) to a physical destination location: synchronizing (3202), with the second storage system (2650) to overcome any lags in synchronization of the dataset (2660) on the first storage system (2600) during transport between the first physical location and the physical destination location.

Synchronizing (3202), with the second storage system (2650) to overcome any lags in synchronization of the dataset (2660) on the first storage system (2600) during transport between the first physical location and the physical destination location, where synchronizing (3202) is respon-sive to arrival of the first storage system (2600) to the physical destination location may be carried out using various techniques.

For example, the first storage system (2600) may, in response to arriving at the physical destination location, determine availability of a communication network as described above with reference to FIG. 27. Specifically, a storage controller or network controller may periodically scan for available networks or respond to network events, such as physical connections to a port or detection of a wireless network. Further, given determination of an avail-able communication network at the physical destination location and establishing a communication link, the first storage system (2600) may synchronize (3202) the local dataset (2660) with the version of the dataset (2670) on the second storage system (2650).

Specifically, in this example, synchronization may be carried out similarly to how the first storage system (2600) continues (2606) replication of the dataset during transport, where the first storage system (2600) may communicate with the second storage system (2650) to determine a recovery point and begin a recovery and resynchronization process to bring the version of the dataset (2660) on the first storage system (2600) in-sync with the version of the dataset (2670) on the second storage system (2650). As discussed above with reference to FIGS. 4A-8 in the context of this example, the respective datasets (2660, 2670) on the mobile date center (2600) and the second storage system (2650) may be in-sync and consistent prior to the movement of the first storage system (2600), where during a period after the first storage system (2600) is disconnected from a commu-nication network available at the first physical location and prior to connection (2604) to a communication network available at the intermediate physical location, the datasets (2660, 2670) may become out-of-sync because of updates received at the second storage system (2650) that were unable to be replicated to the first storage system (2600). In this example, the out-of-sync dataset (2660) on the first storage system (2600) may be brought into an in-sync and consistent state relative to the dataset (2670) on the second storage system (2650) in accordance with the data recovery process described above, where recovery includes reconcil-ing differences in applying updates. In this example, the communication network available at the physical destination location may become visible to the first storage system (2600) in response to plugging in one or more network cables for available networks into one or more correspond-ing network ports on the first storage system (2600), or by the first storage system (2600) logging in to one or more wireless networks available at the third physical location.

While the above implementations provide explanations that closely track the example flowcharts of FIGS. 26A-32, what follows are additional considerations with regard to implementations of a first storage system (2600).

As discussed above, in some implementations, a first storage system (2600) may be a member of a cluster of storage systems that are replicating a dataset (2660). In such an example, the first storage system (2600) may—during a relocation of the first storage system (2600) from a first physical location to a physical destination location—con-tinue replicating the dataset (2660) as the dataset (2660) is being modified, by either the second storage system (2650) or the first storage system (2600). In this way, in this example, the first storage system (2600), upon arrival to the physical destination location, may arrive with a dataset (2660) that is at least partially synchronized with a dataset (2670) being replicated by the cluster of storage systems in the first physical location.

Continuing with this example, in some cases, the first storage system (2600) may be unable to maintain a dataset (2660) synchronized with other members of the cluster of storage systems. For example, available bandwidth for avail-able communication links during transport may be insuffi-cient to maintain the dataset (2660) on the first storage system (2600) synchronized with the other members of the cluster of storage systems.

In such an example, the first storage system (2600), upon arrival at a physical destination location, may synchronize its dataset (2660) within a timeframe that depends on a quantity of changes to the dataset that were unable to be transferred within bandwidth limitations over one or more communication links that were available during transport. In other words, in some examples, during transport, commu-nication links that may be available to the first storage system (2600) may be wireless communication links that operate at lower bandwidths and at higher latency times as compared to communication links available at transport endpoints, including the first physical location and the physical destination location.

In some implementations, responsive to changes in available communication networks, and corresponding changes to network capacity, changes in network response times, or changes in other network characteristics, a first storage system (2600) may also switch between replication schemes. For example, a first storage system (2600) may switch from a current replication scheme that had been selected based on network characteristics or conditions that have changed to a replacement replication scheme that may have network transport requirements, such as bandwidth or latency requirements, that may be satisfied by the changed, or new network conditions or network characteristics.

Further, the first storage system (2600) may implement multiple different replication schemes, where the different replication schemes are based on a common management model for implementing the replication schemes. In some implementations, the common management model may be a basis that enables the first storage system (2600) to switch from one type of replication scheme to a different type of replication scheme—where switching between replication schemes may be based on a common management model used to support the different types of replication schemes. Further, the first storage system (2600) may be a member of a cluster of storage systems replicating data, where each member also implements multiple replication schemes that are based on a same common management model.

As one particular example, with reference to FIG. 26A, in some implementations, prior to transport, a first storage system (2600) may be synchronously replicating a dataset among the cluster of storage systems at the first physical location. For the sake of clarity, a single storage system (2650) is depicted in FIG. 26A; however, in other examples, and as described above with reference to FIGS. 4A-6B, a cluster may include an arbitrary number of storage systems replicating datafirst storage system.

As noted above, the communication networks available to a first storage system (2600) during transport may be unable to support latency requirements or data bandwidth rates that are sufficient to maintain the dataset on the first storage system (2600) synchronized with the rest of the storage systems in the cluster of storage systems.

In this case of a degradation in network bandwidth availability, such a change in network performance or network characteristics may serve as a basis for the first storage system (2600) switching to a different replication scheme. Further, in some instances, such a change in network performance or network characteristics may or may not be related to transport or movement of the first storage system (2600).

In some implementations, with regard to switching replication schemes responsive to changing networks, a given replication scheme may have an associated network profile of communication requirements. For example, a network profile for a given replication scheme may specify, among other criteria, minimum bandwidth requirements, security levels, resiliency specifications, or minimum and/or maximum network latency values. In this example, a respective network profile corresponding to each respective replication scheme may be used in selecting a replacement replication scheme in response to changes in network performance or network characteristics.

Continuing with this example implementation, the first storage system (2600) may, responsive to detecting that available communication links are unable to support, or consistently support, synchronous replication, switch to a different replication scheme, such as periodic replication, or some other data replication scheme that may be supportable given the bandwidth on the available communication networks.

In this way, in some examples, some level of data replication may continue during transport of the first storage system (2600) from a first physical location to a physical destination location. In other words, some quantity of dataset (2660) updates may continue to be applied to the dataset (2660) on the first storage system (2600), but not all dataset (2660) updates may be made that are being made on the synchronously replicated dataset (2760) among the cluster of storage systems at the first physical location.

Further, in this example, upon arrival, because some quantity of dataset (2660) updates continued at the first storage system (2600) during transport, synchronizing the dataset (2660) after the first storage system (2600) arrives at the physical destination location will take less time than if all updates to the dataset (2660) had to be made.

Further still, after arrival of the first storage system (2600) at the physical destination location, and after the first storage system (2600) is physically connected to one or more physical networks at the second physical location, the first storage system (2600) may detect availability of the available networks. In this example, in response to detecting availability of the available networks at the second physical location, the first storage system (2600) may switch to a different replication scheme, which in this example may be synchronous replication.

In this way, in this example, after the first storage system (2600), over the higher-bandwidth network, synchronizes the local dataset (2660) with the dataset (2670) being synchronously replicated among the cluster of storage systems, the first storage system (2600) may continue synchronization of the dataset (2660) on the first storage system (2600).

In some implementations, a first storage system (2600) may be a storage system, such as storage systems described above with reference to FIGS. 1A-25. For example, a first storage system (2600) may include the same, fewer, or additional components as the storage systems described above.

In some implementations, a first storage system (2600) may be configured such that it may continue operation in response to being physically disconnected from a physical location. For example, a first storage system (2600), in addition to including components for implementing a storage system, such as storage systems described above, may also include a power supply. In some examples, the power supply may be a battery, and in other examples, a power supply may be based on generating power by capturing and converting kinetic energy, or based on generating power from the use of solar cells. Further, in some examples, the first storage system (2600) may have an external power source available during transport. This external power source associated with transport may also provide for less than the full power demands of the storage system, so the storage system may operate in a low power mode, even if the amount of power is greater than might be the case from running purely on internal batteries.

In some implementations, the first storage system (2600) may include multiple network ports for physical network connections in accordance with the multiple physical networks described above with reference to FIGS. 4A-25. Further, the first storage system (2600) may include network ports for establishing wireless communication links over a cellular network or mobile network, such as 4G, 5G, or LTE, provided by telecommunication providers.

In other examples, the first storage system (2600) may include network ports for establishing wireless communication links over a wireless network, such as an Institute of Electrical and Electronics Engineers (IEEE) 802.11 wireless network, among others. In some examples, as a first storage system (2600) moves from one location to another location, different wireless networks may become available, and the first storage system (2600) may switch between network transport layers as described above with reference to FIGS. 9-25. In some embodiments, the first storage system (2600) may only include LAN/SAN ports and may be connected to a local switch that enables wireless communications, as the first storage system (2600) may be connected to the local switch that is configured for wireless communications, such that the local switch effectively translates wired communications exchanged between the first storage system (2600) and the local switch to wireless communications exchanged between the local switch and other devices.

Continuing with this example, in some implementations, the first storage system (2600) may use the common management model to provide different replication schemes a consistent, and uniform interface to disparate, or different, underlying network messaging mechanisms. For example, among multiple network ports of the first storage system (2600), one network port may be connected to a TCP/IP network, and another network port may be connected to a Fibre Channel network. Similarly, the first storage system (2600) may include additional network ports that provide support for additional physical or wireless communication links in accordance with one or more underlying network messaging mechanisms.

In some implementations, a first storage system (2600) may implement multiple, distinct types of replication schemes. In some examples, distinct replication schemes may include, among others not listed, synchronous replication, nearly synchronous replication, asynchronous replication, configurable asynchronous replication, snapshot-based replication, continuous data replication, periodic replication, or a combination of configurable asynchronous data replication and dynamically determined snapshot updates. Examples of various ones of these replication schemes are described above with reference to FIGS. 4A-8.

In some implementations, the above-listed replication schemes may be implemented based on a common or uniform management model, where the common management model includes a same or similar metadata model for representing stored data, such as the metadata representation described above with reference to FIG. 4B. For example, in some implementations, a first storage system (2600) may use each of the above-listed replication schemes to establish a replication relationship among one or more other storage systems, where implementation of a given replication scheme is based on a management model that is common to all storage systems participating in a replication relationship, where the common management model may be used to implement each of the above-listed replication schemes.

Further, in some implementations, based on the common management model for the different replication schemes, whether a first storage system (2600) is implementing asynchronous replication, synchronous replication, or some other replication scheme listed above, the replication scheme specifications are the same for network communication with another storage system. For example, as discussed above, a given replication scheme may not be aware of network communication details below a network transport mechanism, and consequently, whether the underlying media layer is different kinds of wireless networks or different kinds of physical networks, the given replication scheme handles communication commands to implement a given replication scheme similarly.

In some implementations, a replication relationship is established when a first storage system (2600) begins replicating data with another storage system, where the first storage system (2600) may have its own internal management of data structures for defining storage objects, mapping objects to physical storage, deduplication, for defining mapping of content to snapshots, and other management tasks related to replicating data. In this way, while a common management model is used by all members of a replication relationship, individual members maintain management of local management information that uses the common management model.

In some implementations, a replication relationship may be specified by a replication policy. In some examples, a replication policy may be considered a management object that specifies how a first storage system (2600) handles data replication in response to changes or in response to anticipated changes in network conditions, such as network bandwidth, network health, network latencies, types of networks.

For example, a first storage system (2600) may use a replication policy to specify conditions or rules that determine modifications to the behavior of a replication scheme, that determine switching between replication schemes, both modifying behavior of a replication scheme and switching between different networks, or both switching between replication schemes and switching between different networks.

In some implementations, a first storage system (2600) may, based on a replication policy, determine that if a Fibre Channel network is available, then a replication scheme to use with another storage system may be a synchronous replication scheme. Further, in this example, the replication policy may specify that the first storage system (2600) continue synchronous replication scheme unless there are changes to the health of the network, changes to available bandwidth, or changes to network latency.

Further, in some implementations, a first storage system (2600) may, based on a replication policy, responsive to synchronizing a dataset (2660) with a synchronous replication scheme, that the replication scheme switch to a different replication scheme, such as asynchronous replication, snapshot-based replication, or any of the other above-listed replication schemes.

In some implementations, based on replication policy, a first storage system (2600) may, in addition to or instead of responding to network conditions by switching networks, respond to changes in network loads or network traffic patterns. For example, a replication policy may specify that in response to network bandwidth availability that drops below a specified threshold, a replication scheme—without switching networks or switching between messaging layers switch from a current replication scheme to a replication scheme that uses less network bandwidth. For example, the replication policy may specify a switch from using synchronous replication to snapshot-based replication, or some other type of lower bandwidth consumption replication scheme.

In some implementations, a first storage system (2600) may, based on a replication policy, determine that responsive to switching from an external power supply to an internal power supply, switch replication schemes from a current replication scheme to a replication scheme that uses less power. For example, a first storage system (2600) may, responsive to switching to an internal battery power supply, switch from synchronous replication to periodic snapshot replication, or some other low-power replication scheme.

Readers will appreciate that the storage systems described above may be similar to any of the storage systems described with reference to FIGS. 1A-3C, including variations of such systems that include additional or fewer components, including combinations thereof. Likewise, the storage systems described above can even be implemented as an Amazon S3 target or other replication target in a cloud environment.

Advantages and features of the present disclosure can be further described by the following statements:

1. A method comprising: replicating, between a first storage system and a second storage system that are both located at a first physical location, a dataset; connecting, by the first storage system and responsive to movement of the first storage system to an intermediate physical location, to a communication network available at the intermediate physical location; and continuing, between the first storage system at the intermediate physical location and the second storage system at the first physical location, replication of the dataset over the communication network available at the intermediate physical location.

2. The method of statement 1, further comprising: establishing a replication scheme between the first storage system and the second storage system that includes replicating, between the first storage system and the second storage system, updates to the dataset that are received at either the first storage system or the second storage system; wherein the replication scheme synchronously or asynchronously maintains consistency between a version of the dataset stored on the first storage system and a version of the dataset stored on the second storage system.

3. The method of statement 2 or statement 1, further comprising: determining network characteristics of the communication network available at the intermediate physical location; and determining, based on the network characteristics of the communication network available at the intermediate physical location, that the communication network available at the intermediate physical location provides lower bandwidth than the communication network available at the first physical location.

4. The method of statement 3, statement 2, or statement 1, further comprising: selecting, responsive to the communication network available at the intermediate physical location relative providing lower bandwidth than the communication network available at the first physical location, a low-bandwidth replication scheme from among a plurality of replication schemes.

5. The method of statement 4, statement 3, statement 2, or statement 1, further comprising: transitioning, without terminating replication of the dataset and responsive to selecting the low-bandwidth replication scheme, the first storage system from using a current replication scheme to using the low-bandwidth replication scheme.

6. The method of statement 5, statement 4, statement 3, statement 2, or statement 1, further comprising: selecting, based on a change in network availability at the intermediate physical location and on expected performance improvement replicating the dataset, a replacement replication scheme; and transitioning, responsive to selecting the replacement replication scheme, from the low-bandwidth replication scheme to the replacement replication scheme.

7. The method of statement 6, statement 5, statement 4, statement 3, statement 2, or statement 1, further comprising: determining, relative to the first physical location, lower power availability at the intermediate physical location; and transitioning, based on the lower power availability at the intermediate physical location, the first storage system from using a current replication scheme to using a low-power replication scheme.

8. The method of statement 7, statement 6, statement 5, statement 4, statement 3, statement 2, or statement 1, wherein the current replication scheme and the low-power replication scheme are based on a common management model.

9. The method of statement 8, statement 7, statement 6, statement 5, statement 4, statement 3, statement 2, or statement 1, wherein the first physical location of the first storage system is within a geographically fixed data center, and wherein the intermediate physical location of the first storage system is a vehicle or a shipping container.

10. The method of statement 9, statement 8, statement 7, statement 6, statement 5, statement 4, statement 3, statement 2, or statement 1, further comprising: responsive to arrival of the first storage system to a destination physical location: synchronizing, with the second storage system replicating the dataset, the dataset with the second storage system to overcome any lags in synchronization of the dataset on the first storage system during transport between the first physical location and the physical destination location.

11. The method of statement 10, statement 9, statement 8, statement 7, statement 6, statement 5, statement 4, statement 3, statement 2, or statement 1, wherein the third physical location is a local, on-premises data center.

12. A first storage system comprising one or more storage devices; one or more network ports; and a storage controller, wherein the storage controller is configured to: replicate, between the first storage system and a second storage system that are both located at a first physical location, a dataset; connect, by the first storage system and responsive to movement of the first storage system to an intermediate physical location, to a communication network available at the intermediate physical location; and continue, between the first storage system at the intermediate physical location and the second storage system at the first physical location, replication of the dataset over the communication network available at the intermediate physical location.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method comprising:

replicating a dataset between a first storage system and a second storage system using a first replication scheme, the first storage system and a second storage system included within a plurality of storage systems that replicate the dataset;

detecting that the first storage system is being physically moved from a first physical location through one or more intermediate physical locations to a second physical location based on a change of power availability; and in response to detecting that the first storage system is being physically moved, transitioning from the first replication scheme to a second replication scheme.

2. The method of claim 1, further comprising:

establishing the first replication scheme between the first storage system and the second storage system that includes replicating, between the first storage system and the second storage system, updates to the dataset that are received at either the first storage system or the second storage system;

wherein the first replication scheme synchronously or asynchronously maintains consistency between a version of the dataset stored on the first storage system and a version of the dataset stored on the second storage system.

3. The method of claim 1, further comprising:

determining network characteristics of a communication network available at the one or more of the intermediate physical locations; and determining, based on the network characteristics of the communication network available at the one or more intermediate physical locations, that the communication network available at the one or more intermediate physical locations provides lower bandwidth than one or more networks previously used for data replication.

4. The method of claim 3, further comprising:

selecting, responsive to the communication network available at the one or more intermediate physical locations providing lower bandwidth than the one or more networks previously used for data replication, a low-bandwidth replication scheme from among a plurality of replication schemes.

5. The method of claim 4, further comprising:

transitioning, without terminating replication of the dataset and responsive to selecting the low-bandwidth replication scheme, the first storage system from using a current replication scheme to using the low-bandwidth replication scheme.

6. The method of claim 5, further comprising:

selecting, based on a change in network availability at the one or more intermediate physical locations and on expected performance improvement replicating the dataset, a replacement replication scheme; and transitioning, responsive to selecting the replacement replication scheme, from the low-bandwidth replication scheme to the replacement replication scheme.

7. The method of claim 1, further comprising:

determining, relative to the first physical location, lower power availability at the one or more intermediate physical locations; and transitioning, based on the lower power availability at the one or more intermediate physical locations, the first storage system from using a current replication scheme to using a low-power replication scheme.

8. The method of claim 7, wherein the current replication scheme and the low-power replication scheme are based on a common management model.

9. The method of claim 1, wherein the first physical location of the first storage system is within a geographically fixed data center, and wherein the one or more intermediate physical locations of the first storage system is within a vehicle or a shipping container.

10. The method of claim 1, further comprising:

responsive to arrival of the first storage system to a physical destination location:

synchronizing, with the second storage system replicating the dataset, the dataset with the second storage system to overcome any lags in synchronization of the dataset on the first storage system during transport to the physical destination location.

11. A storage system comprising:

one or more storage devices;

one or more network ports; and a storage controller configured to:

replicate a dataset between a first storage system and a second storage system using a first replication scheme, the first storage system and a second storage system included within a plurality of storage systems that replicate the dataset;

detect that the first storage system is being physically moved from a first physical location through one or more intermediate physical locations to a second physical location based on a change of power availability; and in response to detecting that the first storage system is being physically moved, transition from the first replication scheme to a second replication scheme.

12. The storage system of claim 11, wherein the storage controller is further configured to:

establish the first replication scheme between the first storage system and the second storage system that includes replicating, between the first storage system and the second storage system, updates to the dataset that are received at either the first storage system or the second storage system;

wherein the first replication scheme synchronously or asynchronously maintains consistency between a version of the dataset stored on the first storage system and a version of the dataset stored on the second storage system.

13. The storage system of claim 11, wherein the storage controller is further configured to:

determine network characteristics of a communication network available at the one or more intermediate physical locations; and determine, based on the network characteristics of the communication network available at the one or more intermediate physical locations, that the communication network available at the one or more intermediate physical locations provides lower bandwidth than one or more networks previously used for data replication.

14. The storage system of claim 13, wherein the storage controller is further configured to:

select, responsive to the communication network available at the one or more intermediate physical locations providing lower bandwidth than the one or more networks previously used for data replication, a low-bandwidth replication scheme from among a plurality of replication schemes.

15. The storage system of claim 14, wherein the storage controller is further configured to:

transition, without terminating replication of the dataset and responsive to selecting the low-bandwidth replication scheme, the first storage system from using a current replication scheme to using the low-bandwidth replication scheme.

16. The storage system of claim 15, wherein the storage controller is further configured to:

select, based on a change in network availability and on expected performance improvement replicating the dataset, a replacement replication scheme; and transition, responsive to selecting the replacement replication scheme, from the low-bandwidth replication scheme to the replacement replication scheme.

17. The storage system of claim 11, wherein the storage controller is further configured to:

determine, relative to the first physical location, lower power availability at one or more of the intermediate physical locations; and transition, based on the lower power availability at the one or more intermediate physical locations, the first storage system from using a current replication scheme to using a low-power replication scheme.

18. The storage system of claim 17, wherein the current replication scheme and the low-power replication scheme are based on a common management model.

19. The storage system of claim 11, wherein the first physical location of the first storage system is within a geographically fixed data center, and wherein the one or more intermediate physical locations of the first storage system is within a vehicle or a shipping container.

20. A non-transitory computer readable storage medium storing instructions which, when executed, cause a storage controller to:

replicate a dataset between a first storage system and a second storage system using a first replication scheme, the first storage system and a second storage system included within a plurality of storage systems that replicate the dataset;

detect that the first storage system is being physically moved from a first physical location through one or more intermediate physical locations to a second physical location based on a change of power availability; and in response to detecting that the first storage system is being physically moved, transition from the first replication scheme to a second replication scheme.

* * * * *